US012759928B2

(12) United States Patent
Berkey et al.

(10) Patent No.: US 12,759,928 B2
(45) Date of Patent: Oct. 13, 2026

(54) TRANSPARENT AND TRANSLUCENT GLASS-CERAMICS AND GLASSES FOR FORMING THE SAME

(71) Applicant: CORNING INCORPORATED, Corning, NY (US)

(72) Inventors: Adam Charles Berkey, Pittsburgh, PA (US); Carol Ann Click, Corning, NY (US); Qiang Fu, Painted Post, NY (US); Kayla Nicole Horton, Campbell, NY (US); Charlene Marie Smith, Corning, NY (US); Siqi Liu, Elmira, NY (US); Alana Marie Whittier, Painted Post, NY (US); Balamurugan Meenakshi Sundaram, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 19/273,898

(22) Filed: Jul. 18, 2025

(65) Prior Publication Data

US 2026/0022056 A1 Jan. 22, 2026

Related U.S. Application Data

(60) Provisional application No. 63/724,590, filed on Nov. 25, 2024, provisional application No. 63/673,413, filed on Jul. 19, 2024.

(51) Int. Cl.
*C03C 3/097* (2006.01)
*C03C 10/00* (2006.01)
(Continued)

(52) U.S. Cl.
CPC ........ *C03C 10/0027* (2013.01); *G06F 1/1629* (2025.01)

(58) Field of Classification Search
CPC ... C03C 10/0027; C03C 21/002; C03C 3/097; G06F 1/1629
See application file for complete search history.

(56) References Cited

U.S. PATENT DOCUMENTS 10,239,780 B2 3/2019 Beall et al.
11,131,611 B2 9/2021 Chambliss et al.
(Continued)

FOREIGN PATENT DOCUMENTS

WO 2003/022767 A1 3/2003
WO 2023/090177 A1 5/2023

OTHER PUBLICATIONS

Beall et al., "Nanophase glass-ceramics", Journal of the American Ceramic Society 82(1) (1999), pp. 5-16.
(Continued)

*Primary Examiner* — Cameron K Miller
(74) *Attorney, Agent, or Firm* — Russell S. Magaziner

(57) ABSTRACT

A glass-ceramic may comprise a phase assemblage comprising lithium disilicate ($Li_2Si_2O_5$) as the primary crystalline phase and a residual amorphous glass phase. The glass-ceramic may further comprise greater than or equal to 0 wt % to less than 8 wt % CaO. A ratio of $Al_2O_3$ (wt %) to $Li_2O$ (wt %) in the glass-ceramic may be greater than or equal to 0 and less than 0.50. The glass-ceramic may have a transmittance of greater than 88% for wavelengths of light within a range from greater than or equal to 400 nm to less than or equal to 750 nm.

19 Claims, 22 Drawing Sheets

(51) Int. Cl.
*C03C 21/00* (2006.01)
*G06F 1/16* (2006.01)

(56) References Cited

U.S. PATENT DOCUMENTS

| | | | | |
|---|---|---|---|---|
| 2017/0342383 | A1* | 11/2017 | Deng | C03C 10/0027 |
| 2020/0300615 | A1 | 9/2020 | Andrews et al. | |
| 2021/0030920 | A1 | 2/2021 | Deng et al. | |
| 2023/0069922 | A1 | 3/2023 | Zhou et al. | |
| 2023/0295035 | A1 | 9/2023 | Yuan et al. | |

OTHER PUBLICATIONS

Bubsey et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, (Oct. 1992), pp. 1-30.

Fu et al., "Nature-inspired design of strong, tough glass-ceramics", MRS Bulletin 42(3) (2017), pp. 220-225.

Gulati, "Frangibility of Tempered Soda-Lime Glass Sheet," Glass Processing Days, Sep. 13-15, 1997, pp. 72-76.

Holand et al., "Glass-ceramic technology", John Wiley & Sons, 2019.

Reddy et al., "Fracture Toughness Measurement of Glass and Ceramic Materials Using Chevron-Notched Specimens," J. Am. Ceram. Soc., 71 [6], 1988, C-310-C-313.

Shyam et al., "The double-torsion testing technique for determination of fracture toughness and slow crack growth of materials: A review," J. Mater. Sci., 41, 2006, pp. 4093-4104.

International Search Report and Written Opinion of the International Searching Authority; PCT/US2025/038271; dated Oct. 24, 2025; 13 pages; European Patent Office.

* cited by examiner

TRANSPARENT AND TRANSLUCENT GLASS-CERAMICS AND GLASSES FOR FORMING THE SAME

CROSS REFERENCE TO RELATED APPLICATIONS

The present specification claims the benefit of priority of U.S. Provisional Application Ser. No. 63/673,413 filed Jul. 19, 2024 and entitled "Transparent and Translucent Glass-Ceramics and Precursor Glasses for Forming the Same" and U.S. Provisional Application Ser. No. 63/724,590 filed Nov. 25, 2024 and entitled "Transparent and Translucent Glass-Ceramics and Glasses for Forming the Same," each or of which are incorporated by reference herein.

FIELD

The present specification generally relates to transparent and translucent glass-ceramics and glasses for forming the same and, more particularly, to transparent glass-ceramics with improved optical and mechanical properties.

TECHNICAL BACKGROUND

There is a demand for high strength transparent and translucent materials that may be used in conjunction with, for example, portable electronic devices. Several materials are currently utilized on the market such as glass, zirconia, plastic, metal, and glass-ceramics.

Glass-ceramics have certain advantages over other materials. However, it can be difficult to form glass-ceramics having the mechanical properties required for high strength portable devices and which also have the desired optical properties.

Accordingly, a need exists for glass-ceramics having improved properties, glasses from which the glass-ceramics are formed, and methods for making the glass-ceramics from glasses.

SUMMARY

The subject matter of the present specification may be understood in terms of the following aspects.

According to a first aspect A1, a glass-ceramic comprises: a phase assemblage comprising lithium disilicate ($Li_2Si_2O_5$) as the primary crystalline phase and a residual amorphous glass phase; and greater than 0 wt % to less than 8 wt % CaO, wherein: a ratio of $Al_2O_3$ (wt %) to $Li_2O$ (wt %) in the glass-ceramic is greater than or equal to 0 and less than 0.50; and the glass-ceramic has a transmittance of greater than 88% for wavelengths of light within a range from greater than or equal to 400 nm to less than or equal to 750 nm.

A second aspect A2 includes the glass-ceramic of the first aspect A1, wherein the ratio of $Al_2O_3$ (wt %) to $Li_2O$ (wt %) in the glass-ceramic is greater than or equal to 0 and less than or equal to 0.30.

A third aspect A3 includes the glass-ceramic of any of aspects A1-A2, wherein the ratio of $Al_2O_3$ (wt %) to $Li_2O$ (wt %) in the glass-ceramic is greater than or equal to 0 and less than or equal to 0.15.

A fourth aspect A4 includes the glass ceramic of any of aspects A1-A3, wherein a ratio of $Li_2O$ (wt %) to $ZrO_2$ (wt %) in the glass-ceramic is greater than or equal to 1.10 and less than or equal to 5.0.

A fifth aspect A5 includes the glass ceramic of any of aspects A1-A4, wherein a ratio of $Li_2O$ (wt %) to the sum of $Li_2O$ (wt %), $Na_2O$ (wt %), and $K_2O$ (wt %) in the glass-ceramic is greater than or equal to 0.5 and less than or equal to 1.0.

A sixth aspect A6 includes the glass ceramic of any of aspects A1-A5, wherein the phase assemblage comprises a secondary crystalline phase comprising lithium metasilicate ($Li_2SiO_3$).

A seventh aspect A7 includes the glass ceramic of any of aspects A1-A6, wherein the phase assemblage comprises a secondary crystalline phase comprising lithium phosphate ($Li_3PO_4$).

An eight aspect A8 includes the glass ceramic of any of aspects A1-A7, wherein the glass-ceramic is free of a petalite crystalline phase.

A ninth aspect A9 includes the glass ceramic of any of aspects A1-A8, wherein the phase assemblage comprises: lithium disilicate ($Li_2Si_2O_5$) with a Rietveld parameter of greater than or equal to 20 and less than or equal to 90; lithium phosphate ($Li_3PO_4$) with a Rietveld parameter of greater than or equal to 0 and less than or equal to 10; and lithium metasilicate ($Li_2SiO_3$) with a Rietveld parameter of greater than or equal to 0 and less than or equal to 10.

A tenth aspect A10 includes the glass ceramic of any of aspects A1-A9, comprising: greater than or equal to 55 wt % and less than or equal to 80 wt % $SiO_2$; greater than or equal to 0 wt % and less than or equal to 6 wt % $Al_2O_3$; greater than or equal to 7 wt % and less than or equal to 20 wt % $Li_2O$; greater than or equal to 1 wt % and less than or equal to 8 wt % $P_2O_5$; greater than 0.5 wt % to less than or equal to 20 wt % $ZrO_2$; greater than or equal to 0 wt % and less than or equal to 5.0 wt % $Na_2O$; and greater than or equal to 0 wt % and less than or equal to 5.0 wt % $K_2O$.

An eleventh aspect A11 includes the glass ceramic of any of aspects A1-A10, comprising: greater than or equal to 55 wt % and less than or equal to 80 wt % $SiO_2$; greater than or equal to 7 wt % and less than or equal to 20 wt % $Li_2O$; greater than 4 wt % to less than or equal to 15 wt % $ZrO_2$; greater than or equal to 1 wt % and less than or equal to 8 wt % $P_2O_5$; greater than or equal to 0.1 wt % and less than or equal to 5 wt % $Na_2O$; and less than 1 wt % $K_2O$.

A twelfth aspect A12 includes the glass ceramic of any of aspects A1-A11, comprising greater than or equal to 0 wt % and less than or equal to 3 wt % $Al_2O_3$.

A thirteenth aspect A13 includes the glass ceramic of any of aspects A1-A12, comprising greater than or equal to 55 wt % and less than or equal to 72 wt % $SiO_2$.

A fourteenth aspect A14 includes the glass ceramic of any of aspects A1-A13, comprising greater than or equal to 12 wt % and less than or equal to 18 wt % $Li_2O$.

A fifteenth aspect A15 includes the glass ceramic of any of aspects A1-A14, comprising greater than or equal to 0.1 wt % and less than or equal to 3.0 wt % $Na_2O$.

A sixteenth aspect A16 includes the glass ceramic of any of aspects A1-A15, comprising less than or equal to 0.5 $K_2O$.

A seventeenth aspect A17 includes the glass ceramic of any of aspects A1-A16, comprising greater than or equal to 7 wt % to less than or equal to 12 wt % $ZrO_2$.

An eighteenth aspect A18 includes the glass ceramic of any of aspects A1-A17, comprising greater than or equal to 3 wt % and less than or equal to 5 wt % $P_2O_5$.

A nineteenth aspect A19 includes the glass ceramic of any of aspects A1-A18, comprising: greater than or equal to 55 wt % and less than or equal to 80 wt % $SiO_2$; greater than or equal to 7 wt % and less than or equal to 20 wt % $Li_2O$; greater than 4 wt % to less than or equal to 15 wt % $ZrO_2$; greater than or equal to 1 wt % and less than or equal to 8 wt % $P_2O_5$; greater than or equal to 0.05 wt % and less than or equal to 5 wt % $Na_2O$; and less than 1 wt % $K_2O$.

A twentieth aspect A20 includes the glass ceramic of any of aspects A1-A19, wherein a ratio of a Rietveld parameter of the lithium disilicate to a crystallite size (in nm) of the lithium disilicate is greater than or equal to 2.75 wt %/nm.

A twenty-first aspect A21 includes the glass ceramic of any of aspects A1-A20, wherein the glass-ceramic has a Young's modulus greater than or equal to 100 GPa and less than or equal to 130 GPa.

A twenty-second aspect A22 includes the glass ceramic of any of aspects A1-A21, wherein the glass-ceramic has a fracture toughness greater than or equal to 1.10 $MPa \cdot m^{1/2}$ and less than or equal to 2.00 $MPa \cdot m^{1/2}$ prior to strengthening by ion exchange.

A twenty-third aspect A23 includes the glass ceramic of any of aspects A1-A22, wherein the glass-ceramic has the transmittance of greater than 88% for wavelengths of light within the range from greater than or equal to 400 nm to less than or equal to 750 nm for an article thickness of less than or equal to 0.5 mm.

A twenty-fourth aspect A24 includes the glass ceramic of any of aspects A1-A23, wherein the glass-ceramic has a haze of less than 1.0%.

A twenty-fifth aspect A25 includes the glass ceramic of any of aspects A1-A24, wherein the glass-ceramic has an article thickness of less than or equal to 0.6 mm.

A twenty-sixth aspect A26 includes the glass ceramic of any of aspects A1-A25, wherein the glass-ceramic has a haze of less than 0.4%.

A twenty-seventh aspect A27 includes the glass ceramic of any of aspects A1-A25, wherein the glass-ceramic has an article thickness of less than or equal to 0.6 mm.

A twenty-eighth aspect A28 includes the glass ceramic of any of aspects A1-A27, wherein the glass-ceramic comprises crystallites having a crystallite size greater than or equal to 10 nm and less than or equal to 100 nm.

A twenty-ninth aspect A29 includes the glass ceramic of any of aspects A1-A28, further comprising: a compressive stress layer extending from a surface of the glass-ceramic to a depth of compression; and a maximum central tension, wherein the maximum central tension is greater than 130 MPa.

A thirtieth aspect A30 includes the glass ceramic of any of aspects A1-A29, wherein the compressive stress layer comprises a surface compressive stress greater than or equal to 200 MPa and less than or equal to 650 MPa.

A thirty-first aspect A31 includes the glass ceramic of any of aspects A1-A30, wherein the glass-ceramic is strengthened by ion exchange.

A thirty-second aspect A32 includes the glass ceramic of any of aspects A1-A31, wherein the glass-ceramic has a thickness t and the depth of compression is greater than or equal to 0.09*t to less than or equal to 0.30*t.

A thirty-third aspect A33 includes the glass ceramic of any of aspects A1-A32, comprising a retained strength greater than or equal to 100 MPa for flaw depths less than or equal to 150 μm.

A thirty-fourth aspect A34 includes the glass ceramic of any of aspects A1-A33, comprising: a Young's modulus greater than or equal to 100 GPa and less than or equal to 130 GPa; a fracture toughness greater than or equal to 1.10 $MPa \cdot m^{1/2}$ and less than or equal to 2.00 $MPa \cdot m^{1/2}$ prior to strengthening by ion exchange; a transmittance of greater than 88% for wavelengths of light within a range from greater than or equal to 400 nm to less than or equal to 750 nm; and a haze of less than 1.0%.

A thirty-fifth aspect A35 includes the glass ceramic of any of aspects A1-A34, wherein the glass-ceramic has the transmittance of greater than 88% for wavelengths of light within the range from greater than or equal to 400 nm to less than or equal to 750 nm for an article thickness of less than or equal to 0.5 mm.

A thirty-sixth aspect A36 includes the glass ceramic of any of aspects A1-A35, wherein the glass-ceramic has the haze of less than 1.0% at an article thickness of less than or equal to 0.6 mm.

A thirty-seventh aspect A37 includes the glass ceramic of any of aspects A1-A36, comprising a maximum central tension greater than or equal to 130 MPa and less than or equal to 250 MPa.

A thirty-eighth aspect A38 includes the glass ceramic of any of aspects A1-A37, wherein the maximum central tension is greater than 220 MPa.

A thirty-ninth aspect A39 includes the glass ceramic of any of aspects A1-A38, wherein the haze is less than or equal to 0.30%.

A fortieth aspect A40 includes the glass ceramic of any of aspects A1-A39, wherein the fracture toughness is greater than or equal to 1.2 $MPa \cdot m^{1/2}$.

A forty-first aspect A41 includes the glass ceramic of any of aspects A1-A40, wherein the transmittance is greater than 90% for wavelengths of light within a range from greater than or equal to 400 nm to less than or equal to 750 nm.

A forty-second aspect A42 includes the glass ceramic of any of aspects A1-A41, wherein the Young's modulus is greater than or equal to 105 GPa and less than or equal to 130 GPa.

A forty-third aspect A43 includes an electronic device comprising a cover substrate, the cover substrate comprising the glass-ceramic of any of aspects A1-A42.

According to a forty-fourth aspect A44, a glass or glass-ceramic comprises: greater than or equal to 55 wt % and less than or equal to 80 wt % $SiO_2$; greater than or equal to 7 wt % and less than or equal to 20 wt % $Li_2O$; greater than or equal to 1 wt % and less than or equal to 8 wt % $P_2O_5$; greater than or equal to 0.05 wt % and less than or equal to 5.0 wt % $Na_2O$; greater than 0.5 wt % to less than or equal to 20 wt % $ZrO_2$; greater than or equal to 1 wt % to less than 4 wt % CaO; and less than 1 wt % $K_2O$, wherein: a ratio of $Al_2O_3$ (wt %) to $Li_2O$ (wt %) in the glass or glass-ceramic is greater than or equal to 0 and less than 0.20.

A forty-fifth aspect A45 includes a glass or glass-ceramic of aspect A44, comprising greater than or equal to 0 wt % and less than or equal to 3 wt % $Al_2O_3$.

A forty-sixth aspect A46 includes the glass or glass-ceramic of any of aspects A44-A45, wherein the ratio of $Al_2O_3$ (wt %) to $Li_2O$ (wt %) in the glass or glass-ceramic is greater than or equal to 0 and less than 0.15.

A forty-seventh aspect A47 includes the glass or glass-ceramic of any of aspects A44-A46, wherein a ratio of $Li_2O$ (wt %) to $ZrO_2$ (wt %) in the glass or glass-ceramic is greater than or equal to 1.20 and less than or equal to 5.

A forty-eighth aspect A48 includes the glass or glass-ceramic of any of aspects A44-A47, wherein a ratio of $Li_2O$ (wt %) to the sum of $Li_2O$ (wt %), $Na_2O$ (wt %), and $K_2O$ (wt %) in the glass or glass-ceramic is greater than or equal to 0.5 and less than or equal to 1.0.

A forty-ninth aspect A49 includes the glass or glass-ceramic of any of aspects A44-A48, comprising greater than or equal to 55 wt % and less than or equal to 72 wt % $SiO_2$.

A fiftieth aspect A50 includes the glass or glass-ceramic of any of aspects A44-A49, comprising greater than or equal to 12 wt % and less than or equal to 18 wt % $Li_2O$.

A fifty-first aspect A51 includes the glass or glass-ceramic of any of aspects A44-A50, comprising greater than or equal to 0.05 wt % and less than or equal to 3.0 wt % $Na_2O$.

A fifty-second aspect A52 includes the glass or glass-ceramic of any of aspects A44-A51, comprising less than or equal to 0.5 $K_2O$.

A fifty-third aspect A53 includes the glass or glass-ceramic of any of aspects A44-A52, comprising greater than or equal to 7 wt % to less than or equal to 12 wt % $ZrO_2$.

A fifty-fourth aspect A54 includes the glass or glass-ceramic of any of aspects A44-A53, comprising greater than or equal to 3 wt % and less than or equal to 5 wt % $P_2O_5$.

According to a fifty-fifth aspect A55, glass-ceramic article comprises: a phase assemblage comprising lithium disilicate ($Li_2Si_2O_5$) as the primary crystalline phase and a residual amorphous glass phase, wherein the phase assemblage is substantially free of a petalite crystalline phase; a Young's modulus greater than or equal to 100 GPa and less than or equal to 130 GPa; a fracture toughness greater than or equal to 1.10 $MPa \cdot m^{1/2}$ and less than or equal to 2.00 $MPa \cdot m^{1/2}$ prior to strengthening by ion exchange; a transmittance of greater than 88% for wavelengths of light within a range from greater than or equal to 400 nm to less than or equal to 750 nm; and a haze of less than 1.0%.

A fifty-sixth A56 aspect includes the glass-ceramic article of the fifty-fifth aspect A55, wherein the glass ceramic article comprises a b* reflected color coordinate in CIELAB color space of greater than or equal to −3.80 and less than or equal to −2.20, as measured at an article thickness of 0.6 mm under D65 illumination and a 10° standard observer angle.

A fifty-seventh aspect A57 includes the glass-ceramic article of any of aspects A55-A56, wherein the glass-ceramic article has the transmittance of greater than 88% for wavelengths of light within the range from greater than or equal to 400 nm to less than or equal to 750 nm for an article thickness of less than or equal to 0.5 mm.

A fifty-eighth aspect A58 includes the glass-ceramic article of any of aspects A55-A57, wherein the glass-ceramic article has the haze of less than 1.0% at an article thickness of less than or equal to 0.6 mm.

A fifty-ninth aspect A59 includes the glass-ceramic article of any of aspects A55-A58, comprising a retained strength following damage introduction by a pressurized gas method of: greater than or equal to 100 MPa for average flaw depths less than or equal to 150 μm; greater than or equal to 200 MPa for average flaw depths less than or equal to 100 μm; greater than or equal to 350 MPa for average flaw depths less than or equal to 50 μm; greater than or equal to 450 MPa for average flaw depth less than or equal to 25 μm; and greater than or equal to 500 MPa for average flaw depths less than or equal to 10 μm.

A sixtieth aspect A60 includes the glass-ceramic article of any of aspects A55-A59, comprising a maximum central tension greater than or equal to 130 MPa and less than or equal to 250 MPa.

A sixty-first aspect A61 includes the glass-ceramic article of any of aspects A55-A60, wherein the maximum central tension is greater than 220 MPa.

A sixty-second aspect A62 includes the glass-ceramic article of any of aspects A55-A61, wherein the haze is less than or equal to 1.0%.

A sixty-third aspect A63 includes the glass-ceramic article of any of aspects A55-A62, wherein the fracture toughness is greater than or equal to 1.2 $MPa \cdot m^{1/2}$.

A sixty-fourth aspect A64 includes the glass-ceramic article of any of aspects A55-A63, wherein the transmittance is greater than 90% for wavelengths of light within a range from greater than or equal to 400 nm to less than or equal to 750 nm.

A sixty-fifth aspect A65 includes the glass-ceramic article of any of aspects A55-A64, wherein the Young's modulus is greater than or equal to 105 GPa and less than or equal to 130 GPa.

A sixty-sixth aspect A66 includes the glass-ceramic article of any of aspects A55-A65, comprising a failure stress of greater than or equal to 110 MPa after impact with a pendulum impactor apparatus with 180 grit sandpaper.

A sixty-seventh aspect A67 includes the glass-ceramic article of any of aspects A55-A66, comprising a failure stress of greater than or equal to 90 MPa after impact with a pendulum impactor apparatus with 80 grit sandpaper.

A sixty-eighth aspect A68 includes the glass-ceramic article of any of aspects A55-A67, comprising a failure stress of greater than or equal to 80 MPa after impact with a pendulum impactor apparatus with 30 grit sandpaper.

A sixty-ninth aspect A69 includes the glass-ceramic article of any of aspects A55-A68, wherein the glass-ceramic article is not strengthened by ion exchange and comprises an average flaw depth of less than or equal to 70 μm after impact with a pendulum impactor apparatus with 180 grit sandpaper.

A seventieth aspect A70 includes the glass-ceramic article of any of aspects A55-A69, wherein the glass-ceramic article is not strengthened by ion exchange and comprises an average flaw depth of less than or equal to 120 μm after impact with a pendulum impactor apparatus with 80 grit sandpaper.

A seventy-first aspect A71 includes the glass-ceramic article of any of aspects A55-A70, wherein the glass-ceramic article is not strengthened by ion exchange and comprises an average flaw depth of less than or equal to 170 μm after impact with a pendulum impactor apparatus with 30 grit sandpaper.

A seventy-second aspect A72 includes the glass-ceramic article of any of aspects A55-A71, wherein the glass-ceramic article is strengthened by ion exchange and comprises an average flaw depth of less than or equal to 80 μm after impact with a pendulum impactor apparatus with 80 grit sandpaper.

A seventy-third aspect A73 includes the glass-ceramic article of any of aspects A55-A72, wherein the glass-ceramic article comprises a retained strength of greater than or equal to 250 MPa.

A seventy-fourth aspect A74 includes the glass-ceramic article of any of aspects A55-A73, wherein the glass-ceramic article is not strengthened by ion exchange and comprises a Knoop hardness of greater than or equal to 650 $kgf/mm^2$ and less than or equal to 700 $kgf/mm^2$.

A seventy-fifth aspect A75 includes the glass-ceramic article of any of aspects A55-A74, wherein the glass-ceramic article is strengthened by ion exchange and comprises a Knoop hardness of greater than or equal to 680 $kgf/mm^2$ and less than or equal to 750 $kgf/mm^2$.

A seventy-sixth aspect A76 includes the glass-ceramic article of any of aspects A55-A75, wherein the glass-ceramic article comprises a thickness t and a compressive stress $CS_D$ at a depth from 0.01t to 0.02t from a surface of the glass-ceramic article of greater than or equal to 300 MPa.

A seventy-seventh aspect A77 includes the glass-ceramic article of any of aspects A55-A76, wherein a ratio of a Rietveld parameter of the lithium disilicate to a crystallite size (in nm) of the lithium disilicate is greater than or equal to 2.75 wt %/nm.

A seventy-eighth aspect A78 includes the glass-ceramic article of any of aspects A55-A77, wherein the glass ceramic article has a drop height of greater than or equal to 180 cm on 80 grit SiC sandpaper at an article thickness of 0.6 mm.

A seventy-ninth aspect A79 includes the glass-ceramic article of any of aspects A55-A78, wherein the glass ceramic article has a drop height of greater than or equal to 130 cm on 80 grit SiC sandpaper at an article thickness of 0.5 mm.

An eightieth aspect A80 includes the glass-ceramic article of any of aspects A55-A79, wherein the glass ceramic article has a drop height of greater than or equal to 160 cm on 80 grit SiC sandpaper at an article thickness of 0.55 mm.

An eighty-first aspect A81 includes the glass-ceramic article of any of aspects A55-A80, wherein the glass ceramic article has a drop height of greater than or equal to 45 cm on 36 grit $Al_2O_3$ sandpaper at an article thickness of 0.55 mm.

An eighty-second aspect A82 includes the glass-ceramic article of any of aspects A55-A81, wherein the glass ceramic article has a drop height of greater than or equal to 45 cm on 36 grit $Al_2O_3$ sandpaper at an article thickness of 0.60 mm.

According to an eighty-third aspect A83, a glass-ceramic article comprises: a phase assemblage comprising lithium disilicate ($Li_2Si_2O_5$) as the primary crystalline phase and a residual amorphous glass phase, wherein: the phase assemblage is substantially free of a petalite crystalline phase; and a ratio of a Rietveld parameter of the lithium disilicate to a crystallite size (in nm) of the lithium disilicate is greater than or equal to 2.75 wt %/nm.

Additional features and advantages of the glass-ceramics and glasses described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
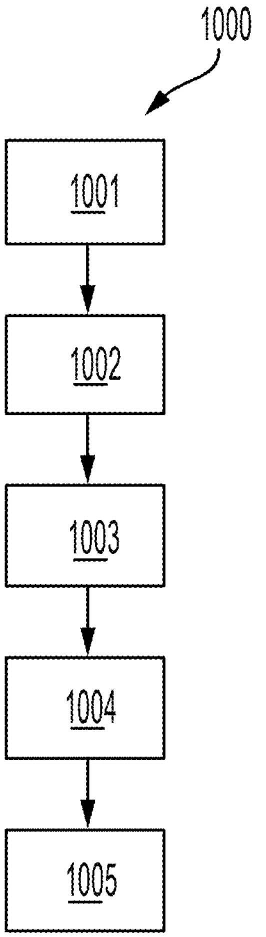
FIG. 1 is a flow chart that depicts a method for forming glass-ceramics according to embodiments disclosed and described herein.

Reference will now be made in detail to embodiments of the glass-ceramics and glasses described herein, examples of which are illustrated in the accompanying drawings. Whenever possible, the same reference numerals will be used throughout the drawings to refer to the same or like parts. According to embodiments, a glass-ceramic generally includes a phase assemblage comprising lithium disilicate ($Li_2Si_2O_5$) as the primary crystalline phase and a residual amorphous glass phase. The glass-ceramic may comprise greater than or equal to 1 wt % to less than 8 wt % CaO. A ratio of $Al_2O_3$ (wt %) to $Li_2O$ (wt %) in the glass-ceramic may be greater than or equal to 0 and less than 0.50. The glass-ceramic may have a transmittance of greater than 88% for wavelengths of light within a range from greater than or equal to 400 nm to less than or equal to 750 nm. In one or more embodiments, the glass-ceramic has a transmittance of greater than 88% for wavelengths of light within a range from greater than or equal to 400 nm to less than or equal to 1000 nm. In one or more embodiments, the thickness of the glass-ceramic exhibiting such transmittance is 0.5 mm. Various embodiments of glass-ceramics and glasses will be described herein with specific reference to the appended drawings.

As used herein, the term "glass" refers to solids prior to exposure to a controlled nucleation heat treatment and prior to exposure to a growth stage. The glass is amorphous (i.e., the sum of the Rietveld parameters of all the crystalline phases in the glass is less than 0.5 as measured at 20° C.). The Rietveld parameters of the crystalline phases and the amorphous phases of the glass are determined by X-ray diffraction (XRD) using the Rietveld method as described herein.

As used herein, the term "nucleated glass" refers to solids prepared by controlled nucleation of a glass but prior to exposure to a growth stage. The nucleated glass comprises one or more crystalline phases and a residual amorphous glass phase. The nucleated glass is formed by heat treating a glass at a temperature greater than or equal to a nucleation temperature for a nucleation time (i.e., a nucleation duration), resulting in the formation of the crystalline phases in the residual amorphous glass phase. The nucleated glass is intended to be more fully crystallized through controlled crystallization in a subsequent heat treatment (i.e., exposure to a subsequent growth stage) by which a final glass-ceramic is formed. The crystalline phase(s) in the nucleated glass may be the same as or differ from the final crystalline phase(s) of the glass-ceramic (e.g., in terms of composition, amount, morphology, size or size distribution, etc.). The sum of the Rietveld parameters of all the crystalline phases in the nucleated glass is greater than or equal to 0.5 and less than 20 as measured at 20° C. The Rietveld parameters of the crystalline phases of the nucleated glass are determined by X-ray diffraction (XRD) using the Rietveld method after exposure to the nucleation temperature for the nucleation time and then cooling the nucleated glass to 20° C.

As used herein, the term "glass-ceramic" refers to solids prepared by controlled crystallization of a nucleated glass and comprises one or more crystalline phases and a residual amorphous glass phase. The glass-ceramic is formed by heat treating a nucleated glass at a temperature greater than or equal to a growth temperature for a growth time (i.e., a growth duration), resulting in the growth of the crystalline phases (referred to as crystalline phases or final crystalline phases following the growth stage) and/or the formation of additional crystalline phases in the residual amorphous glass. The crystalline phase(s) may be the same as or differ from the crystalline phase(s) of the nucleated glass (e.g., in terms of composition, amount, morphology, size or size distribution, etc.). The sum of the Rietveld parameters of all the crystalline phases in the glass-ceramic is greater than or equal 20 as measured at 20° C. The Rietveld parameters of the crystalline phases of the glass-ceramic are determined by X-ray diffraction (XRD) using the Rietveld method after exposure to the growth temperature for the growth time and cooling the glass-ceramic to 20° C.

The liquidus temperature of a glass is the temperature (in ° C.) above which no crystalline phases can coexist in equilibrium with the glass. The liquidus temperature is measured according to ASTM C829-81 (2022).

The liquidus viscosity (in poise) of a glass is the viscosity of the glass at the liquidus temperature. The liquidus viscosity is measured according to ASTM C965-23 (2023).

As used herein, "depth of compression" or "DOC" refers to the depth of a compressive stress (CS) layer and is the depth at which the stress within a glass-ceramic article changes from compressive stress to tensile stress and has a stress value of zero. According to the convention normally used in the art, compressive stress is expressed as a negative (<0) stress and tensile stress is expressed as a positive (>0) stress. Throughout this description, however, and unless otherwise noted, CS is expressed as a positive or absolute value—that is, as recited herein, CS=|CS|.

The compressive stress (CS) and depth of compression (DOC) values are measured using a hybrid method that combines measurements made using evanescent prism coupling spectroscopy (EPCS) and light scattering polarimetry (LSP) as disclosed in U.S. Patent Application Publication No. 2020/0300615, which is incorporated herein by reference in its entirety. The maximum central tension (mCT) values are measured using a scattered light polariscope (SCALP) technique known in the art.

Fracture toughness ($K_{1C}$) represents the ability of a glass or glass-ceramic to resist fracture. Fracture toughness is measured on a non-chemically strengthened glass article or glass-ceramic article, such as measuring the $K_{1C}$ value prior to ion exchange (IOX) treatment of the glass article or glass-ceramic article, thereby representing a feature of the article prior to IOX. The fracture toughness test methods described herein are not suitable for glasses that have been exposed to IOX treatment. However, fracture toughness measurements performed as described herein on the same article prior to IOX treatment (e.g., glass or glass-ceramic substrates) correlate to fracture toughness after IOX treatment, and are accordingly used as such. The chevron notched short bar (CNSB) method utilized to measure the $K_{1C}$ value is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). The double torsion method and fixture utilized to measure the $K_{1C}$ value is described in Shyam, A. and Lara-Curzio, E., "The double-torsion testing technique for determination of fracture toughness and slow crack growth of materials: A review," J. Mater. Sci., 41, pp. 4093-4104, (2006). The double torsion measurement method generally produces $K_{1C}$ values that are slightly higher than the chevron notched short bar method. Unless otherwise specified, all fracture toughness values were measured by chevron notched short bar (CNSB) method.

The term "retained strength," as used herein, refers to the strength of a glass article after damage introduction when the glass-ceramic plate is bent to impart tensile stress. In some examples, the retained strength is determined by introducing damage in the glass-ceramic plate using silicon carbide (SiC) particles entrained in a pressurized gas (i.e., the damage is introduced by a "pressurized gas method"). Specifically, 30 grit or 90 grit SiC particles are entrained in a flowing gas, such as air, that is directed on the surface of the glass-ceramic plate under test. The grit size of the SiC particles (i.e., 30 grit or 90 grit) and/or the pressure of the flowing gas may be varied to impart flaws of different depths (e.g., flaw depths in the range from approximately 10 μm to 180 μm). For purposes of determining the retained strength, each glass-ceramic plate under test was imparted with flaws of a specific flaw depth. In some examples, the retained strength is determined following damage introduction utilizing a pendulum impactor apparatus, as described herein.

Following damage introduction, the glass-ceramic plates are tested in four-point bending according to ASTM C158-23 (2023) entitled "Standard Test Methods for Strength of Glass by Flexure (Determination of Modulus of Rupture)." In particular, the glass-ceramic plates are tested in four-point bending using a 24 mm span in the test fixture and a 12 mm spacing between the loading elements. Increasing load (P) is applied to the plate until failure occurs and the load at failure is recorded. The load at failure is then converted to stress (σ) according to the equation $\sigma=(3\,Pa)/(bd^2)$ where P is the load at failure, a is the span, d is the thickness of the glass-ceramic plate, and b is the width of the glass-ceramic plate. The stress (σ) is the retained strength of the glass-ceramic plate. The retained strength may also be referred to as the failure stress.

Young's modulus, shear modulus, and Poisson's ratio are measured by a resonant ultrasonic spectroscopy technique of the general type set forth in ASTM E2001-13 (2018).

Haze of a glass-ceramic article is measured using a haze meter, such as the BYK Gardner Haze-Gard I, following ASTM D1003-21 (2021) or ASTM D1044-19 (2019) on optically polished glass-ceramic plates with plane parallel faces. The haze is reported as a percentage (%).

Optical transmission (also referred to herein as "transmittance") is measured in the 400-1000 nm range on optically polished samples with plane parallel faces using a Perkin Elmer Lambda 950 spectrophotometer with a data interval of 2 nm. The transmission is measured on the glass-ceramic article itself without any coatings or other applications.

X-ray diffraction (XRD) is conducted on powdered samples using a Bruker D4 Endeavor equipped with Cu radiation and a LynxEye detector. The phase assemblage of the sample is determined using the Rietveld method and using Bruker's Topas software package. The procedure for determining the Rietveld parameters of the crystalline phases and the amorphous glass phase of the glass-ceramics described herein is described in the section entitled "Procedure for Determining Rietveld Parameters for Glass-Ceramic Samples". It is noted that the Rietveld parameters indicate the relative concentrations of the various phases in the glass-ceramics, are analogous to the weight percentage (wt %) of the various phases in the glass-ceramics, and may be converted to weight percentages by utilizing an internal standard. For example, a known quantity of a crystalline phase that is not present in the glass-ceramic under analysis (e.g., fine grain corundum for the lithium disilicate glass-ceramics of the present application) can be added to the glass-ceramic sample under analysis and the XRD performed such that the Rietveld results can be normalized to that known quantity of the added crystalline phase.

The stored strain energy of the glass-ceramic article is calculated as described in Gulati, Suresh T., "Frangibility of Tempered Soda-Lime Glass Sheet," Glass Processing Days, Sep. 13-15, 1997, pp. 72-76 (ISBN 952-90-8959-7), specifically equation (4) of the publication.

Density is measured in accordance with ASTM C693-93 (2019).

Vicker's hardness is measured according to ASTM C1327-15 (2019) using a MITUTOYO HM114 Hardness testing machine with a Vickers indenter with a 200 gram indentation load (dwell time is 15 seconds). Measurement of indentation diagonals is performed using calibrated optical microscopy. Values are the average of measurements from 5 indentations per sample. Tests are performed on optically polished samples with plane parallel faces.

Knoop hardness is measured according to ASTM C730-98 (2021) using a MITUTOYO HM114 Hardness testing machine with a Knoop indenter with a 200 gram indentation load (dwell time is 15 seconds). Measurement of indentation diagonals is performed using calibrated optical microscopy. Values are the average of measurements from 5 indentations per sample. Tests are performed on optically polished samples with plane parallel faces.

The term "softening point," as used herein, refers to the temperature at which the viscosity of the glass composition is $1\times10^{7.6}$ poise. The softening point is determined using the parallel plate viscosity method of ASTM C1351M-96 (2012).

The term "annealing point" as used herein, refers to the temperature at which the viscosity of the glass or glass-ceramic is $1\times10^{13}$ poise. The annealing point is determined using the beam bending viscosity method of ASTM C598-93 (2013).

The term "strain point" and "$T_{strain}$" as used herein, refer to the temperature at which the viscosity of the glass or glass-ceramic is $3\times10^{14}$ poise. The strain point is determined using the beam bending viscosity method of ASTM C598-93 (2013).

The linear coefficient of thermal expansion (CTE) of the glass-ceramics over the temperature range 0° C. to 300° C. is expressed as the average CTE over the range in terms of ppm/° C. (×10-6/° C.) and was determined using a push-rod dilatometer in accordance with ASTM E228-11 (2016).

The term "CIELAB color space," as used herein, refers to a color space defined by the International Commission on Illumination (CIE) in 1976. It expresses color as three values: L* for the lightness from black (0) to white (100), a* from green (−) to red (+), and B* from blue (−) to yellow (+).

The terms "free" and "substantially free," when used to describe the concentration and/or absence of a particular constituent component in a glass or glass-ceramic, means that the constituent component is not intentionally added to the glass or glass-ceramic. However, the glass or glass-ceramic may contain traces of the constituent component as a contaminant or tramp in amounts of less than 0.01 wt % (i.e., the glass is substantially free of the constituent component). In terms of crystalline phases, a glass-ceramic may be substantially free of a crystalline phase if the crystalline phase has a Rietveld parameter of less than 0.5.

Ranges can be expressed herein as from "less than or equal to" one particular value, and/or to "less than or equal to" another particular value. When such a range is expressed, another embodiment includes from the one particular value and/or to the other particular value. Similarly, when values are expressed as approximations, by use of the antecedent "less than or equal to," it will be understood that the particular value forms another embodiment. It will be further understood that the endpoints of each of the ranges are significant both in relation to the other endpoint, and independently of the other endpoint. Any ranges used herein include all ranges and subranges and any values there between unless explicitly stated otherwise.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Glass-ceramics have attributes making them amenable for use as cover substrates and/or housings for mobile electronic devices. For example, without being bound by theory, glass-ceramics with high fracture toughness and/or Young's modulus can provide resistance to crack penetration and exhibit good drop performance. When such glass-ceramics are chemically strengthened, for example through ion exchange, the resistance to crack penetration and drop performance can be further enhanced. The high fracture toughness and/or Young's modulus may also increase the amount of stored tensile energy and maximum central tension that can be imparted to the glass-ceramics through chemical tempering (e.g., through ion exchange strengthening). In addition, where high transparency is desired, such as when the glass-ceramics are used as a cover glass for electronic devices, the optical characteristics of the glass-ceramics, such as transmittance and haze, also make them well suited for use as cover substrates and/or housing for mobile electronic devices.

In the embodiments described herein, the glass-ceramics have a relatively high Young's modulus in combination with a relatively high fracture toughness. While not wishing to be bound by theory, it is believed that the relatively high Young's modulus is achieved by increasing the amount of the lithium disilicate crystalline phase in the glass-ceramics compared to the amount of other crystalline phases that may be present in the glass-ceramics. In that regard, it has been found that the amount of the lithium disilicate ($Li_2Si_2O_5$) crystalline phase may be increased in the glass-ceramics disclosed herein by tailoring the composition of the glass (and resulting glass-ceramic) to reduce or prevent the formation of certain other crystalline phases, such as the petalite ($LiAlSi_4O_{10}$) crystalline phase. In particular, it has been found that limiting the amount of $Al_2O_3$ in the glass (and resulting glass-ceramic) relative to the amount of $Li_2O$ in the glass such that the ratio of $Al_2O_3$:$Li_2O$ is less than 0.5 promotes the formation of lithium disilicate crystals in the glass-ceramics during ceramming while reducing or preventing the formation of petalite crystals, thereby resulting in glass-ceramics with relatively high Young's modulus values which, in turn, can increase the amount of stored tensile energy and maximum central tension that can be imparted to the glass-ceramics through chemical tempering (e.g., through ion exchange strengthening), improving the mechanical properties of the glass ceramic.

Further, by minimizing the formation of crystalline phases in the glass-ceramics other than the lithium disilicate crystalline phase, the optical properties of the glass-ceramic may also be improved. For example, each phase of a glass-ceramic (i.e., each of the crystalline phases and the residual amorphous glass phase) may have a different index of refraction. Minimizing the number of crystalline phases in the glass-ceramics other than the lithium disilicate crystalline phase may reduce the overall difference between the index of refraction of the crystalline phases and the index of refraction of the residual amorphous glass phase, thereby improving the optical properties of the glass-ceramic, such as transmittance and haze.

In addition, glasses and glass-ceramics according to embodiments disclosed and described herein may also include relatively high amounts of calcium oxide (CaO). Without being bound by any particular theory, it is believed that the additional calcium oxide increases the density of the glass-ceramics and, therefore, slows the diffusion of ions into the glass-ceramics during chemical strengthening. This slowing of diffusion slows the ion exchange process, but results in glass-ceramics with more compressive stress and central tension than less dense glasses and glass-ceramics. It is also believed that zirconia helps to increase the density of the glass-ceramic.

In the embodiments described herein, the composition of the glass is selected such that the resultant glass-ceramic has a phase assemblage comprising a lithium silicate crystalline phase, specifically a lithium disilicate crystalline phase, wherein the lithium disilicate crystalline phase has a greater Rietveld parameter than other crystalline phases present in the glass-ceramic (i.e., the lithium disilicate crystalline phase is the primary crystalline phase of the glass-ceramic). In embodiments, the phase assemblage of the glass-ceramics may optionally comprise one or more secondary crystalline phases such as, for example and without limitation, a lithium metasilicate crystalline phase and/or a lithium phosphate crystalline phase. The phase assemblage further includes a residual amorphous glass phase.

The lithium disilicate ($Li_2Si_2O_5$) of the lithium disilicate crystalline phase is an orthorhombic crystal based on corrugated sheets of $\{Si_2O_5\}$ tetrahedral arrays. The crystals are typically tabular or lath-like in shape, with pronounced cleavage planes. Glass-ceramics based on lithium disilicate offer highly desirable mechanical properties, including high body strength and fracture toughness, due to their microstructure of randomly oriented interlocked crystals—a crystal structure that forces cracks to propagate through the material via tortuous paths around these crystals.

In embodiments, the Rietveld parameter of the lithium disilicate crystalline phase (also referred to herein as "L2S") in the glass-ceramics can be in a range from greater than or equal to 20 to less than or equal to 90, greater than or equal to 20 to less than or equal to 85, greater than or equal to 20 to less than or equal to 80, greater than or equal to 20 to less than or equal to 75, greater than or equal to 20 to less than or equal to 70, greater than or equal to 20 to less than or equal to 65, greater than or equal to 20 to less than or equal to 60, greater than or equal to 20 to less than or equal to 55, greater than or equal to 20 to less than or equal to 50, greater than or equal to 20 to less than or equal to 45, greater than or equal to 20 to less than or equal to 40, greater than or equal to 20 to less than or equal to 35, greater than or equal to 20 to less than or equal to 30, greater than or equal to 20 to less than or equal to 25, greater than or equal to 25 to less than or equal to 90, greater than or equal to 25 to less than or equal to 85, greater than or equal to 25 to less than or equal to 80, greater than or equal to 25 to less than or equal to 75, greater than or equal to 25 to less than or equal to 70, greater than or equal to 25 to less than or equal to 65, greater than or equal to 25 to less than or equal to 60, greater than or equal to 25 to less than or equal to 55, greater than or equal to 25 to less than or equal to 50, greater than or equal to 25 to less than or equal to 45, greater than or equal to 25 to less than or equal to 40, greater than or equal to 25 to less than or equal to 35, greater than or equal to 25 to less than or equal to 30, greater than or equal to 30 to less than or equal to 90, greater than or equal to 30 to less than or equal to 85, greater than or equal to 30 to less than or equal to 80, greater than or equal to 30 to less than or equal to 75, greater than or equal to 30 to less than or equal to 70, greater than or equal to 30 to less than or equal to 65, greater than or equal to 30 to less than or equal to 60, greater than or equal to 30 to less than or equal to 55, greater than or equal to 30 to less than or equal to 50, greater than or equal to 30 to less than or equal to 45, greater than or equal to 30 to less than or equal to 40, greater than or equal to 30 to less than or equal to 35, greater than or equal to 35 to less than or equal to 90, greater than or equal to 35 to less than or equal to 85, greater than or equal to 35 to less than or equal to 80, greater than or equal to 35 to less than or equal to 75, greater than or equal to 35 to less than or equal to 70, greater than or equal to 35 to less than or equal to 65, greater than or equal to 35 to less than or equal to 60, greater than or equal to 35 to less than or equal to 55, greater than or equal to 35 to less than or equal to 50, greater than or equal to 35 to less than or equal to 45, greater than or equal to 35 to less than or equal to 40, greater than or equal to 40 to less than or equal to 90, greater than or equal to 40 to less than or equal to 85, greater than or equal to 40 to less than or equal to 80, greater than or equal to 40 to less than or equal to 75, greater than or equal to 40 to less than or equal to 70, greater than or equal to 40 to less than or equal to 65, greater than or equal to 40 to less than or equal to 60, greater than or equal to 40 to less than or equal to 55, greater than or equal to 40 to less than or equal to 50, greater than or equal to 40 to less than or equal to 45, greater than or equal to 45 to less than or equal to 90, greater than or equal to 45 to less than or equal to 85, greater than or equal to 45 to less than or equal to 80, greater than or equal to 45 to less than or equal to 75, greater than or equal to 45 to less than or equal to 70, greater than or equal to 45 to less than or equal to 65, greater than or equal to 45 to less than or equal to 60, greater than or equal to 45 to less than or equal to 55, greater than or equal to 45 to less than or equal to 50, greater than or equal to 50 to less than or equal to 90, greater than or equal to 50 to less than or equal to 85, greater than or equal to 50 to less than or equal to 80, greater than or equal to 50 to less than or equal to 75, greater than or equal to 50 to less than or equal to 70, greater than or equal to 50 to less than or equal to 65, greater than or equal to 50 to less than or equal to 60, greater than or equal to 50 to less than or equal to 55, greater than or equal to 55 to less than or equal to 90, greater than or equal to 55 to less than or equal to 85, greater than or equal to 55 to less than or equal to 80, greater than or equal to 55 to less than or equal to 75, greater than or equal to 55 to less than or equal to 70, greater than or equal to 55 to less than or equal to 65, greater than or equal to 55 to less than or equal to 60, greater than or equal to 60 to less than or equal to 90, greater than or equal to 60 to less than or equal to 85, greater than or equal to 60 to less than or equal to 80, greater than or equal to 60 to less than or equal to 75, greater than or equal to 60 to less than or equal to 70, greater than or equal to 60 to less than or equal to 65, greater than or equal to 65 to less than or equal to 90, greater than or equal to 65 to less than or equal to 85, greater than or equal to 65 to less than or equal to 80, greater than or equal to 65 to less than or equal to 75, greater than or equal to 65 to less than or equal to 70, greater than or equal to 70 to less than or equal to 90, greater than or equal to 70 to less than or equal to 85, greater than or equal to 70 to less than or equal to 80, greater than or equal to 70 to less than or equal to 75, greater than or equal to 75 to less than or equal to 90, greater than or equal to 75 to less than or equal to 85, or even greater than or equal to 75 to less than or equal to 80. In embodiments, the Rietveld parameter of the lithium disilicate crystalline phase in the glass-ceramics can be in a range from greater than or equal to 60 to less than or equal to 74, greater than or equal to 62 to less than or equal to 72, greater than or equal to 63 to less than or equal to 72, greater than or equal to 64 to less than or equal to 72, or even greater than or equal to 66 to less than or equal to 71.5, In embodiments, the lithium disilicate crystalline phase in the glass-ceramic may comprise a Rietveld parameter of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75. It should be understood that the above ranges include all subranges within the explicitly disclosed ranges.

Lithium metasilicate, $Li_2SiO_3$, has an orthorhombic symmetry with $(Si_2O_6)$ chains running parallel to the c axis and linked together by lithium ions. Lithium metasilicate crystals can be easily dissolved from glass-ceramics in diluted hydrofluoric acid.

In embodiments, the Rietveld parameter of the lithium metasilicate crystalline phase, when present in the glass-ceramics, can be in a range from greater than or equal to 0 to less than or equal to 10.0, greater than or equal to 0 to less than or equal to 9.5, greater than or equal to 0 to less than or equal to 9.0, greater than or equal to 0 to less than or equal to 8.5, greater than or equal to 0 to less than or equal to 8.0, greater than or equal to 0 to less than or equal to 7.5, greater than or equal to 0 to less than or equal to 7.0, greater than or equal to 0 to less than or equal to 6.5, greater than or equal to 0 to less than or equal to 6.0, greater than or equal to 0 to less than or equal to 5.5, greater than or equal to 0 to less than or equal to 5.0, greater than or equal to 0 to less than or equal to 4.5, greater than or equal to 0 to less than or equal to 4.0, greater than or equal to 0 to less than or equal to 3.5, greater than or equal to 0 to less than or equal to 3.0, greater than or equal to 0 to less than or equal to 2.5, greater than or equal to 0 to less than or equal to 2.0, greater than or equal to 0 to less than or equal to 1.5, greater than or equal to 0 to less than or equal to 1.0, greater than or equal to 0 to less than or equal to 0.5, greater than or equal to 0.5 to less than or equal to 10.0, greater than or equal to 0.5 to less than or equal to 9.5, greater than or equal to 0.5 to less than or equal to 9.0, greater than or equal to 0.5 to less than or equal to 8.5, greater than or equal to 0.5 to less than or equal to 8.0, greater than or equal to 0.5 to less than or equal to 7.5, greater than or equal to 0.5 to less than or equal to 7.0, greater than or equal to 0.5 to less than or equal to 6.5, greater than or equal to 0.5 to less than or equal to 6.0, greater than or equal to 0.5 to less than or equal to 5.5, greater than or equal to 0.5 to less than or equal to 5.0, greater than or equal to 0.5 to less than or equal to 4.5, greater than or equal to 0.5 to less than or equal to 4.0, greater than or equal to 0.5 to less than or equal to 3.5, greater than or equal to 0.5 to less than or equal to 3.0, greater than or equal to 0.5 to less than or equal to 2.5, greater than or equal to 0.5 to less than or equal to 2.0, greater than or equal to 0.5 to less than or equal to 1.5, greater than or equal to 0.5 to less than or equal to 1.0, greater than or equal to 1.0 to less than or equal to 10.0, greater than or equal to 1.0 to less than or equal to 9.5, greater than or equal to 1.0 to less than or equal to 9.0, greater than or equal to 1.0 to less than or equal to 8.5, greater than or equal to 1.0 to less than or equal to 8.0, greater than or equal to 1.0 to less than or equal to 7.5, greater than or equal to 1.0 to less than or equal to 7.0, greater than or equal to 1.0 to less than or equal to 6.5, greater than or equal to 1.0 to less than or equal to 6.0, greater than or equal to 1.0 to less than or equal to 5.5, greater than or equal to 1.0 to less than or equal to 5.0, greater than or equal to 1.0 to less than or equal to 4.5, greater than or equal to 1.0 to less than or equal to 4.0, greater than or equal to 1.0 to less than or equal to 3.5, greater than or equal to 1.0 to less than or equal to 3.0, greater than or equal to 1.0 to less than or equal to 2.5, greater than or equal to 1.0 to less than or equal to 2.0, greater than or equal to 1.0 to less than or equal to 1.5, greater than or equal to 1.5 to less than or equal to 10.0, greater than or equal to 1.5 to less than or equal to 9.5, greater than or equal to 1.5 to less than or equal to 9.0, greater than or equal to 1.5 to less than or equal to 8.5, greater than or equal to 1.5 to less than or equal to 8.0, greater than or equal to 1.5 to less than or equal to 7.5, greater than or equal to 1.5 to less than or equal to 7.0, greater than or equal to 1.5 to less than or equal to 6.5, greater than or equal to 1.5 to less than or equal to 6.0, greater than or equal to 1.5 to less than or equal to 5.5, greater than or equal to 1.5 to less than or equal to 5.0, greater than or equal to 1.5 to less than or equal to 4.5, greater than or equal to 1.5 to less than or equal to 4.0, greater than or equal to 1.5 to less than or equal to 3.5, greater than or equal to 1.5 to less than or equal to 3.0, greater than or equal to 1.5 to less than or equal to 2.5, greater than or equal to 1.5 to less than or equal to 2.0, greater than or equal to 2.0 to less than or equal to 10.0, greater than or equal to 2.0 to less than or equal to 9.5, greater than or equal to 2.0 to less than or equal to 9.0, greater than or equal to 2.0 to less than or equal to 8.5, greater than or equal to 2.0 to less than or equal to 8.0, greater than or equal to 2.0 to less than or equal to 7.5, greater than or equal to 2.0 to less than or equal to 7.0, greater than or equal to 2.0 to less than or equal to 6.5, greater than or equal to 2.0 to less than or equal to 6.0, greater than or equal to 2.0 to less than or equal to 5.5, greater than or equal to 2.0 to less than or equal to 5.0, greater than or equal to 2.0 to less than or equal to 4.5, greater than or equal to 2.0 to less than or equal to 4.0, greater than or equal to 2.0 to less than or equal to 3.5, greater than or equal to 2.0 to less than or equal to 3.0, greater than or equal to 2.0 to less than or equal to 2.5, greater than or equal to 2.5 to less than or equal to 10.0, greater than or equal to 2.5 to less than or equal to 9.5, greater than or equal to 2.5 to less than or equal to 9.0, greater than or equal to 2.5 to less than or equal to 8.5, greater than or equal to 2.5 to less than or equal to 8.0, greater than or equal to 2.5 to less than or equal to 7.5, greater than or equal to 2.5 to less than or equal to 7.0, greater than or equal to 2.5 to less than or equal to 6.5, greater than or equal to 2.5 to less than or equal to 6.0, greater than or equal to 2.5 to less than or equal to 5.5, greater than or equal to 2.5 to less than or equal to 5.0, greater than or equal to 2.5 to less than or equal to 4.5, greater than or equal to 2.5 to less than or equal to 4.0, greater than or equal to 2.5 to less than or equal to 3.5, greater than or equal to 2.5 to less than or equal to 3.0, greater than or equal to 3.0 to less than or equal to 10.0, greater than or equal to 3.0 to less than or equal to 9.5, greater than or equal to 3.0 to less than or equal to 9.0, greater than or equal to 3.0 to less than or equal to 8.5, greater than or equal to 3.0 to less than or equal to 8.0, greater than or equal to 3.0 to less than or equal to 7.5, greater than or equal to 3.0 to less than or equal to 7.0, greater than or equal to 3.0 to less than or equal to 6.5, greater than or equal to 3.0 to less than or equal to 6.0, greater than or equal to 3.0 to less than or equal to 5.5, greater than or equal to 3.0 to less than or equal to 5.0, greater than or equal to 3.0 to less than or equal to 4.5, greater than or equal to 3.0 to less than or equal to 4.0, greater than or equal to 3.0 to less than or equal to 3.5, greater than or equal to 3.5 to less than or equal to 10.0, greater than or equal to 3.5 to less than or equal to 9.5, greater than or equal to 3.5 to less than or equal to 9.0, greater than or equal to 3.5 to less than or equal to 8.5, greater than or equal to 3.5 to less than or equal to 8.0, greater than or equal to 3.5 to less than or equal to 7.5, greater than or equal to 3.5 to less than or equal to 7.0, greater than or equal to 3.5 to less than or equal to 6.5, greater than or equal to 3.5 to less than or equal to 6.0, greater than or equal to 3.5 to less than or equal to 5.5, greater than or equal to 3.5 to less than or equal to 5.0, greater than or equal to 3.5 to less than or equal to 4.5, greater than or equal to 3.5 to less than or equal to 4.0, greater than or equal to 4.0 to less than or equal to 10.0, greater than or equal to 4.0 to less than or equal to 9.5, greater than or equal to 4.0 to less than or equal to 9.0, greater than or equal to 4.0 to less than or equal to 8.5, greater than or equal to 4.0 to less than or equal to 8.0, greater than or equal to 4.0 to less than or equal to 7.5, greater than or equal to 4.0 to less than or equal to 7.0, greater than or equal to 4.0 to less than or equal to 6.5, greater than or equal to 4.0 to less than or equal to 6.0, greater than or equal to 4.0 to less than or equal to 5.5, greater than or equal to 4.0 to less than or equal to 5.0, or even greater than or equal to 4.0 to less than or equal to 4.5. It should be understood that the above ranges include all subranges within the explicitly disclosed ranges. In some embodiments, the Rietveld parameter of the lithium metasilicate crystalline phase in the glass-ceramic is 0, 1, 2, 3, 4, 5, 6, 7, 8, 9, or even 10. In embodiments, the glass-ceramics are free of a lithium metasilicate crystalline phase. In embodiments, the glass-ceramics are substantially free of a lithium metasilicate crystalline phase. For purposes of the present specification, the presence or absence of a crystalline phase is determined by X-ray diffraction (XRD) using the Rietveld method.

The glass-ceramics described herein may comprise a lithium phosphate ($Li_3PO_4$ or "lithiophosphate") crystalline phase. $Li_3PO_4$ comprises a beta beryllia derived structure and crystallizes in the orthorhombic Pnma space group.

In embodiments, the Rietveld parameter of the lithium phosphate crystalline phase, when present in the glass-ceramics, can be in a range from greater than or equal to 0 to less than or equal to 10.0, greater than or equal to 0 to less than or equal to 9.5, greater than or equal to 0 to less than or equal to 9.0, greater than or equal to 0 to less than or equal to 8.5, greater than or equal to 0 to less than or equal to 8.0, greater than or equal to 0 to less than or equal to 7.5, greater than or equal to 0 to less than or equal to 7.0, greater than or equal to 0 to less than or equal to 6.5, greater than or equal to 0 to less than or equal to 6.0, greater than or equal to 0 to less than or equal to 5.5, greater than or equal to 0 to less than or equal to 5.0, greater than or equal to 0 to less than or equal to 4.5, greater than or equal to 0 to less than or equal to 4.0, greater than or equal to 0 to less than or equal to 3.5, greater than or equal to 0 to less than or equal to 3.0, greater than or equal to 0 to less than or equal to 2.5, greater than or equal to 0 to less than or equal to 2.0, greater than or equal to 0 to less than or equal to 1.5, greater than or equal to 0 to less than or equal to 1.0, greater than or equal to 0 to less than or equal to 0.5, greater than or equal to 0.5 to less than or equal to 10.0, greater than or equal to 0.5 to less than or equal to 9.5, greater than or equal to 0.5 to less than or equal to 9.0, greater than or equal to 0.5 to less than or equal to 8.5, greater than or equal to 0.5 to less than or equal to 8.0, greater than or equal to 0.5 to less than or equal to 7.5, greater than or equal to 0.5 to less than or equal to 7.0, greater than or equal to 0.5 to less than or equal to 6.5, greater than or equal to 0.5 to less than or equal to 6.0, greater than or equal to 0.5 to less than or equal to 5.5, greater than or equal to 0.5 to less than or equal to 5.0, greater than or equal to 0.5 to less than or equal to 4.5, greater than or equal to 0.5 to less than or equal to 4.0, greater than or equal to 0.5 to less than or equal to 3.5, greater than or equal to 0.5 to less than or equal to 3.0, greater than or equal to 0.5 to less than or equal to 2.5, greater than or equal to 0.5 to less than or equal to 2.0, greater than or equal to 0.5 to less than or equal to 1.5, greater than or equal to 0.5 to less than or equal to 1.0, greater than or equal to 1.0 to less than or equal to 10.0, greater than or equal to 1.0 to less than or equal to 9.5, greater than or equal to 1.0 to less than or equal to 9.0, greater than or equal to 1.0 to less than or equal to 8.5, greater than or equal to 1.0 to less than or equal to 8.0, greater than or equal to 1.0 to less than or equal to 7.5, greater than or equal to 1.0 to less than or equal to 7.0, greater than or equal to 1.0 to less than or equal to 6.5, greater than or equal to 1.0 to less than or equal to 6.0, greater than or equal to 1.0 to less than or equal to 5.5, greater than or equal to 1.0 to less than or equal to 5.0, greater than or equal to 1.0 to less than or equal to 4.5, greater than or equal to 1.0 to less than or equal to 4.0, greater than or equal to 1.0 to less than or equal to 3.5, greater than or equal to 1.0 to less than or equal to 3.0, greater than or equal to 1.0 to less than or equal to 2.5, greater than or equal to 1.0 to less than or equal to 2.0, greater than or equal to 1.0 to less than or equal to 1.5, greater than or equal to 1.5 to less than or equal to 10.0, greater than or equal to 1.5 to less than or equal to 9.5, greater than or equal to 1.5 to less than or equal to 9.0, greater than or equal to 1.5 to less than or equal to 8.5, greater than or equal to 1.5 to less than or equal to 8.0, greater than or equal to 1.5 to less than or equal to 7.5, greater than or equal to 1.5 to less than or equal to 7.0, greater than or equal to 1.5 to less than or equal to 6.5, greater than or equal to 1.5 to less than or equal to 6.0, greater than or equal to 1.5 to less than or equal to 5.5, greater than or equal to 1.5 to less than or equal to 5.0, greater than or equal to 1.5 to less than or equal to 4.5, greater than or equal to 1.5 to less than or equal to 4.0, greater than or equal to 1.5 to less than or equal to 3.5, greater than or equal to 1.5 to less than or equal to 3.0, greater than or equal to 1.5 to less than or equal to 2.5, greater than or equal to 1.5 to less than or equal to 2.0, greater than or equal to 2.0 to less than or equal to 10.0, greater than or equal to 2.0 to less than or equal to 9.5, greater than or equal to 2.0 to less than or equal to 9.0, greater than or equal to 2.0 to less than or equal to 8.5, greater than or equal to 2.0 to less than or equal to 8.0, greater than or equal to 2.0 to less than or equal to 7.5, greater than or equal to 2.0 to less than or equal to 7.0, greater than or equal to 2.0 to less than or equal to 6.5, greater than or equal to 2.0 to less than or equal to 6.0, greater than or equal to 2.0 to less than or equal to 5.5, greater than or equal to 2.0 to less than or equal to 5.0, greater than or equal to 2.0 to less than or equal to 4.5, greater than or equal to 2.0 to less than or equal to 4.0, greater than or equal to 2.0 to less than or equal to 3.5, greater than or equal to 2.0 to less than or equal to 3.0, greater than or equal to 2.0 to less than or equal to 2.5, greater than or equal to 2.5 to less than or equal to 10.0, greater than or equal to 2.5 to less than or equal to 9.5, greater than or equal to 2.5 to less than or equal to 9.0, greater than or equal to 2.5 to less than or equal to 8.5, greater than or equal to 2.5 to less than or equal to 8.0, greater than or equal to 2.5 to less than or equal to 7.5, greater than or equal to 2.5 to less than or equal to 7.0, greater than or equal to 2.5 to less than or equal to 6.5, greater than or equal to 2.5 to less than or equal to 6.0, greater than or equal to 2.5 to less than or equal to 5.5, greater than or equal to 2.5 to less than or equal to 5.0, greater than or equal to 2.5 to less than or equal to 4.5, greater than or equal to 2.5 to less than or equal to 4.0, greater than or equal to 2.5 to less than or equal to 3.5, greater than or equal to 2.5 to less than or equal to 3.0, greater than or equal to 3.0 to less than or equal to 10.0, greater than or equal to 3.0 to less than or equal to 9.5, greater than or equal to 3.0 to less than or equal to 9.0, greater than or equal to 3.0 to less than or equal to 8.5, greater than or equal to 3.0 to less than or equal to 8.0, greater than or equal to 3.0 to less than or equal to 7.5, greater than or equal to 3.0 to less than or equal to 7.0, greater than or equal to 3.0 to less than or equal to 6.5, greater than or equal to 3.0 to less than or equal to 6.0, greater than or equal to 3.0 to less than or equal to 5.5, greater than or equal to 3.0 to less than or equal to 5.0, greater than or equal to 3.0 to less than or equal to 4.5, greater than or equal to 3.0 to less than or equal to 4.0, greater than or equal to 3.0 to less than or equal to 3.5, greater than or equal to 3.5 to less than or equal to 10.0, greater than or equal to 3.5 to less than or equal to 9.5, greater than or equal to 3.5 to less than or equal to 9.0, greater than or equal to 3.5 to less than or equal to 8.5, greater than or equal to 3.5 to less than or equal to 8.0, greater than or equal to 3.5 to less than or equal to 7.5, greater than or equal to 3.5 to less than or equal to 7.0, greater than or equal to 3.5 to less than or equal to 6.5, greater than or equal to 3.5 to less than or equal to 6.0, greater than or equal to 3.5 to less than or equal to 5.5, greater than or equal to 3.5 to less than or equal to 5.0, greater than or equal to 3.5 to less than or equal to 4.5, greater than or equal to 3.5 to less than or equal to 4.0, greater than or equal to 4.0 to less than or equal to 10.0, greater than or equal to 4.0 to less than or equal to 9.5, greater than or equal to 4.0 to less than or equal to 9.0, greater than or equal to 4.0 to less than or equal to 8.5, greater than or equal to 4.0 to less than or equal to 8.0, greater than or equal to 4.0 to less than or equal to 7.5, greater than or equal to 4.0 to less than or equal to 7.0, greater than or equal to 4.0 to less than or equal to 6.5, greater than or equal to 4.0 to less than or equal to 6.0, greater than or equal to 4.0 to less than or equal to 5.5, greater than or equal to 4.0 to less than or equal to 5.0, or even greater than or equal to 4.0 to less than or equal to 4.5. It should be understood that the above ranges include all subranges within the explicitly disclosed ranges. In some embodiments, the lithium phosphate crystalline phase in the glass-ceramic has a Rietveld parameter of 0, 1, 2, 3, 4, 5, 6, 7, 8, 9, or even 10. In embodiments, the glass-ceramics are free of a lithium phosphate crystalline phase. In embodiments, the glass-ceramics are substantially free of a lithium phosphate crystalline phase. For purposes of the present specification, the presence or absence of a crystalline phase is determined by X-ray diffraction (XRD) using the Rietveld method.

In embodiments, the Rietveld parameter of the residual amorphous glass phase in the glass-ceramics is greater than or equal to 5 to less than or equal to 65, greater than or equal to 6 to less than or equal to 60, greater than or equal to 5 to less than or equal to 55, greater than or equal to 5 to less than or equal to 50, greater than or equal to 5 to less than or equal to 45, greater than or equal to 5 to less than or equal to 40, greater than or equal to 5 to less than or equal to 35, greater than or equal to 5 to less than or equal to 30, greater than or equal to 5 to less than or equal to 25, greater than or equal to 5 to less than or equal to 20, greater than or equal to 5 to less than or equal to 15, greater than 5 to less than or equal to 10, greater than or equal to 10 to less than or equal to 65, greater than or equal to 6 to less than or equal to 60, greater than or equal to 10 to less than or equal to 55, greater than or equal to 10 to less than or equal to 50, greater than or equal to 10 to less than or equal to 45, greater than or equal to 10 to less than or equal to 40, greater than or equal to 10 to less than or equal to 35, greater than or equal to 10 to less than or equal to 30, greater than or equal to 10 to less than or equal to 25, greater than or equal to 10 to less than or equal to 20, greater than or equal to 10 to less than or equal to 15, greater than or equal to 15 to less than or equal to 65, greater than or equal to 5 to less than or equal to 60, greater than or equal to 15 to less than or equal to 55, greater than or equal to 15 to less than or equal to 50, greater than or equal to 15 to less than or equal to 45, greater than or equal to 15 to less than or equal to 40, greater than or equal to 15 to less than or equal to 35, greater than or equal to 15 to less than or equal to 30, greater than or equal to 15 to less than or equal to 25, greater than or equal to 15 to less than or equal to 20, greater than or equal to 20 to less than or equal to 65, greater than or equal to 20 to less than or equal to 60, greater than or equal to 20 to less than or equal to 55, greater than or equal to 20 to less than or equal to 50, greater than or equal to 20 to less than or equal to 45, greater than or equal to 20 to less than or equal to 40, greater than or equal to 20 to less than or equal to 35, greater than or equal to 20 to less than or equal to 30, greater than or equal to 20 to less than or equal to 25, greater than or equal to 25 to less than or equal to 65, greater than or equal to 25 to less than or equal to 60, greater than or equal to 25 to less than or equal to 55, greater than or equal to 25 to less than or equal to 50, greater than or equal to 25 to less than or equal to 45, greater than or equal to 25 to less than or equal to 40, greater than or equal to 25 to less than or equal to 35, greater than or equal to 25 to less than or equal to 30, greater than or equal to 30 to less than or equal to 65, greater than or equal to 30 to less than or equal to 60, greater than or equal to 30 to less than or equal to 55, greater than or equal to 30 to less than or equal to 50, greater than or equal to 30 to less than or equal to 45, greater than or equal to 30 to less than or equal to 40, greater than or equal to 30 to less than or equal to 35, greater than or equal to 35 to less than or equal to 65, greater than or equal to 35 to less than or equal to 60, greater than or equal to 35 to less than or equal to 55, greater than or equal to 35 to less than or equal to 50, greater than or equal to 35 to less than or equal to 45, greater than or equal to 35 to less than or equal to 40, greater than or equal to 40 to less than or equal to 65, greater than or equal to 40 to less than or equal to 60, greater than or equal to 40 to less than or equal to 55, greater than or equal to 40 to less than or equal to 50, greater than or equal to 40 to less than or equal to 45, greater than or equal to 45 to less than or equal to 60, greater than or equal to 45 to less than or equal to 55, greater than or equal to 45 to less than or equal to 50, greater than or equal to 50 to less than or equal to 60, greater than or equal to 50 to less than or equal to 55, or even greater than or equal to 55 to less than or equal to 60. It should be understood that the above ranges include all subranges within the explicitly disclosed ranges. In embodiments, the Rietveld parameter of the residual amorphous glass phase in the glass-ceramic may be about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, or even 65.

In the embodiments described herein, the glass-ceramics comprise a lithium disilicate crystalline phase and a residual amorphous glass phase. In some embodiments, the glass-ceramics comprise a lithium disilicate crystalline phase, a residual amorphous glass phase, a lithium metasilicate crystalline phase, and a lithium phosphate crystalline phase. In some other embodiments, the glass-ceramics comprise a lithium disilicate crystalline phase, a residual amorphous glass phase, a lithium metasilicate crystalline phase, and are free of a lithium phosphate crystalline phase. In still other embodiments, the glass-ceramics comprise a lithium disilicate crystalline phase, a residual amorphous glass phase, a lithium phosphate crystalline phase, and are free of a lithium metasilicate crystalline phase. In the embodiments described herein, the glass-ceramics comprise a petalite crystalline phase with a Rietveld parameter of less than 5. In the embodiments described herein, the glass-ceramics are substantially free of a petalite crystalline phase. In one or more embodiments, the glass-ceramics are free of a petalite crystalline phase. In the embodiments described herein, the glass-ceramics are free of an apatite crystalline phase. In embodiments, the glass-ceramics are free of a cristobalite crystalline phase, a wollastonite crystalline phase, a β-quartz crystalline phase, and/or a fluoroapatite crystalline phase. For purposes of the present specification, the presence or absence of a crystalline phase is determined by X-ray diffraction (XRD) using the Rietveld method.

The glasses and glass-ceramics described herein may be generally described as lithium-containing silicate glasses and glass-ceramics and comprise $SiO_2$, $Li_2O$, $Na_2O$, CaO, $ZrO_2$, and $P_2O_5$. In embodiments, the lithium-containing silicate glasses and glass-ceramics may further comprise $Al_2O_3$. In addition, the glasses and glass-ceramics embodied herein may further comprise other alkali oxides, such as $K_2O$, $Rb_2O$, or $Cs_2O$, as well as one or more other components as described herein. As noted herein, the major crystallite phase of the phase assemblage of the glass-ceramics described herein is lithium disilicate. In embodiments, the sum of the Rietveld parameters of the other crystalline phases (i.e., crystalline phases other than lithium disilicate such as, but not limited to lithium metasilicate ($Li_2SiO_3$) and lithium phosphate ($Li_3PO_4$)) may be less than 25, such as less than 24, less than 23, less than 22, less than 21, or even less than 20. This phase assemblage provides a glass-ceramic that has low haze (high clarity) and improved mechanical properties.

$SiO_2$, an oxide involved in the formation of glass, can function to stabilize the network structure of glasses and glass-ceramics. The concentration of $SiO_2$ should be sufficiently high to form the lithium disilicate crystalline phase when the glass is heat treated to convert the glass to a glass-ceramic. The amount of $SiO_2$ may be limited to control the melting temperature of the glass, as the melting temperature of pure $SiO_2$ or high-$SiO_2$ glasses is undesirably high. In embodiments, the glasses and glass-ceramics comprise greater than or equal to 55 wt % and less than or equal to 80 wt % $SiO_2$, greater than or equal to 55 wt % and less than or equal to 75 wt % $SiO_2$, greater than or equal to 55 wt % and less than or equal to 73 wt % $SiO_2$, greater than or equal to 55 wt % and less than or equal to 72 wt % $SiO_2$, greater than or equal to 60 wt % and less than or equal to 80 wt % $SiO_2$, greater than or equal to 60 wt % and less than or equal to 75 wt % $SiO_2$, greater than or equal to 60 wt % and less than or equal to 73 wt % $SiO_2$, greater than or equal to 60 wt % and less than or equal to 72 wt % $SiO_2$, greater than or equal to 65 wt % and less than or equal to 80 wt % $SiO_2$, greater than or equal to 65 wt % and less than or equal to 75 wt % $SiO_2$, greater than or equal to 65 wt % and less than or equal to 73 wt % $SiO_2$, greater than or equal to 65 wt % and less than or equal to 72 wt % $SiO_2$, greater than or equal to 68 wt % and less than or equal to 80 wt % $SiO_2$, greater than or equal to 68 wt % and less than or equal to 75 wt % $SiO_2$, greater than or equal to 68 wt % and less than or equal to 73 wt % $SiO_2$, or even greater than or equal to 68 wt % and less than or equal to 72 wt % $SiO_2$. It should be understood that the above ranges include all subranges within the explicitly disclosed ranges.

In the glasses and glass-ceramics described herein, $Li_2O$ aids in forming the lithium disilicate crystalline phase. Additions of $Li_2O$ also contribute to improved stress levels in glass-ceramics according to embodiments disclosed and described herein. In particular, lithium is the smallest of the alkali metal ions. When lithium is replaced in the residual amorphous glass phase with larger alkali metal ions during ion exchange strengthening, relatively high compressive stress and central tension values may be achieved. However, including too much lithium in the glass can make the glass difficult to form, which can make it difficult to achieve the thin glass-ceramic articles desirable for handheld electronic devices, such as mobile phones and tablets. In the embodiments described herein, to obtain lithium disilicate as the primary crystal phase, it is desirable to have at least about 7 wt % $Li_2O$ in the composition. Additionally, it has been found that once $Li_2O$ approaches about 20 wt %, the viscosity of the glass may be reduced to an undesirable level making the glass difficult to form.

Accordingly, in embodiments, the glasses and glass-ceramics described herein can comprise greater than or equal to 7 wt % and less than or equal to 20 wt % $Li_2O$, 8 wt % and less than or equal to 20 wt % $Li_2O$, greater than or equal to 9 wt % and less than or equal to 20 wt % $Li_2O$, greater than or equal to 10 wt % and less than or equal to 20 wt % $Li_2O$, greater than or equal to 11 wt % and less than or equal to 20 wt % $Li_2O$, greater than or equal to 12 wt % and less than or equal to 20 wt % $Li_2O$, greater than or equal to 13 wt % and less than or equal to 20 wt % $Li_2O$, greater than or equal to 14 wt % and less than or equal to 20 wt % $Li_2O$, greater than or equal to 15 wt % and less than or equal to 20 wt % $Li_2O$, greater than or equal to 16 wt % and less than or equal to 20 wt % $Li_2O$, greater than or equal to 17 wt % and less than or equal to 20 wt % $Li_2O$, greater than or equal to 18 wt % and less than or equal to 20 wt % $Li_2O$, greater than or equal to 7 wt % and less than or equal to 19 wt % $Li_2O$, 8 wt % and less than or equal to 19 wt % $Li_2O$, 9 wt % and less than or equal to 19 wt % $Li_2O$, greater than or equal to 10 wt % and less than or equal to 19 wt % $Li_2O$, greater than or equal to 11 wt % and less than or equal to 19 wt % $Li_2O$, greater than or equal to 12 wt % and less than or equal to 19 wt % $Li_2O$, 13 wt % and less than or equal to 19 wt % $Li_2O$, greater than or equal to 14 wt % and less than or equal to 19 wt % $Li_2O$, 15 wt % and less than or equal to 19 wt % $Li_2O$, greater than or equal to 16 wt % and less than or equal to 19 wt % $Li_2O$, greater than or equal to 17 wt % and less than or equal to 19 wt % $Li_2O$, greater than or equal to 7 wt % and less than or equal to 18 wt % $Li_2O$, 8 wt % and less than or equal to 18 wt % $Li_2O$, 9 wt % and less than or equal to 18 wt % $Li_2O$, greater than or equal to 10 wt % and less than or equal to 18 wt % $Li_2O$, greater than or equal to 11 wt % and less than or equal to 18 wt % $Li_2O$, greater than or equal to 12 wt % and less than or equal to 18 wt % $Li_2O$, greater than or equal to 13 wt % and less than or equal to 18 wt % $Li_2O$, greater than or equal to 14 wt % and less than or equal to 18 wt % $Li_2O$, greater than or equal to 15 wt % and less than or equal to 18 wt % $Li_2O$, greater than or equal to 16 wt % and less than or equal to 18 wt % $Li_2O$, greater than or equal to 7 wt % and less than or equal to 17 wt % $Li_2O$, 8 wt % and less than or equal to 17 wt % $Li_2O$, greater than or equal to 9 wt % and less than or equal to 17 wt % $Li_2O$, greater than or equal to 10 wt % and less than or equal to 17 wt % $Li_2O$, greater than or equal to 11 wt % and less than or equal to 17 wt % $Li_2O$, greater than or equal to 12 wt % and less than or equal to 17 wt % $Li_2O$, greater than or equal to 13 wt % and less than or equal to 17 wt % $Li_2O$, greater than or equal to 14 wt % and less than or equal to 17 wt % $Li_2O$, greater than or equal to 15 wt % and less than or equal to 17 wt % $Li_2O$, greater than or equal to 16 wt % and less than or equal to 17 wt % $Li_2O$, greater than or equal to 7 wt % and less than or equal to 16 wt % $Li_2O$, greater than or equal to 8 wt % and less than or equal to 16 wt % $Li_2O$, greater than or equal to 9 wt % and less than or equal to 16 wt % $Li_2O$, greater than or equal to 10 wt % and less than or equal to 16 wt % $Li_2O$, greater than or equal to 11 wt % and less than or equal to 16 wt % $Li_2O$, greater than or equal to 12 wt % and less than or equal to 16 wt % $Li_2O$, greater than or equal to 13 wt % and less than or equal to 16 wt % $Li_2O$, greater than or equal to 14 wt % and less than or equal to 16 wt % $Li_2O$, greater than or equal to 7 wt % and less than or equal to 15 wt % $Li_2O$, greater than or equal to 8 wt % and less than or equal to 15 wt % $Li_2O$, greater than or equal to 9 wt % and less than or equal to 15 wt % $Li_2O$, greater than or equal to 10 wt % and less than or equal to 15 wt % $Li_2O$, greater than or equal to 11 wt % and less than or equal to 15 wt % $Li_2O$, greater than or equal to 12 wt % and less than or equal to 15 wt % $Li_2O$, greater than or equal to 13 wt % and less than or equal to 15 wt % $Li_2O$, greater than or equal to 14 wt % and less than or equal to 15 wt % $Li_2O$, greater than or equal to 7 wt % and less than or equal to 14 wt % $Li_2O$, greater than or equal to 8 wt % and less than or equal to 14 wt % $Li_2O$, greater than or equal to 9 wt % and less than or equal to 14 wt % $Li_2O$, greater than or equal to 10 wt % and less than or equal to 14 wt % $Li_2O$, greater than or equal to 11 wt % and less than or equal to 14 wt % $Li_2O$, greater than or equal to 12 wt % and less than or equal to 14 wt % $Li_2O$, greater than or equal to 7 wt % and less than or equal to 13 wt % $Li_2O$, greater than or equal to 8 wt % and less than or equal to 13 wt % $Li_2O$, greater than or equal to 9 wt % and less than or equal to 13 wt % $Li_2O$, greater than or equal to 10 wt % and less than or equal to 13 wt % $Li_2O$, greater than or equal to 11 wt % and less than or equal to 13 wt % $Li_2O$, greater than or equal to 12 wt % and less than or equal to 13 wt % $Li_2O$, greater than or equal to 7 wt % and less than or equal to 12 wt % $Li_2O$, greater than or equal to 8 wt % and less than or equal to 12 wt % $Li_2O$, greater than or equal to 8 wt % and less than or equal to 12 wt % $Li_2O$, or even greater than or equal to 10 wt % and less than or equal to 12 wt % $Li_2O$. It should be understood that the above ranges include all subranges within the explicitly disclosed ranges.

As noted herein, the alkali metal oxide $Li_2O$ is generally useful for forming various glass-ceramics. However, other alkali metal oxides tend to decrease glass-ceramic formation and, instead, form a silicate or aluminosilicate residual amorphous glass in the glass-ceramics. It has been found that more than about 5 wt % $Na_2O$ or $K_2O$, or combinations thereof, leads to excessive residual amorphous glass, which can lead to deformation during crystallization and undesirable microstructures from a mechanical property perspective. The composition of the residual amorphous glass may be tailored to control viscosity during crystallization, minimizing deformation or undesirable thermal expansion, or control microstructure properties. Therefore, in general, the glasses may comprise relatively low amounts of non-lithium alkali metal oxides. For example, in embodiments, the glasses or glass-ceramics can comprise greater than or equal to 0 wt % to less than or equal to 5 wt % $R_2O$, wherein R is one or more of the alkali cations Na and K. In embodiments, the glasses or glass-ceramics can comprise from greater than or equal to 0.1 wt % to less than or equal to 3 wt % $R_2O$, wherein R is one or more of the alkali cations Na and K. In embodiments, the glasses or glass-ceramics can comprise from greater than or equal to 0.1 wt % to less than or equal to 2.5 wt % $R_2O$, or even from greater than or equal to 0.1 wt % to less than or equal to 2 wt % $R_2O$, wherein R is one or more of the alkali cations Na and K.

In embodiments, the glasses and glass-ceramics comprise greater than or equal to 0 wt % and less than or equal to 5 wt % $Na_2O$, greater than or equal to 0 wt % and less than or equal to 4.5 wt % $Na_2O$, greater than or equal to 0 wt % and less than or equal to 4 wt % $Na_2O$, greater than or equal to 0 wt % and less than or equal to 3.5 wt % $Na_2O$, greater than or equal to 0 wt % and less than or equal to 3 wt % $Na_2O$, greater than or equal to 0 wt % and less than or equal to 2.5 wt % $Na_2O$, greater than or equal to 0 wt % and less than or equal to 2 wt % $Na_2O$, greater than or equal to 0 wt % and less than or equal to 1.5 wt % $Na_2O$, greater than or equal to 0 wt % and less than or equal to 1 wt % $Na_2O$, greater than or equal to 0 wt % and less than or equal to 0.5 wt % $Na_2O$, greater than or equal to 0.05 wt % and less than or equal to 5 wt % $Na_2O$, greater than or equal to 0.05 wt % and less than or equal to 4.5 wt % $Na_2O$, greater than or equal to 0.05 wt % and less than or equal to 4 wt % $Na_2O$, greater than or equal to 0.05 wt % and less than or equal to 3.5 wt % $Na_2O$, greater than or equal to 0.05 wt % and less than or equal to 3 wt % $Na_2O$, greater than or equal to 0.05 wt % and less than or equal to 2.5 wt % $Na_2O$, greater than or equal to 0.05 wt % and less than or equal to 2 wt % $Na_2O$, greater than or equal to 0.05 wt % and less than or equal to 1.5 wt % $Na_2O$, greater than or equal to 0.05 wt % and less than or equal to 1 wt % $Na_2O$, greater than or equal to 0.05 wt % and less than or equal to 0.5 wt % $Na_2O$, greater than or equal to 0.1 wt % and less than or equal to 5 wt % $Na_2O$, greater than or equal to 0.1 wt % and less than or equal to 4.5 wt % $Na_2O$, greater than or equal to 0.1 wt % and less than or equal to 4 wt % $Na_2O$, greater than or equal to 0.1 wt % and less than or equal to 3.5 wt % $Na_2O$, greater than or equal to 0.1 wt % and less than or equal to 3 wt % $Na_2O$, greater than or equal to 0.1 wt % and less than or equal to 2.5 wt % $Na_2O$, greater than or equal to 0.1 wt % and less than or equal to 2 wt % $Na_2O$, greater than or equal to 0.1 wt % and less than or equal to 1.5 wt % $Na_2O$, greater than or equal to 0.1 wt % and less than or equal to 1 wt % $Na_2O$, greater than or equal to 0.1 wt % and less than or equal to 0.5 wt % $Na_2O$, greater than or equal to 0.5 wt % and less than or equal to 5 wt % $Na_2O$, greater than or equal to 0.5 wt % and less than or equal to 4.5 wt % $Na_2O$, greater than or equal to 0.5 wt % and less than or equal to 4 wt % $Na_2O$, greater than or equal to 0.5 wt % and less than or equal to 3.5 wt % $Na_2O$, greater than or equal to 0.5 wt % and less than or equal to 3 wt % $Na_2O$, greater than or equal to 0.5 wt % and less than or equal to 2.5 wt % $Na_2O$, greater than or equal to 0.5 wt % and less than or equal to 2 wt % $Na_2O$, greater than or equal to 0.5 wt % and less than or equal to 1.5 wt % $Na_2O$, or even greater than or equal to 0.5 wt % and less than or equal to 1 wt % $Na_2O$. It should be understood that the above ranges include all subranges within the explicitly disclosed ranges. In embodiments, the glasses or glass-ceramics do not contain $Na_2O$. In embodiments, the glasses or glass-ceramics are substantially free of $Na_2O$.

In embodiments, the glasses and glass-ceramics comprise greater than or equal to 0 wt % and less than or equal to 5 wt % $K_2O$, greater than or equal to 0 wt % and less than or equal to 4.5 wt % $K_2O$, greater than or equal to 0 wt % and less than or equal to 4 wt % $K_2O$, greater than or equal to 0 wt % and less than or equal to 3.5 wt % $K_2O$, greater than or equal to 0 wt % and less than or equal to 3 wt % $K_2O$, greater than or equal to 0 wt % and less than or equal to 2.5 wt % $K_2O$, greater than or equal to 0 wt % and less than or equal to 2 wt % $K_2O$, greater than or equal to 0 wt % and less than or equal to 1.5 wt % $K_2O$, greater than or equal to 0 wt % and less than or equal to 1 wt % $K_2O$, greater than or equal to 0 wt % and less than or equal to 0.5 wt % $K_2O$, greater than or equal to 0.05 wt % and less than or equal to 5 wt % $K_2O$, greater than or equal to 0.05 wt % and less than or equal to 4.5 wt % $K_2O$, greater than or equal to 0.05 wt % and less than or equal to 4 wt % $K_2O$, greater than or equal to 0.05 wt % and less than or equal to 3.5 wt % $K_2O$, greater than or equal to 0.05 wt % and less than or equal to 3 wt % $K_2O$, greater than or equal to 0.05 wt % and less than or equal to 2.5 wt % $K_2O$, greater than or equal to 0.05 wt % and less than or equal to 2 wt % $K_2O$, greater than or equal to 0.05 wt % and less than or equal to 1.5 wt % $K_2O$, greater than or equal to 0.05 wt % and less than or equal to 1 wt % $K_2O$, greater than or equal to 0.05 wt % and less than or equal to 0.5 wt % $K_2O$, greater than or equal to 0.1 wt % and less than or equal to 5 wt % $K_2O$, greater than or equal to 0.1 wt % and less than or equal to 4.5 wt % $K_2O$, greater than or equal to 0.1 wt % and less than or equal to 4 wt % $K_2O$, greater than or equal to 0.1 wt % and less than or equal to 3.5 wt % $K_2O$, greater than or equal to 0.1 wt % and less than or equal to 3 wt % $K_2O$, greater than or equal to 0.1 wt % and less than or equal to 2.5 wt % $K_2O$, greater than or equal to 0.1 wt % and less than or equal to 2 wt % $K_2O$, greater than or equal to 0.1 wt % and less than or equal to 1.5 wt % $K_2O$, greater than or equal to 0.1 wt % and less than or equal to 1 wt % $K_2O$, greater than or equal to 0.1 wt % and less than or equal to 0.5 wt % $K_2O$, greater than or equal to 0.5 wt % and less than or equal to 5 wt % $K_2O$, greater than or equal to 0.5 wt % and less than or equal to 4.5 wt % $K_2O$, greater than or equal to 0.5 wt % and less than or equal to 4 wt % $K_2O$, greater than or equal to 0.5 wt % and less than or equal to 3.5 wt % $K_2O$, greater than or equal to 0.5 wt % and less than or equal to 3 wt % $K_2O$, greater than or equal to 0.5 wt % and less than or equal to 2.5 wt % $K_2O$, greater than or equal to 0.5 wt % and less than or equal to 2 wt % $K_2O$, greater than or equal to 0.5 wt % and less than or equal to 1.5 wt % $K_2O$, or even greater than or equal to 0.5 wt % and less than or equal to 1 wt % $K_2O$. It should be understood that the above ranges include all subranges within the explicitly disclosed ranges. In embodiments, the glasses or glass-ceramics do not contain $K_2O$. In embodiments, the glasses or glass-ceramics are substantially free of $K_2O$.

In embodiments, the ratio of $Li_2O$ (wt %) to the sum of $Li_2O$ (wt %), $Na_2O$ (wt %) and $K_2O$ (wt %) (i.e., $Li_2O$:($Li_2O$+$Na_2O$+$K_2O$)) is greater than or equal to 0.5 and less than 1.0, greater than or equal to 0.6 and less than 1.0, greater than or equal to 0.7 and less than 1.0, greater than or equal to 0.8 and less than 1.0, or even greater than or equal to 0.9 and less than 1.0. If the total concentration of $Na_2O$ and $K_2O$ is too high (i.e., the ratio of $Li_2O$:($Li_2O$+$Na_2O$+$K_2O$) is less than 0.5), less stress may be installed in the glass-ceramic following strengthening by ion exchange.

$Al_2O_3$ may stabilize the glass network and improves the mechanical properties and chemical durability of the resulting glasses and glass-ceramics. The amount of $Al_2O_3$ can be tailored to control the viscosity of the glasses during melting and forming. If the amount of $Al_2O_3$ is too high, the viscosity of the melt is also generally increased and the fraction of lithium disilicate crystals is decreased to an extent that no interlocking structure of crystals in the phase assemblage is formed, thereby diminishing the mechanical properties of the glass-ceramic. In addition, if the amount of $Al_2O_3$ is too high, the formation of lithium aluminosilicate phases increases and the elastic modulus and fracture toughness of the glass-ceramics decreases.

Embodiments of the glasses and glass-ceramics described herein comprise greater than or equal to 0 wt % and less than or equal to 6.0 wt % $Al_2O_3$, greater than or equal to 0.1 wt % and less than or equal to 6.0 wt % $Al_2O_3$, greater than or equal to 0.5 wt % and less than or equal to 6.0 wt % $Al_2O_3$, greater than or equal to 1.0 wt % and less than or equal to 6.0 wt % $Al_2O_3$, greater than or equal to 1.5 wt % and less than or equal to 6.0 wt % $Al_2O_3$, greater than or equal to 2.0 wt % and less than or equal to 6.0 wt % $Al_2O_3$, greater than or equal to 2.5 wt % and less than or equal to 6.0 wt % $Al_2O_3$, greater than or equal to 3.0 wt % and less than or equal to 6.0 wt % $Al_2O_3$, greater than or equal to 3.5 wt % and less than or equal to 6.0 wt % $Al_2O_3$, greater than or equal to 4.0 wt % and less than or equal to 6.0 wt % $Al_2O_3$, greater than or equal to 4.5 wt % and less than or equal to 6.0 wt % $Al_2O_3$, greater than or equal to 5.0 wt % and less than or equal to 6.0 wt % $Al_2O_3$, greater than or equal to 5.5 wt % and less than or equal to 6.0 wt % $Al_2O_3$, greater than or equal to 0 wt % and less than or equal to 5.0 wt % $Al_2O_3$, greater than or equal to 0 wt % and less than or equal to 5.0 wt % $Al_2O_3$, greater than or equal to 0.1 wt % and less than or equal to 5.0 wt % $Al_2O_3$, greater than or equal to 0.5 wt % and less than or equal to 5.0 wt % $Al_2O_3$, greater than or equal to 1.0 wt % and less than or equal to 5.0 wt % $Al_2O_3$, greater than or equal to 1.5 wt % and less than or equal to 5.0 wt % $Al_2O_3$, greater than or equal to 2.0 wt % and less than or equal to 5.0 wt % $Al_2O_3$, greater than or equal to 2.5 wt % and less than or equal to 5.0 wt % $Al_2O_3$, greater than or equal to 3.0 wt % and less than or equal to 5.0 wt % $Al_2O_3$, greater than or equal to 3.5 wt % and less than or equal to 5.0 wt % $Al_2O_3$, greater than or equal to 4.0 wt % and less than or equal to 5.0 wt % $Al_2O_3$, greater than or equal to 4.5 wt % and less than or equal to 5.0 wt % $Al_2O_3$, greater than or equal to 0 wt % and less than or equal to 4.5 wt % $Al_2O_3$, greater than or equal to 0.1 wt % and less than or equal to 4.5 wt % $Al_2O_3$, greater than or equal to 0.5 wt % and less than or equal to 4.5 wt % $Al_2O_3$, greater than or equal to 1.0 wt % and less than or equal to 4.5 wt % $Al_2O_3$, greater than or equal to 1.5 wt % and less than or equal to 4.5 wt % $Al_2O_3$, greater than or equal to 2.0 wt % and less than or equal to 4.5 wt % $Al_2O_3$, greater than or equal to 2.5 wt % and less than or equal to 4.5 wt % $Al_2O_3$, greater than or equal to 3.0 wt % and less than or equal to 4.5 wt % $Al_2O_3$, greater than or equal to 3.5 wt % and less than or equal to 4.5 wt % $Al_2O_3$, greater than or equal to 4.0 wt % and less than or equal to 4.5 wt % $Al_2O_3$, greater than or equal to 0 wt % and less than or equal to 4.0 wt % $Al_2O_3$, greater than or equal to 0.1 wt % and less than or equal to 4.0 wt % $Al_2O_3$, greater than or equal to 0.5 wt % and less than or equal to 4.0 wt % $Al_2O_3$, greater than or equal to 1.0 wt % and less than or equal to 4.0 wt % $Al_2O_3$, greater than or equal to 1.5 wt % and less than or equal to 4.0 wt % $Al_2O_3$, greater than or equal to 2.0 wt % and less than or equal to 4.0 wt % $Al_2O_3$, greater than or equal to 2.5 wt % and less than or equal to 4.0 wt % $Al_2O_3$, greater than or equal to 3.0 wt % and less than or equal to 4.0 wt % $Al_2O_3$, greater than or equal to 3.5 wt % and less than or equal to 4.0 wt % $Al_2O_3$, greater than or equal to 0 wt % and less than or equal to 3.5 wt % $Al_2O_3$, greater than or equal to 0.1 wt % and less than or equal to 3.5 wt % $Al_2O_3$, greater than or equal to 0.5 wt % and less than or equal to 3.5 wt % $Al_2O_3$, greater than or equal to 1.0 wt % and less than or equal to 3.5 wt % $Al_2O_3$, greater than or equal to 1.5 wt % and less than or equal to 3.5 wt % $Al_2O_3$, greater than or equal to 2.0 wt % and less than or equal to 3.5 wt % $Al_2O_3$, greater than or equal to 2.5 wt % and less than or equal to 3.5 wt % $Al_2O_3$, greater than or equal to 3.0 wt % and less than or equal to 3.5 wt % $Al_2O_3$, greater than or equal to 0 wt % and less than or equal to 3.0 wt % $Al_2O_3$, greater than or equal to 0.1 wt % and less than or equal to 3.0 wt % $Al_2O_3$, greater than or equal to 0.5 wt % and less than or equal to 3.0 wt % $Al_2O_3$, greater than or equal to 1.0 wt % and less than or equal to 3.0 wt % $Al_2O_3$, greater than or equal to 1.5 wt % and less than or equal to 3.0 wt % $Al_2O_3$, greater than or equal to 2.0 wt % and less than or equal to 3.0 wt % $Al_2O_3$, greater than or equal to 2.5 wt % and less than or equal to 3.0 wt % $Al_2O_3$, greater than or equal to 0 wt % and less than or equal to 2.5 wt % $Al_2O_3$, greater than or equal to 0.1 wt % and less than or equal to 2.5 wt % $Al_2O_3$, greater than or equal to 0.5 wt % and less than or equal to 2.5 wt % $Al_2O_3$, greater than or equal to 1.0 wt % and less than or equal to 2.5 wt % $Al_2O_3$, greater than or equal to 1.5 wt % and less than or equal to 2.5 wt % $Al_2O_3$, greater than or equal to 2.0 wt % and less than or equal to 2.5 wt % $Al_2O_3$, greater than or equal to 0 wt % and less than or equal to 2.0 wt % $Al_2O_3$, greater than or equal to 0.1 wt % and less than or equal to 2.0 wt % $Al_2O_3$, greater than or equal to 0.5 wt % and less than or equal to 2.0 wt % $Al_2O_3$, greater than or equal to 1.0 wt % and less than or equal to 2.0 wt % $Al_2O_3$, greater than or equal to 1.5 wt % and less than or equal to 2.0 wt % $Al_2O_3$, greater than or equal to 0 wt % and less than or equal to 1.5 wt % $Al_2O_3$, greater than or equal to 0.1 wt % and less than or equal to 1.5 wt % $Al_2O_3$, greater than or equal to 0.5 wt % and less than or equal to 1.5 wt % $Al_2O_3$, greater than or equal to 1.0 wt % and less than or equal to 1.5 wt % $Al_2O_3$, greater than or equal to 0 wt % and less than or equal to 1.0 wt % $Al_2O_3$, greater than or equal to 0.1 wt % and less than or equal to 1.0 wt % $Al_2O_3$, greater than or equal to 0.5 wt % and less than or equal to 1.0 wt % $Al_2O_3$, or greater than or equal to 0.1 wt % and less than or equal to 0.5 wt % $Al_2O_3$. In embodiments, the glasses and glass ceramics do not include $Al_2O_3$. In embodiments, the glasses and glass ceramics are substantially free of $Al_2O_3$. It should be understood that the above ranges include all subranges within the explicitly disclosed ranges.

As noted herein, the ratio of $Al_2O_3$ (wt %) to $Li_2O$ (wt %) ($Al_2O_3$:$Li_2O$) is minimized to reduce formation of a petalite crystalline phase and encourage the formation of the lithium disilicate crystalline phase during ceramming which, in turn, increases the Young's modulus of the resulting glass-ceramics. In embodiments, the ratio of $Al_2O_3$ (wt %) to $Li_2O$ (wt %) is greater than or equal to 0 and less than 0.50, greater than or equal to 0 and less than or equal to 0.45, greater than or equal to 0 and less than or equal to 0.40, greater than or equal to 0 and less than or equal to 0.35, greater than or equal to 0 and less than or equal to 0.30, greater than or equal to 0 and less than or equal to 0.25, greater than or equal to 0 and less than or equal to 0.20, greater than or equal to 0 and less than or equal to 0.15, or even greater than or equal to 0 and less than or equal to 0.1. In embodiments, the ratio of $Al_2O_3$ (wt %) to $Li_2O$ (wt %) is 0, such as when the glass or glass ceramics are free of $Al_2O_3$.

As noted herein, CaO can increase the density of the glasses (and resulting glass-ceramic) increasing the amount of compressive stress and central tension that may be installed in the glasses. In embodiments, the glasses and glass-ceramics comprise greater than 0 wt % and less than or equal to 10.0 wt % CaO, greater than or equal to 0.1 wt % and less than or equal to 10.0 wt % CaO, greater than or equal to 0.5 wt % and less than or equal to 10.0 wt % CaO, greater than or equal to 1.0 wt % and less than or equal to 10.0 wt % CaO, greater than or equal to 1.5 wt % and less than or equal to 10.0 wt % CaO, greater than or equal to 2.0 wt % and less than or equal to 10.0 wt % CaO, greater than or equal to 2.5 wt % and less than or equal to 10.0 wt % CaO, greater than or equal to 3.0 wt % and less than or equal to 10.0 wt % CaO, greater than or equal to 3.5 wt % and less than or equal to 10.0 wt % CaO, greater than or equal to 4.0 wt % and less than or equal to 10.0 wt % CaO, greater than or equal to 4.5 wt % and less than or equal to 10.0 wt % CaO, greater than or equal to 5.0 wt % and less than or equal to 10.0 wt % CaO, greater than or equal to 5.5 wt % and less than or equal to 10.0 wt % CaO, greater than or equal to 6.0 wt % and less than or equal to 10.0 wt % CaO, greater than or equal to 6.5 wt % and less than or equal to 10.0 wt % CaO, greater than or equal to 7.0 wt % and less than or equal to 10.0 wt % CaO, greater than or equal to 7.5 wt % and less than or equal to 10.0 wt % CaO, greater than or equal to 8.0 wt % and less than or equal to 10.0 wt % CaO, greater than or equal to 8.5 wt % and less than or equal to 10.0 wt % CaO, greater than or equal to 9.0 wt % and less than or equal to 10.0 wt % CaO, greater than 0 wt % and less than or equal to 9.0 wt % CaO, greater than or equal to 0.1 wt % and less than or equal to 9.0 wt % CaO, greater than or equal to 0.5 wt % and less than or equal to 9.0 wt % CaO, greater than or equal to 1.0 wt % and less than or equal to 9.0 wt % CaO, greater than or equal to 1.5 wt % and less than or equal to 9.0 wt % CaO, greater than or equal to 2.0 wt % and less than or equal to 9.0 wt % CaO, greater than or equal to 2.5 wt % and less than or equal to 9.0 wt % CaO, greater than or equal to 3.0 wt % and less than or equal to 9.0 wt % CaO, greater than or equal to 3.5 wt % and less than or equal to 9.0 wt % CaO, greater than or equal to 4.0 wt % and less than or equal to 9.0 wt % CaO, greater than or equal to 4.5 wt % and less than or equal to 9.0 wt % CaO, greater than or equal to 5.0 wt % and less than or equal to 9.0 wt % CaO, greater than or equal to 5.5 wt % and less than or equal to 9.0 wt % CaO, greater than or equal to 6.0 wt % and less than or equal to 9.0 wt % CaO, greater than or equal to 6.5 wt % and less than or equal to 9.0 wt % CaO, greater than or equal to 7.0 wt % and less than or equal to 9.0 wt % CaO, greater than or equal to 7.5 wt % and less than or equal to 9.0 wt % CaO, greater than or equal to 8.0 wt % and less than or equal to 9.0 wt % CaO, greater than 0 wt % and less than or equal to 8.0 wt % CaO, greater than or equal to 0.1 wt % and less than or equal to 8.0 wt % CaO, greater than or equal to 0.5 wt % and less than or equal to 8.0 wt % CaO, greater than or equal to 1.0 wt % and less than or equal to 8.0 wt % CaO, greater than or equal to 1.5 wt % and less than or equal to 8.0 wt % CaO, greater than or equal to 2.0 wt % and less than or equal to 8.0 wt % CaO, greater than or equal to 2.5 wt % and less than or equal to 8.0 wt % CaO, greater than or equal to 3.0 wt % and less than or equal to 8.0 wt % CaO, greater than or equal to 3.5 wt % and less than or equal to 8.0 wt % CaO, greater than or equal to 4.0 wt % and less than or equal to 8.0 wt % CaO, greater than or equal to 4.5 wt % and less than or equal to 8.0 wt % CaO, greater than or equal to 5.0 wt % and less than or equal to 8.0 wt % CaO, greater than or equal to 5.5 wt % and less than or equal to 8.0 wt % CaO, greater than or equal to 6.0 wt % and less than or equal to 8.0 wt % CaO, greater than or equal to 6.5 wt % and less than or equal to 8.0 wt % CaO, greater than or equal to 7.0 wt % and less than or equal to 8.0 wt % CaO, greater than 0 wt % and less than or equal to 6.0 wt % CaO, greater than or equal to 0.1 wt % and less than or equal to 6.0 wt % CaO, greater than or equal to 0.5 wt % and less than or equal to 6.0 wt % CaO, greater than or equal to 1.0 wt % and less than or equal to 6.0 wt % CaO, greater than or equal to 1.5 wt % and less than or equal to 6.0 wt % CaO, greater than or equal to 2.0 wt % and less than or equal to 6.0 wt % CaO, greater than or equal to 2.5 wt % and less than or equal to 6.0 wt % CaO, greater than or equal to 3.0 wt % and less than or equal to 6.0 wt % CaO, greater than or equal to 3.5 wt % and less than or equal to 6.0 wt % CaO, greater than or equal to 4.0 wt % and less than or equal to 6.0 wt % CaO, greater than or equal to 4.5 wt % and less than or equal to 6.0 wt % CaO, greater than or equal to 5.0 wt % and less than or equal to 6.0 wt % CaO, greater than 0 wt % and less than or equal to 6.0 wt % CaO, greater than or equal to 0.1 wt % and less than or equal to 5.0 wt % CaO, greater than or equal to 0.5 wt % and less than or equal to 5.0 wt % CaO, greater than or equal to 1.0 wt % and less than or equal to 5.0 wt % CaO, greater than or equal to 1.5 wt % and less than or equal to 5.0 wt % CaO, greater than or equal to 2.0 wt % and less than or equal to 5.0 wt % CaO, greater than or equal to 2.5 wt % and less than or equal to 5.0 wt % CaO, greater than or equal to 3.0 wt % and less than or equal to 5.0 wt % CaO, greater than or equal to 3.5 wt % and less than or equal to 5.0 wt % CaO, greater than or equal to 4.0 wt % and less than or equal to 5.0 wt % CaO, greater than 0 wt % and less than or equal to 4.0 wt % CaO, greater than or equal to 0.1 wt % and less than or equal to 4.0 wt % CaO, greater than or equal to 0.5 wt % and less than or equal to 4.0 wt % CaO, greater than or equal to 1.0 wt % and less than or equal to 4.0 wt % CaO, greater than or equal to 1.5 wt % and less than or equal to 4.0 wt % CaO, greater than or equal to 2.0 wt % and less than or equal to 4.0 wt % CaO, greater than or equal to 2.5 wt % and less than or equal to 4.0 wt % CaO, greater than or equal to 3.0 wt % and less than or equal to 4.0 wt % CaO, greater than or equal to 3.5 wt % and less than or equal to 4.0 wt % CaO, greater than 0 wt % and less than or equal to 3.5 wt % CaO, greater than or equal to 0.05 wt % and less than or equal to 3.5 wt % CaO, greater than or equal to 0.1 wt % and less than or equal to 3.5 wt % CaO, greater than or equal to 0.5 wt % and less than or equal to 3.5 wt % CaO, greater than or equal to 1.0 wt % and less than or equal to 3.5 wt % CaO, greater than or equal to 1.5 wt % and less than or equal to 3.5 wt % CaO, greater than or equal to 2.0 wt % and less than or equal to 3.5 wt % CaO, greater than or equal to 2.5 wt % and less than or equal to 3.5 wt % CaO, greater than or equal to 3.0 wt % and less than or equal to 3.5 wt % CaO, greater than 0 wt % and less than or equal to 3.0 wt % CaO, greater than or equal to 0.1 wt % and less than or equal to 3.0 wt % CaO, greater than or equal to 0.5 wt % and less than or equal to 3.0 wt % CaO, greater than or equal to 1.0 wt % and less than or equal to 3.0 wt % CaO, greater than or equal to 1.5 wt % and less than or equal to 3.0 wt % CaO, greater than or equal to 2.0 wt % and less than or equal to 3.0 wt % CaO, greater than or equal to 2.5 wt % and less than or equal to 3.0 wt % CaO, greater than 0 wt % and less than or equal to 2.5 wt % CaO, greater than or equal to 0.05 wt % and less than or equal to 2.5 wt % CaO, greater than or equal to 0.1 wt % and less than or equal to 2.5 wt % CaO, greater than or equal to 0.5 wt % and less than or equal to 2.5 wt % CaO, greater than or equal to 1.0 wt % and less than or equal to 2.5 wt % CaO, greater than or equal to 1.5 wt % and less than or equal to 2.5 wt % CaO, greater than or equal to 2.0 wt % and less than or equal to 2.5 wt % CaO, greater than 0 wt % and less than or equal to 2.0 wt % CaO, greater than or equal to 0.1 wt % and less than or equal to 2.0 wt % CaO, greater than or equal to 0.5 wt % and less than or equal to 2.0 wt % CaO, greater than or equal to 1.0 wt % and less than or equal to 2.0 wt % CaO, greater than or equal to 1.5 wt % and less than or equal to 2.0 wt % CaO, greater than 0 wt % and less than or equal to 1.5 wt % CaO, greater than or equal to 0.1 wt % and less than or equal to 1.5 wt % CaO, greater than or equal to 0.5 wt % and less than or equal to 1.5 wt % CaO, greater than or equal to 1.0 wt % and less than or equal to 1.5 wt % CaO, greater than 0 wt % and less than or equal to 1.0 wt % CaO, greater than or equal to 0.1 wt % and less than or equal to 1.0 wt % CaO, greater than or equal to 0.5 wt % and less than or equal to 1.0 wt % CaO, greater than 0 wt % and less than or equal to 0.5 wt % CaO, or even greater than or equal to 0.1 wt % and less than or equal to 0.5 wt % CaO. It should be understood that the above ranges include all subranges within the explicitly disclosed ranges.

It has been found that $ZrO_2$ can improve the stability of the glasses (and resulting glass-ceramics) by significantly reducing glass devitrification during forming and lowering the liquidus temperature. At concentrations above 8 wt %, $ZrSiO_4$ can form a primary liquidus phase at a high temperature, which significantly lowers liquidus viscosity. Additions of $ZrO_2$ also aid in forming transparent glasses (and resulting glass-ceramics) and improve the chemical durability of the glass-ceramics. The addition of $ZrO_2$ can also help decrease the crystallite size of the glass-ceramics, which aids in the formation of transparent glass-ceramics when high transparency is desired. It has been found that including $ZrO_2$ in the glass (and resulting glass-ceramics), in combination with a slightly higher amount of lithium in the glass and glass-ceramics described herein, can result in higher compressive stress and central tension in the glass-ceramics following chemical tempering without unduly effecting the melting behavior of the glass. Without being bound by any particular theory, it is believed that when forming glass-ceramics via heat treatments-which will be described in further detail herein-$ZrO_2$ helps to partition lithium in the residual amorphous glass phase of the glass-ceramics. Thus, more lithium is present in the residual amorphous glass phase and is readily available to be exchanged with sodium and potassium during chemical tempering processes.

In embodiments, the glasses and glass-ceramics comprise greater than or equal to 0.5 wt % and less than or equal to 20 wt % $ZrO_2$, greater than or equal to 1.0 wt % and less than or equal to 20 wt % $ZrO_2$, greater than or equal to 1.5 wt % and less than or equal to 20 wt % $ZrO_2$, greater than or equal to 2.0 wt % and less than or equal to 20 wt % $ZrO_2$, greater than or equal to 2.5 wt % and less than or equal to 20 wt % $ZrO_2$, greater than or equal to 3.0 wt % and less than or equal to 20 wt % $ZrO_2$, greater than or equal to 3.5 wt % and less than or equal to 20 wt % $ZrO_2$, greater than or equal to 4.0 wt % and less than or equal to 20 wt % $ZrO_2$, greater than or equal to 0.5 wt % and less than or equal to 19 wt % $ZrO_2$, greater than or equal to 1.0 wt % and less than or equal to 19 wt % $ZrO_2$, greater than or equal to 1.5 wt % and less than or equal to 19 wt % $ZrO_2$, greater than or equal to 2.0 wt % and less than or equal to 19 wt % $ZrO_2$, greater than or equal to 2.5 wt % and less than or equal to 19 wt % $ZrO_2$, greater than or equal to 3.0 wt % and less than or equal to 19 wt % $ZrO_2$, greater than or equal to 3.5 wt % and less than or equal to 19 wt % $ZrO_2$, greater than or equal to 4.0 wt % and less than or equal to 19 wt % $ZrO_2$, greater than or equal to 0.5 wt % and less than or equal to 18 wt % $ZrO_2$, greater than or equal to 1.0 wt % and less than or equal to 18 wt % $ZrO_2$, greater than or equal to 1.5 wt % and less than or equal to 18 wt % $ZrO_2$, greater than or equal to 2.0 wt % and less than or equal to 18 wt % $ZrO_2$, greater than or equal to 2.5 wt % and less than or equal to 18 wt % $ZrO_2$, greater than or equal to 3.0 wt % and less than or equal to 18 wt % $ZrO_2$, greater than or equal to 3.5 wt % and less than or equal to 18 wt % $ZrO_2$, greater than or equal to 4.0 wt % and less than or equal to 18 wt % $ZrO_2$, greater than or equal to 0.5 wt % and less than or equal to 17 wt % $ZrO_2$, greater than or equal to 1.0 wt % and less than or equal to 17 wt % $ZrO_2$, greater than or equal to 1.5 wt % and less than or equal to 17 wt % $ZrO_2$, greater than or equal to 2.0 wt % and less than or equal to 17 wt % $ZrO_2$, greater than or equal to 2.5 wt % and less than or equal to 17 wt % $ZrO_2$, greater than or equal to 3.0 wt % and less than or equal to 17 wt % $ZrO_2$, greater than or equal to 3.5 wt % and less than or equal to 17 wt % $ZrO_2$, greater than or equal to 4.0 wt % and less than or equal to 17 wt % $ZrO_2$, greater than or equal to 0.5 wt % and less than or equal to 16 wt % $ZrO_2$, greater than or equal to 1.0 wt % and less than or equal to 16 wt % $ZrO_2$, greater than or equal to 1.5 wt % and less than or equal to 16 wt % $ZrO_2$, greater than or equal to 2.0 wt % and less than or equal to 16 wt % $ZrO_2$, greater than or equal to 2.5 wt % and less than or equal to 16 wt % $ZrO_2$, greater than or equal to 3.0 wt % and less than or equal to 16 wt % $ZrO_2$, greater than or equal to 3.5 wt % and less than or equal to 16 wt % $ZrO_2$, greater than or equal to 4.0 wt % and less than or equal to 16 wt % $ZrO_2$, greater than or equal to 0.5 wt % and less than or equal to 15 wt % $ZrO_2$, greater than or equal to 1.0 wt % and less than or equal to 15 wt % $ZrO_2$, greater than or equal to 1.5 wt % and less than or equal to 15 wt % $ZrO_2$, greater than or equal to 2.0 wt % and less than or equal to 15 wt % $ZrO_2$, greater than or equal to 2.5 wt % and less than or equal to 15 wt % $ZrO_2$, greater than or equal to 3.0 wt % and less than or equal to 15 wt % $ZrO_2$, greater than or equal to 3.5 wt % and less than or equal to 15 wt % $ZrO_2$, greater than or equal to 4 wt % and less than or equal to 15 wt % $ZrO_2$, greater than or equal to 5 wt % and less than or equal to 15 wt % $ZrO_2$, greater than or equal to 6 wt % and less than or equal to 15 wt % $ZrO_2$, greater than or equal to 7 wt % and less than or equal to 15 wt % $ZrO_2$, greater than or equal to 8 wt % and less than or equal to 15 wt % $ZrO_2$, greater than or equal to 9 wt % and less than or equal to 15 wt % $ZrO_2$, greater than or equal to 10 wt % and less than or equal to 15 wt % $ZrO_2$, greater than or equal to 11 wt % and less than or equal to 15 wt % $ZrO_2$, greater than or equal to 12 wt % and less than or equal to 15 wt % $ZrO_2$, greater than or equal to 13 wt % and less than or equal to 15 wt % $ZrO_2$, greater than or equal to 14 wt % and less than or equal to 15 wt % $ZrO_2$, greater than or equal to 4 wt % and less than or equal to 14 wt % $ZrO_2$, greater than or equal to 5 wt % and less than or equal to 14 wt % $ZrO_2$, greater than or equal to 6 wt % and less than or equal to 14 wt % $ZrO_2$, greater than or equal to 7 wt % and less than or equal to 14 wt % $ZrO_2$, greater than or equal to 8 wt % and less than or equal to 14 wt % $ZrO_2$, greater than or equal to 9 wt % and less than or equal to 14 wt % $ZrO_2$, greater than or equal to 10 wt % and less than or equal to 14 wt % $ZrO_2$, greater than or equal to 11 wt % and less than or equal to 14 wt % $ZrO_2$, greater than or equal to 12 wt % and less than or equal to 14 wt % $ZrO_2$, greater than or equal to 4 wt % and less than or equal to 12 wt % $ZrO_2$, greater than or equal to 5 wt % and less than or equal to 12 wt % $ZrO_2$, greater than or equal to 6 wt % and less than or equal to 12 wt % $ZrO_2$, greater than or equal to 7 wt % and less than or equal to 12 wt % $ZrO_2$, greater than or equal to 8 wt % and less than or equal to 12 wt % $ZrO_2$, greater than or equal to 9 wt % and less than or equal to 12 wt % $ZrO_2$, greater than or equal to 10 wt % and less than or equal to 12 wt % $ZrO_2$, greater than or equal to 4 wt % and less than or equal to 10 wt % $ZrO_2$, greater than or equal to 5 wt % and less than or equal to 10 wt % $ZrO_2$, greater than or equal to 6 wt % and less than or equal to 10 wt % $ZrO_2$, greater than or equal to 7 wt % and less than or equal to 10 wt % $ZrO_2$, greater than or equal to 8 wt % and less than or equal to 10 wt % $ZrO_2$, greater than or equal to 4 wt % and less than or equal to 9 wt % $ZrO_2$, greater than or equal to 5 wt % and less than or equal to 9 wt % $ZrO_2$, greater than or equal to 6 wt % and less than or equal to 9 wt % $ZrO_2$, or greater than or equal to 7 wt % and less than or equal to 9 wt % $ZrO_2$. It should be understood that the above ranges include all subranges within the explicitly disclosed ranges.

Further, it has been determined that the central tension installed in a glass-ceramic by ion exchange can be maximized by balancing the amount of $Li_2O$ and $ZrO_2$ in the glasses and resulting glass-ceramics. In particular, it has been found that when the ratio of $Li_2O$ (wt %) to $ZrO_2$ (wt %) (i.e., $Li_2O$:$ZrO_2$) in the glasses and resulting glass-ceramics is in the range from greater than or equal to 1.10 to less than or equal to 5.0, the central tension in the glass-ceramics as a result of strengthening by ion exchange can be maximized. In that regard, without wishing to be bound by any particular theory, it is believed that compositions which include ratios of $Li_2O$ to $ZrO_2$ within this range maximize the amount $Li_2O$ in the residual amorphous glass phase of the glass-ceramics which, in turn, allows for more ion exchange to occur between smaller lithium ions in the residual amorphous glass phase and larger sodium and/or potassium ions from an ion exchange bath resulting in greater central tension in the glass-ceramics.

Accordingly, in some embodiments, the ratio of $Li_2O$ to $ZrO_2$ in the glasses and glass-ceramics is greater than or equal to 1.10 to less than or equal to 5.0, greater than or equal to 1.10 to less than or equal to 4.5, greater than or equal to 1.10 to less than or equal to 4.0, greater than or equal to 1.10 to less than or equal to 3.5, greater than or equal to 1.10 to less than or equal to 3.0, greater than or equal to 1.10 to less than or equal to 2.5, or even greater than or equal to 1.10 to less than or equal to 2.0. In some embodiments, the ratio of $Li_2O$ to $ZrO_2$ in the glasses and glass-ceramics is greater than or equal to 1.10 to less than or equal to 1.90, greater than or equal to 1.15 to less than or equal to 1.90, greater than or equal to 1.20 to less than or equal to 1.90, greater than or equal to 1.25 to less than or equal to 1.90, greater than or equal to 1.30 to less than or equal to 1.90, greater than or equal to 1.35 to less than or equal to 1.90, greater than or equal to 1.40 to less than or equal to 1.90, greater than or equal to 1.45 to less than or equal to 1.90, greater than or equal to 1.50 to less than or equal to 1.90, greater than or equal to 1.55 to less than or equal to 1.90, greater than or equal to 1.60 to less than or equal to 1.90, greater than or equal to 1.65 to less than or equal to 1.90, greater than or equal to 1.70 to less than or equal to 1.90, greater than or equal to 1.75 to less than or equal to 1.90, greater than or equal to 1.80 to less than or equal to 1.90, greater than or equal to 1.10 to less than or equal to 1.85, greater than or equal to 1.15 to less than or equal to 1.85, greater than or equal to 1.20 to less than or equal to 1.85, greater than or equal to 1.25 to less than or equal to 1.85, greater than or equal to 1.30 to less than or equal to 1.85, greater than or equal to 1.35 to less than or equal to 1.85, greater than or equal to 1.40 to less than or equal to 1.85, greater than or equal to 1.45 to less than or equal to 1.85, greater than or equal to 1.50 to less than or equal to 1.85, greater than or equal to 1.55 to less than or equal to 1.85, greater than or equal to 1.60 to less than or equal to 1.85, greater than or equal to 1.65 to less than or equal to 1.85, greater than or equal to 1.70 to less than or equal to 1.85, greater than or equal to 1.75 to less than or equal to 1.85, greater than or equal to 1.10 to less than or equal to 1.80, greater than or equal to 1.15 to less than or equal to 1.80, greater than or equal to 1.20 to less than or equal to 1.80, greater than or equal to 1.25 to less than or equal to 1.80, greater than or equal to 1.30 to less than or equal to 1.80, greater than or equal to 1.35 to less than or equal to 1.80, greater than or equal to 1.40 to less than or equal to 1.80, greater than or equal to 1.45 to less than or equal to 1.80, greater than or equal to 1.50 to less than or equal to 1.80, greater than or equal to 1.55 to less than or equal to 1.80, greater than or equal to 1.60 to less than or equal to 1.80, greater than or equal to 1.65 to less than or equal to 1.80, greater than or equal to 1.70 to less than or equal to 1.80, greater than or equal to 1.10 to less than or equal to 1.75, greater than or equal to 1.15 to less than or equal to 1.75, greater than or equal to 1.20 to less than or equal to 1.75, greater than or equal to 1.25 to less than or equal to 1.75, greater than or equal to 1.30 to less than or equal to 1.75, greater than or equal to 1.35 to less than or equal to 1.75, greater than or equal to 1.40 to less than or equal to 1.75, greater than or equal to 1.45 to less than or equal to 1.75, greater than or equal to 1.50 to less than or equal to 1.75, greater than or equal to 1.55 to less than or equal to 1.75, greater than or equal to 1.60 to less than or equal to 1.75, greater than or equal to 1.65 to less than or equal to 1.75, greater than or equal to 1.10 to less than or equal to 1.70, greater than or equal to 1.15 to less than or equal to 1.70, greater than or equal to 1.20 to less than or equal to 1.70, greater than or equal to 1.25 to less than or equal to 1.70, greater than or equal to 1.30 to less than or equal to 1.70, greater than or equal to 1.35 to less than or equal to 1.70, greater than or equal to 1.40 to less than or equal to 1.70, greater than or equal to 1.45 to less than or equal to 1.70, greater than or equal to 1.50 to less than or equal to 1.70, greater than or equal to 1.55 to less than or equal to 1.70, greater than or equal to 1.60 to less than or equal to 1.70, greater than or equal to 1.10 to less than or equal to 1.65, greater than or equal to 1.15 to less than or equal to 1.65, greater than or equal to 1.20 to less than or equal to 1.65, greater than or equal to 1.25 to less than or equal to 1.65, greater than or equal to 1.30 to less than or equal to 1.65, greater than or equal to 1.35 to less than or equal to 1.65, greater than or equal to 1.40 to less than or equal to 1.65, greater than or equal to 1.45 to less than or equal to 1.65, greater than or equal to 1.50 to less than or equal to 1.65, greater than or equal to 1.55 to less than or equal to 1.65, greater than or equal to 1.10 to less than or equal to 1.60, greater than or equal to 1.15 to less than or equal to 1.60, greater than or equal to 1.20 to less than or equal to 1.60, greater than or equal to 1.25 to less than or equal to 1.60, greater than or equal to 1.30 to less than or equal to 1.60, greater than or equal to 1.35 to less than or equal to 1.60, greater than or equal to 1.40 to less than or equal to 1.60, greater than or equal to 1.45 to less than or equal to 1.60, greater than or equal to 1.50 to less than or equal to 1.60, greater than or equal to 1.55 to less than or equal to 1.60, greater than or equal to 1.10 to less than or equal to 1.55, greater than or equal to 1.15 to less than or equal to 1.55, greater than or equal to 1.20 to less than or equal to 1.55, greater than or equal to 1.25 to less than or equal to 1.55, greater than or equal to 1.30 to less than or equal to 1.55, greater than or equal to 1.35 to less than or equal to 1.55, greater than or equal to 1.40 to less than or equal to 1.55, greater than or equal to 1.45 to less than or equal to 1.55, or even greater than or equal to 1.50 to less than or equal to 1.55. It should be understood that the above ranges include all subranges within the explicitly disclosed ranges.

The glasses and glass-ceramics described herein also include $P_2O_5$. $P_2O_5$ can function as a nucleating agent to produce bulk nucleation. As used herein, bulk nucleation can result in nucleated glasses with one or more crystalline phases. If the concentration of $P_2O_5$ is too low, the glass does crystallize, but only at higher temperatures (due to a lower viscosity) and from the surface inward, yielding a weak and often deformed body. However, if the concentration of $P_2O_5$ is too high, the devitrification, upon cooling during the formation of glass sheets, can be difficult to control. Embodiments of the glasses and glass-ceramics comprise greater than or equal to 1.0 wt % and less than or equal to 8.0 wt % $P_2O_5$, greater than or equal to 1.5 wt % and less than or equal to 8.0 wt % $P_2O_5$, greater than or equal to 2.0 wt % and less than or equal to 8.0 wt % $P_2O_5$, greater than or equal to 2.5 wt % and less than or equal to 8.0 wt % $P_2O_5$, greater than or equal to 3.0 wt % and less than or equal to 8.0 wt % $P_2O_5$, greater than or equal to 1.0 wt % and less than or equal to 7.5 wt % $P_2O_5$, greater than or equal to 1.5 wt % and less than or equal to 7.5 wt % $P_2O_5$, greater than or equal to 2.0 wt % and less than or equal to 7.5 wt % $P_2O_5$, greater than or equal to 2.5 wt % and less than or equal to 7.5 wt % $P_2O_5$, greater than or equal to 3.0 wt % and less than or equal to 7.5 wt % $P_2O_5$, greater than or equal to 1.0 wt % and less than or equal to 7.0 wt % $P_2O_5$, greater than or equal to 1.5 wt % and less than or equal to 7.0 wt % $P_2O_5$, greater than or equal to 2.0 wt % and less than or equal to 7.0 wt % $P_2O_5$, greater than or equal to 2.5 wt % and less than or equal to 7.0 wt % $P_2O_5$, greater than or equal to 3.0 wt % and less than or equal to 7.0 wt % $P_2O_5$, greater than or equal to 1.0 wt % and less than or equal to 6.5 wt % $P_2O_5$, greater than or equal to 1.5 wt % and less than or equal to 6.5 wt % $P_2O_5$, greater than or equal to 2.0 wt % and less than or equal to 6.5 wt % $P_2O_5$, greater than or equal to 2.5 wt % and less than or equal to 6.5 wt % $P_2O_5$, greater than or equal to 3.0 wt % and less than or equal to 6.5 wt % $P_2O_5$, greater than or equal to 1.0 wt % and less than or equal to 6.0 wt % $P_2O_5$, greater than or equal to 1.5 wt % and less than or equal to 6.0 wt % $P_2O_5$, greater than or equal to 2.0 wt % and less than or equal to 6.0 wt % $P_2O_5$, greater than or equal to 2.5 wt % and less than or equal to 6.0 wt % $P_2O_5$, greater than or equal to 3.0 wt % and less than or equal to 6.0 wt % $P_2O_5$, greater than or equal to 1.0 wt % and less than or equal to 5.5 wt % $P_2O_5$, greater than or equal to 1.5 wt % and less than or equal to 5.5 wt % $P_2O_5$, greater than or equal to 2.0 wt % and less than or equal to 5.5 wt % $P_2O_5$, greater than or equal to 2.5 wt % and less than or equal to 5.5 wt % $P_2O_5$, greater than or equal to 3.0 wt % and less than or equal to 5.5 wt % $P_2O_5$, greater than or equal to 1.0 wt % and less than or equal to 5.0 wt % $P_2O_5$, greater than or equal to 1.5 wt % and less than or equal to 5.0 wt % $P_2O_5$, greater than or equal to 2.0 wt % and less than or equal to 5.0 wt % $P_2O_5$, greater than or equal to 2.5 wt % and less than or equal to 5.0 wt % $P_2O_5$, greater than or equal to 3.0 wt % and less than or equal to 5.0 wt % $P_2O_5$, greater than or equal to 1.0 wt % and less than or equal to 4.5 wt % $P_2O_5$, greater than or equal to 1.5 wt % and less than or equal to 4.5 wt % $P_2O_5$, greater than or equal to 2.0 wt % and less than or equal to 4.5 wt % $P_2O_5$, greater than or equal to 2.25 wt % and less than or equal to 4.5 wt % $P_2O_5$, greater than or equal to 2.5 wt % and less than or equal to 4.5 wt % $P_2O_5$, greater than or equal to 3.0 wt % and less than or equal to 4.5 wt % $P_2O_5$, greater than or equal to 1.0 wt % and less than or equal to 4.0 wt % $P_2O_5$, greater than or equal to 1.5 wt % and less than or equal to 4.0 wt % $P_2O_5$, greater than or equal to 2.0 wt % and less than or equal to 4.0 wt % $P_2O_5$, greater than or equal to 2.5 wt % and less than or equal to 4.0 wt % $P_2O_5$, greater than or equal to 3.0 wt % and less than or equal to 4.0 wt % $P_2O_5$, greater than or equal to 1.0 wt % and less than or equal to 3.5 wt % $P_2O_5$, greater than or equal to 1.5 wt % and less than or equal to 3.5 wt % $P_2O_5$, greater than or equal to 2.0 wt % and less than or equal to 3.5 wt % $P_2O_5$, greater than or equal to 2.25 wt % and less than or equal to 3.5 wt % $P_2O_5$, greater than or equal to 2.5 wt % and less than or equal to 3.5 wt % $P_2O_5$, or even greater than or equal to 3.0 wt % and less than or equal to 3.5 wt % $P_2O_5$. It should be understood that the above ranges include all subranges within the explicitly disclosed ranges.

In embodiments, the glasses or glass-ceramics may further include MgO. Divalent cations (such as divalent cations from alkaline earth oxides and ZnO) generally improve the melting behavior of the glass. Without wishing to be bound by theory, it is believed that additions of MgO may enter the residual amorphous glass phase. It is believed that additions of MgO that enter the residual amorphous glass phase may decrease the diffusivity of alkali ions in the glass, such as during ion exchange. As such, the content of MgO in the embodiments described herein is limited to less than or equal to 5.0 wt % to avoid any deleterious effects on ion exchange performance. In embodiments, the glasses and glass-ceramics comprise greater than or equal to 0 wt % and less than or equal to 5.0 wt % MgO, greater than or equal to 0 wt % and less than or equal to 4.5 wt % MgO, greater than or equal to 0 wt % and less than or equal to 4.0 wt % MgO, greater than or equal to 0 wt % and less than or equal to 3.5 wt % MgO, greater than or equal to 0 wt % and less than or equal to 3.0 wt % MgO, greater than or equal to 0 wt % and less than or equal to 2.5 wt % MgO, greater than or equal to 0 wt % and less than or equal to 2.0 wt % MgO, greater than or equal to 0 wt % and less than or equal to 1.5 wt % MgO, greater than or equal to 0 wt % and less than or equal to 1.0 wt % MgO, greater than or equal to 0 wt % and less than or equal to 0.5 wt % MgO, greater than or equal to 0.1 wt % and less than or equal to 5.0 wt % MgO, greater than or equal to 0.1 wt % and less than or equal to 4.5 wt % MgO, greater than or equal to 0.1 wt % and less than or equal to 4.0 wt % MgO, greater than or equal to 0.1 wt % and less than or equal to 3.5 wt % MgO, greater than or equal to 0.1 wt % and less than or equal to 3.0 wt % MgO, greater than or equal to 0.1 wt % and less than or equal to 2.5 wt % MgO, greater than or equal to 0.1 wt % and less than or equal to 2.0 wt % MgO, greater than or equal to 0.1 wt % and less than or equal to 1.5 wt % MgO, greater than or equal to 0.1 wt % and less than or equal to 1.0 wt % MgO, greater than or equal to 0.1 wt % and less than or equal to 0.5 wt % MgO. In embodiments, the glasses and glass-ceramics do not include MgO. In embodiments, the glasses and glass-ceramics are substantially free of MgO. It should be understood that the above ranges include all subranges within the explicitly disclosed ranges.

In embodiments, the glasses or glass-ceramics may further include SrO. As noted herein, divalent cations (such as divalent cations from alkaline earth oxides and ZnO) generally improve the melting behavior of the glass. Without wishing to be bound by theory, it is believed that SrO, when present, may increase the amount of residual glass in the resultant glass-ceramics. In embodiments, the glasses and glass-ceramics comprise greater than or equal to 0 wt % and less than or equal to 10.0 wt % SrO, greater than or equal to 0 wt % and less than or equal to 9.5 wt % SrO, greater than or equal to 0 wt % and less than or equal to 9.0 wt % SrO, greater than or equal to 0 wt % and less than or equal to 8.5 wt % SrO, greater than or equal to 0 wt % and less than or equal to 8.0 wt % SrO, greater than or equal to 0 wt % and less than or equal to 7.5 wt % SrO, greater than or equal to 0 wt % and less than or equal to 7.0 wt % SrO, greater than or equal to 0 wt % and less than or equal to 6.5 wt % SrO, greater than or equal to 0 wt % and less than or equal to 6.0 wt % SrO, greater than or equal to 0 wt % and less than or equal to 5.5 wt % SrO, greater than or equal to 0 wt % and less than or equal to 5.0 wt % SrO, greater than or equal to 0 wt % and less than or equal to 4.5 wt % SrO, greater than or equal to 0 wt % and less than or equal to 4.0 wt % SrO, greater than or equal to 0 wt % and less than or equal to 3.5 wt % SrO, greater than or equal to 0 wt % and less than or equal to 3.0 wt % SrO, greater than or equal to 0 wt % and less than or equal to 2.5 wt % SrO, greater than or equal to 0 wt % and less than or equal to 2.0 wt % SrO, greater than or equal to 0 wt % and less than or equal to 1.5 wt % SrO, greater than or equal to 0 wt % and less than or equal to 1.0 wt % SrO, greater than or equal to 0 wt % and less than or equal to 0.5 wt % SrO, greater than or equal to 0.1 wt % and less than or equal to 10.0 wt % SrO, greater than or equal to 0.1 wt % and less than or equal to 9.5 wt % SrO, greater than or equal to 0.1 wt % and less than or equal to 9.0 wt % SrO, greater than or equal to 0.1 wt % and less than or equal to 8.5 wt % SrO, greater than or equal to 0.1 wt % and less than or equal to 8.0 wt % SrO, greater than or equal to 0.1 wt % and less than or equal to 7.5 wt % SrO, greater than or equal to 0.1 wt % and less than or equal to 7.0 wt % SrO, greater than or equal to 0.1 wt % and less than or equal to 6.5 wt % SrO, greater than or equal to 0.1 wt % and less than or equal to 6.0 wt % SrO, greater than or equal to 0.1 wt % and less than or equal to 5.5 wt % SrO, greater than or equal to 0.1 wt % and less than or equal to 5.0 wt % SrO, greater than or equal to 0.1 wt % and less than or equal to 4.5 wt % SrO, greater than or equal to 0.1 wt % and less than or equal to 4.0 wt % SrO, greater than or equal to 0.1 wt % and less than or equal to 3.5 wt % SrO, greater than or equal to 0.1 wt % and less than or equal to 3.0 wt % SrO, greater than or equal to 0.1 wt % and less than or equal to 2.5 wt % SrO, greater than or equal to 0.1 wt % and less than or equal to 2.0 wt % SrO, greater than or equal to 0.1 wt % and less than or equal to 1.5 wt % SrO, greater than or equal to 0.1 wt % and less than or equal to 1.0 wt % SrO, greater than or equal to 0.1 wt % and less than or equal to 0.5 wt % SrO. In embodiments, the glasses and glass-ceramics do not include SrO. In embodiments, the glasses and glass-ceramics are substantially free of SrO. It should be understood that the above ranges include all subranges within the explicitly disclosed ranges.

In embodiments, the glasses or glass-ceramics may further include BaO. As noted herein, divalent cations (such as divalent cations from alkaline earth oxides and ZnO) generally improve the melting behavior of the glass. Without wishing to be bound by theory, it is believed that BaO, when present, may increase the amount of residual glass in the resultant glass-ceramics. In embodiments, the glasses and glass-ceramics comprise greater than or equal to 0 wt % and less than or equal to 10.0 wt % BaO, greater than or equal to 0 wt % and less than or equal to 9.5 wt % BaO, greater than or equal to 0 wt % and less than or equal to 9.0 wt % BaO, greater than or equal to 0 wt % and less than or equal to 8.5 wt % BaO, greater than or equal to 0 wt % and less than or equal to 8.0 wt % BaO, greater than or equal to 0 wt % and less than or equal to 7.5 wt % BaO, greater than or equal to 0 wt % and less than or equal to 7.0 wt % BaO, greater than or equal to 0 wt % and less than or equal to 6.5 wt % BaO, greater than or equal to 0 wt % and less than or equal to 6.0 wt % BaO, greater than or equal to 0 wt % and less than or equal to 5.5 wt % BaO, greater than or equal to 0 wt % and less than or equal to 5.0 wt % BaO, greater than or equal to 0 wt % and less than or equal to 4.5 wt % BaO, greater than or equal to 0 wt % and less than or equal to 4.0 wt % BaO, greater than or equal to 0 wt % and less than or equal to 3.5 wt % BaO, greater than or equal to 0 wt % and less than or equal to 3.0 wt % BaO, greater than or equal to 0 wt % and less than or equal to 2.5 wt % BaO, greater than or equal to 0 wt % and less than or equal to 2.0 wt % BaO, greater than or equal to 0 wt % and less than or equal to 1.5 wt % BaO, greater than or equal to 0 wt % and less than or equal to 1.0 wt % BaO, greater than or equal to 0 wt % and less than or equal to 0.5 wt % BaO, greater than or equal to 0.1 wt % and less than or equal to 10.0 wt % BaO, greater than or equal to 0.1 wt % and less than or equal to 9.5 wt % BaO, greater than or equal to 0.1 wt % and less than or equal to 9.0 wt % BaO, greater than or equal to 0.1 wt % and less than or equal to 8.5 wt % BaO, greater than or equal to 0.1 wt % and less than or equal to 8.0 wt % BaO, greater than or equal to 0.1 wt % and less than or equal to 7.5 wt % BaO, greater than or equal to 0.1 wt % and less than or equal to 7.0 wt % BaO, greater than or equal to 0.1 wt % and less than or equal to 6.5 wt % BaO, greater than or equal to 0.1 wt % and less than or equal to 6.0 wt % BaO, greater than or equal to 0.1 wt % and less than or equal to 5.5 wt % BaO, greater than or equal to 0.1 wt % and less than or equal to 5.0 wt % BaO, greater than or equal to 0.1 wt % and less than or equal to 4.5 wt % BaO, greater than or equal to 0.1 wt % and less than or equal to 4.0 wt % BaO, greater than or equal to 0.1 wt % and less than or equal to 3.5 wt % BaO, greater than or equal to 0.1 wt % and less than or equal to 3.0 wt % BaO, greater than or equal to 0.1 wt % and less than or equal to 2.5 wt % BaO, greater than or equal to 0.1 wt % and less than or equal to 2.0 wt % BaO, greater than or equal to 0.1 wt % and less than or equal to 1.5 wt % BaO, greater than or equal to 0.1 wt % and less than or equal to 1.0 wt % BaO, greater than or equal to 0.1 wt % and less than or equal to 0.5 wt % BaO. In embodiments, the glasses and glass-ceramics do not include BaO. In embodiments, the glasses and glass-ceramics are substantially free of BaO. It should be understood that the above ranges include all subranges within the explicitly disclosed ranges.

In embodiments, the glasses or glass-ceramics may further include ZnO. As noted herein, divalent cations (such as divalent cations from ZnO and alkaline earth oxides) improve the melting behavior of the glass. In embodiments, the glasses and glass-ceramics comprise greater than or equal to 0 wt % and less than or equal to 10.0 wt % ZnO, greater than or equal to 0 wt % and less than or equal to 9.5 wt % ZnO, greater than or equal to 0 wt % and less than or equal to 9.0 wt % ZnO, greater than or equal to 0 wt % and less than or equal to 8.5 wt % ZnO, greater than or equal to 0 wt % and less than or equal to 8.0 wt % ZnO, greater than or equal to 0 wt % and less than or equal to 7.5 wt % ZnO, greater than or equal to 0 wt % and less than or equal to 7.0 wt % ZnO, greater than or equal to 0 wt % and less than or equal to 6.5 wt % ZnO, greater than or equal to 0 wt % and less than or equal to 6.0 wt % ZnO, greater than or equal to 0 wt % and less than or equal to 5.5 wt % ZnO, greater than or equal to 0 wt % and less than or equal to 5.0 wt % ZnO, greater than or equal to 0 wt % and less than or equal to 4.5 wt % ZnO, greater than or equal to 0 wt % and less than or equal to 4.0 wt % ZnO, greater than or equal to 0 wt % and less than or equal to 3.5 wt % ZnO, greater than or equal to 0 wt % and less than or equal to 3.0 wt % ZnO, greater than or equal to 0 wt % and less than or equal to 2.5 wt % ZnO, greater than or equal to 0 wt % and less than or equal to 2.0 wt % ZnO, greater than or equal to 0 wt % and less than or equal to 1.5 wt % ZnO, greater than or equal to 0 wt % and less than or equal to 1.0 wt % ZnO, greater than or equal to 0 wt % and less than or equal to 0.5 wt % ZnO, greater than or equal to 0.1 wt % and less than or equal to 10.0 wt % ZnO, greater than or equal to 0.1 wt % and less than or equal to 9.5 wt % ZnO, greater than or equal to 0.1 wt % and less than or equal to 9.0 wt % ZnO, greater than or equal to 0.1 wt % and less than or equal to 8.5 wt % ZnO, greater than or equal to 0.1 wt % and less than or equal to 8.0 wt % ZnO, greater than or equal to 0.1 wt % and less than or equal to 7.5 wt % ZnO, greater than or equal to 0.1 wt % and less than or equal to 7.0 wt % ZnO, greater than or equal to 0.1 wt % and less than or equal to 6.5 wt % ZnO, greater than or equal to 0.1 wt % and less than or equal to 6.0 wt % ZnO, greater than or equal to 0.1 wt % and less than or equal to 5.5 wt % ZnO, greater than or equal to 0.1 wt % and less than or equal to 5.0 wt % ZnO, greater than or equal to 0.1 wt % and less than or equal to 4.5 wt % ZnO, greater than or equal to 0.1 wt % and less than or equal to 4.0 wt % ZnO, greater than or equal to 0.1 wt % and less than or equal to 3.5 wt % ZnO, greater than or equal to 0.1 wt % and less than or equal to 3.0 wt % ZnO, greater than or equal to 0.1 wt % and less than or equal to 2.5 wt % ZnO, greater than or equal to 0.1 wt % and less than or equal to 2.0 wt % ZnO, greater than or equal to 0.1 wt % and less than or equal to 1.5 wt % ZnO, greater than or equal to 0.1 wt % and less than or equal to 1.0 wt % ZnO, greater than or equal to 0.1 wt % and less than or equal to 0.5 wt % ZnO. In embodiments, the glasses and glass-ceramics do not include ZnO. In embodiments, the glasses and glass-ceramics are substantially free of ZnO. It should be understood that the above ranges include all subranges within the explicitly disclosed ranges.

In embodiments, the glasses or glass-ceramics may further include $B_2O_3$. Without wishing to be bound by theory, it is believed that additions of $B_2O_3$ may partition into the residual amorphous glass. It is also believed that additions $B_2O_3$ may lower the viscosity of the glass at ceramming temperatures. In embodiments, the glasses and glass-ceramics comprise greater than or equal to 0 wt % and less than or equal to 2.0 wt % $B_2O_3$, greater than or equal to 0 wt % and less than or equal to 1.5 wt % $B_2O_3$, greater than or equal to 0 wt % and less than or equal to 1.0 wt % $B_2O_3$, greater than or equal to 0 wt % and less than or equal to 0.5 wt % $B_2O_3$, greater than or equal to 0.1 wt % and less than or equal to 2.0 wt % $B_2O_3$, greater than or equal to 0.1 wt % and less than or equal to 1.5 wt % $B_2O_3$, greater than or equal to 0.1 wt % and less than or equal to 1.0 wt % $B_2O_3$, or even greater than or equal to 0.1 wt % and less than or equal to 0.5 wt % $B_2O_3$. In embodiments, the glasses and glass-ceramics do not include $B_2O_3$. In embodiments, the glasses and glass-ceramics are substantially free of $B_2O_3$. It should be understood that the above ranges include all subranges within the explicitly disclosed ranges.

$Fe_2O_3$ can lower the melting point of the glasses and glass-ceramics. However, adding too much $Fe_2O_3$ can alter the color of the glass and glass-ceramics. In embodiments, the glasses and glass-ceramics do not comprise $Fe_2O_3$. In embodiments, the glasses and glass-ceramics are substantially free of $Fe_2O_3$. In embodiments, the glasses and glass-ceramics comprise greater than 0.0 wt % and less than or equal to 1.0 wt % $Fe_2O_3$, greater than or equal to 0 wt % and less than or equal to 0.5 wt % $Fe_2O_3$, greater than 0.0 wt % and less than or equal to 0.3 wt % $Fe_2O_3$, greater than or equal to 0.0 wt % and less than or equal to 0.2 wt % $Fe_2O_3$, greater than 0.0 wt % and less than or equal to 0.1 wt % $Fe_2O_3$ greater than 0.03 wt % and less than or equal to 1.0 wt % $Fe_2O_3$, greater than or equal to 0.03 wt % and less than or equal to 0.5 wt % $Fe_2O_3$, greater than 0.03 wt % and less than or equal to 0.3 wt % $Fe_2O_3$, greater than or equal to 0.03 wt % and less than or equal to 0.2 wt % $Fe_2O_3$, or greater than 0.03 wt % and less than or equal to 0.1 wt % $Fe_2O_3$. It should be understood that the above ranges include all subranges within the explicitly disclosed ranges.

In embodiments, the glasses or glass-ceramics may further include $La_2O_3$. Without wishing to be bound by theory, it is believed that additions of $La_2O_3$ may increase the refractive index of the glasses and resulting glass-ceramics. In embodiments, the glasses and glass-ceramics comprise greater than or equal to 0 wt % and less than or equal to 10.0 wt % $La_2O_3$, greater than or equal to 0 wt % and less than or equal to 9.5 wt % $La_2O_3$, greater than or equal to 0 wt % and less than or equal to 9.0 wt % $La_2O_3$, greater than or equal to 0 wt % and less than or equal to 8.5 wt % $La_2O_3$, greater than or equal to 0 wt % and less than or equal to 8.0 wt % $La_2O_3$, greater than or equal to 0 wt % and less than or equal to 7.5 wt % $La_2O_3$, greater than or equal to 0 wt % and less than or equal to 7.0 wt % $La_2O_3$, greater than or equal to 0 wt % and less than or equal to 6.5 wt % $La_2O_3$, greater than or equal to 0 wt % and less than or equal to 6.0 wt % $La_2O_3$, greater than or equal to 0 wt % and less than or equal to 5.5 wt % $La_2O_3$, greater than or equal to 0 wt % and less than or equal to 5.0 wt % $La_2O_3$, greater than or equal to 0 wt % and less than or equal to 4.5 wt % $La_2O_3$, greater than or equal to 0 wt % and less than or equal to 4.0 wt % $La_2O_3$, greater than or equal to 0 wt % and less than or equal to 3.5 wt % $La_2O_3$, greater than or equal to 0 wt % and less than or equal to 3.0 wt % $La_2O_3$, greater than or equal to 0 wt % and less than or equal to 2.5 wt % $La_2O_3$, greater than or equal to 0 wt % and less than or equal to 2.0 wt % $La_2O_3$, greater than or equal to 0 wt % and less than or equal to 1.5 wt % $La_2O_3$, greater than or equal to 0 wt % and less than or equal to 1.0 wt % $La_2O_3$, greater than or equal to 0 wt % and less than or equal to 0.5 wt % $La_2O_3$, greater than or equal to 0.1 wt % and less than or equal to 10.0 wt % $La_2O_3$, greater than or equal to 0.1 wt % and less than or equal to 9.5 wt % $La_2O_3$, greater than or equal to 0.1 wt % and less than or equal to 9.0 wt % $La_2O_3$, greater than or equal to 0.1 wt % and less than or equal to 8.5 wt % $La_2O_3$, greater than or equal to 0.1 wt % and less than or equal to 8.0 wt % $La_2O_3$, greater than or equal to 0.1 wt % and less than or equal to 7.5 wt % $La_2O_3$, greater than or equal to 0.1 wt % and less than or equal to 7.0 wt % $La_2O_3$, greater than or equal to 0.1 wt % and less than or equal to 6.5 wt % $La_2O_3$, greater than or equal to 0.1 wt % and less than or equal to 6.0 wt % $La_2O_3$, greater than or equal to 0.1 wt % and less than or equal to 5.5 wt % $La_2O_3$, greater than or equal to 0.1 wt % and less than or equal to 5.0 wt % $La_2O_3$, greater than or equal to 0.1 wt % and less than or equal to 4.5 wt % $La_2O_3$, greater than or equal to 0.1 wt % and less than or equal to 4.0 wt % $La_2O_3$, greater than or equal to 0.1 wt % and less than or equal to 3.5 wt % $La_2O_3$, greater than or equal to 0.1 wt % and less than or equal to 3.0 wt % $La_2O_3$, greater than or equal to 0.1 wt % and less than or equal to 2.5 wt % $La_2O_3$, greater than or equal to 0.1 wt % and less than or equal to 2.0 wt % $La_2O_3$, greater than or equal to 0.1 wt % and less than or equal to 1.5 wt % $La_2O_3$, greater than or equal to 0.1 wt % and less than or equal to 1.0 wt % $La_2O_3$, greater than or equal to 0.1 wt % and less than or equal to 0.5 wt % $La_2O_3$. In embodiments, the glasses and glass-ceramics do not include $La_2O_3$. In embodiments, the glasses and glass-ceramics are substantially free of $La_2O_3$. It should be understood that the above ranges include all subranges within the explicitly disclosed ranges.

In embodiments, the glasses or glass-ceramics may further include $HfO_2$. Without wishing to be bound by theory, it is believed that additions of $HfO_2$ may at least partially replace $ZrO_2$ in the compositions. In embodiments, the glasses and glass-ceramics comprise greater than or equal to 0 wt % and less than or equal to 3.0 wt % $HfO_2$, greater than or equal to 0 wt % and less than or equal to 2.5 wt % $HfO_2$, greater than or equal to 0 wt % and less than or equal to 2.0 wt % $HfO_2$, greater than or equal to 0 wt % and less than or equal to 1.5 wt % $HfO_2$, greater than or equal to 0 wt % and less than or equal to 1.0 wt % $HfO_2$, greater than or equal to 0 wt % and less than or equal to 0.5 wt % $HfO_2$, greater than or equal to 0.1 to less than or equal to 3 wt % $HfO_2$, greater than or equal to 0.1 wt % and less than or equal to 2.5 wt % $HfO_2$, greater than or equal to 0.1 wt % and less than or equal to 2.0 wt % $HfO_2$, greater than or equal to 0.1 wt % and less than or equal to 1.5 wt % $HfO_2$, greater than or equal to 0.1 wt % and less than or equal to 1.0 wt % $HfO_2$, or even greater than or equal to 0.1 wt % and less than or equal to 0.5 wt % $HfO_2$. In embodiments, the glasses and glass-ceramics do not include $HfO_2$. In embodiments, the glasses and glass-ceramics are substantially free of $HfO_2$. It should be understood that the above ranges include all subranges within the explicitly disclosed ranges.

In embodiments, the glasses or glass-ceramics may further include $Y_2O_3$. Without wishing to be bound by theory, it is believed that additions of $Y_2O_3$ may increase the refractive index of the glasses and resulting glass-ceramics. In embodiments, the glasses and glass-ceramics comprise greater than or equal to 0 wt % and less than or equal to 2.0 wt % $Y_2O_3$, greater than or equal to 0 wt % and less than or equal to 1.5 wt % $Y_2O_3$, greater than or equal to 0 wt % and less than or equal to 1.0 wt % $Y_2O_3$, greater than or equal to 0 wt % and less than or equal to 0.5 wt % $Y_2O_3$, greater than or equal to 0.1 wt % and less than or equal to 2.0 wt % $Y_2O_3$, greater than or equal to 0.1 wt % and less than or equal to 1.5 wt % $Y_2O_3$, greater than or equal to 0.1 wt % and less than or equal to 1.0 wt % $Y_2O_3$, or even greater than or equal to 0.1 wt % and less than or equal to 0.5 wt % $Y_2O_3$. In embodiments, the glasses and glass-ceramics do not include $Y_2O_3$. In embodiments, the glasses and glass-ceramics are substantially free of $Y_2O_3$. It should be understood that the above ranges include all subranges within the explicitly disclosed ranges.

In embodiments, the glasses or glass-ceramics may further include $Ta_2O_5$. Without wishing to be bound by theory, it is believed that additions of $Ta_2O_5$ may increase the refractive index of the glasses and resulting glass-ceramics. It is also believed that additions of $Ta_2O_5$ may increase the modulus of the glasses and resulting glass-ceramics. In embodiments, the glasses and glass-ceramics comprise greater than or equal to 0 wt % and less than or equal to 2.0 wt % $Ta_2O_5$, greater than or equal to 0 wt % and less than or equal to 1.5 wt % $Ta_2O_5$, greater than or equal to 0 wt % and less than or equal to 1.0 wt % $Ta_2O_5$, greater than or equal to 0 wt % and less than or equal to 0.5 wt % $Ta_2O_5$, greater than or equal to 0.1 wt % and less than or equal to 2.0 wt % $Ta_2O_5$, greater than or equal to 0.1 wt % and less than or equal to 1.5 wt % $Ta_2O_5$, greater than or equal to 0.1 wt % and less than or equal to 1.0 wt % $Ta_2O_5$, or even greater than or equal to 0.1 wt % and less than or equal to 0.5 wt % $Ta_2O_5$. In embodiments, the glasses and glass-ceramics do not include $Ta_2O_5$. In embodiments, the glasses and glass-ceramics are substantially free of $Ta_2O_5$. It should be understood that the above ranges include all subranges within the explicitly disclosed ranges.

In embodiments, the glasses or glass-ceramics may further include $GeO_2$. Without wishing to be bound by theory, it is believed that additions of $GeO_2$ may increase the refractive index of the glasses and resulting glass-ceramics. In embodiments, the glasses and glass-ceramics comprise greater than or equal to 0 wt % and less than or equal to 5.0 wt % $GeO_2$, greater than or equal to 0 wt % and less than or equal to 4.5 wt % $GeO_2$, greater than or equal to 0 wt % and less than or equal to 4.0 wt % $GeO_2$, greater than or equal to 0 wt % and less than or equal to 3.5 wt % $GeO_2$, greater than or equal to 0 wt % and less than or equal to 3.0 wt % $GeO_2$, greater than or equal to 0 wt % and less than or equal to 2.5 wt % $GeO_2$, greater than or equal to 0 wt % and less than or equal to 2.0 wt % $GeO_2$, greater than or equal to 0 wt % and less than or equal to 1.5 wt % $GeO_2$, greater than or equal to 0 wt % and less than or equal to 1.0 wt % $GeO_2$, greater than or equal to 0 wt % and less than or equal to 0.5 wt % $GeO_2$, greater than or equal to 0.1 wt % and less than or equal to 5.0 wt % $GeO_2$, greater than or equal to 0.1 wt % and less than or equal to 4.5 wt % $GeO_2$, greater than or equal to 0.1 wt % and less than or equal to 4.0 wt % $GeO_2$, greater than or equal to 0.1 wt % and less than or equal to 3.5 wt % $GeO_2$, greater than or equal to 0.1 wt % and less than or equal to 3.0 wt % $GeO_2$, greater than or equal to 0.1 wt % and less than or equal to 2.5 wt % $GeO_2$, greater than or equal to 0.1 wt % and less than or equal to 2.0 wt % $GeO_2$, greater than or equal to 0.1 wt % and less than or equal to 1.5 wt % $GeO_2$, greater than or equal to 0.1 wt % and less than or equal to 1.0 wt % $GeO_2$, or even greater than or equal to 0.1 wt % and less than or equal to 0.5 wt % $GeO_2$. In embodiments, the glasses and glass-ceramics do not include $GeO_2$. In embodiments, the glasses and glass-ceramics are substantially free of $GeO_2$. It should be understood that the above ranges include all subranges within the explicitly disclosed ranges.

In embodiments, the glasses or glass-ceramics may further include $TiO_2$. In embodiments, the glasses and glass-ceramics comprise greater than or equal to 0 wt % and less than or equal to 2.0 wt % $TiO_2$, greater than or equal to 0 wt % and less than or equal to 1.5 wt % $TiO_2$, greater than or equal to 0 wt % and less than or equal to 1.0 wt % $TiO_2$, greater than or equal to 0 wt % and less than or equal to 0.5 wt % $TiO_2$, greater than or equal to 0.1 wt % and less than or equal to 2.0 wt % $TiO_2$, greater than or equal to 0.1 wt % and less than or equal to 1.5 wt % $TiO_2$, greater than or equal to 0.1 wt % and less than or equal to 1.0 wt % $TiO_2$, or even greater than or equal to 0.1 wt % and less than or equal to 0.5 wt % $TiO_2$. In embodiments, the glasses and glass-ceramics do not include $TiO_2$. In embodiments, the glasses and glass-ceramics are substantially free of $TiO_2$. It should be understood that the above ranges include all subranges within the explicitly disclosed ranges.

In embodiments, the glasses or glass-ceramics may further include F. Without wishing to be bound by theory, it is believed that additions of fluorine may function as a nucleating agent and/or as a fining agent. In embodiments, the glasses and glass-ceramics may comprise greater than or equal to 0 wt % and less than or equal to 1.5 wt % $F^-$, greater than or equal to 0 wt % and less than or equal to 1.0 wt % $F^-$, greater than or equal to 0 wt % and less than or equal to 0.5 wt % $F^-$, greater than or equal to 0.1 wt % and less than or equal to 2.0 wt % F, greater than or equal to 0.1 wt % and less than or equal to 1.5 wt % $F^-$, greater than or equal to 0.1 wt % and less than or equal to 1.0 wt % $F^-$, or even greater than or equal to 0.1 wt % and less than or equal to 0.5 wt % $F^-$. In embodiments, the glasses and glass-ceramics do not include F. In embodiments, the glasses and glass-ceramics are substantially free of $F^-$. It should be understood that the above ranges include all subranges within the explicitly disclosed ranges.

In embodiments, the glasses or glass-ceramics may further include a chemical fining agent. Such fining agents include, but are not limited to, $SnO_2$, $As_2O_3$, $Sb_2O_3$, $SO_3$ F, Cl and Br. In embodiments, the concentrations of the chemical fining agents are kept at a level of 3, 2, 1, or 0.5, >0 wt %. In embodiments, the chemical fining agent is $SnO_2$ and the glasses or glass-ceramics comprise greater than or equal to 0 to less than or equal to 3 wt % $SnO_2$. In embodiments, the glasses or glass-ceramics comprise greater than or equal to 0 wt % and less than or equal to 2.5 wt % $SnO_2$, greater than or equal to 0 wt % and less than or equal to 2.0 wt % $SnO_2$, greater than or equal to 0 wt % and less than or equal to 1.5 wt % $SnO_2$, greater than or equal to 0 wt % and less than or equal to 1.0 wt % $SnO_2$, greater than or equal to 0 wt % and less than or equal to 0.5 wt % $SnO_2$, greater than 0.01 wt % to less than or equal to 3 wt % $SnO_2$, greater than 0.01 wt % and less than or equal to 2.5 wt % $SnO_2$, greater than 0.01 wt % and less than or equal to 2.0 wt % $SnO_2$, greater than 0.01 wt % and less than or equal to 1.5 wt % $SnO_2$, greater than 0.01 wt % and less than or equal to 1.0 wt % $SnO_2$, or even greater than 0.01 wt % and less than or equal to 0.5 wt % $SnO_2$. In embodiments, the glasses or glass-ceramics do not include a chemical fining agent.

In some embodiments, the glasses or glass-ceramics can be substantially free of $Sb_2O_3$, $As_2O_3$, or combinations thereof. For example, the glasses or glass-ceramics can comprise 0.05 weight percent or less of $Sb_2O_3$ or $As_2O_3$ or a combination thereof, the glasses or glass-ceramics may comprise 0 wt % of $Sb_2O_3$ or $As_2O_3$ or a combination thereof, or the glasses or glass-ceramic may be, for example, free of any intentionally added $Sb_2O_3$, $As_2O_3$, or combinations thereof.

In embodiments, glasses having the composition described herein may be initially formed by mixing a batch of constituent component sources (i.e., $SiO_2$ sources, $Li_2O$ sources, and the like), heating the batch to form molten glass, and, thereafter, forming or shaping the molten glass into a glass article using conventional forming processes, such as slot draw, float, rolling, fusion forming, or the like. At this point, the glass or glass article may be referred to as a "glass" which refers to the glass or glass article that has not been subjected to heat treatments (e.g., ceramming) required to convert the glass to a glass-ceramic, thereby forming a glass-ceramic article.

The processes for making glass-ceramics according to embodiments described herein includes heat treating the glass at two preselected temperatures for one or more preselected times to induce glass homogenization and crystallization (i.e., nucleation and growth) of one or more crystalline phases (e.g., having one or more compositions, amounts, morphologies, sizes or size distributions, etc.). Nucleation produces a nucleated glass with one or more crystalline phases, while growth results in a final glass-ceramic with one or more crystalline phases (also referred to as final crystalline phases). These two temperatures may be referred to as the nucleation temperature and the growth temperature, respectively.

With reference now to FIG. 1, embodiments of methods 1000 for making glass-ceramics will generally be described. Initially, at step 1001, a glass is heated in an oven to a nucleation temperature that is greater than or equal to 450° C. and less than or equal to 650° C. It should be understood that the nucleation temperature corresponds to the temperature of the oven in which the glass is heated and that the temperature of the glass may be within +/−5° C. of the nucleation temperature when the temperature of the oven is at the nucleation temperature. At step 1002, the glass is held in the oven for a first duration in a temperature range that is greater than or equal to the nucleation temperature and less than or equal to 650° C. to form a nucleated glass. At step 1003, the nucleated glass is heated to a growth temperature that is greater than or equal to 650° C. and less than or equal to 800° C. At step 1004, the nucleated glass is held for a second duration in a temperature range that is greater than or equal to the growth temperature and less than or equal to 800° C. to form the glass-ceramic with the final crystalline phase(s). In embodiments, at step 1005, the glass-ceramic may be exposed to an ion exchange medium comprising a molten potassium salt, a molten sodium salt, or combinations thereof, with or without additions of $LiNO_3$ to the ion exchange bath, to form a strengthened glass-ceramic. Each of these steps will be described in more detail below.

In embodiments, the nucleation stage takes place when a glass is held at the predetermined nucleation temperature for a predetermined duration (i.e., the nucleation time). In embodiments, the nucleation temperature is greater than or equal to 450° C. and less than or equal to 650° C., greater than or equal to 460° C. and less than or equal to 650° C., greater than or equal to 470° C. and less than or equal to 650° C., greater than or equal to 480° C. and less than or equal to 650° C., greater than or equal to 490° C. and less than or equal to 650° C., greater than or equal to 500° C. and less than or equal to 650° C., greater than or equal to 510° C. and less than or equal to 650° C., greater than or equal to 520° C. and less than or equal to 650° C., greater than or equal to 530° C. and less than or equal to 650° C., greater than or equal to 540° C. and less than or equal to 650° C., greater than or equal to 550° C. and less than or equal to 650° C., greater than or equal to 560° C. and less than or equal to 650° C., greater than or equal to 570° C. and less than or equal to 650° C., greater than or equal to 580° C. and less than or equal to 650° C., greater than or equal to 590° C. and less than or equal to 650° C., greater than or equal to 600° C. and less than or equal to 650° C., greater than or equal to 610° C. and less than or equal to 650° C., greater than or equal to 620° C. and less than or equal to 650° C., greater than or equal to 630° C. and less than or equal to 650° C., greater than or equal to 640° C. and less than or equal to 650° C., greater than or equal to 450° C. and less than or equal to 640° C., greater than or equal to 460° C. and less than or equal to 640° C., greater than or equal to 470° C. and less than or equal to 640° C., greater than or equal to 480° C. and less than or equal to 640° C., greater than or equal to 490° C. and less than or equal to 640° C., greater than or equal to 500° C. and less than or equal to 640° C., greater than or equal to 510° C. and less than or equal to 640° C., greater than or equal to 520° C. and less than or equal to 640° C., greater than or equal to 530° C. and less than or equal to 640° C., greater than or equal to 540° C. and less than or equal to 640° C., greater than or equal to 550° C. and less than or equal to 640° C., greater than or equal to 560° C. and less than or equal to 640° C., greater than or equal to 570° C. and less than or equal to 640° C., greater than or equal to 580° C. and less than or equal to 640° C., greater than or equal to 590° C. and less than or equal to 640° C., greater than or equal to 600° C. and less than or equal to 640° C., greater than or equal to 610° C. and less than or equal to 640° C., greater than or equal to 620° C. and less than or equal to 640° C., greater than or equal to 630° C. and less than or equal to 640° C., greater than or equal to 450° C. and less than or equal to 630° C., greater than or equal to 460° C. and less than or equal to 630° C., greater than or equal to 470° C. and less than or equal to 630° C., greater than or equal to 480° C. and less than or equal to 630° C., greater than or equal to 490° C. and less than or equal to 630° C., greater than or equal to 500° C. and less than or equal to 630° C., greater than or equal to 510° C. and less than or equal to 630° C., greater than or equal to 520° C. and less than or equal to 630° C., greater than or equal to 530° C. and less than or equal to 630° C., greater than or equal to 540° C. and less than or equal to 630° C., greater than or equal to 550° C. and less than or equal to 630° C., greater than or equal to 560° C. and less than or equal to 630° C., greater than or equal to 570° C. and less than or equal to 630° C., greater than or equal to 580° C. and less than or equal to 630° C., greater than or equal to 590° C. and less than or equal to 630° C., greater than or equal to 600° C. and less than or equal to 630° C., greater than or equal to 610° C. and less than or equal to 630° C., greater than or equal to 620° C. and less than or equal to 630° C., greater than or equal to 450° C. and less than or equal to 620° C., greater than or equal to 460° C. and less than or equal to 620° C., greater than or equal to 470° C. and less than or equal to 620° C., greater than or equal to 480° C. and less than or equal to 620° C., greater than or equal to 490° C. and less than or equal to 620° C., greater than or equal to 500° C. and less than or equal to 620° C., greater than or equal to 510° C. and less than or equal to 620° C., greater than or equal to 520° C. and less than or equal to 620° C., greater than or equal to 530° C. and less than or equal to 620° C., greater than or equal to 540° C. and less than or equal to 620° C., greater than or equal to 550° C. and less than or equal to 620° C., greater than or equal to 560° C. and less than or equal to 620° C., greater than or equal to 570° C. and less than or equal to 620° C., greater than or equal to 580° C. and less than or equal to 620° C., greater than or equal to 590° C. and less than or equal to 620° C., greater than or equal to 600° C. and less than or equal to 620° C., greater than or equal to 610° C. and less than or equal to 620° C., greater than or equal to 450° C. and less than or equal to 610° C., greater than or equal to 460° C. and less than or equal to 610° C., greater than or equal to 470° C. and less than or equal to 610° C., greater than or equal to 480° C. and less than or equal to 610° C., greater than or equal to 490° C. and less than or equal to 610° C., greater than or equal to 500° C. and less than or equal to 610° C., greater than or equal to 510° C. and less than or equal to 610° C., greater than or equal to 520° C. and less than or equal to 610° C., greater than or equal to 530° C. and less than or equal to 610° C., greater than or equal to 540° C. and less than or equal to 610° C., greater than or equal to 550° C. and less than or equal to 610° C., greater than or equal to 560° C. and less than or equal to 610° C., greater than or equal to 570° C. and less than or equal to 610° C., greater than or equal to 580° C. and less than or equal to 610° C., greater than or equal to 590° C. and less than or equal to 610° C., greater than or equal to 600° C. and less than or equal to 610° C., greater than or equal to 450° C. and less than or equal to 600° C., greater than or equal to 460° C. and less than or equal to 600° C., greater than or equal to 470° C. and less than or equal to 600° C., greater than or equal to 480° C. and less than or equal to 600° C., greater than or equal to 490° C. and less than or equal to 600° C., greater than or equal to 500° C. and less than or equal to 600° C., greater than or equal to 510° C. and less than or equal to 600° C., greater than or equal to 520° C. and less than or equal to 600° C., greater than or equal to 530° C. and less than or equal to 600° C., greater than or equal to 540° C. and less than or equal to 600° C., greater than or equal to 550° C. and less than or equal to 600° C., greater than or equal to 560° C. and less than or equal to 600° C., greater than or equal to 570° C. and less than or equal to 600° C., greater than or equal to 580° C. and less than or equal to 600° C., greater than or equal to 590° C. and less than or equal to 600° C., greater than or equal to 450° C. and less than or equal to 590° C., greater than or equal to 460° C. and less than or equal to 590° C., greater than or equal to 470° C. and less than or equal to 590° C., greater than or equal to 480° C. and less than or equal to 590° C., greater than or equal to 490° C. and less than or equal to 590° C., greater than or equal to 500° C. and less than or equal to 590° C., greater than or equal to 510° C. and less than or equal to 590° C., greater than or equal to 520° C. and less than or equal to 590° C., greater than or equal to 530° C. and less than or equal to 590° C., greater than or equal to 540° C. and less than or equal to 590° C., greater than or equal to 550° C. and less than or equal to 590° C., greater than or equal to 560° C. and less than or equal to 590° C., greater than or equal to 570° C. and less than or equal to 590° C., greater than or equal to 580° C. and less than or equal to 590° C., greater than or equal to 450° C. and less than or equal to 580° C., greater than or equal to 460° C. and less than or equal to 580° C., greater than or equal to 470° C. and less than or equal to 580° C., greater than or equal to 480° C. and less than or equal to 580° C., greater than or equal to 490° C. and less than or equal to 580° C., greater than or equal to 500° C. and less than or equal to 580° C., greater than or equal to 510° C. and less than or equal to 580° C., greater than or equal to 520° C. and less than or equal to 580° C., greater than or equal to 530° C. and less than or equal to 580° C., greater than or equal to 540° C. and less than or equal to 580° C., greater than or equal to 550° C. and less than or equal to 580° C., greater than or equal to 560° C. and less than or equal to 580° C., greater than or equal to 570° C. and less than or equal to 580° C., greater than or equal to 450° C. and less than or equal to 570° C., greater than or equal to 460° C. and less than or equal to 570° C., greater than or equal to 470° C. and less than or equal to 570° C., greater than or equal to 480° C. and less than or equal to 570° C., greater than or equal to 490° C. and less than or equal to 570° C., greater than or equal to 500° C. and less than or equal to 570° C., greater than or equal to 510° C. and less than or equal to 570° C., greater than or equal to 520° C. and less than or equal to 570° C., greater than or equal to 530° C. and less than or equal to 570° C., greater than or equal to 540° C. and less than or equal to 570° C., greater than or equal to 550° C. and less than or equal to 570° C., greater than or equal to 560° C. and less than or equal to 570° C., greater than or equal to 450° C. and less than or equal to 560° C., greater than or equal to 460° C. and less than or equal to 560° C., greater than or equal to 470° C. and less than or equal to 560° C., greater than or equal to 480° C. and less than or equal to 560° C., greater than or equal to 490° C. and less than or equal to 560° C., greater than or equal to 500° C. and less than or equal to 560° C., greater than or equal to 510° C. and less than or equal to 560° C., greater than or equal to 520° C. and less than or equal to 560° C., greater than or equal to 530° C. and less than or equal to 560° C., greater than or equal to 540° C. and less than or equal to 560° C., or greater than or equal to 550° C. and less than or equal to 560° C. It should be understood that the above ranges include all subranges within the explicitly disclosed ranges.

In embodiments, the glass is held at the nucleation temperature for a duration that is greater than or equal to 1 minute to less than or equal to 720 minutes, greater than or equal to 30 minutes to less than or equal to 720 minutes, greater than or equal to 60 minutes to less than or equal to 720 minutes, greater than or equal to 90 minutes to less than or equal to 720 minutes, greater than or equal to 120 minutes to less than or equal to 720 minutes, greater than or equal to 150 minutes to less than or equal to 720 minutes, greater than or equal to 180 minutes to less than or equal to 720 minutes, greater than or equal to 210 minutes to less than or equal to 720 minutes, greater than or equal to 240 minutes to less than or equal to 720 minutes, greater than or equal to 270 minutes to less than or equal to 720 minutes, greater than or equal to 300 minutes to less than or equal to 720 minutes, greater than or equal to 330 minutes to less than or equal to 720 minutes, greater than or equal to 360 minutes to less than or equal to 720 minutes, greater than or equal to 390 minutes to less than or equal to 720 minutes, greater than or equal to 420 minutes to less than or equal to 720 minutes, greater than or equal to 450 minutes to less than or equal to 720 minutes, greater than or equal to 480 minutes to less than or equal to 720 minutes, greater than or equal to 510 minutes to less than or equal to 720 minutes, greater than or equal to 540 minutes to less than or equal to 720 minutes, greater than or equal to 570 minutes to less than or equal to 720 minutes, greater than or equal to 600 minutes to less than or equal to 720 minutes, greater than or equal to 630 minutes to less than or equal to 720 minutes, greater than or equal to 660 minutes to less than or equal to 720 minutes, or even greater than or equal to 690 minutes to less than or equal to 720 minutes. In embodiments, the glass is held at the nucleation temperature for a duration that is greater than or equal to 1 minute to less than or equal to 360 minutes, greater than or equal to 30 minutes to less than or equal to 360 minutes, greater than or equal to 60 minutes to less than or equal to 360 minutes, greater than or equal to 90 minutes to less than or equal to 360 minutes, greater than or equal to 120 minutes to less than or equal to 360 minutes, greater than or equal to 150 minutes to less than or equal to 360 minutes, greater than or equal to 180 minutes to less than or equal to 360 minutes, greater than or equal to 210 minutes to less than or equal to 360 minutes, greater than or equal to 240 minutes to less than or equal to 360 minutes, greater than or equal to 270 minutes to less than or equal to 360 minutes, greater than or equal to 300 minutes to less than or equal to 360 minutes, greater than or equal to 330 minutes to less than or equal to 360 minutes, greater than or equal to 1 minute to less than or equal to 330 minutes, greater than or equal to 30 minutes to less than or equal to 330 minutes, greater than or equal to 60 minutes to less than or equal to 330 minutes, greater than or equal to 90 minutes to less than or equal to 330 minutes, greater than or equal to 120 minutes to less than or equal to 330 minutes, greater than or equal to 150 minutes to less than or equal to 330 minutes, greater than or equal to 180 minutes to less than or equal to 330 minutes, greater than or equal to 210 minutes to less than or equal to 330 minutes, greater than or equal to 240 minutes to less than or equal to 330 minutes, greater than or equal to 270 minutes to less than or equal to 330 minutes, greater than or equal to 300 minutes to less than or equal to 330 minutes, greater than or equal to 1 minute to less than or equal to 300 minutes, greater than or equal to 30 minutes to less than or equal to 300 minutes, greater than or equal to 60 minutes to less than or equal to 300 minutes, greater than or equal to 90 minutes to less than or equal to 300 minutes, greater than or equal to 120 minutes to less than or equal to 300 minutes, greater than or equal to 150 minutes to less than or equal to 300 minutes, greater than or equal to 180 minutes to less than or equal to 300 minutes, greater than or equal to 210 minutes to less than or equal to 300 minutes, greater than or equal to 240 minutes to less than or equal to 300 minutes, greater than or equal to 270 minutes to less than or equal to 300 minutes, greater than or equal to 1 minute to less than or equal to 270 minutes, greater than or equal to 30 minutes to less than or equal to 270 minutes, greater than or equal to 60 minutes to less than or equal to 270 minutes, greater than or equal to 90 minutes to less than or equal to 270 minutes, greater than or equal to 120 minutes to less than or equal to 270 minutes, greater than or equal to 150 minutes to less than or equal to 270 minutes, greater than or equal to 180 minutes to less than or equal to 270 minutes, greater than or equal to 210 minutes to less than or equal to 270 minutes, greater than or equal to 240 minutes to less than or equal to 270 minutes, greater than or equal to 1 minute to less than or equal to 240 minutes, greater than or equal to 30 minutes to less than or equal to 240 minutes, greater than or equal to 60 minutes to less than or equal to 240 minutes, greater than or equal to 90 minutes to less than or equal to 240 minutes, greater than or equal to 120 minutes to less than or equal to 240 minutes, greater than or equal to 150 minutes to less than or equal to 240 minutes, greater than or equal to 180 minutes to less than or equal to 240 minutes, greater than or equal to 210 minutes to less than or equal to 240 minutes, greater than or equal to 1 minute to less than or equal to 210 minutes, greater than or equal to 30 minutes to less than or equal to 210 minutes, greater than or equal to 60 minutes to less than or equal to 210 minutes, greater than or equal to 90 minutes to less than or equal to 210 minutes, greater than or equal to 120 minutes to less than or equal to 210 minutes, greater than or equal to 150 minutes to less than or equal to 210 minutes, greater than or equal to 180 minutes to less than or equal to 210 minutes, greater than or equal to 1 minute to less than or equal to 180 minutes, greater than or equal to 30 minutes to less than or equal to 180 minutes, greater than or equal to 60 minutes to less than or equal to 180 minutes, greater than or equal to 90 minutes to less than or equal to 180 minutes, greater than or equal to 120 minutes to less than or equal to 180 minutes, greater than or equal to 150 minutes to less than or equal to 180 minutes, greater than or equal to 1 minute to less than or equal to 150 minutes, greater than or equal to 30 minutes to less than or equal to 150 minutes, greater than or equal to 60 minutes to less than or equal to 150 minutes, greater than or equal to 90 minutes to less than or equal to 150 minutes, greater than or equal to 120 minutes to less than or equal to 150 minutes, greater than or equal to 1 minute to less than or equal to 120 minutes, greater than or equal to 30 minutes to less than or equal to 120 minutes, greater than or equal to 60 minutes to less than or equal to 120 minutes, greater than or equal to 90 minutes to less than or equal to 120 minutes, greater than or equal to 1 minute to less than or equal to 90 minutes, greater than or equal to 30 minutes to less than or equal to 90 minutes, greater than or equal to 60 minutes to less than or equal to 90 minutes, greater than or equal to 1 minute to less than or equal to 60 minutes, greater than or equal to 30 minutes to less than or equal to 60 minutes, or greater than or equal to 1 minute to less than or equal to 30 minutes. It should be understood that the above ranges include all subranges within the explicitly disclosed ranges. After the nucleation stage, the glass is referred to as a nucleated glass.

The growth stage takes place when a nucleated glass is held at the predetermined growth temperature for a predetermined duration (i.e., the growth time). The growth temperature is, in embodiments, greater than the nucleation temperature. In embodiments, the growth temperature is greater than or equal to 650° C. and less than or equal to 800° C., greater than or equal to 660° C. and less than or equal to 800° C., greater than or equal to 670° C. and less than or equal to 800° C., greater than or equal to 680° C. and less than or equal to 800° C., greater than or equal to 690° C. and less than or equal to 800° C., greater than or equal to 700° C. and less than or equal to 800° C., greater than or equal to 710° C. and less than or equal to 800° C., greater than or equal to 720° C. and less than or equal to 800° C., greater than or equal to 730° C. and less than or equal to 800° C., greater than or equal to 740° C. and less than or equal to 800° C., greater than or equal to 750° C. and less than or equal to 800° C., greater than or equal to 760° C. and less than or equal to 800° C., greater than or equal to 770° C. and less than or equal to 800° C., greater than or equal to 780° C. and less than or equal to 800° C., greater than or equal to 790° C. and less than or equal to 800° C., greater than or equal to 650° C. and less than or equal to 790° C., greater than or equal to 660° C. and less than or equal to 790° C., greater than or equal to 670° C. and less than or equal to 790° C., greater than or equal to 680° C. and less than or equal to 790° C., greater than or equal to 690° C. and less than or equal to 790° C., greater than or equal to 700° C. and less than or equal to 790° C., greater than or equal to 710° C. and less than or equal to 790° C., greater than or equal to 720° C. and less than or equal to 790° C., greater than or equal to 730° C. and less than or equal to 790° C., greater than or equal to 740° C. and less than or equal to 790° C., greater than or equal to 750° C. and less than or equal to 790° C., greater than or equal to 760° C. and less than or equal to 790° C., greater than or equal to 770° C. and less than or equal to 790° C., greater than or equal to 780° C. and less than or equal to 790° C., greater than or equal to 650° C. and less than or equal to 780° C., greater than or equal to 660° C. and less than or equal to 780° C., greater than or equal to 670° C. and less than or equal to 780° C., greater than or equal to 680° C. and less than or equal to 780° C., greater than or equal to 690° C. and less than or equal to 780° C., greater than or equal to 700° C. and less than or equal to 780° C., greater than or equal to 710° C. and less than or equal to 780° C., greater than or equal to 720° C. and less than or equal to 780° C., greater than or equal to 730° C. and less than or equal to 780° C., greater than or equal to 740° C. and less than or equal to 780° C., greater than or equal to 750° C. and less than or equal to 780° C., greater than or equal to 760° C. and less than or equal to 780° C., greater than or equal to 770° C. and less than or equal to 780° C., greater than or equal to 650° C. and less than or equal to 770° C., greater than or equal to 660° C. and less than or equal to 770° C., greater than or equal to 670° C. and less than or equal to 770° C., greater than or equal to 680° C. and less than or equal to 770° C., greater than or equal to 690° C. and less than or equal to 770° C., greater than or equal to 700° C. and less than or equal to 770° C., greater than or equal to 710° C. and less than or equal to 770° C., greater than or equal to 720° C. and less than or equal to 770° C., greater than or equal to 730° C. and less than or equal to 770° C., greater than or equal to 740° C. and less than or equal to 770° C., greater than or equal to 750° C. and less than or equal to 770° C., greater than or equal to 760° C. and less than or equal to 770° C., greater than or equal to 650° C. and less than or equal to 760° C., greater than or equal to 660° C. and less than or equal to 760° C., greater than or equal to 670° C. and less than or equal to 760° C., greater than or equal to 680° C. and less than or equal to 760° C., greater than or equal to 690° C. and less than or equal to 760° C., greater than or equal to 700° C. and less than or equal to 760° C., greater than or equal to 710° C. and less than or equal to 760° C., greater than or equal to 720° C. and less than or equal to 760° C., greater than or equal to 730° C. and less than or equal to 760° C., greater than or equal to 740° C. and less than or equal to 760° C., greater than or equal to 750° C. and less than or equal to 760° C., greater than or equal to 650° C. and less than or equal to 750° C., greater than or equal to 660° C. and less than or equal to 750° C., greater than or equal to 670° C. and less than or equal to 750° C., greater than or equal to 680° C. and less than or equal to 750° C., greater than or equal to 690° C. and less than or equal to 750° C., greater than or equal to 700° C. and less than or equal to 750° C., greater than or equal to 710° C. and less than or equal to 750° C., greater than or equal to 720° C. and less than or equal to 750° C., greater than or equal to 730° C. and less than or equal to 750° C., greater than or equal to 740° C. and less than or equal to 750° C., greater than or equal to 650° C. and less than or equal to 740° C., greater than or equal to 660° C. and less than or equal to 740° C., greater than or equal to 670° C. and less than or equal to 740° C., greater than or equal to 680° C. and less than or equal to 740° C., greater than or equal to 690° C. and less than or equal to 740° C., greater than or equal to 700° C. and less than or equal to 740° C., greater than or equal to 710° C. and less than or equal to 740° C., greater than or equal to 720° C. and less than or equal to 740° C., greater than or equal to 730° C. and less than or equal to 740° C., greater than or equal to 650° C. and less than or equal to 730° C., greater than or equal to 660° C. and less than or equal to 730° C., greater than or equal to 670° C. and less than or equal to 730° C., greater than or equal to 680° C. and less than or equal to 730° C., greater than or equal to 690° C. and less than or equal to 730° C., greater than or equal to 700° C. and less than or equal to 730° C., greater than or equal to 710° C. and less than or equal to 730° C., greater than or equal to 720° C. and less than or equal to 730° C., greater than or equal to 650° C. and less than or equal to 720° C., greater than or equal to 660° C. and less than or equal to 720° C., greater than or equal to 670° C. and less than or equal to 720° C., greater than or equal to 680° C. and less than or equal to 720° C., greater than or equal to 690° C. and less than or equal to 720° C., greater than or equal to 700° C. and less than or equal to 720° C., greater than or equal to 710° C. and less than or equal to 720° C., greater than or equal to 650° C. and less than or equal to 710° C., greater than or equal to 660° C. and less than or equal to 710° C., greater than or equal to 670° C. and less than or equal to 710° C., greater than or equal to 680° C. and less than or equal to 710° C., greater than or equal to 690° C. and less than or equal to 710° C., greater than or equal to 700° C. and less than or equal to 710° C., greater than or equal to 650° C. and less than or equal to 700° C., greater than or equal to 660° C. and less than or equal to 700° C., greater than or equal to 670° C. and less than or equal to 700° C., greater than or equal to 680° C. and less than or equal to 700° C., greater than or equal to 690° C. and less than or equal to 700° C., greater than or equal to 650° C. and less than or equal to 690° C., greater than or equal to 660° C. and less than or equal to 690° C., greater than or equal to 670° C. and less than or equal to 690° C., or greater than or equal to 680° C. and less than or equal to 690° C. It should be understood that the above ranges include all subranges within the explicitly disclosed ranges.

In embodiments, the nucleated glass is held at the growth temperature for a duration that is greater than or equal to 1 minute to less than or equal to 240 minutes, greater than or equal to 30 minutes to less than or equal to 240 minutes, greater than or equal to 60 minutes to less than or equal to 240 minutes, greater than or equal to 90 minutes to less than or equal to 240 minutes, greater than or equal to 120 minutes to less than or equal to 240 minutes, greater than or equal to 150 minutes to less than or equal to 240 minutes, greater than or equal to 180 minutes to less than or equal to 240 minutes, greater than or equal to 210 minutes to less than or equal to 240 minutes, greater than or equal to 1 minute to less than or equal to 210 minutes, greater than or equal to 30 minutes to less than or equal to 210 minutes, greater than or equal to 60 minutes to less than or equal to 210 minutes, greater than or equal to 90 minutes to less than or equal to 210 minutes, greater than or equal to 120 minutes to less than or equal to 210 minutes, greater than or equal to 150 minutes to less than or equal to 210 minutes, greater than or equal to 180 minutes to less than or equal to 210 minutes, greater than or equal to 1 minute to less than or equal to 180 minutes, greater than or equal to 30 minutes to less than or equal to 180 minutes, greater than or equal to 60 minutes to less than or equal to 180 minutes, greater than or equal to 90 minutes to less than or equal to 180 minutes, greater than or equal to 120 minutes to less than or equal to 180 minutes, greater than or equal to 150 minutes to less than or equal to 180 minutes, greater than or equal to 1 minute to less than or equal to 150 minutes, greater than or equal to 30 minutes to less than or equal to 150 minutes, greater than or equal to 60 minutes to less than or equal to 150 minutes, greater than or equal to 90 minutes to less than or equal to 150 minutes, greater than or equal to 120 minutes to less than or equal to 150 minutes, greater than or equal to 1 minute to less than or equal to 120 minutes, greater than or equal to 30 minutes to less than or equal to 120 minutes, greater than or equal to 60 minutes to less than or equal to 120 minutes, greater than or equal to 90 minutes to less than or equal to 120 minutes, greater than or equal to 1 minute to less than or equal to 90 minutes, greater than or equal to 30 minutes to less than or equal to 90 minutes, greater than or equal to 60 minutes to less than or equal to 90 minutes, greater than or equal to 1 minute to less than or equal to 60 minutes, greater than or equal to 30 minutes to less than or equal to 60 minutes, or greater than or equal to 1 minute to less than or equal to 30 minutes. It should be understood that the above ranges include all subranges within the explicitly disclosed ranges. The growth stage transitions the nucleated glass into a glass-ceramic material (i.e., a glass-ceramic or glass-ceramic article).

Glasses as disclosed and described herein held at the nucleation temperature and growth temperature for the durations disclosed and described herein will form a glass-ceramic having a phase assemblage comprising a residual amorphous glass phase and a lithium disilicate ($Li_2Si_2O_5$) crystalline phase. Optionally, the glass-ceramic may further comprise a lithium metasilicate crystalline phase ($Li_2SiO_3$) and/or a lithium phosphate crystalline phase ($Li_3PO_4$). As noted herein, this phase assemblage provides a glass-ceramic that has low haze (high clarity) and improved mechanical properties.

It is believed that the nucleation and growth temperatures and durations disclosed and described herein are the heat treatments that primarily result in the desired phase assemblage in the glass-ceramics. Additional heat treatments may be included before the nucleation stage, between the nucleation stage and the growth stage, and after the growth stage without causing significant deviation in the phase assemblage of the glass-ceramic material. These additional heat treatments include isothermal holds, heating at specific heating schedules including a number of differing heating rates, and combinations thereof.

Accordingly, in embodiments, there may be one of more additional temperature holds between the nucleation temperature and the growth temperature. In embodiments, after maintaining the glass at the nucleation temperature, the article may be heated to one or more intermediate temperatures (wherein the intermediate temperatures are in a range between the nucleation temperature and the growth temperature) and held at the one or more intermediate temperatures for a predetermined time (for example, between 1 minute and 360 minutes and all ranges and subranges there between) and then heated to the growth temperature.

In embodiments, the nucleation stage comprises an isothermal hold at a single nucleation temperature for a duration. However, in other embodiments, the nucleation stage includes heating the glass at one or more heating rates through the nucleation temperature range described herein (i.e., from greater than or equal to 550° C. to less than or equal to 650° C.). Likewise, in embodiments, the growth stage comprises an isothermal hold at a single growth temperature for a duration. However, in other embodiments, the growth stage includes heating or cooling the nucleated glass at one or more heating rates within the growth temperature range described herein (i.e., from greater than or equal to 680° C. to less than or equal to 800° C.).

According to embodiments, heating rates used to heat from room temperature to the nucleation temperature, within the nucleation stage, between the nucleation stage and the growth stage, within the growth stage, and after the growth stage is greater than or equal to 0.1° C./min and less than or equal to 50° C./min, greater than or equal to 5° C./min and less than or equal to 50° C./min, greater than or equal to 10° C./min and less than or equal to 50° C./min, greater than or equal to 15° C./min and less than or equal to 50° C./min, greater than or equal to 20° C./min and less than or equal to 50° C./min, greater than or equal to 25° C./min and less than or equal to 50° C./min, greater than or equal to 30° C./min and less than or equal to 50° C./min, greater than or equal to 35° C./min and less than or equal to 50° C./min, greater than or equal to 40° C./min and less than or equal to 50° C./min, greater than or equal to 45° C./min and less than or equal to 50° C./min, greater than or equal to 0.1° C./min and less than or equal to 45° C./min, greater than or equal to 5° C./min and less than or equal to 45° C./min, greater than or equal to 10° C./min and less than or equal to 45° C./min, greater than or equal to 15° C./min and less than or equal to 45° C./min, greater than or equal to 20° C./min and less than or equal to 45° C./min, greater than or equal to 25° C./min and less than or equal to 45° C./min, greater than or equal to 30° C./min and less than or equal to 45° C./min, greater than or equal to 35° C./min and less than or equal to 45° C./min, greater than or equal to 40° C./min and less than or equal to 45° C./min, greater than or equal to 0.1° C./min and less than or equal to 40° C./min, greater than or equal to 5° C./min and less than or equal to 40° C./min, greater than or equal to 10° C./min and less than or equal to 40° C./min, greater than or equal to 15° C./min and less than or equal to 40° C./min, greater than or equal to 20° C./min and less than or equal to 40° C./min, greater than or equal to 25° C./min and less than or equal to 40° C./min, greater than or equal to 30° C./min and less than or equal to 40° C./min, greater than or equal to 35° C./min and less than or equal to 40° C./min, greater than or equal to 0.1° C./min and less than or equal to 35° C./min, greater than or equal to 5° C./min and less than or equal to 35° C./min, greater than or equal to 10° C./min and less than or equal to 35° C./min, greater than or equal to 15° C./min and less than or equal to 35° C./min, greater than or equal to 20° C./min and less than or equal to 35° C./min, greater than or equal to 25° C./min and less than or equal to 35° C./min, greater than or equal to 30° C./min and less than or equal to 35° C./min, greater than or equal to 0.1° C./min and less than or equal to 30° C./min, greater than or equal to 5° C./min and less than or equal to 30° C./min, greater than or equal to 10° C./min and less than or equal to 30° C./min, greater than or equal to 15° C./min and less than or equal to 30° C./min, greater than or equal to 20° C./min and less than or equal to 30° C./min, greater than or equal to 25° C./min and less than or equal to 30° C./min, greater than or equal to 0.1° C./min and less than or equal to 25° C./min, greater than or equal to 5° C./min and less than or equal to 25° C./min, greater than or equal to 10° C./min and less than or equal to 25° C./min, greater than or equal to 15° C./min and less than or equal to 25° C./min, greater than or equal to 20° C./min and less than or equal to 25° C./min, greater than or equal to 0.1° C./min and less than or equal to 20° C./min, greater than or equal to 5° C./min and less than or equal to 20° C./min, greater than or equal to 10° C./min and less than or equal to 20° C./min, greater than or equal to 15° C./min and less than or equal to 20° C./min, greater than or equal to 0.1° C./min and less than or equal to 15° C./min, greater than or equal to 5° C./min and less than or equal to 15° C./min, greater than or equal to 10° C./min and less than or equal to 15° C./min, greater than or equal to 0.1° C./min and less than or equal to 10° C./min, greater than or equal to 5° C./min and less than or equal to 10° C./min, or greater than or equal to 0.1° C./min and less than or equal to 5° C./min. It should be understood that the above ranges include all subranges within the explicitly disclosed ranges. Such heating rates allow the proper amount of nucleation and crystal growth without damaging the glass-ceramic article. If heating is done too quickly, the material may be damaged. However, if heating is done too slowly, proper nucleation and growth may not occur.

In one or more embodiments, the nucleated glass may be shaped during the growth step. In one or more embodiments, the nucleated glass may be shaped into a non-planar shape. In some embodiments, the nucleated glass may be shaped into a planar shape. In some embodiments, shaping may occur within a mold or other structure that imparts a desired shape to the nucleated glass as it is being subjected to the growth temperature.

In embodiments, the glass-ceramic is cooled after being held at the growth temperature. In embodiments, the glass-ceramic may be cooled to room temperature in a single stage at a constant cooling rate, in two stages each with a different cooling rate, or in three or more stages each with a different cooling rate. In embodiments, the glass-ceramics are cooled at a controlled rate from the growth temperature to minimize temperature gradients across the articles as well as minimize residual stress across the articles. Temperature gradients and differences in residual stress may lead to the articles warping during cooling. Thus, controlling the cooling to control the temperature gradients and residual stresses may also minimize warpage of the glass-ceramics.

The phase assemblage of the glass-ceramics described herein (i.e., the respective Rietveld parameters of the crystalline phases and the residual amorphous glass phase) limits the mismatch in indices between the crystals and the residual amorphous glass phase, which reduces light scatter and the resulting haze of the glass-ceramic while increasing the transmittance of the glass-ceramic.

The average crystallite size of the crystals in the crystalline phases is a factor that affects the transparency (i.e., transmittance) of the glass-ceramics. In embodiments, the average crystallite size of the glass-ceramics is in a range from greater than or equal to 5 nm to less than or equal to 150 nm, greater than or equal to 5 nm to less than or equal to 125 nm, greater than or equal to 5 nm to less than or equal to 100 nm, greater than or equal to 5 nm to less than or equal to 75 nm, greater than or equal to 5 nm to less than or equal to 50 nm, greater than or equal to 5 nm to less than or equal to 27 nm, greater than or equal to 5 nm to less than or equal to 26 nm, greater than or equal to 5 nm to less than or equal to 25 nm, greater than or equal to 5 nm to less than or equal to 22 nm, greater than or equal to 10 nm to less than or equal to 150 nm, greater than or equal to 10 nm to less than or equal to 125 nm, greater than or equal to 10 nm to less than or equal to 100 nm, greater than or equal to 10 nm to less than or equal to 75 nm, greater than or equal to 10 nm to less than or equal to 50 nm, greater than or equal to 10 nm to less than or equal to 25 nm, greater than or equal to 10 nm to less than or equal to 22 nm, greater than or equal to 12 nm to less than or equal to 150 nm, greater than or equal to 12 nm to less than or equal to 125 nm, greater than or equal to 12 nm to less than or equal to 100 nm, greater than or equal to 12 nm to less than or equal to 75 nm, greater than or equal to 12 nm to less than or equal to 50 nm, greater than or equal to 12 nm to less than or equal to 27 nm, greater than or equal to 12 nm to less than or equal to 26 nm, greater than or equal to 12 nm to less than or equal to 25 nm, greater than or equal to 12 nm to less than or equal to 22 nm, greater than or equal to 13 nm to less than or equal to 150 nm, greater than or equal to 13 nm to less than or equal to 125 nm, greater than or equal to 13 nm to less than or equal to 100 nm, greater than or equal to 13 nm to less than or equal to 75 nm, greater than or equal to 13 nm to less than or equal to 50 nm, greater than or equal to 13 nm to less than or equal to 27 nm, greater than or equal to 13 nm to less than or equal to 26 nm, greater than or equal to 13 nm to less than or equal to 25 nm, greater than or equal to 13 nm to less than or equal to 22 nm, greater than or equal to 15 nm to less than or equal to 150 nm, greater than or equal to 15 nm to less than or equal to 125 nm, greater than or equal to 15 nm to less than or equal to 125 nm, greater than or equal to 15 nm to less than or equal to 100 nm, greater than or equal to 15 nm to less than or equal to 75 nm, greater than or equal to 15 nm to less than or equal to 50 nm, greater than or equal to 15 nm to less than or equal to 27 nm, greater than or equal to 15 nm to less than or equal to 26 nm, greater than or equal to 15 nm to less than or equal to 25 nm, greater than or equal to 16 nm to less than or equal to 150 nm, greater than or equal to 16 nm to less than or equal to 165 nm, greater than or equal to 16 nm to less than or equal to 100 nm, greater than or equal to 16 nm to less than or equal to 75 nm, greater than or equal to 16 nm to less than or equal to 50 nm, greater than or equal to 16 nm to less than or equal to 27 nm, greater than or equal to 16 nm to less than or equal to 26 nm, greater than or equal to 16 nm to less than or equal to 25 nm, greater than or equal to 16 nm to less than or equal to 22 nm, greater than or equal to 17 nm to less than or equal to 150 nm, greater than or equal to 17 nm to less than or equal to 175 nm, greater than or equal to 17 nm to less than or equal to 100 nm, greater than or equal to 17 nm to less than or equal to 75 nm, greater than or equal to 17 nm to less than or equal to 50 nm, greater than or equal to 17 nm to less than or equal to 27 nm, greater than or equal to 17 nm to less than or equal to 26 nm, greater than or equal to 17 nm to less than or equal to 25 nm, greater than or equal to 17 nm to less than or equal to 22 nm, greater than or equal to 18 nm to less than or equal to 150 nm, greater than or equal to 18 nm to less than or equal to 185 nm, greater than or equal to 18 nm to less than or equal to 100 nm, greater than or equal to 18 nm to less than or equal to 75 nm, greater than or equal to 18 nm to less than or equal to 50 nm, greater than or equal to 18 nm to less than or equal to 27 nm, greater than or equal to 18 nm to less than or equal to 26 nm, greater than or equal to 18 nm to less than or equal to 25 nm, greater than or equal to 18 nm to less than or equal to 22 nm, greater than or equal to 19 nm to less than or equal to 150 nm, greater than or equal to 19 nm to less than or equal to 195 nm, greater than or equal to 19 nm to less than or equal to 100 nm, greater than or equal to 19 nm to less than or equal to 75 nm, greater than or equal to 19 nm to less than or equal to 50 nm, greater than or equal to 19 nm to less than or equal to 27 nm, greater than or equal to 19 nm to less than or equal to 26 nm, greater than or equal to 19 nm to less than or equal to 25 nm, greater than or equal to 19 nm to less than or equal to 22 nm, greater than or equal to 20 nm to less than or equal to 150 nm, greater than or equal to 20 nm to less than or equal to 125 nm, greater than or equal to 20 nm to less than or equal to 125 nm, greater than or equal to 15 nm to less than or equal to 22 nm, greater than or equal to 20 nm to less than or equal to 100 nm, greater than or equal to 20 nm to less than or equal to 75 nm, greater than or equal to 20 nm to less than or equal to 50 nm, greater than or equal to 20 nm to less than or equal to 27 nm, greater than or equal to 20 nm to less than or equal to 26 nm, greater than or equal to 20 nm to less than or equal to 25 nm, or even greater than or equal to 20 nm to less than or equal to 22 nm. The average crystallite size of the crystallites in the glass-ceramic are determined from x-ray diffraction data. In particular, x-ray diffraction is performed on powdered samples of the glass-ceramic and an x-ray diffraction pattern is obtained. The crystalline phases present in the sample and the average size of the crystallites (i.e., the crystallite size) are determined from the x-ray diffraction pattern using Bruker AXS TOPAS Rietveld refinement software.

In embodiments, the glass-ceramics have high transparency and low haze and are suitable for use as a cover glass for electronic devices, such as mobile electronic device. In embodiments, the glass-ceramics are transparent in that the glass-ceramics have a transmittance of 75% or greater, 76% or greater, 77% or greater, 78% or greater, 79% or greater, 80% or greater, 81% or greater, 82% or greater, 83% or greater, 84% or greater, 85% or greater, 86% or greater, 87% or greater, 88% or greater, 89% or greater, 90% or greater, 91% or greater, 92% or greater, 93% or greater, 94% or greater for wavelengths of light within a range from 400 nm to 750 nm. In one or more embodiments, the glass-ceramic exhibits the foregoing transmittance ranges for wavelengths of light within a range from greater than or equal to 400 nm to less than or equal to 1000 nm. In one or more embodiments, the thickness of the glass-ceramic exhibiting such transmittance is 0.5 mm.

In other embodiments, glass-ceramics may be translucent for wavelengths of light within a range from 400 nm to 750 nm. In embodiments a translucent glass-ceramic can have a transmittance in a range from about 20% to less than 75% for wavelengths of light within a range of about 400 nm to about 750 nm. In embodiments a translucent glass-ceramic can have a transmittance in a range from about 20% to less than 75% for wavelengths of light within a range of about 400 nm to about 1000 nm. In one or more embodiments, the thickness of the glass-ceramic exhibiting such transmittance is 0.5 mm. It should be understood that the above ranges include all subranges within the explicitly disclosed ranges.

In embodiments, the glass-ceramic article has a haze (%) of less or equal to 1.0, 0.95, 0.90, 0.85, 0.80, 0.75, 0.70, 0.65, 0.60, 0.55, 0.50, 0.45, 0.40, 0.35, 0.30, 0.25, 0.20, 0.15, 0.14, 0.13, 0.12, 0.11, 0.10, 0.09, 0.08, 0.07, 0.06, or 0.05. In one or more embodiments the glass-ceramic article exhibiting such haze has a thickness of less than or equal to 0.6 mm, such as less than or equal to 0.5 mm, less than or equal to 0.4 mm, less than or equal to 0.3 mm, less than or equal to 0.2 mm, or even less than or equal to 0.1 mm. In one or more embodiments, the glass-ceramic article has a haze (%) of greater than or equal to 0 and less than or equal to 1.0, greater than or equal to 0 and less than or equal to 0.95, greater than or equal to 0 and less than or equal to 0.90, greater than or equal to 0 and less than or equal to 0.85, greater than or equal to 0 and less than or equal to 0.80, greater than or equal to 0 and less than or equal to 0.75, greater than or equal to 0 and less than or equal to 0.70, greater than or equal to 0 and less than or equal to 0.65, greater than or equal to 0 and less than or equal to 0.60, greater than or equal to 0 and less than or equal to 0.55, greater than or equal to 0 and less than or equal to 0.50, greater than or equal to 0 and less than or equal to 0.45, greater than or equal to 0 and less than or equal to 0.40, greater than or equal to 0 and less than or equal to 0.35, greater than or equal to 0 and less than or equal to 0.30, greater than or equal to 0 and less than or equal to 0.25, greater than or equal to 0 and less than or equal to 0.20, greater than or equal to 0 and less than or equal to 0.15, greater than or equal to 0 and less than or equal to 0.14, greater than or equal to 0 and less than or equal to 0.13, greater than or equal to 0 and less than or equal to 0.12, greater than or equal to 0 and less than or equal to 0.11, greater than or equal to 0 and less than or equal to 0.10, greater than or equal to 0 and less than or equal to 0.09, greater than or equal to 0 and less than or equal to 0.08, greater than or equal to 0 and less than or equal to 0.07, greater than or equal to 0 and less than or equal to 0.06, greater than or equal to 0 and less than or equal to 0.05, greater than or equal to 0.05 and less than or equal to 1.0, greater than or equal to 0.05 and less than or equal to 0.95, greater than or equal to 0.05 and less than or equal to 0.90, greater than or equal to 0.05 and less than or equal to 0.85, greater than or equal to 0.05 and less than or equal to 0.80, greater than or equal to 0.05 and less than or equal to 0.75, greater than or equal to 0.05 and less than or equal to 0.70, greater than or equal to 0.05 and less than or equal to 0.65, greater than or equal to 0.05 and less than or equal to 0.60, greater than or equal to 0.05 and less than or equal to 0.55, greater than or equal to 0.05 and less than or equal to 0.50, greater than or equal to 0.05 and less than or equal to 0.45, greater than or equal to 0.05 and less than or equal to 0.40, greater than or equal to 0.05 and less than or equal to 0.35, greater than or equal to 0.05 and less than or equal to 0.30, greater than or equal to 0.05 and less than or equal to 0.25, greater than or equal to 0.05 and less than or equal to 0.20, greater than or equal to 0.05 and less than or equal to 0.15, greater than or equal to 0.05 and less than or equal to 0.14, greater than or equal to 0.05 and less than or equal to 0.13, greater than or equal to 0.05 and less than or equal to 0.12, greater than or equal to 0.05 and less than or equal to 0.11, greater than or equal to 0.05 and less than or equal to 0.10, greater than or equal to 0.05 and less than or equal to 0.09, greater than or equal to 0.05 and less than or equal to 0.08, greater than or equal to 0.05 and less than or equal to 0.07, greater than or equal to 0.07 and less than or equal to 1.0, greater than or equal to 0.07 and less than or equal to 0.95, greater than or equal to 0.07 and less than or equal to 0.90, greater than or equal to 0.07 and less than or equal to 0.85, greater than or equal to 0.07 and less than or equal to 0.80, greater than or equal to 0.07 and less than or equal to 0.75, greater than or equal to 0.07 and less than or equal to 0.70, greater than or equal to 0.07 and less than or equal to 0.65, greater than or equal to 0.07 and less than or equal to 0.60, greater than or equal to 0.07 and less than or equal to 0.55, greater than or equal to 0.07 and less than or equal to 0.50, greater than or equal to 0.07 and less than or equal to 0.45, greater than or equal to 0.07 and less than or equal to 0.40, greater than or equal to 0.07 and less than or equal to 0.35, greater than or equal to 0.07 and less than or equal to 0.30, greater than or equal to 0.07 and less than or equal to 0.25, greater than or equal to 0.07 and less than or equal to 0.20, greater than or equal to 0.07 and less than or equal to 0.15, greater than or equal to 0.07 and less than or equal to 0.14, greater than or equal to 0.07 and less than or equal to 0.13, greater than or equal to 0.07 and less than or equal to 0.12, greater than or equal to 0.07 and less than or equal to 0.11, greater than or equal to 0.07 and less than or equal to 0.10, greater than or equal to 0.07 and less than or equal to 0.09, greater than or equal to 0.07 and less than or equal to 0.08, greater than or equal to 0.1 and less than or equal to 1.0, greater than or equal to 0.1 and less than or equal to 0.95, greater than or equal to 0.1 and less than or equal to 0.90, greater than or equal to 0.1 and less than or equal to 0.85, greater than or equal to 0.1 and less than or equal to 0.80, greater than or equal to 0.1 and less than or equal to 0.75, greater than or equal to 0.1 and less than or equal to 0.70, greater than or equal to 0.1 and less than or equal to 0.65, greater than or equal to 0.1 and less than or equal to 0.60, greater than or equal to 0.1 and less than or equal to 0.55, greater than or equal to 0.1 and less than or equal to 0.50, greater than or equal to 0.1 and less than or equal to 0.45, greater than or equal to 0.1 and less than or equal to 0.40, greater than or equal to 0.1 and less than or equal to 0.35, greater than or equal to 0.1 and less than or equal to 0.30, greater than or equal to 0.1 and less than or equal to 0.25, greater than or equal to 0.1 and less than or equal to 0.20, or even greater than or equal to 0.1 and less than or equal to 0.15. In one or more embodiments, the glass-ceramic article exhibiting such haze has a thickness of less than or equal to 0.6 mm, such as less than or equal to 0.5 mm, less than or equal to 0.4 mm, less than or equal to 0.3 mm, less than or equal to 0.2 mm, or even less than or equal to 0.1 mm. It is noted that when a glass-ceramic article has a certain haze value at a specified thickness, a glass-ceramic article having the same composition and the same phase assemblage will have at least the same haze value or less at a thickness less than the specified thickness. As an example, a glass-ceramic article having a thickness of 0.5 mm will have the same haze value or lower than a glass-ceramic article formed from the same composition and comprising the same phase assemblage but having a thickness of 0.6 mm. It should be understood that the above ranges include all subranges within the explicitly disclosed ranges.

In embodiments, the haze of the glass-ceramic may be characterized based on the haze value (or haze) per millimeter (mm) of thickness of the glass-ceramic. In embodiments, the glass-ceramic may have a haze (%) per mm of thickness of greater than or equal to 0.04/mm to less than or equal to 2.0/mm, greater than or equal to 0.04/mm to less than or equal to 1.8/mm, greater than or equal to 0.04/mm to less than or equal to 1.6/mm, greater than or equal to 0.04/mm to less than or equal to 1.4/mm, greater than or equal to 0.04/mm to less than or equal to 1.2/mm, greater than or equal to 0.04/mm to less than or equal to 1.0/mm, greater than or equal to 0.04/mm to less than or equal to 0.8/mm, or even greater than or equal to 0.04/mm to less than or equal to 0.6/mm. In embodiments, the glass-ceramic may have a haze (%) per mm of thickness of greater than or equal to 0.06/mm to less than or equal to 0.4/mm, greater than or equal to 0.06/mm to less than or equal to 0.3/mm, greater than or equal to 0.06/mm to less than or equal to 0.2/mm, or even greater than or equal to 0.06/mm to less than or equal to 0.1/mm. It should be understood that the above ranges include all subranges within the explicitly disclosed ranges.

The fracture toughness of the glass-ceramic generally increases with the amount of the lithium disilicate crystalline phase in the glass-ceramic, as indicated by the Rietveld parameter. However, the optical properties of the glass-ceramic, such as haze, may degrade as the crystallite size of the lithium disilicate crystalline phase increases. It has now been found that when the ratio of the Rietveld parameter of the lithium disilicate crystalline phase to the average crystallite size (in nm) of the lithium disilicate crystalline phase is greater than or equal to 2.75 wt %/nm, the glass-ceramic exhibits relatively high fracture toughness and relatively low haze, making the glass-ceramic amenable for use in applications such as cover glasses for handheld electronic devices and the like. That is, the glass-ceramics exhibit a favorable combination of high fracture toughness and low haze when the ratio of the Rietveld parameter of the lithium disilicate crystalline phase to the crystallite size of the lithium disilicate crystalline phase is greater than or equal to 2.75 wt %/nm. In embodiments, the ratio of the Rietveld parameter of the lithium disilicate crystalline phase to the crystallite size of the lithium disilicate crystalline phase is greater than or equal to 2.75 wt %/nm, greater than or equal to 3.0 wt %/nm, greater than or equal to 3.25 wt %/nm, greater than or equal to 3.5 wt %/nm, greater than or equal to 3.75 wt %/nm, greater than or equal to 4.0 wt %/nm, greater than or equal to 4.25 wt %/nm, greater than or equal to 4.5 wt %/nm, greater than or equal to 4.75 wt %/nm, greater than or equal to 5.0 wt %/nm, greater than or equal to 5.25 wt %/nm, greater than or equal to 5.5 wt %/nm, or even greater than or equal to 5.75 wt %/nm. In embodiments, the ratio of the Rietveld parameter of the lithium disilicate crystalline phase to the crystallite size of the lithium disilicate crystalline phase is greater than or equal to 2.75 wt %/nm and less than or equal to 6.0 wt %/nm, greater than or equal to 2.75 wt %/nm and less than or equal to 5.75 wt %/nm, greater than or equal to 2.75 wt %/nm and less than or equal to 5.5 wt %/nm, greater than or equal to 2.75 wt %/nm and less than or equal to 5.25 wt %/nm, greater than or equal to 2.75 wt %/nm and less than or equal to 5.0 wt %/nm, greater than or equal to 2.75 wt %/nm and less than or equal to 4.75 wt %/nm, greater than or equal to 2.75 wt %/nm and less than or equal to 4.5 wt %/nm, greater than or equal to 4.75 wt %/nm and less than or equal to 4.25 wt %/nm, greater than or equal to 2.75 wt %/nm and less than or equal to 4.0 wt %/nm, greater than or equal to 2.75 wt %/nm and less than or equal to 3.75 wt %/nm, greater than or equal to 2.75 wt %/nm and less than or equal to 3.5 wt %/nm, greater than or equal to 2.75 wt %/nm and less than or equal to 3.25 wt %/nm, greater than or equal to 2.75 wt %/nm and less than or equal to 3.0 wt %/nm, greater than or equal to 3.0 wt %/nm and less than or equal to 6.0 wt %/nm, greater than or equal to 3.0 wt %/nm and less than or equal to 5.75 wt %/nm, greater than or equal to 3.0 wt %/nm and less than or equal to 5.5 wt %/nm, greater than or equal to 3.0 wt %/nm and less than or equal to 5.25 wt %/nm, greater than or equal to 3.0 wt %/nm and less than or equal to 5.0 wt %/nm, greater than or equal to 3.0 wt %/nm and less than or equal to 4.75 wt %/nm, greater than or equal to 3.0 wt %/nm and less than or equal to 4.5 wt %/nm, greater than or equal to 4.75 wt %/nm and less than or equal to 4.25 wt %/nm, greater than or equal to 3.0 wt %/nm and less than or equal to 4.0 wt %/nm, greater than or equal to 3.0 wt %/nm and less than or equal to 3.75 wt %/nm, greater than or equal to 3.0 wt %/nm and less than or equal to 3.5 wt %/nm, greater than or equal to 3.0 wt %/nm and less than or equal to 3.25 wt %/nm, greater than or equal to 3.25 wt %/nm and less than or equal to 6.0 wt %/nm, greater than or equal to 3.25 wt %/nm and less than or equal to 5.75 wt %/nm, greater than or equal to 3.25 wt %/nm and less than or equal to 5.5 wt %/nm, greater than or equal to 3.25 wt %/nm and less than or equal to 5.25 wt %/nm, greater than or equal to 3.25 wt %/nm and less than or equal to 5.0 wt %/nm, greater than or equal to 3.25 wt %/nm and less than or equal to 4.75 wt %/nm, greater than or equal to 3.25 wt %/nm and less than or equal to 4.5 wt %/nm, greater than or equal to 4.75 wt %/nm and less than or equal to 4.25 wt %/nm, greater than or equal to 3.25 wt %/nm and less than or equal to 4.0 wt %/nm, greater than or equal to 3.25 wt %/nm and less than or equal to 3.75 wt %/nm, greater than or equal to 3.25 wt %/nm and less than or equal to 3.5 wt %/nm, greater than or equal to 3.5 wt %/nm and less than or equal to 6.0 wt %/nm, greater than or equal to 3.5 wt %/nm and less than or equal to 5.75 wt %/nm, greater than or equal to 3.5 wt %/nm and less than or equal to 5.5 wt %/nm, greater than or equal to 3.5 wt %/nm and less than or equal to 5.25 wt %/nm, greater than or equal to 3.5 wt %/nm and less than or equal to 5.0 wt %/nm, greater than or equal to 3.5 wt %/nm and less than or equal to 4.75 wt %/nm, greater than or equal to 3.5 wt %/nm and less than or equal to 4.5 wt %/nm, greater than or equal to 4.75 wt %/nm and less than or equal to 4.25 wt %/nm, greater than or equal to 3.5 wt %/nm and less than or equal to 4.0 wt %/nm, or even greater than or equal to 3.5 wt %/nm and less than or equal to 3.75 wt %/nm. It should be understood that the above ranges include all subranges within the explicitly disclosed ranges.

It has been determined that, in the glass-ceramics described herein, the haze of the glass-ceramics generally increases with increasing crystallite size. Increasing crystallite size may also alter the reflectance and transmittance characteristics of the glass-ceramic. For example, glass-ceramics with relatively larger crystallite size may have a larger proportion of blue light in the reflected light and a larger proportion of yellow light in transmitted light. These changes in the reflected and transmitted light may be quantified by the CIELAB color coordinates of the glass-ceramics.

In embodiments, the glass-ceramics described herein have transmitted color coordinates in the CIELAB color space, as measured at an article thickness of 0.6 mm under D65 illumination and a 10° standard observer angle, of L* greater than or equal to 96.5 and less than or equal to 97.5, a* greater than or equal to −0.25 and less than or equal to −0.15, and b* greater than or equal to −0.30 and less than or equal to −0.05.

In embodiments, the glass-ceramics described herein have reflected color coordinates in the CIELAB color space, as measured at an article thickness of 0.6 mm under D65 illumination and a 10° standard observer angle (specular components excluded (SCE)), of L* greater than or equal to 0.5 and less than or equal to 1.5, a* greater than or equal to 0.35 and less than or equal to 0.75, and b* greater than or equal to −3.80 and less than or equal to −2.20.

Figure 2:
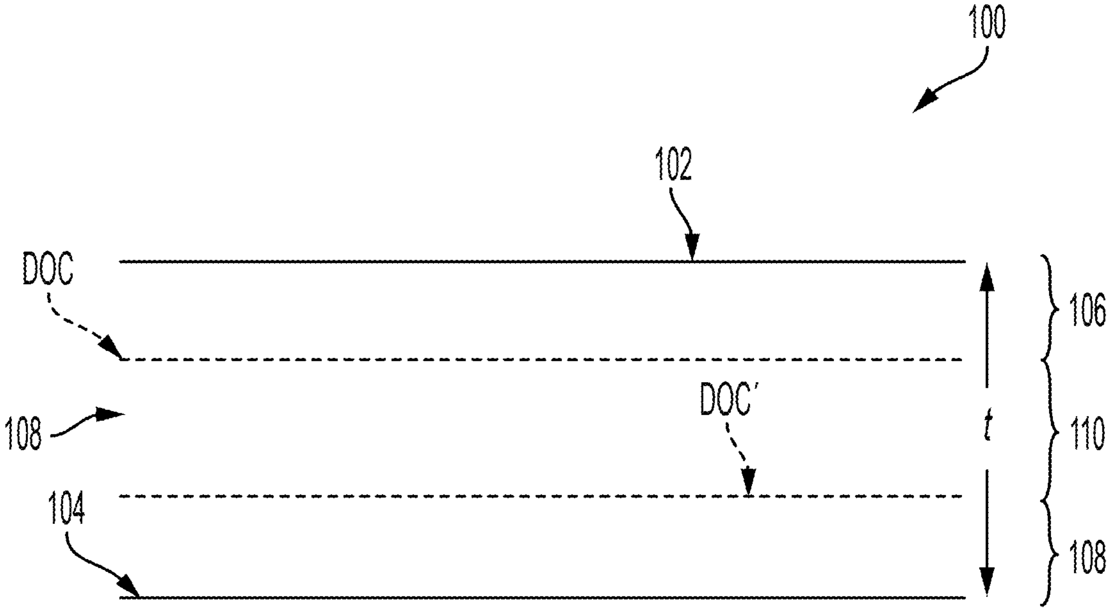
FIG. 2 schematically depicts a cross section of a glass-ceramic article that has been chemically strengthened by ion exchange.

In embodiments, glass-ceramics and glass-ceramic articles may be strengthened to install a compressive stress layer on one or more surfaces thereof and a corresponding central tension in the thickness of the glass-ceramic article. Referring now to FIG. 2 by way of example, an exemplary cross-sectional side view of a strengthened glass-ceramic article 100 is depicted having a first surface 102 and an opposing second surface 104 separated by a thickness (t). In embodiments, the strengthened glass-ceramic article 100 has been ion exchanged and has a compressive stress (CS) layer 106 (or first region) extending from the first surface 102 to a depth of compression (DOC). In embodiments, as shown in FIG. 2, the glass-ceramic article 100 also has a compressive stress (CS) layer 108 extending from the second surface 104 to a depth of compression DOC'. A central tension region 110 having a central tension (CT) is positioned between DOC and DOC'.

In embodiments, the glass-ceramics and glass-ceramic articles are capable of being chemically tempered (also referred to as chemically strengthened) using one or more ion exchange techniques. In these embodiments, ion exchange can occur by subjecting one or more surfaces of such glass-ceramic or glass-ceramic article to one or more ion exchange mediums (for example molten salt baths), having a specific composition and temperature, for a specified time period to impart to the one or more surfaces with compressive stress layer(s). In embodiments, the ion exchange medium is a molten salt bath containing an ion (for example an alkali metal ion) that is larger than an ion (for example an alkali metal ion) present in the glass-ceramic or glass-ceramic article wherein the larger ion from the molten bath is exchanged with the smaller ion in the glass-ceramic article to impart a compressive stress in the glass-ceramic or glass-ceramic article, and thereby increases the strength of the glass-ceramic or glass-ceramic article.

In embodiments, a one-step ion exchange process can be used. In other embodiments, a multi-step ion exchange process (such as a two-step ion exchange process) can be used. In embodiments, for both one-step and multi-step ion exchange processes, the ion exchange mediums (for example, molten baths) can include potassium nitrate ($KNO_3$) and sodium nitrate ($NaNO_3$) as primary components. The ion exchange mediums can, in embodiments, further comprise lithium nitrate ($LiNO_3$), sodium nitrite ($NaNO_2$), and silicic acid.

In embodiments, the ion exchange medium comprises greater than or equal to 2 wt % and less than or equal to 80 wt %, greater than or equal to 2 wt % and less than or equal to 70 wt % $KNO_3$, greater than or equal to 2 wt % and less than or equal to 60 wt % $KNO_3$, greater than or equal to 2 wt % and less than or equal to 50 wt % $KNO_3$, greater than or equal to 2 wt % and less than or equal to 40 wt % $KNO_3$, greater than or equal to 2 wt % and less than or equal to 30 wt % $KNO_3$, greater than or equal to 2 wt % and less than or equal to 20 wt % $KNO_3$, greater than or equal to 2 wt % and less than or equal to 10 wt % $KNO_3$, or greater than or equal to 2 wt % and less than or equal to 10 wt % $KNO_3$. In embodiments, the ion exchange medium comprises greater than or equal to 10 wt % and less than or equal to 30 wt % $KNO_3$, greater than or equal to 15 wt % and less than or equal to 30 wt % $KNO_3$, greater than or equal to 20 wt % and less than or equal to 30 wt % $KNO_3$, greater than or equal to 25 wt % and less than or equal to 30 wt % $KNO_3$, greater than or equal to 10 wt % and less than or equal to 25 wt % $KNO_3$, greater than or equal to 15 wt % and less than or equal to 25 wt % $KNO_3$, greater than or equal to 20 wt % and less than or equal to 25 wt % $KNO_3$, greater than or equal to 10 wt % and less than or equal to 20 wt % $KNO_3$, or greater than or equal to 15 wt % and less than or equal to 20 wt % $KNO_3$. It should be understood that the above ranges include all subranges within the explicitly disclosed ranges.

In embodiments, the ion exchange medium further comprises greater than or equal to 20 wt % and less than or equal to 98 wt % $NaNO_3$, greater than or equal to 20 wt % and less than or equal to 90 wt % $NaNO_3$, greater than or equal to 20 wt % and less than or equal to 80 wt % $NaNO_3$, greater than or equal to 20 wt % and less than or equal to 70 wt % $NaNO_3$, greater than or equal to 20 wt % and less than or equal to 60 wt % $NaNO_3$, greater than or equal to 20 wt % and less than or equal to 50 wt % $NaNO_3$, greater than or equal to 20 wt % and less than or equal to 40 wt % $NaNO_3$, or greater than or equal to 20 wt % and less than or equal to 30 wt % $NaNO_3$. In embodiments, the ion exchange medium further comprises greater than or equal to 70 wt % and less than or equal to 90 wt % $NaNO_3$, greater than or equal to 75 wt % and less than or equal to 90 wt % $NaNO_3$, greater than or equal to 80 wt % and less than or equal to 90 wt % $NaNO_3$, greater than or equal to 70 wt % and less than or equal to 85 wt % $NaNO_3$, greater than or equal to 75 wt % and less than or equal to 85 wt % $NaNO_3$, greater than or equal to 80 wt % and less than or equal to 85 wt % $NaNO_3$, greater than or equal to 70 wt % and less than or equal to 80 wt % $NaNO_3$, or greater than or equal to 75 wt % and less than or equal to 80 wt % $NaNO_3$. It should be understood that the above ranges include all subranges within the explicitly disclosed ranges.

In embodiments, the ion exchange medium comprises greater than or equal to 0.05 wt % and less than or equal to 0.5 wt % $LiNO_3$, greater than or equal to 0.05 wt % and less than or equal to 0.45 wt % $LiNO_3$, greater than or equal to 0.05 wt % and less than or equal to 0.4 wt % $LiNO_3$, greater than or equal to 0.05 wt % and less than or equal to 0.35 wt % $LiNO_3$, greater than or equal to 0.05 wt % and less than or equal to 0.3 wt % $LiNO_3$, greater than or equal to 0.05 wt % and less than or equal to 0.25 wt % $LiNO_3$, or even greater than or equal to 0.05 wt % and less than or equal to 0.2 wt % $LiNO_3$, In embodiments, the ion exchange medium comprises greater than or equal to 0.05 wt % and less than or equal to 0.15 wt % $LiNO_3$, greater than or equal to 0.08 wt % and less than or equal to 0.15 wt % $LiNO_3$, greater than or equal to 0.10 wt % and less than or equal to 0.15 wt % $LiNO_3$, greater than or equal to 0.12 wt % and less than or equal to 0.15 wt % $LiNO_3$, greater than or equal to 0.05 wt % and less than or equal to 0.12 wt % $LiNO_3$, greater than or equal to 0.08 wt % and less than or equal to 0.12 wt % $LiNO_3$, greater than or equal to 0.10 wt % and less than or equal to 0.12 wt % $LiNO_3$, greater than or equal to 0.05 wt % and less than or equal to 0.10 wt % $LiNO_3$, greater than or equal to 0.08 wt % and less than or equal to 0.10 wt % $LiNO_3$, or greater than or equal to 0.05 wt % and less than or equal to 0.08 wt % $LiNO_3$. It should be understood that the above ranges include all subranges within the explicitly disclosed ranges.

In embodiments, the ion exchange medium may further comprise greater than or equal to 0.40 wt % and less than or equal to 0.60 wt % silicic acid, greater than or equal to 0.45 wt % and less than or equal to 0.60 wt % silicic acid, greater than or equal to 0.50 wt % and less than or equal to 0.60 wt % silicic acid, greater than or equal to 0.55 wt % and less than or equal to 0.60 wt % silicic acid, greater than or equal to 0.40 wt % and less than or equal to 0.55 wt % silicic acid, greater than or equal to 0.45 wt % and less than or equal to 0.55 wt % silicic acid, greater than or equal to 0.50 wt % and less than or equal to 0.55 wt % silicic acid, greater than or equal to 0.40 wt % and less than or equal to 0.50 wt % silicic acid, greater than or equal to 0.45 wt % and less than or equal to 0.50 wt % silicic acid, or greater than or equal to 0.40 wt % and less than or equal to 0.45 wt %. It should be understood that the above ranges include all subranges within the explicitly disclosed ranges.

The temperature of the ion exchange medium is, in embodiments, greater than or equal to 430° C. and less than or equal to 550° C., greater than or equal to 450° C. and less than or equal to 550° C., greater than or equal to 475° C. and less than or equal to 550° C., greater than or equal to 500° C. and less than or equal to 550° C., greater than or equal to 525° C. and less than or equal to 550° C., greater than or equal to 530° C. and less than or equal to 550° C., greater than or equal to 430° C. and less than or equal to 530° C., greater than or equal to 450° C. and less than or equal to 530° C., greater than or equal to 475° C. and less than or equal to 530° C., greater than or equal to 500° C. and less than or equal to 530° C., greater than or equal to 525° C. and less than or equal to 530° C., greater than or equal to 430° C. and less than or equal to 525° C., greater than or equal to 450° C. and less than or equal to 525° C., greater than or equal to 475° C. and less than or equal to 525° C., greater than or equal to 500° C. and less than or equal to 525° C., greater than or equal to 430° C. and less than or equal to 500° C., greater than or equal to 450° C. and less than or equal to 500° C., greater than or equal to 475° C. and less than or equal to 500° C., or greater than or equal to 450° C. and less than or equal to 475° C. It should be understood that the above ranges include all subranges within the explicitly disclosed ranges.

According to embodiments, the glass-ceramic or glass-ceramic article is contacted with the ion exchange medium for a duration that is greater than or equal to 1 hour and less than or equal to 16 hours, greater than or equal to 2 hour and less than or equal to 16 hours, greater than or equal to 4 hour and less than or equal to 16 hours, greater than or equal to 6 hour and less than or equal to 16 hours, greater than or equal to 8 hour and less than or equal to 16 hours, greater than or equal to 10 hour and less than or equal to 16 hours, greater than or equal to 12 hour and less than or equal to 16 hours, greater than or equal to 14 hour and less than or equal to 16 hours, greater than or equal to 1 hour and less than or equal to 14 hours, greater than or equal to 2 hour and less than or equal to 14 hours, greater than or equal to 4 hour and less than or equal to 14 hours, greater than or equal to 6 hour and less than or equal to 14 hours, greater than or equal to 8 hour and less than or equal to 14 hours, greater than or equal to 10 hour and less than or equal to 14 hours, greater than or equal to 12 hour and less than or equal to 14 hours, greater than or equal to 1 hour and less than or equal to 12 hours, greater than or equal to 2 hour and less than or equal to 12 hours, greater than or equal to 4 hour and less than or equal to 12 hours, greater than or equal to 6 hour and less than or equal to 12 hours, greater than or equal to 8 hour and less than or equal to 12 hours, greater than or equal to 10 hour and less than or equal to 12 hours, greater than or equal to 1 hour and less than or equal to 10 hours, greater than or equal to 2 hour and less than or equal to 10 hours, greater than or equal to 4 hour and less than or equal to 10 hours, greater than or equal to 6 hour and less than or equal to 10 hours, greater than or equal to 8 hour and less than or equal to 10 hours, greater than or equal to 1 hour and less than or equal to 8 hours, greater than or equal to 2 hour and less than or equal to 8 hours, greater than or equal to 4 hour and less than or equal to 8 hours, greater than or equal to 6 hour and less than or equal to 8 hours, greater than or equal to 1 hour and less than or equal to 6 hours, greater than or equal to 2 hour and less than or equal to 6 hours, greater than or equal to 4 hour and less than or equal to 6 hours, greater than or equal to 1 hour and less than or equal to 4 hours, greater than or equal to 2 hour and less than or equal to 4 hours, or greater than or equal to 1 hour and less than or equal to 2 hours. It should be understood that the above ranges include all subranges within the explicitly disclosed ranges.

After an ion exchange process is performed, it should be understood that a composition at the surface of the glass-ceramic may be different from the composition of the as-formed glass-ceramic (i.e., the glass-ceramic before it undergoes an ion exchange process). This results from one type of alkali metal ion in the as-formed glass-ceramic, such as, for example $Li^+$ or $Na^+$, being replaced with larger alkali metal ions, such as, for example $Na^+$ or $K^+$, respectively. However, the composition of the glass-ceramic at or near the center of the depth of the glass-ceramic will still, in embodiments, have the composition of the as-formed glass-ceramic. As utilized herein, the center of the glass-ceramic article refers to any location in the glass-ceramic article that is a distance of at least 0.5t from every surface thereof, where t is the thickness of the glass-ceramic or glass-ceramic article.

The mechanical properties of the glass-ceramics disclosed herein are tested on strengthened glass-ceramic articles unless otherwise indicated. By forming a glass-ceramic having a composition as disclosed and described herein, using the heat treatments and chemical strengthening as disclosed and described herein, glass-ceramics with phase assemblages that provide low haze and improved mechanical properties (as described in detail below) can be achieved. Even though described in separate paragraphs below, the various mechanical properties are present in combination in glass-ceramics of embodiments. The balance of these mechanical properties provide a durable, robust glass-ceramic that is difficult to achieve without sacrificing other mechanical properties. For instance, and as an example only, achieving high compressive stress alone is possible, but achieving high compressive stress and central tension can be more difficult.

In embodiments, the depths of compression from each surface, DOC and DOC', are individually greater than or equal to 0.09t and less than or equal to 0.30t, greater than or equal to 0.10t and less than or equal to 0.30t, greater than or equal to 0.11t and less than or equal to 0.30t, greater than or equal to 0.12t and less than or equal to 0.30t, greater than or equal to 0.13t and less than or equal to 0.30t, greater than or equal to 0.14t and less than or equal to 0.30t, greater than or equal to 0.15t and less than or equal to 0.30t, greater than or equal to 0.16t and less than or equal to 0.30t, greater than or equal to 0.17t and less than or equal to 0.30t, greater than or equal to 0.18t and less than or equal to 0.30t, greater than or equal to 0.19t and less than or equal to 0.30t, greater than or equal to 0.20t and less than or equal to 0.30t, greater than or equal to 0.21t and less than or equal to 0.30t, greater than or equal to 0.22t and less than or equal to 0.30t, greater than or equal to 0.23t and less than or equal to 0.30t, greater than or equal to 0.24t and less than or equal to 0.30t, greater than or equal to 0.09t and less than or equal to 0.25t, greater than or equal to 0.10t and less than or equal to 0.25t, greater than or equal to 0.11t and less than or equal to 0.25t, greater than or equal to 0.12t and less than or equal to 0.25t, greater than or equal to 0.13t and less than or equal to 0.25t, greater than or equal to 0.14t and less than or equal to 0.25t, greater than or equal to 0.15t and less than or equal to 0.25t, greater than or equal to 0.16t and less than or equal to 0.25t, greater than or equal to 0.17t and less than or equal to 0.25t, greater than or equal to 0.18t and less than or equal to 0.25t, greater than or equal to 0.19t and less than or equal to 0.25t, greater than or equal to 0.20t and less than or equal to 0.25t, greater than or equal to 0.21t and less than or equal to 0.25t, greater than or equal to 0.22t and less than or equal to 0.25t, greater than or equal to 0.23t and less than or equal to 0.25t, greater than or equal to 0.24t and less than or equal to 0.25t, greater than or equal to 0.09t and less than or equal to 0.24t, greater than or equal to 0.10t and less than or equal to 0.24t, greater than or equal to 0.11t and less than or equal to 0.24t, greater than or equal to 0.12t and less than or equal to 0.24t, greater than or equal to 0.13t and less than or equal to 0.24t, greater than or equal to 0.14t and less than or equal to 0.24t, greater than or equal to 0.15t and less than or equal to 0.24t, greater than or equal to 0.16t and less than or equal to 0.24t, greater than or equal to 0.17 and less than or equal to 0.24t, greater than or equal to 0.18t and less than or equal to 0.24t, greater than or equal to 0.19t and less than or equal to 0.24t, greater than or equal to 0.20t and less than or equal to 0.24t, greater than or equal to 0.21t and less than or equal to 0.24t, greater than or equal to 0.22t and less than or equal to 0.24t, greater than or equal to 0.23t and less than or equal to 0.24t, greater than or equal to 0.09t and less than or equal to 0.23t, greater than or equal to 0.10t and less than or equal to 0.23t, greater than or equal to 0.11t and less than or equal to 0.23t, greater than or equal to 0.12t and less than or equal to 0.23t, greater than or equal to 0.13t and less than or equal to 0.23t, greater than or equal to 0.14t and less than or equal to 0.23t, greater than or equal to 0.15t and less than or equal to 0.23t, greater than or equal to 0.16t and less than or equal to 0.23t, greater than or equal to 0.17t and less than or equal to 0.23t, greater than or equal to 0.18t and less than or equal to 0.23t, greater than or equal to 0.19t and less than or equal to 0.23t, greater than or equal to 0.20t and less than or equal to 0.23t, greater than or equal to 0.21t and less than or equal to 0.23t, greater than or equal to 0.22t and less than or equal to 0.23t, greater than or equal to 0.09t and less than or equal to 0.22t, greater than or equal to 0.10t and less than or equal to 0.22t, greater than or equal to 0.11t and less than or equal to 0.22t, greater than or equal to 0.12t and less than or equal to 0.22t, greater than or equal to 0.13t and less than or equal to 0.22t, greater than or equal to 0.14t and less than or equal to 0.22t, greater than or equal to 0.15t and less than or equal to 0.22t, greater than or equal to 0.16t and less than or equal to 0.22t, greater than or equal to 0.17t and less than or equal to 0.22t, greater than or equal to 0.18t and less than or equal to 0.22t, greater than or equal to 0.19t and less than or equal to 0.22t, greater than or equal to 0.20t and less than or equal to 0.22t, greater than or equal to 0.21t and less than or equal to 0.22t, greater than or equal to 0.09t and less than or equal to 0.21t, greater than or equal to 0.10t and less than or equal to 0.21t, greater than or equal to 0.11t and less than or equal to 0.21t, greater than or equal to 0.12t and less than or equal to 0.21t, greater than or equal to 0.13t and less than or equal to 0.21t, greater than or equal to 0.14t and less than or equal to 0.21t, greater than or equal to 0.15t and less than or equal to 0.21t, greater than or equal to 0.16t and less than or equal to 0.21t, greater than or equal to 0.17t and less than or equal to 0.21t, greater than or equal to 0.18t and less than or equal to 0.21t, greater than or equal to 0.19t and less than or equal to 0.21t, greater than or equal to 0.20t and less than or equal to 0.21t, greater than or equal to 0.09t and less than or equal to 0.20t, greater than or equal to 0.10t and less than or equal to 0.20t, greater than or equal to 0.11t and less than or equal to 0.20t, greater than or equal to 0.12t and less than or equal to 0.20t, greater than or equal to 0.13t and less than or equal to 0.20t, greater than or equal to 0.14t and less than or equal to 0.20t, greater than or equal to 0.15t and less than or equal to 0.20t, greater than or equal to 0.16t and less than or equal to 0.20t, greater than or equal to 0.17t and less than or equal to 0.20t, greater than or equal to 0.18t and less than or equal to 0.20t, greater than or equal to 0.19t and less than or equal to 0.20t, greater than or equal to 0.09t and less than or equal to 0.19t, greater than or equal to 0.10t and less than or equal to 0.19t, greater than or equal to 0.11t and less than or equal to 0.19t, greater than or equal to 0.12t and less than or equal to 0.19t, greater than or equal to 0.13t and less than or equal to 0.19t, greater than or equal to 0.14t and less than or equal to 0.19t, greater than or equal to 0.15t and less than or equal to 0.19t, greater than or equal to 0.16t and less than or equal to 0.19t, greater than or equal to 0.17t and less than or equal to 0.19t, greater than or equal to 0.18t and less than or equal to 0.19t, greater than or equal to 0.09t and less than or equal to 0.18t, greater than or equal to 0.10t and less than or equal to 0.18t, greater than or equal to 0.11t and less than or equal to 0.18t, greater than or equal to 0.12t and less than or equal to 0.18t, greater than or equal to 0.13t and less than or equal to 0.18t, greater than or equal to 0.14t and less than or equal to 0.18t, greater than or equal to 0.15t and less than or equal to 0.18t, greater than or equal to 0.16t and less than or equal to 0.18t, greater than or equal to 0.17t and less than or equal to 0.18t, greater than or equal to 0.09t and less than or equal to 0.17t, greater than or equal to 0.10t and less than or equal to 0.17t, greater than or equal to 0.11t and less than or equal to 0.17t, greater than or equal to 0.12t and less than or equal to 0.17t, greater than or equal to 0.13t and less than or equal to 0.17t, greater than or equal to 0.14t and less than or equal to 0.17t, greater than or equal to 0.15t and less than or equal to 0.17t, greater than or equal to 0.16t and less than or equal to 0.17t, greater than or equal to 0.09t and less than or equal to 0.16t, greater than or equal to 0.10t and less than or equal to 0.16t, greater than or equal to 0.11t and less than or equal to 0.16t, greater than or equal to 0.12t and less than or equal to 0.16t, greater than or equal to 0.13t and less than or equal to 0.16t, greater than or equal to 0.14t and less than or equal to 0.16t, or greater than or equal to 0.15t and less than or equal to 0.16t, where t is the thickness of the glass-ceramic article.

Still referring to FIG. 2 and as noted herein, there is also a central tension region 110 having a central tension (CT) between DOC and DOC'. Accordingly, stress transitions from compressive stress to tensile stress at DOC and DOC', which are described hereinabove, measured from a surface toward a centerline of the strengthened glass-ceramic article.

In embodiments, the glass-ceramic articles may have a surface compressive stress (CS) of greater than or equal to 200 MPa and less than or equal to 650 MPa, such as greater than or equal to 225 MPa and less than or equal to 650 MPa, greater than or equal to 250 MPa and less than or equal to 650 MPa, greater than or equal to 275 MPa and less than or equal to 650 MPa, greater than or equal to 300 MPa and less than or equal to 650 MPa, greater than or equal to 325 MPa and less than or equal to 650 MPa, greater than or equal to 350 MPa and less than or equal to 650 MPa, greater than or equal to 375 MPa and less than or equal to 650 MPa, greater than or equal to 400 MPa and less than or equal to 650 MPa, greater than or equal to 425 MPa and less than or equal to 650 MPa, greater than or equal to 450 MPa and less than or equal to 650 MPa, greater than or equal to 475 MPa and less than or equal to 650 MPa, greater than or equal to 500 MPa and less than or equal to 650 MPa, greater than or equal to 525 MPa and less than or equal to 650 MPa, greater than or equal to 550 MPa and less than or equal to 650 MPa, greater than or equal to 575 MPa and less than or equal to 650 MPa, greater than or equal to 600 MPa and less than or equal to 650 MPa, greater than or equal to 625 MPa and less than or equal to 650 MPa, greater than or equal to 200 MPa and less than or equal to 600 MPa, such as greater than or equal to 225 MPa and less than or equal to 600 MPa, greater than or equal to 250 MPa and less than or equal to 600 MPa, greater than or equal to 275 MPa and less than or equal to 600 MPa, greater than or equal to 300 MPa and less than or equal to 600 MPa, greater than or equal to 325 MPa and less than or equal to 600 MPa, greater than or equal to 350 MPa and less than or equal to 600 MPa, greater than or equal to 375 MPa and less than or equal to 600 MPa, greater than or equal to 400 MPa and less than or equal to 600 MPa, greater than or equal to 425 MPa and less than or equal to 600 MPa, greater than or equal to 450 MPa and less than or equal to 600 MPa, greater than or equal to 475 MPa and less than or equal to 600 MPa, greater than or equal to 500 MPa and less than or equal to 600 MPa, greater than or equal to 525 MPa and less than or equal to 600 MPa, greater than or equal to 550 MPa and less than or equal to 600 MPa, greater than or equal to 575 MPa and less than or equal to 600 MPa, greater than or equal to 200 MPa and less than or equal to 550 MPa, such as greater than or equal to 225 MPa and less than or equal to 550 MPa, greater than or equal to 250 MPa and less than or equal to 550 MPa, greater than or equal to 275 MPa and less than or equal to 550 MPa, greater than or equal to 300 MPa and less than or equal to 550 MPa, greater than or equal to 325 MPa and less than or equal to 550 MPa, greater than or equal to 350 MPa and less than or equal to 550 MPa, greater than or equal to 375 MPa and less than or equal to 550 MPa, greater than or equal to 400 MPa and less than or equal to 550 MPa, greater than or equal to 425 MPa and less than or equal to 550 MPa, greater than or equal to 450 MPa and less than or equal to 550 MPa, greater than or equal to 475 MPa and less than or equal to 550 MPa, greater than or equal to 500 MPa and less than or equal to 550 MPa, greater than or equal to 525 MPa and less than or equal to 550 MPa, greater than or equal to 200 MPa and less than or equal to 500 MPa, such as greater than or equal to 225 MPa and less than or equal to 500 MPa, greater than or equal to 250 MPa and less than or equal to 500 MPa, greater than or equal to 275 MPa and less than or equal to 500 MPa, greater than or equal to 300 MPa and less than or equal to 500 MPa, greater than or equal to 325 MPa and less than or equal to 500 MPa, greater than or equal to 350 MPa and less than or equal to 500 MPa, greater than or equal to 375 MPa and less than or equal to 500 MPa, greater than or equal to 400 MPa and less than or equal to 500 MPa, greater than or equal to 425 MPa and less than or equal to 500 MPa, greater than or equal to 450 MPa and less than or equal to 500 MPa, greater than or equal to 475 MPa and less than or equal to 500 MPa, greater than or equal to 200 MPa and less than or equal to 475 MPa, such as greater than or equal to 225 MPa and less than or equal to 475 MPa, greater than or equal to 250 MPa and less than or equal to 475 MPa, greater than or equal to 275 MPa and less than or equal to 475 MPa, greater than or equal to 300 MPa and less than or equal to 475 MPa, greater than or equal to 325 MPa and less than or equal to 475 MPa, greater than or equal to 350 MPa and less than or equal to 475 MPa, greater than or equal to 375 MPa and less than or equal to 475 MPa, greater than or equal to 400 MPa and less than or equal to 475 MPa, greater than or equal to 425 MPa and less than or equal to 475 MPa, greater than or equal to 450 MPa and less than or equal to 475 MPa, greater than or equal to 200 MPa and less than or equal to 450 MPa, such as greater than or equal to 225 MPa and less than or equal to 450 MPa, greater than or equal to 250 MPa and less than or equal to 450 MPa, greater than or equal to 275 MPa and less than or equal to 450 MPa, greater than or equal to 300 MPa and less than or equal to 450 MPa, greater than or equal to 325 MPa and less than or equal to 450 MPa, greater than or equal to 350 MPa and less than or equal to 450 MPa, greater than or equal to 375 MPa and less than or equal to 450 MPa, greater than or equal to 400 MPa and less than or equal to 450 MPa, greater than or equal to 425 MPa and less than or equal to 450 MPa, greater than or equal to 200 MPa and less than or equal to 425 MPa, such as greater than or equal to 225 MPa and less than or equal to 425 MPa, greater than or equal to 250 MPa and less than or equal to 425 MPa, greater than or equal to 275 MPa and less than or equal to 425 MPa, greater than or equal to 300 MPa and less than or equal to 425 MPa, greater than or equal to 325 MPa and less than or equal to 425 MPa, greater than or equal to 350 MPa and less than or equal to 425 MPa, greater than or equal to 375 MPa and less than or equal to 425 MPa, greater than or equal to 400 MPa and less than or equal to 425 MPa, greater than or equal to 200 MPa and less than or equal to 400 MPa, such as greater than or equal to 225 MPa and less than or equal to 400 MPa, greater than or equal to 250 MPa and less than or equal to 400 MPa, greater than or equal to 275 MPa and less than or equal to 400 MPa, greater than or equal to 300 MPa and less than or equal to 400 MPa, greater than or equal to 325 MPa and less than or equal to 400 MPa, greater than or equal to 350 MPa and less than or equal to 400 MPa, greater than or equal to 375 MPa and less than or equal to 400 MPa, greater than or equal to 200 MPa and less than or equal to 375 MPa, greater than or equal to 225 MPa and less than or equal to 375 MPa, greater than or equal to 250 MPa and less than or equal to 375 MPa, greater than or equal to 275 MPa and less than or equal to 375 MPa, greater than or equal to 300 MPa and less than or equal to 375 MPa, greater than or equal to 325 MPa and less than or equal to 375 MPa, greater than or equal to 350 MPa and less than or equal to 375 MPa, greater than or equal to 200 MPa and less than or equal to 350 MPa, greater than or equal to 225 MPa and less than or equal to 350 MPa, greater than or equal to 250 MPa and less than or equal to 350 MPa, greater than or equal to 275 MPa and less than or equal to 350 MPa, greater than or equal to 300 MPa and less than or equal to 350 MPa, greater than or equal to 325 MPa and less than or equal to 350 MPa, greater than or equal to 200 MPa and less than or equal to 325 MPa, greater than or equal to 225 MPa and less than or equal to 325 MPa, greater than or equal to 250 MPa and less than or equal to 325 MPa, greater than or equal to 275 MPa and less than or equal to 325 MPa, greater than or equal to 300 MPa and less than or equal to 325 MPa, greater than or equal to 200 MPa and less than or equal to 300 MPa, greater than or equal to 225 MPa and less than or equal to 300 MPa, greater than or equal to 250 MPa and less than or equal to 300 MPa, greater than or equal to 275 MPa and less than or equal to 300 MPa, greater than or equal to 200 MPa and less than or equal to 275 MPa, greater than or equal to 225 MPa and less than or equal to 275 MPa, greater than or equal to 250 MPa and less than or equal to 275 MPa, greater than or equal to 200 MPa and less than or equal to 250 MPa, greater than or equal to 225 MPa and less than or equal to 250 MPa, or greater than or equal to 200 MPa and less than or equal to 225 MPa. It should be understood that the above ranges include all subranges within the explicitly disclosed ranges.

In embodiments, the glass-ceramic articles may have a compressive stress $CS_D$ at a depth from 0.01t to 0.02t (where "t" is the thickness of the glass ceramic article) from the surface of the glass-ceramic article of greater than or equal to 300 MPa, greater than or equal to 305 MPa, greater than or equal to 310 MPa, greater than or equal to 315 MPa, greater than or equal to 320 MPa, greater than or equal to 325 MPa, greater than or equal to 330 MPa, greater than or equal to 335 MPa, greater than or equal to 340 MPa, or even greater than or equal to 345 MPa. In embodiments, the glass-ceramic articles may have a compressive stress $CS_D$ at a depth from 0.01t to 0.02t (where "t" is the thickness of the glass ceramic article) from the surface of the glass-ceramic article of greater than or equal to 300 MPa and less than or equal to 500 MPa, greater than or equal to 305 MPa and less than or equal to 500 MPa, greater than or equal to 310 MPa and less than or equal to 500 MPa, greater than or equal to 315 MPa and less than or equal to 500 MPa, greater than or equal to 320 MPa and less than or equal to 500 MPa, greater than or equal to 325 MPa and less than or equal to 500 MPa, greater than or equal to 330 MPa and less than or equal to 500 MPa, greater than or equal to 335 MPa and less than or equal to 500 MPa, greater than or equal to 340 MPa and less than or equal to 500 MPa, or even greater than or equal to 345 MPa and less than or equal to 500 MPa. It should be understood that the above ranges include all subranges within the explicitly disclosed ranges.

In embodiments, the maximum central tension (mCT) is greater than or equal to 130 MPa, greater than or equal to 140 MPa, greater than or equal to 150 MPa, greater than or equal to 160 MPa, greater than or equal to 170 MPa, greater than or equal to 180 MPa, greater than or equal to 190 MPa, greater than or equal to 200 MPa, greater than or equal to 210 MPa, greater than or equal to 220 MPa, greater than or equal to 230 MPa, greater than or equal to 240 MPa, greater than or equal to 250 MPa, greater than or equal to 260 MPa, greater than or equal to 270 MPa, greater than or equal to 280 MPa, greater than or equal to 290 MPa, or even greater than or equal to 300 MPa. In embodiments, the maximum central tension is greater than or equal to 130 MPa and less than or equal to 300 MPa, greater than or equal to 140 MPa and less than or equal to 300 MPa, greater than or equal to 150 MPa and less than or equal to 300 MPa, greater than or equal to 160 MPa and less than or equal to 300 MPa, greater than or equal to 170 MPa and less than or equal to 300 MPa, greater than or equal to 180 MPa and less than or equal to 300 MPa, greater than or equal to 190 MPa and less than or equal to 300 MPa, greater than or equal to 200 MPa and less than or equal to 300 MPa, greater than or equal to 210 MPa and less than or equal to 300 MPa, greater than or equal to 220 MPa and less than or equal to 300 MPa, 230 MPa and less than or equal to 300 MPa, greater than or equal to 240 MPa and less than or equal to 300 MPa, greater than or equal to 250 MPa and less than or equal to 300 MPa, greater than or equal to 260 MPa and less than or equal to 300 MPa, greater than or equal to 270 MPa and less than or equal to 300 MPa, greater than or equal to 280 MPa and less than or equal to 300 MPa, greater than or equal to 290 MPa and less than or equal to 300 MPa, greater than or equal to 130 MPa and less than or equal to 290 MPa, greater than or equal to 140 MPa and less than or equal to 290 MPa, greater than or equal to 150 MPa and less than or equal to 290 MPa, greater than or equal to 160 MPa and less than or equal to 290 MPa, greater than or equal to 170 MPa and less than or equal to 290 MPa, greater than or equal to 180 MPa and less than or equal to 290 MPa, greater than or equal to 190 MPa and less than or equal to 290 MPa, greater than or equal to 200 MPa and less than or equal to 290 MPa, greater than or equal to 210 MPa and less than or equal to 290 MPa, greater than or equal to 220 MPa and less than or equal to 290 MPa, 230 MPa and less than or equal to 290 MPa, greater than or equal to 240 MPa and less than or equal to 290 MPa, greater than or equal to 250 MPa and less than or equal to 290 MPa, greater than or equal to 260 MPa and less than or equal to 290 MPa, greater than or equal to 270 MPa and less than or equal to 290 MPa, greater than or equal to 280 MPa and less than or equal to 290 MPa, greater than or equal to 130 MPa and less than or equal to 280 MPa, greater than or equal to 140 MPa and less than or equal to 280 MPa, greater than or equal to 150 MPa and less than or equal to 280 MPa, greater than or equal to 160 MPa and less than or equal to 280 MPa, greater than or equal to 170 MPa and less than or equal to 280 MPa, greater than or equal to 180 MPa and less than or equal to 280 MPa, greater than or equal to 190 MPa and less than or equal to 280 MPa, greater than or equal to 200 MPa and less than or equal to 280 MPa, greater than or equal to 210 MPa and less than or equal to 280 MPa, greater than or equal to 220 MPa and less than or equal to 280 MPa, 230 MPa and less than or equal to 280 MPa, greater than or equal to 240 MPa and less than or equal to 280 MPa, greater than or equal to 250 MPa and less than or equal to 280 MPa, greater than or equal to 260 MPa and less than or equal to 280 MPa, greater than or equal to 270 MPa and less than or equal to 280 MPa, greater than or equal to 130 MPa and less than or equal to 270 MPa, greater than or equal to 140 MPa and less than or equal to 270 MPa, greater than or equal to 150 MPa and less than or equal to 270 MPa, greater than or equal to 160 MPa and less than or equal to 270 MPa, greater than or equal to 170 MPa and less than or equal to 270 MPa, greater than or equal to 180 MPa and less than or equal to 270 MPa, greater than or equal to 190 MPa and less than or equal to 270 MPa, greater than or equal to 200 MPa and less than or equal to 270 MPa, greater than or equal to 210 MPa and less than or equal to 270 MPa, greater than or equal to 220 MPa and less than or equal to 270 MPa, 230 MPa and less than or equal to 270 MPa, greater than or equal to 240 MPa and less than or equal to 270 MPa, greater than or equal to 250 MPa and less than or equal to 270 MPa, greater than or equal to 260 MPa and less than or equal to 270 MPa, greater than or equal to 130 MPa and less than or equal to 260 MPa, greater than or equal to 140 MPa and less than or equal to 260 MPa, greater than or equal to 150 MPa and less than or equal to 260 MPa, greater than or equal to 160 MPa and less than or equal to 260 MPa, greater than or equal to 170 MPa and less than or equal to 260 MPa, greater than or equal to 180 MPa and less than or equal to 260 MPa, greater than or equal to 190 MPa and less than or equal to 260 MPa, greater than or equal to 200 MPa and less than or equal to 260 MPa, greater than or equal to 210 MPa and less than or equal to 260 MPa, greater than or equal to 220 MPa and less than or equal to 260 MPa, 230 MPa and less than or equal to 260 MPa, greater than or equal to 240 MPa and less than or equal to 260 MPa, greater than or equal to 250 MPa and less than or equal to 260 MPa, greater than or equal to 130 MPa and less than or equal to 250 MPa, greater than or equal to 140 MPa and less than or equal to 250 MPa, greater than or equal to 150 MPa and less than or equal to 250 MPa, greater than or equal to 160 MPa and less than or equal to 250 MPa, greater than or equal to 170 MPa and less than or equal to 250 MPa, greater than or equal to 180 MPa and less than or equal to 250 MPa, greater than or equal to 190 MPa and less than or equal to 250 MPa, greater than or equal to 200 MPa and less than or equal to 250 MPa, greater than or equal to 210 MPa and less than or equal to 250 MPa, greater than or equal to 220 MPa and less than or equal to 250 MPa, 230 MPa and less than or equal to 250 MPa, greater than or equal to 240 MPa and less than or equal to 250 MPa, greater than or equal to 130 MPa and less than or equal to 240 MPa, greater than or equal to 140 MPa and less than or equal to 240 MPa, greater than or equal to 150 MPa and less than or equal to 240 MPa, greater than or equal to 160 MPa and less than or equal to 240 MPa, greater than or equal to 170 MPa and less than or equal to 240 MPa, greater than or equal to 180 MPa and less than or equal to 240 MPa, greater than or equal to 190 MPa and less than or equal to 240 MPa, greater than or equal to 200 MPa and less than or equal to 240 MPa, greater than or equal to 210 MPa and less than or equal to 240 MPa, greater than or equal to 220 MPa and less than or equal to 240 MPa, 230 MPa and less than or equal to 240 MPa, greater than or equal to 130 MPa and less than or equal to 230 MPa, greater than or equal to 140 MPa and less than or equal to 230 MPa, greater than or equal to 150 MPa and less than or equal to 230 MPa, greater than or equal to 160 MPa and less than or equal to 230 MPa, greater than or equal to 170 MPa and less than or equal to 230 MPa, greater than or equal to 180 MPa and less than or equal to 230 MPa, greater than or equal to 190 MPa and less than or equal to 230 MPa, greater than or equal to 200 MPa and less than or equal to 230 MPa, greater than or equal to 210 MPa and less than or equal to 230 MPa, greater than or equal to 220 MPa and less than or equal to 230 MPa, greater than or equal to 130 MPa and less than or equal to 220 MPa, greater than or equal to 140 MPa and less than or equal to 220 MPa, greater than or equal to 150 MPa and less than or equal to 220 MPa, greater than or equal to 160 MPa and less than or equal to 220 MPa, greater than or equal to 170 MPa and less than or equal to 220 MPa, greater than or equal to 180 MPa and less than or equal to 220 MPa, greater than or equal to 190 MPa and less than or equal to 220 MPa, greater than or equal to 200 MPa and less than or equal to 220 MPa, greater than or equal to 210 MPa and less than or equal to 220 MPa, greater than or equal to 130 MPa and less than or equal to 210 MPa, greater than or equal to 140 MPa and less than or equal to 210 MPa, greater than or equal to 150 MPa and less than or equal to 210 MPa, greater than or equal to 160 MPa and less than or equal to 210 MPa, greater than or equal to 170 MPa and less than or equal to 210 MPa, greater than or equal to 180 MPa and less than or equal to 210 MPa, greater than or equal to 190 MPa and less than or equal to 210 MPa, or even greater than or equal to 200 MPa and less than or equal to 210 MPa. It should be understood that the above ranges include all subranges within the explicitly disclosed ranges.

The relatively high maximum central tension correlates to the glass-ceramics having a relatively high stored strain energy. In embodiments, the stored strain energy of the glass-ceramic article is greater than or equal to 30 $J/m^2$ and less than or equal to 75 $J/m^2$, greater than or equal to 30 $J/m^2$ and less than or equal to 70 $J/m^2$, greater than or equal to 30 $J/m^2$ and less than or equal to 65 $J/m^2$, greater than or equal to 30 $J/m^2$ and less than or equal to 60 $J/m^2$, greater than or equal to 30 $J/m^2$ and less than or equal to 55 $J/m^2$, greater than or equal to 30 $J/m^2$ and less than or equal to 50 $J/m^2$, greater than or equal to 30 $J/m^2$ and less than or equal to 45 $J/m^2$ or even greater than or equal to 30 $J/m^2$ and less than or equal to 40 $J/m^2$. It should be understood that the above ranges include all subranges within the explicitly disclosed ranges.

In embodiments, the Knoop hardness of the non-chemically strengthened (i.e., non-ion exchanged) glass-ceramic article is greater than or equal 650 $kgf/mm^2$ and less than or equal to 700 $kgf/mm^2$, greater than or equal 655 $kgf/mm^2$ and less than or equal to 700 $kgf/mm^2$, greater than or equal 660 $kgf/mm^2$ and less than or equal to 700 $kgf/mm^2$, greater than or equal 665 $kgf/mm^2$ and less than or equal to 700 $kgf/mm^2$, greater than or equal 670 $kgf/mm^2$ and less than or equal to 700 $kgf/mm^2$, or even greater than or equal 675 $kgf/mm^2$ and less than or equal to 700 $kgf/mm^2$. It should be understood that the above ranges include all subranges within the explicitly disclosed ranges.

In embodiments, the Knoop hardness of the chemically strengthened (i.e., ion exchanged) glass-ceramic article is greater than or equal 680 $kgf/mm^2$ and less than or equal to 750 $kgf/mm^2$, greater than or equal 685 $kgf/mm^2$ and less than or equal to 750 $kgf/mm^2$, greater than or equal 690 $kgf/mm^2$ and less than or equal to 750 $kgf/mm^2$, greater than or equal 695 $kgf/mm^2$ and less than or equal to 750 $kgf/mm^2$, greater than or equal 700 $kgf/mm^2$ and less than or equal to 750 $kgf/mm^2$, greater than or equal 705 $kgf/mm^2$ and less than or equal to 750 $kgf/mm^2$, greater than or equal 710 $kgf/mm^2$ and less than or equal to 750 $kgf/mm^2$, greater than or equal 715 $kgf/mm^2$ and less than or equal to 750 $kgf/mm^2$, or even greater than or equal 720 $kgf/mm^2$ and less than or equal to 750 $kgf/mm^2$. It should be understood that the above ranges include all subranges within the explicitly disclosed ranges.

The failure stress was measured in 4-point bending after introducing flaws using $Al_2O_3$ sandpaper of a specified grit utilizing a pendulum impactor apparatus. In particular, damage was introduced using an apparatus comprising a simple pendulum-based test apparatus, where the glass-ceramic article test specimen, such as a glass-ceramic plate, is mounted to a bob of a pendulum, which is then used to cause the test specimen to contact a roughened impact surface. The apparatus is described in detail in U.S. Pat. No. 11,131,611 entitled "Impact Testing Apparatus and Methods," which is hereby incorporated by reference in its entirety. To perform the test, the sample is loaded on a holder affixed to the bob of the pendulum and then pulled backwards from the pendulum equilibrium position and released to make a dynamic impact on the impact surface.

The failure stress of the glass-ceramic articles according to embodiments described herein was measured in 4-point bending on non-ion exchanged and ion exchanged glass-ceramic articles having a thickness t of 0.5 mm after introducing flaws in the glass-ceramic article by the pendulum impactor apparatus described herein. The applied load at failure is converted to a stress (i.e., the failure stress) as described herein. For flaws introduced using 180 grit $Al_2O_3$ sandpaper, the failure stress of non-ion exchanged glass-ceramic articles may be greater than or equal to 110 MPa, greater than or equal to 115 MPa, or even greater than or equal to 120 MPa. In embodiments, for flaws introduced using 180 grit $Al_2O_3$ sandpaper, the failure stress may be greater than or equal to 110 MPa and less than or equal to 200 MPa, greater than or equal to 115 MPa and less than or equal to 200 MPa, or even greater than or equal to 120 MPa and less than or equal to 200 MPa. For flaws introduced using 80 grit $Al_2O_3$ sandpaper, the failure stress of non-ion exchanged glass-ceramic articles may be greater than or equal to 90 MPa, greater than or equal to 100 MPa, or even greater than or equal to 105 MPa. For flaws introduced using 80 grit $Al_2O_3$ sandpaper, the failure stress of non-ion exchanged glass-ceramic articles may be greater than or equal to 90 MPa and less than or equal to 150 MPa, greater than or equal to 100 MPa and less than or equal to 200 MPa, or even greater than or equal to 105 MPa and less than or equal to 150 MPa. For flaws introduced using 30 grit $Al_2O_3$ sandpaper, the failure stress of non-ion exchanged glass-ceramic articles may be greater than or equal to 80 MPa, greater than or equal to 85 MPa, or even greater than or equal to 90 MPa. For flaws introduced using 30 grit $Al_2O_3$ sandpaper, the failure stress of non-ion exchanged glass-ceramic articles may be greater than or equal to 80 MPa and less than or equal to 120 MPa, greater than or equal to 85 MPa and less than or equal to 120 MPa, or even greater than or equal to 90 MPa and less than or equal to 150 MPa. In embodiments, non-ion exchanged glass-ceramic articles may have a failure stress in 4-point bending of greater than or equal to 80 MPa, greater than or equal to 85 MPa, greater than or equal to 90 MPa, greater than or equal to 95 MPa, greater than or equal to 100 MPa, greater than or equal to 110 MPa, greater than or equal to 120 MPa, greater than or equal to 130 MPa, or even greater than or equal to 140 MPa, for flaws introduced using $Al_2O_3$ sandpaper have a grit of greater than or equal to 30. It should be understood that the above ranges include all subranges within the explicitly disclosed ranges.

In the embodiments of the glass-ceramic articles described herein, the glass-ceramic articles may be more resistant to damage introduction such that, upon the introduction of flaws through, for example, the pendulum impactor apparatus described herein, the flaws extend to a shallow depth in the glass-ceramic articles described herein compared to other glass ceramic materials. In embodiments, flaws introduced in non-ion-exchanged glass-ceramic articles with a pendulum impactor apparatus and 180 grit $Al_2O_3$ sandpaper comprise an average flaw depth of less than or equal to 70 μm, less than or equal to 65 μm, less than or equal to 60 μm, less than or equal to 55 μm, or even less than or equal to 50 μm. In embodiments, flaws introduced in non-ion-exchanged glass-ceramic articles with a pendulum impactor apparatus and 80 grit $Al_2O_3$ sandpaper comprise an average flaw depth of less than or equal to 120 μm, less than or equal to 110 μm, less than or equal to 100 μm, less than or equal to 95 μm, or even less than or equal to 90 μm. In embodiments, flaws introduced in non-ion-exchanged glass-ceramic articles with a pendulum impactor apparatus and 30 grit $Al_2O_3$ sandpaper comprise an average flaw depth of less than or equal to 170 μm, less than or equal to 160 μm, less than or equal to 150 μm, less than or equal to 140 μm, or even less than or equal to 130 μm. It should be understood that the above ranges include all subranges within the explicitly disclosed ranges. In these embodiments, it should be understood that the flaws are introduced in the glass-ceramic article utilizing the pendulum impactor apparatus and the specified grit of $Al_2O_3$ sandpaper. Thereafter, the glass-ceramic article is failed in 4-point bending as described herein and images of the fracture surfaces of the glass-ceramic article are captured and analyzed utilizing image analysis software to determine the average depth of the flaws introduced with the pendulum impactor apparatus.

In embodiments, flaws introduced in ion-exchanged glass-ceramic articles with a pendulum impactor apparatus and 80 grit $Al_2O_3$ sandpaper comprise an average flaw depth of less than or equal to 120 μm, less than or equal to 110 μm, less than or equal to 100 μm, less than or equal to 90 μm, or even less than or equal to 80 μm. In these embodiments, it should be understood that the flaws are introduced in the glass-ceramic article utilizing the pendulum impactor apparatus and the specified grit of $Al_2O_3$ sandpaper. Thereafter, the glass-ceramic article is failed in 4-point bending as described herein and images of the fracture surfaces of the glass-ceramic article are captured and analyzed utilizing image analysis software to determine the average depth of the flaws introduced with the pendulum impactor apparatus. In embodiments, ion-exchanged glass ceramics with a thickness t of 0.5 mm may have a fracture stress of greater than or equal to 250 MPa, greater than or equal to 275 MPa, greater than or equal to 300 MPa, greater than or equal to 325 MPa, greater than or equal to 350 MPa, greater than or equal to 375 MPa, greater than or equal to 400 MPa, greater than or equal to 425 MPa, or even greater than or equal to 450 MPa after being impacted with a pendulum impactor apparatus and 80 grit $Al_2O_3$ sandpaper. It should be understood that the above ranges include all subranges within the explicitly disclosed ranges.

In embodiments, the fracture toughness of the non-chemically strengthened glass-ceramic article is greater than or equal to 1.1 MPa√m and less than or equal to 2.0 MPa√m, greater than or equal to 1.2 MPa√m and less than or equal to 2.0 MPa√m, greater than or equal to 1.4 MPa√m and less than or equal to 2.0 MPa√m, greater than or equal to 1.1 MPa√m and less than or equal to 1.8 MPa√m, greater than or equal to 1.2 MPa√m and less than or equal to 1.8 MPa√m, greater than or equal to 1.3 MPa√m and less than or equal to 1.8 MPa√m, greater than or equal to 1.4 MPa√m and less than or equal to 1.8 MPa√m, greater than or equal to 1.1 MPa√m and less than or equal to 1.6 MPa√m, greater than or equal to 1.2 MPa√m and less than or equal to 1.6 MPa√m, greater than or equal to 1.3 MPa√m and less than or equal to 1.6 MPa√m, greater than or equal to 1.4 MPa√m and less than or equal to 1.6 MPa√m, greater than or equal to 1.5 MPa√m and less than or equal to 1.6 MPa√m, greater than or equal to 1.1 MPa√m and less than or equal to 1.5 MPa√m, greater than or equal to 1.2 MPa√m and less than or equal to 1.5 MPa√m, greater than or equal to 1.3 MPa√m and less than or equal to 1.5 MPa√m, greater than or equal to 1.4 MPa√m and less than or equal to 1.5 MPa√m, greater than or equal to 1.1 MPa√m and less than or equal to 1.4 MPa√m, greater than or equal to 1.2 MPa√m and less than or equal to 1.4 MPa√m, greater than or equal to 1.1 MPa√m and less than or equal to 1.3 MPa√m, or even greater than or equal to 1.2 MPa√m and less than or equal to 1.3 MPa√m. It should be understood that the above ranges include all subranges within the explicitly disclosed ranges.

The glass-ceramics described herein are capable of withstanding mechanical insults resulting in flaws in the surface of the glass-ceramic without catastrophic failure (i.e., without fracturing) following strengthening by ion exchange and may maintain a relatively high degree of strength thereafter (i.e., the retained strength is relatively high). For example, in embodiments, the retained strength (also referred to herein as the "failure stress") of the glass-ceramic following damage introduction by the pressurized gas method is greater than or equal to 100 MPa for average flaw depths less than or equal to 150 μm. In embodiments, the retained strength of the glass-ceramic following damage introduction by the pressurized gas method may be greater than or equal to 125 MPa for average flaw depths less than or equal to 150 μm, greater than or equal to 150 MPa for average flaw depths less than or equal to 150 μm, greater than or equal to 175 MPa for average flaw depths less than or equal to 150 μm, greater than or equal to 200 MPa for average flaw depths less than or equal to 150 μm, greater than or equal to 225 MPa for average flaw depths less than or equal to 150 μm, or even greater than or equal to 250 MPa for average flaw depths less than or equal to 150 μm. The retained strength of the glass-ceramic following damage introduction by the pressurized gas method may be greater than or equal to 200 MPa for average flaw depths less than or equal to 100 μm, greater than or equal to 250 MPa for average flaw depths less than or equal to 100 μm, greater than or equal to 275 MPa for average flaw depths less than or equal to 100 μm, greater than or equal to 300 MPa for average flaw depths less than or equal to 100 μm, greater than or equal to 325 MPa for average flaw depths less than or equal to 100 μm, or even greater than or equal to 350 MPa for average flaw depths less than or equal to 100 μm. The retained strength of the glass-ceramic following damage introduction by the pressurized gas method may be greater than or equal to 350 MPa for average flaw depths less than or equal to 50 μm, greater than or equal to 375 MPa for average flaw depths less than or equal to 50 μm, greater than or equal to 400 MPa for average flaw depths less than or equal to 50 μm, or even greater than or equal to 425 MPa for average flaw depths less than or equal to 50 μm. The retained strength of the glass-ceramic following damage introduction by the pressurized gas method may be greater than or equal to 450 MPa for average flaw depths less than or equal to 25 μm, greater than or equal to 475 MPa for average flaw depths less than or equal to 25 μm, or even greater than or equal to 500 MPa for average flaw depths less than or equal to 25 μm. The retained strength of the glass-ceramic following damage introduction by the pressurized gas method may be greater than or equal to 500 MPa for average flaw depths less than or equal to 10 μm, or even greater than or equal to 525 MPa for average flaw depths less than or equal to 10 μm. It should be understood that the above ranges include all subranges within the explicitly disclosed ranges.

The Drop Test Method is used to determine the maximum height (i.e., the drop height) from which the precursor glass or glass-ceramic can be dropped without catastrophic failure. The Drop Test Method involves performing face-drop testing on a puck with a precursor glass or glass-ceramic article attached thereto. The precursor glass or glass-ceramic article to be tested has a thickness similar or equal to the thickness that will be used in a given hand-held consumer electronic device. A puck refers to a structure meant to mimic the size, shape, and weight distribution of a given device, such as a cell phone. Hereinafter, the term "puck," refers to a structure that has a weight of 126.0 grams, a length of 133.1 mm, a width of 68.2 mm, and a height of 9.4 mm.

Figure 18:
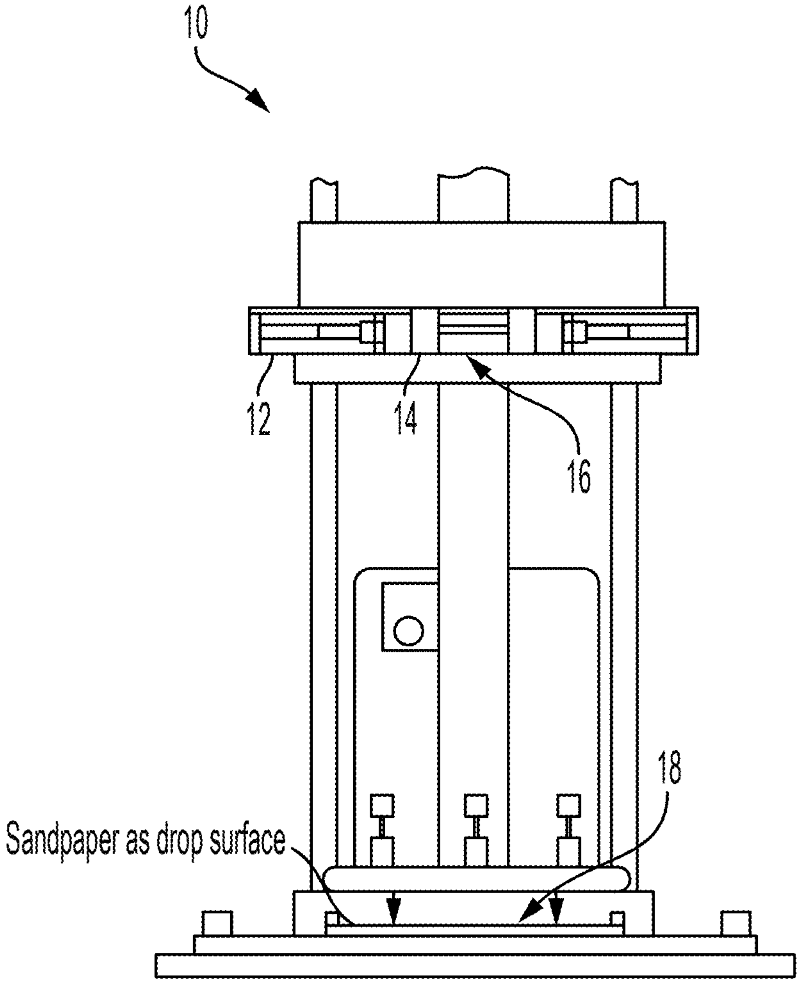
FIG. 18 schematically depicts a drop test apparatus.
Figure 19:
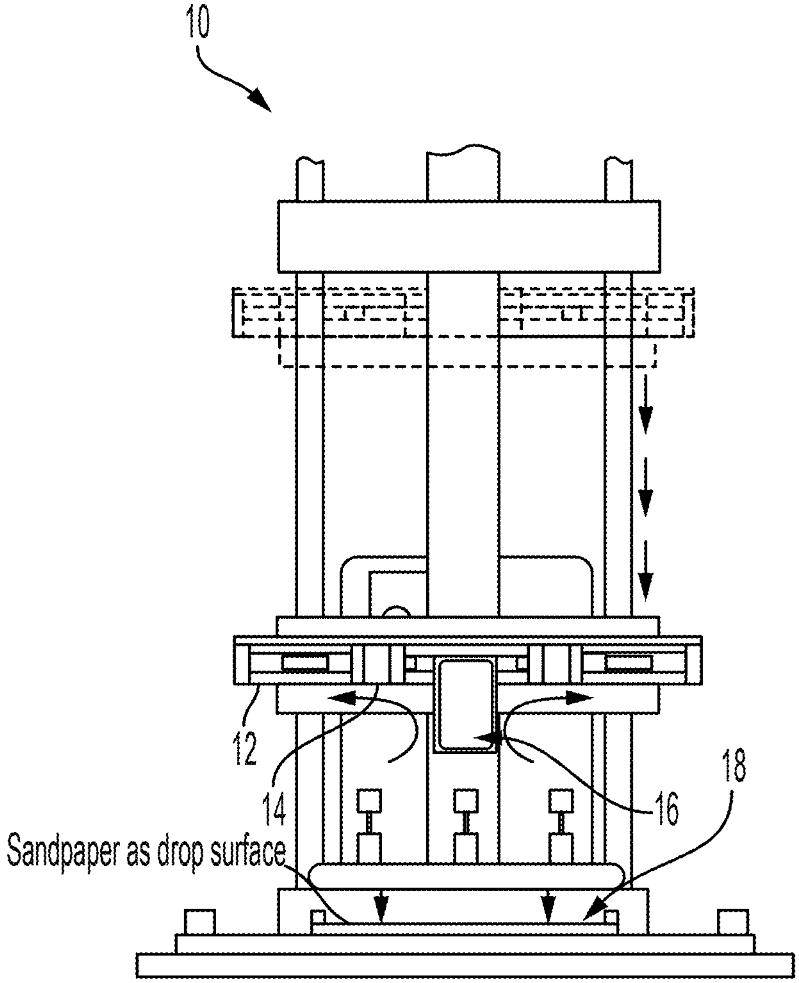
FIG. 19 schematically depicts the drop test apparatus of FIG. 18 in use.
Figure 20:
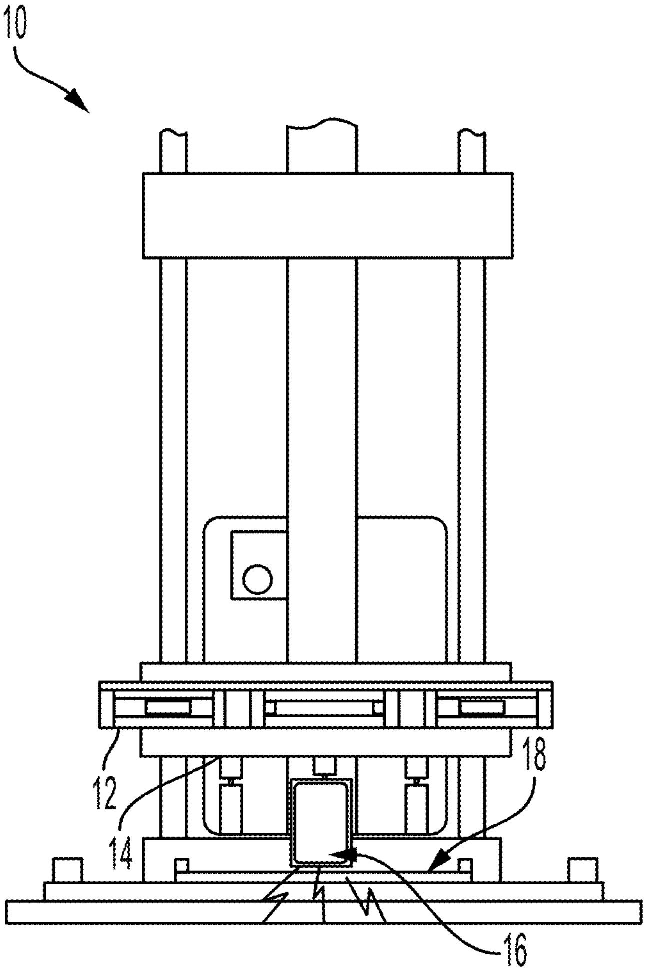
FIG. 20 schematically depicts the drop test apparatus of FIG. 18 in use.

An exemplary device-drop machine that may be used to conduct the Drop Test Method is shown as reference number 10 in FIG. 18. The device-drop machine 10 includes a chuck 12 having chuck jaws 14. The puck 16 is staged in the chuck jaws 14 with the precursor glass article or glass-ceramic article attached thereto and facing downward. The chuck 12 is ready to fall from, for example, an electro-magnetic chuck lifter. Referring now to FIG. 19, the chuck 12 is released and during its fall, the chuck jaws 14 are triggered to open by, for example, a proximity sensor. As the chuck jaws 14 open, the puck 16 is released. Referring now to FIG. 20, the falling puck 16 strikes a drop surface 18. The drop surface 18 may be sandpaper of a specified grit. If the precursor glass or glass-ceramic article attached to the puck survives the fall (i.e., does not crack), the chuck 12 is set at an increased height and the test is repeated. The failure height is then the lowest height from which the puck including the precursor glass or glass-ceramic article is dropped and the precursor glass or glass-ceramic article fails.

In embodiments the drop height of a 0.6 mm thick glass-ceramic article onto 80 grit SiC sandpaper is greater than or equal to 180 cm, greater than or equal to 190 cm, or even greater than or equal to 200 cm. In embodiments the drop height of a 0.6 mm thick glass-ceramic article onto 80 grit SiC sandpaper is greater than or equal to 180 cm and less than or equal to 220 cm, greater than or equal to 190 cm and less than or equal to 220 cm, or even greater than or equal to 200 cm and less than or equal to 220 cm. It should be understood that the above ranges include all subranges within the explicitly disclosed ranges.

In embodiments the drop height of a 0.5 mm thick glass-ceramic article on 80 grit SiC sandpaper is greater than or equal to 130 cm, greater than or equal to 140 cm, greater than or equal to 150 cm, greater than or equal to 160 cm, greater than or equal to 170 cm, greater than or equal to 180 cm, greater than or equal to 190 cm, greater than or equal to 200 cm, greater than or equal to 130 cm, greater than or equal to 140 cm, greater than or equal to 150 cm, greater than or equal to 160 cm, greater than or equal to 170 cm, greater than or equal to 180 cm, greater than or equal to 190 cm, greater than or equal to 200 cm, greater than or equal to 130 cm, greater than or equal to 140 cm, greater than or equal to 150 cm, greater than or equal to 160 cm, greater than or equal to 170 cm, greater than or equal to 180 cm, or even greater than or equal to 190 cm. In embodiments the drop height of a 0.5 mm thick glass-ceramic article on 80 grit SiC sandpaper is greater than or equal to 130 cm and less than or equal to 220 cm, greater than or equal to 140 cm and less than or equal to 220 cm, greater than or equal to 150 cm and less than or equal to 220 cm, greater than or equal to 160 cm and less than or equal to 220 cm, greater than or equal to 170 cm and less than or equal to 220 cm, greater than or equal to 180 cm and less than or equal to 220 cm, greater than or equal to 190 cm and less than or equal to 220 cm, greater than or equal to 200 cm and less than or equal to 220 cm, greater than or equal to 130 cm and less than or equal to 210 cm, greater than or equal to 140 cm and less than or equal to 210 cm, greater than or equal to 150 cm and less than or equal to 210 cm, greater than or equal to 160 cm and less than or equal to 210 cm, greater than or equal to 170 cm and less than or equal to 210 cm, greater than or equal to 180 cm and less than or equal to 210 cm, greater than or equal to 190 cm and less than or equal to 210 cm, greater than or equal to 200 cm and less than or equal to 210 cm, greater than or equal to 130 cm and less than or equal to 200 cm, greater than or equal to 140 cm and less than or equal to 200 cm, greater than or equal to 150 cm and less than or equal to 200 cm, greater than or equal to 160 cm and less than or equal to 200 cm, greater than or equal to 170 cm and less than or equal to 200 cm, greater than or equal to 180 cm and less than or equal to 200 cm, or even greater than or equal to 190 cm and less than or equal to 200 cm. It should be understood that the above ranges include all subranges within the explicitly disclosed ranges.

In embodiments the drop height of a 0.55 mm thick glass-ceramic article on 80 grit SiC sandpaper is greater than or equal to 160 cm, greater than or equal to 170 cm, greater than or equal to 180 cm, greater than or equal to 190 cm, greater than or equal to 200 cm, greater than or equal to 160 cm, greater than or equal to 170 cm, greater than or equal to 180 cm, greater than or equal to 190 cm, greater than or equal to 200 cm, greater than or equal to 160 cm, greater than or equal to 170 cm, greater than or equal to 180 cm, or even greater than or equal to 190 cm. In embodiments the drop height of a 0.55 mm thick glass-ceramic article on 80 grit SiC sandpaper is greater than or equal to 160 cm and less than or equal to 220 cm, greater than or equal to 170 cm and less than or equal to 220 cm, greater than or equal to 180 cm and less than or equal to 220 cm, greater than or equal to 190 cm and less than or equal to 220 cm, greater than or equal to 200 cm and less than or equal to 220 cm, greater than or equal to 160 cm and less than or equal to 210 cm, greater than or equal to 170 cm and less than or equal to 210 cm, greater than or equal to 180 cm and less than or equal to 210 cm, greater than or equal to 190 cm and less than or equal to 210 cm, greater than or equal to 200 cm and less than or equal to 210 cm, greater than or equal to 160 cm and less than or equal to 200 cm, greater than or equal to 170 cm and less than or equal to 200 cm, greater than or equal to 180 cm and less than or equal to 200 cm, or even greater than or equal to 190 cm and less than or equal to 200 cm. It should be understood that the above ranges include all subranges within the explicitly disclosed ranges.

In embodiments the drop height of a 0.6 mm thick glass-ceramic article on 60 grit $Al_2O_3$ sandpaper is greater than or equal to 160 cm, greater than or equal to 170 cm, greater than or equal to 180 cm, greater than or equal to 190 cm, greater than or equal to 200 cm, greater than or equal to 160 cm, greater than or equal to 170 cm, greater than or equal to 180 cm, greater than or equal to 190 cm, greater than or equal to 200 cm, greater than or equal to 160 cm, greater than or equal to 170 cm, greater than or equal to 180 cm, or even greater than or equal to 190 cm. In embodiments the drop height of a 0.6 mm thick glass-ceramic article on 60 grit $Al_2O_3$ sandpaper is greater than or equal to 160 cm and less than or equal to 220 cm, greater than or equal to 170 cm and less than or equal to 220 cm, greater than or equal to 180 cm and less than or equal to 220 cm, greater than or equal to 190 cm and less than or equal to 220 cm, greater than or equal to 200 cm and less than or equal to 220 cm, greater than or equal to 160 cm and less than or equal to 210 cm, greater than or equal to 170 cm and less than or equal to 210 cm, greater than or equal to 180 cm and less than or equal to 210 cm, greater than or equal to 190 cm and less than or equal to 210 cm, greater than or equal to 200 cm and less than or equal to 210 cm, greater than or equal to 160 cm and less than or equal to 200 cm, greater than or equal to 170 cm and less than or equal to 200 cm, greater than or equal to 180 cm and less than or equal to 200 cm, or even greater than or equal to 190 cm and less than or equal to 200 cm. It should be understood that the above ranges include all subranges within the explicitly disclosed ranges.

In embodiments the drop height of a 0.55 mm thick glass-ceramic article on 36 grit $Al_2O_3$ sandpaper is greater than or equal to 45 cm, greater than or equal to 50 cm, greater than or equal to 55 cm, greater than or equal to 60 cm, greater than or equal to 65 cm, greater than or equal to 70 cm, greater than or equal to 75 cm, greater than or equal to 80 cm, greater than or equal to 85 cm, 90 cm, greater than or equal to 95 cm, 45 cm, greater than or equal to 50 cm, greater than or equal to 55 cm, greater than or equal to 60 cm, greater than or equal to 65 cm, greater than or equal to 70 cm, greater than or equal to 75 cm, greater than or equal to 80 cm, greater than or equal to 85 cm, 90 cm, 45 cm, greater than or equal to 50 cm, greater than or equal to 55 cm, greater than or equal to 60 cm, greater than or equal to 65 cm, greater than or equal to 70 cm, greater than or equal to 75 cm, greater than or equal to 80 cm, greater than or equal to 85 cm, 45 cm, greater than or equal to 50 cm, greater than or equal to 55 cm, greater than or equal to 60 cm, greater than or equal to 65 cm, greater than or equal to 70 cm, greater than or equal to 75 cm, greater than or equal to 80 cm, 45 cm, greater than or equal to 50 cm, greater than or equal to 55 cm, greater than or equal to 60 cm, greater than or equal to 65 cm, greater than or equal to 70 cm, or even greater than or equal to 75 cm. In embodiments the drop height of a 0.55 mm thick glass-ceramic article on 36 grit $Al_2O_3$ sandpaper is greater than or equal to 45 cm and less than or equal to 100 cm, greater than or equal to 50 cm and less than or equal to 100 cm, greater than or equal to 55 cm and less than or equal to 100 cm, greater than or equal to 60 cm and less than or equal to 100 cm, greater than or equal to 65 cm and less than or equal to 100 cm, greater than or equal to 70 cm and less than or equal to 100 cm, greater than or equal to 75 cm and less than or equal to 100 cm, greater than or equal to 80 cm and less than or equal to 100 cm, greater than or equal to 85 cm and less than or equal to 100 cm, 90 cm and less than or equal to 100 cm, greater than or equal to 95 cm and less than or equal to 100 cm, 45 cm and less than or equal to 95 cm, greater than or equal to 50 cm and less than or equal to 95 cm, greater than or equal to 55 cm and less than or equal to 95 cm, greater than or equal to 60 cm and less than or equal to 95 cm, greater than or equal to 65 cm and less than or equal to 95 cm, greater than or equal to 70 cm and less than or equal to 95 cm, greater than or equal to 75 cm and less than or equal to 95 cm, greater than or equal to 80 cm and less than or equal to 95 cm, greater than or equal to 85 cm and less than or equal to 95 cm, 90 cm and less than or equal to 95 cm, 45 cm and less than or equal to 90 cm, greater than or equal to 50 cm and less than or equal to 90 cm, greater than or equal to 55 cm and less than or equal to 90 cm, greater than or equal to 60 cm and less than or equal to 90 cm, greater than or equal to 65 cm and less than or equal to 90 cm, greater than or equal to 70 cm and less than or equal to 90 cm, greater than or equal to 75 cm and less than or equal to 90 cm, greater than or equal to 80 cm and less than or equal to 90 cm, greater than or equal to 85 cm and less than or equal to 90 cm, 45 cm and less than or equal to 85 cm, greater than or equal to 50 cm and less than or equal to 85 cm, greater than or equal to 55 cm and less than or equal to 85 cm, greater than or equal to 60 cm and less than or equal to 85 cm, greater than or equal to 65 cm and less than or equal to 85 cm, greater than or equal to 70 cm and less than or equal to 85 cm, greater than or equal to 75 cm and less than or equal to 85 cm, greater than or equal to 80 cm and less than or equal to 85 cm, 45 cm and less than or equal to 80 cm, greater than or equal to 50 cm and less than or equal to 80 cm, greater than or equal to 55 cm and less than or equal to 80 cm, greater than or equal to 60 cm and less than or equal to 80 cm, greater than or equal to 65 cm and less than or equal to 80 cm, greater than or equal to 70 cm and less than or equal to 80 cm, or even greater than or equal to 75 cm and less than or equal to 80 cm. It should be understood that the above ranges include all subranges within the explicitly disclosed ranges.

In embodiments the drop height of a 0.60 mm thick glass-ceramic article on 36 grit $Al_2O_3$ sandpaper is greater than or equal to 45 cm, greater than or equal to 50 cm, greater than or equal to 55 cm, greater than or equal to 60 cm, greater than or equal to 65 cm, greater than or equal to 70 cm, greater than or equal to 75 cm, greater than or equal to 80 cm, greater than or equal to 85 cm, 90 cm, greater than or equal to 95 cm, 45 cm, greater than or equal to 50 cm, greater than or equal to 55 cm, greater than or equal to 60 cm, greater than or equal to 65 cm, greater than or equal to 70 cm, greater than or equal to 75 cm, greater than or equal to 80 cm, greater than or equal to 85 cm, 90 cm, 45 cm, greater than or equal to 50 cm, greater than or equal to 55 cm, greater than or equal to 60 cm, greater than or equal to 65 cm, greater than or equal to 70 cm, greater than or equal to 75 cm, greater than or equal to 80 cm, greater than or equal to 85 cm, 45 cm, greater than or equal to 50 cm, greater than or equal to 55 cm, greater than or equal to 60 cm, greater than or equal to 65 cm, greater than or equal to 70 cm, greater than or equal to 75 cm, greater than or equal to 80 cm, greater than or equal to 45 cm, greater than or equal to 50 cm, greater than or equal to 55 cm, greater than or equal to 60 cm, greater than or equal to 65 cm, greater than or equal to 70 cm, or even greater than or equal to 75 cm. In embodiments the drop height of a 0.60 mm thick glass-ceramic article on 36 grit $Al_2O_3$ sandpaper is greater than or equal to 45 cm and less than or equal to 100 cm, greater than or equal to 50 cm and less than or equal to 100 cm, greater than or equal to 55 cm and less than or equal to 100 cm, greater than or equal to 60 cm and less than or equal to 100 cm, greater than or equal to 65 cm and less than or equal to 100 cm, greater than or equal to 70 cm and less than or equal to 100 cm, greater than or equal to 75 cm and less than or equal to 100 cm, greater than or equal to 80 cm and less than or equal to 100 cm, greater than or equal to 85 cm and less than or equal to 100 cm, 90 cm and less than or equal to 100 cm, greater than or equal to 95 cm and less than or equal to 100 cm, 45 cm and less than or equal to 95 cm, greater than or equal to 50 cm and less than or equal to 95 cm, greater than or equal to 55 cm and less than or equal to 95 cm, greater than or equal to 60 cm and less than or equal to 95 cm, greater than or equal to 65 cm and less than or equal to 95 cm, greater than or equal to 70 cm and less than or equal to 95 cm, greater than or equal to 75 cm and less than or equal to 95 cm, greater than or equal to 80 cm and less than or equal to 95 cm, greater than or equal to 85 cm and less than or equal to 95 cm, 90 cm and less than or equal to 95 cm, 45 cm and less than or equal to 90 cm, greater than or equal to 50 cm and less than or equal to 90 cm, greater than or equal to 55 cm and less than or equal to 90 cm, greater than or equal to 60 cm and less than or equal to 90 cm, greater than or equal to 65 cm and less than or equal to 90 cm, greater than or equal to 70 cm and less than or equal to 90 cm, greater than or equal to 75 cm and less than or equal to 90 cm, greater than or equal to 80 cm and less than or equal to 90 cm, greater than or equal to 85 cm and less than or equal to 90 cm, 45 cm and less than or equal to 85 cm, greater than or equal to 50 cm and less than or equal to 85 cm, greater than or equal to 55 cm and less than or equal to 85 cm, greater than or equal to 60 cm and less than or equal to 85 cm, greater than or equal to 65 cm and less than or equal to 85 cm, greater than or equal to 70 cm and less than or equal to 85 cm, greater than or equal to 75 cm and less than or equal to 85 cm, greater than or equal to 80 cm and less than or equal to 85 cm, 45 cm and less than or equal to 80 cm, greater than or equal to 50 cm and less than or equal to 80 cm, greater than or equal to 55 cm and less than or equal to 80 cm, greater than or equal to 60 cm and less than or equal to 80 cm, greater than or equal to 65 cm and less than or equal to 80 cm, greater than or equal to 70 cm and less than or equal to 80 cm, or even greater than or equal to 75 cm and less than or equal to 80 cm. It should be understood that the above ranges include all subranges within the explicitly disclosed ranges.

In embodiments, the Young's modulus (also referred to as elastic modulus) of the non-chemically strengthened glass-ceramic article is greater than or equal to 100 GPa and less than or equal to 130 GPa, greater than or equal to 105 GPa and less than or equal to 130 GPa, greater than or equal to 100 GPa and less than or equal to 120 GPa, greater than or equal to 105 GPa and less than or equal to 120 GPa, greater than or equal to 100 GPa and less than or equal to 115 GPa, greater than or equal to 105 GPa and less than or equal to 115 GPa, or greater than or equal to 110 GPa and less than or equal to 115 GPa. It should be understood that the above ranges include all subranges within the explicitly disclosed ranges.

In embodiments, the non-chemically strengthened glass-ceramic articles have a Poisson's ratio that is greater than or equal to 0.20 and less than or equal to 0.25, greater than or equal to 0.21 and less than or equal to 0.25, greater than or equal to 0.22 and less than or equal to 0.25, greater than or equal to 0.23 and less than or equal to 0.25, greater than or equal to 0.20 and less than or equal to 0.23, greater than or equal to 0.21 and less than or equal to 0.23, or even greater than or equal to 0.20 and less than or equal to 0.22. It should be understood that the above ranges include all subranges within the explicitly disclosed ranges.

In embodiments, the non-chemically strengthened glass-ceramic articles have a shear modulus that is greater than or equal to 40 GPa and less than or equal to 50 GPa, greater than or equal to 41 GPa and less than or equal to 50 GPa, greater than or equal to 42 GPa and less than or equal to 50 GPa, greater than or equal to 40 GPa and less than or equal to 48 GPa, greater than or equal to 41 GPa and less than or equal to 48 GPa, greater than or equal to 42 GPa and less than or equal to 48 GPa, or even greater than or equal to 43 GPa and less than or equal to 46 GPa. It should be understood that the above ranges include all subranges within the explicitly disclosed ranges.

According to embodiments, the glass-ceramics have a refractive index (measured at wavelengths of 589.3 nm) that is greater than or equal to 1.500 and less than or equal to 1.600, greater than or equal to 1.520 and less than or equal to 1.600, greater than or equal to 1.540 and less than or equal to 1.600, greater than or equal to 1.550 and less than or equal to 1.600, greater than or equal to 1.560 and less than or equal to 1.600, greater than or equal to 1.570 and less than or equal to 1.600, greater than or equal to 1.500 and less than or equal to 1.580, greater than or equal to 1.520 and less than or equal to 1.580, greater than or equal to 1.540 and less than or equal to 1.580, greater than or equal to 1.550 and less than or equal to 1.580. It should be understood that the above ranges include all subranges within the explicitly disclosed ranges.

The stress optical coefficient (measured at a wavelength of 546 nm) of glass-ceramics according to embodiments is greater than or equal to 2.40 nm/mm/MPa and less than or equal to 2.50 nm/mm/MPa. It should be understood that the above ranges include all subranges within the explicitly disclosed ranges.

In some embodiments, the glasses described here may be compatible with float-type forming processes with an adjustment of the liquidus viscosity. In some embodiments, the glass can have a liquidus viscosity of from greater than or equal to 0.1 kilopoise (kP) to less than or equal to 2 kP, greater than or equal to 0.1 kP to less than or equal to 1.5 kP, greater than or equal to 0.1 kP to less than or equal to 1.25 kP, greater than or equal to 0.2 kP to less than or equal to 2 kP, greater than or equal to 0.2 kP to less than or equal to 1.5 kP, greater than or equal to 0.2 kP to less than or equal to 1.25 kP, greater than or equal to 0.3 kilopoise (kP) to less than or equal to 2 kP, greater than or equal to 0.3 kP to less than or equal to 1.5 kP, greater than or equal to 0.3 kP to less than or equal to 1.25 kP, greater than or equal to 0.4 kilopoise (kP) to less than or equal to 2 kP, greater than or equal to 0.4 kP to less than or equal to 1.5 kP, greater than or equal to 0.4 kP to less than or equal to 1.25 kP, greater than or equal to 0.5 kilopoise (kP) to less than or equal to 2 kP, greater than or equal to 0.5 kP to less than or equal to 1.5 kP, or even greater than or equal to 0.5 kP to less than or equal to 1.25 kP.

Based on the foregoing, it has now been found that the glasses disclosed herein may be cerammed to form lithium disilicate-based glass-ceramics that have both improved mechanical properties and improved optical properties, specifically haze and optical transmittance. In particular, prior to the discovery of the glasses and glass-ceramics described herein, it was difficult to achieve both the desired mechanical properties and the desired optical properties in lithium disilicate-based glass-ceramics such that the glass-ceramic was suitable for use in applications which require both, such as cover and housing materials of mobile electronic devices. That is, prior lithium disilicate-based glass-ceramics may have the desired mechanical properties or the desired optical properties, but not both the desired mechanical properties and the desired optical properties. In that regard the lithium disilicate-based glass-ceramics described herein and having the combination of Young's moduli greater than or equal to 100 GPa, fracture toughnesses greater than or equal to 1.10

MPa·m$^{1/2}$, transmittances of greater than 88% for wavelengths of light within a range from greater than or equal to 400 nm to less than or equal to 750 nm, and haze values of less than 1.0% have both excellent mechanical properties and excellent optical properties making them suitable for use in a variety of applications, including handheld electronic devices, among other end-use applications. In one or more embodiments, the glass-ceramic exhibits such transmittance and haze at a thickness of less than or equal to 0.6 mm.

In embodiments, the glass-ceramic articles formed from the glass may be in the form of ribbons, strips, bars or boules from which substrates or plates may be sectioned. In embodiments, the glass-ceramic articles formed from the glass may be in the form of substrates or plates having a thickness t that is greater than or equal to 0.1 mm and less than or equal to 3.5 mm, greater than or equal to 0.3 mm and less than or equal to 3.5 mm, greater than or equal to 0.5 mm and less than or equal to 3.5 mm, greater than or equal to 0.8 mm and less than or equal to 3.5 mm, greater than or equal to 1.0 mm and less than or equal to 3.5 mm, greater than or equal to 1.3 mm and less than or equal to 3.5 mm, greater than or equal to 1.5 mm and less than or equal to 3.5 mm, greater than or equal to 1.8 mm and less than or equal to 3.5 mm, greater than or equal to 2.0 mm and less than or equal to 3.5 mm, greater than or equal to 2.2 mm and less than or equal to 3.5 mm, greater than or equal to 2.4 mm and less than or equal to 3.5 mm, greater than or equal to 2.6 mm and less than or equal to 3.5 mm, greater than or equal to 2.8 mm and less than or equal to 3.5 mm, greater than or equal to 3.0 mm and less than or equal to 3.5 mm, greater than or equal to 3.2 mm and less than or equal to 3.5 mm, greater than or equal to 0.1 mm and less than or equal to 3.2 mm, greater than or equal to 0.3 mm and less than or equal to 3.2 mm, greater than or equal to 0.5 mm and less than or equal to 3.2 mm, greater than or equal to 0.8 mm and less than or equal to 3.2 mm, greater than or equal to 1.0 mm and less than or equal to 3.2 mm, greater than or equal to 1.3 mm and less than or equal to 3.2 mm, greater than or equal to 1.5 mm and less than or equal to 3.2 mm, greater than or equal to 1.8 mm and less than or equal to 3.2 mm, greater than or equal to 2.0 mm and less than or equal to 3.2 mm, greater than or equal to 2.2 mm and less than or equal to 3.2 mm, greater than or equal to 2.4 mm and less than or equal to 3.2 mm, greater than or equal to 2.6 mm and less than or equal to 3.2 mm, greater than or equal to 2.8 mm and less than or equal to 3.2 mm, greater than or equal to 3.0 mm and less than or equal to 3.2 mm, greater than or equal to 0.1 mm and less than or equal to 3.0 mm, greater than or equal to 0.3 mm and less than or equal to 3.0 mm, greater than or equal to 0.5 mm and less than or equal to 3.0 mm, greater than or equal to 0.8 mm and less than or equal to 3.0 mm, greater than or equal to 1.0 mm and less than or equal to 3.0 mm, greater than or equal to 1.3 mm and less than or equal to 3.0 mm, greater than or equal to 1.5 mm and less than or equal to 3.0 mm, greater than or equal to 1.8 mm and less than or equal to 3.0 mm, greater than or equal to 2.0 mm and less than or equal to 3.0 mm, greater than or equal to 2.2 mm and less than or equal to 3.0 mm, greater than or equal to 2.4 mm and less than or equal to 3.0 mm, greater than or equal to 2.6 mm and less than or equal to 3.0 mm, greater than or equal to 2.8 mm and less than or equal to 3.0 mm, greater than or equal to 0.1 mm and less than or equal to 2.8 mm, greater than or equal to 0.3 mm and less than or equal to 2.8 mm, greater than or equal to 0.5 mm and less than or equal to 2.8 mm, greater than or equal to 0.8 mm and less than or equal to 2.8 mm, greater than or equal to 1.0 mm and less than or equal to 2.8 mm, greater than or equal to 1.3 mm and less than or equal to 2.8 mm, greater than or equal to 1.5 mm and less than or equal to 2.8 mm, greater than or equal to 1.8 mm and less than or equal to 2.8 mm, greater than or equal to 2.0 mm and less than or equal to 2.8 mm, greater than or equal to 2.2 mm and less than or equal to 2.8 mm, greater than or equal to 2.4 mm and less than or equal to 2.8 mm, greater than or equal to 2.6 mm and less than or equal to 2.8 mm, greater than or equal to 0.1 mm and less than or equal to 2.6 mm, greater than or equal to 0.3 mm and less than or equal to 2.6 mm, greater than or equal to 0.5 mm and less than or equal to 2.6 mm, greater than or equal to 0.8 mm and less than or equal to 2.6 mm, greater than or equal to 1.0 mm and less than or equal to 2.6 mm, greater than or equal to 1.3 mm and less than or equal to 2.6 mm, greater than or equal to 1.5 mm and less than or equal to 2.6 mm, greater than or equal to 1.8 mm and less than or equal to 2.6 mm, greater than or equal to 2.0 mm and less than or equal to 2.6 mm, greater than or equal to 2.2 mm and less than or equal to 2.6 mm, greater than or equal to 2.4 mm and less than or equal to 2.6 mm, greater than or equal to 0.1 mm and less than or equal to 2.4 mm, greater than or equal to 0.3 mm and less than or equal to 2.4 mm, greater than or equal to 0.5 mm and less than or equal to 2.4 mm, greater than or equal to 0.8 mm and less than or equal to 2.4 mm, greater than or equal to 1.0 mm and less than or equal to 2.4 mm, greater than or equal to 1.3 mm and less than or equal to 2.4 mm, greater than or equal to 1.5 mm and less than or equal to 2.4 mm, greater than or equal to 1.8 mm and less than or equal to 2.4 mm, greater than or equal to 2.0 mm and less than or equal to 2.4 mm, greater than or equal to 2.2 mm and less than or equal to 2.4 mm, greater than or equal to 0.1 mm and less than or equal to 2.2 mm, greater than or equal to 0.3 mm and less than or equal to 2.2 mm, greater than or equal to 0.5 mm and less than or equal to 2.2 mm, greater than or equal to 0.8 mm and less than or equal to 2.2 mm, greater than or equal to 1.0 mm and less than or equal to 2.2 mm, greater than or equal to 1.3 mm and less than or equal to 2.2 mm, greater than or equal to 1.5 mm and less than or equal to 2.2 mm, greater than or equal to 1.8 mm and less than or equal to 2.2 mm, greater than or equal to 2.0 mm and less than or equal to 2.2 mm, greater than or equal to 0.1 mm and less than or equal to 2.0 mm, greater than or equal to 0.3 mm and less than or equal to 2.0 mm, greater than or equal to 0.5 mm and less than or equal to 2.0 mm, greater than or equal to 0.8 mm and less than or equal to 2.0 mm, greater than or equal to 1.0 mm and less than or equal to 2.0 mm, greater than or equal to 1.3 mm and less than or equal to 2.0 mm, greater than or equal to 1.5 mm and less than or equal to 2.0 mm, greater than or equal to 1.8 mm and less than or equal to 2.0 mm, greater than or equal to 0.1 mm and less than or equal to 1.8 mm, greater than or equal to 0.3 mm and less than or equal to 1.8 mm, greater than or equal to 0.5 mm and less than or equal to 1.8 mm, greater than or equal to 0.8 mm and less than or equal to 1.8 mm, greater than or equal to 1.0 mm and less than or equal to 1.8 mm, greater than or equal to 1.3 mm and less than or equal to 1.8 mm, greater than or equal to 1.5 mm and less than or equal to 1.8 mm, greater than or equal to 0.1 mm and less than or equal to 1.5 mm, greater than or equal to 0.3 mm and less than or equal to 1.5 mm, greater than or equal to 0.5 mm and less than or equal to 1.5 mm, greater than or equal to 0.8 mm and less than or equal to 1.5 mm, greater than or equal to 1.0 mm and less than or equal to 1.5 mm, greater than or equal to 1.3 mm and less than or equal to 1.5 mm, greater than or equal to 0.1 mm and less than or equal to 1.3 mm, greater than or equal to 0.3 mm and less than or equal to 1.3 mm, greater than or equal to 0.5 mm and less than or equal to 1.3 mm, greater than or equal to 0.8 mm and less than or equal to 1.3 mm, greater than or equal to 1.0 mm and less than or equal to 1.3 mm, greater than or equal to 0.1 mm and less than or equal to 1.0 mm, greater than or equal to 0.3 mm and less than or equal to 1.0 mm, greater than or equal to 0.5 mm and less than or equal to 1.0 mm, greater than or equal to 0.8 mm and less than or equal to 1.0 mm, greater than or equal to 0.1 mm and less than or equal to 0.8 mm, greater than or equal to 0.3 mm and less than or equal to 0.8 mm, greater than or equal to 0.5 mm and less than or equal to 0.8 mm, greater than or equal to 0.1 mm and less than or equal to 0.5 mm, greater than or equal to 0.3 mm and less than or equal to 0.5 mm, or greater than or equal to 0.1 mm and less than or equal to 0.3 mm. It should be understood that the above ranges include all subranges within the explicitly disclosed ranges.

The glass and glass-ceramic articles disclosed herein may be incorporated into another article or device such as device with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc. for example for use as an interior display cover, a window, or windshield), appliance articles, or any article that requires some transparency, scratch-resistance, abrasion resistance or a combination thereof. In embodiments, translucent glass-ceramics may be used as enclosures for electronic devices (e.g., consumer electronics, including mobile phones, tablets, computers, navigation systems, wearable devices (e.g., watches) and the like). An exemplary article incorporating any of the strengthened glass-ceramic articles disclosed herein is shown in FIGS. 3A and 3B.

Figure 3A:
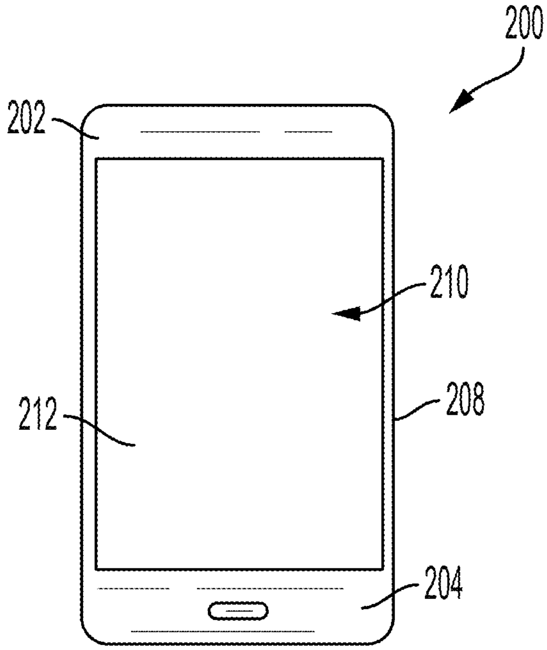
FIG. 3A schematically depicts a top view of an electronic device including a glass-ceramic article according to embodiments disclosed and described herein.
Figure 3B:
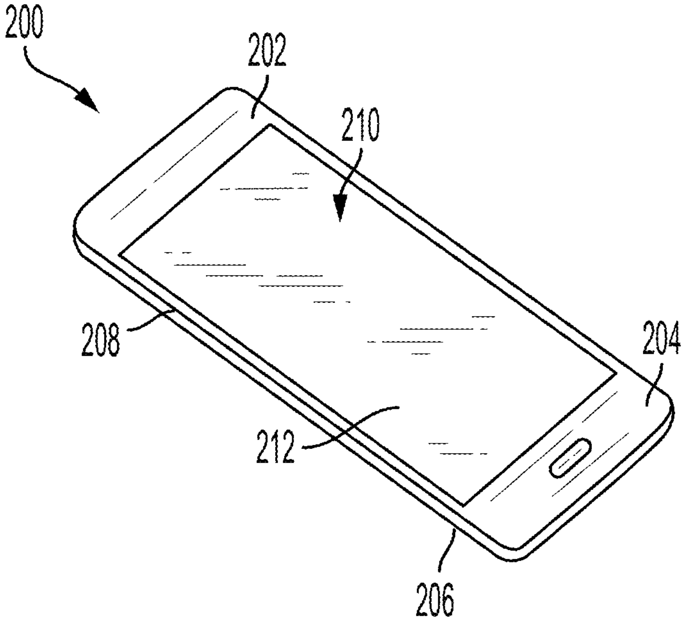
FIG. 3B schematically depicts a perspective view of an electronic device including a glass-ceramic article according to embodiments disclosed and described herein.

Specifically, FIGS. 3A and 3B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display 210. In some embodiments, at least one of the cover substrate 212 or a portion of the housing 202 (such as the back 206) may include any of the strengthened glass-ceramics disclosed herein.

Additionally, the glasses disclosed herein can be cerammed into other shapes (i.e., other than a plate or sheet) with minimal deformation, readily machined to precision shapes, cut, drilled, chamfered, tapped, polished to high luster with conventional ceramic machining tooling and even exhibit various degrees of translucency depending on composition and heat treatment. These properties make the glass-ceramics useful for a broad number of applications in addition to those identified herein, including, without limitation, countertops and other surfaces, appliance doors and exteriors, floor tiles, wall panels, ceiling tiles, white boards, materials storage containers (hollowware) such as beverage bottles, food sales and storage vessels, machine parts requiring light weight, good wear resistance and precise dimensions. The glass-ceramics can be formed in three-dimensional articles using various methods due to its lower viscosity.

Accordingly, various embodiments described herein may be employed to produce glass-ceramic articles having excellent optical and mechanical properties. Such glass-ceramic articles may be particularly well suited for use in portable electronic devices and devices such as watches that require high strength, high transmittance, and low haze.

EXAMPLES

The embodiments described herein will be further clarified by the following examples.

The compositions listed in Tables 1A-1J were melted and formed into glass plates with thicknesses in the range from 0.5 mm to 0.6 mm. The liquidus viscosity and liquidus temperature of the glass plates were measured. The glass plates were then cerammed according to the ceramming cycles indicated in Tables 1A-1J for each composition to create glass-ceramic articles, specifically glass-ceramic plates. Various properties of the glass-ceramic plates were then measured. The phase assemblages of the glass-ceramic plates were also determined by x-ray diffraction using the Rietveld method. The properties of the glass-ceramics are reported in Tables 1A-1J.

TABLE 1A

| Example | 1 | 2 | 3 | 4 | 5 | 6 | 7 |
|---|---|---|---|---|---|---|---|
| $SiO_2$ (wt %) | 67.10 | 68.12 | 68.53 | 69.56 | 69.96 | 70.40 | 69.80 |
| $Al_2O_3$ (wt %) | 1.82 | 1.82 | 1.82 | 1.82 | 1.82 | 1.82 | 1.82 |
| $Li_2O$ (wt %) | 14.13 | 14.12 | 14.16 | 14.15 | 14.14 | 14.14 | 14.11 |
| $Na_2O$ (wt %) | 1.11 | 1.10 | 1.11 | 1.11 | 0.55 | 0.11 | 0.11 |
| $K_2O$ (wt %) | 0.00 | 0.00 | 0.00 | 0.00 | 0.17 | 0.17 | 0.84 |
| CaO (wt %) | 3.60 | 2.60 | 2.61 | 1.60 | 1.60 | 1.60 | 1.60 |
| $ZrO_2$ (wt %) | 7.69 | 7.69 | 7.71 | 7.71 | 7.70 | 7.70 | 7.68 |
| $P_2O_5$ (wt %) | 4.56 | 4.55 | 4.06 | 4.06 | 4.06 | 4.06 | 4.05 |
| $Al_2O_3$:$Li_2O$ | 0.13 | 0.13 | 0.13 | 0.13 | 0.13 | 0.13 | 0.13 |
| $Li_2O$:$ZrO_2$ | 1.84 | 1.84 | 1.84 | 1.84 | 1.84 | 1.84 | 1.84 |
| $Li_2O$:($Li_2O$ + $K_2O$ + $Na_2O$) | 0.93 | 0.93 | 0.93 | 0.93 | 0.95 | 0.98 | 0.94 |
| Liquidus Temp. (° C.) | 990 | 1010 | 1030 | 1050 | 1055 | 1040 | 1090 |
| Liquidus phase | Zektzerite/ lithio-phospahte | Lithium Phosphate | Zektzerite/ lithio-phospahte | Lithio-phosphate | Lithio-phosphate | Tridymite/ Lithio-phosphate | Sogdianite |
| Liquidus viscosity (poise) | 1100 | 1183 | 808 | | 842 | 1174 | 534 |
| ceramming cycle (nucleation (° C.-hr), (growth (° C.-hr)) | 570-4, 700-1 | 570-4, 700-1 | 570-4, 700-1 | 570-4, 700-1 | 570-4, 710-1 | 570-4, 710-1 | 570-4, 710-1 |

TABLE 1A-continued

| Example | 1 | 2 | 3 | 4 | 5 | 6 | 7 |
|---|---|---|---|---|---|---|---|
| Qualitative appearance | Clear, transparent | clear transparent | clear transparent | clear transparent | Hazy transparent | Hazy transparent | Hazy transparent |
| Phase assemblage | Lithium disilicate; lithio-phosphate | Lithium disilicate; lithio-phosphate | Lithium dislicate | Lithium disilicate; lithio-phosphate | Lithium disilicate; lithium metasilicate | Lithium disilicate; lithium metasilicate | Lithium disilicate; lithium metasilicate |
| Rietveld parameter - Glass | 26 | 28 | 32 | 34 | 29 | 33 | 41 |
| Rietveld parameter - $Li_2Si_2O_5$ | 69 | 66 | 69 | 60 | 67 | 62 | 52 |
| Rietveld parameter - $Li_2SiO_3$ | 0 | 0 | 0 | 1.2 | 0 | 1.4 | 2.3 |
| Rietveld parameter - $Li_3PO_4$ | 5.2 | 6.8 | 0 | 4.4 | 4.2 | 4.3 | 3.7 |
| Haze at 0.6 mm | 0.27 | 0.17 | 0.26 | | | | |
| $K_{1c}$ (MPa · $m^{1/2}$) | 1.29 | 1.26 | 1.33 | | | | |
| Young's modulus (GPa) | 111.3 | 108.9 | 110.9 | | | | |
| Poisson's ratio | 0.224 | 0.218 | 0.221 | | | | |
| Shear modulus (GPa) | 45.5 | 44.7 | 45.4 | | | | |
| SOC (nm/mm/MPa) | 2.414 | 2.455 | 2.44 | | | | |

TABLE 1B

| Example | 8 | 9 | 10 | 11 | 12 | 13 | 14 |
|---|---|---|---|---|---|---|---|
| $SiO_2$ (wt %) | 69.03 | 69.47 | 68.87 | 68.55 | 67.64 | 66.74 | 66.94 |
| $Al_2O_3$ (wt %) | 1.81 | 1.81 | 1.81 | 1.80 | 1.79 | 1.78 | 1.80 |
| $Li_2O$ (wt %) | 14.06 | 14.06 | 14.03 | 13.99 | 13.91 | 13.83 | 14.51 |
| $Na_2O$ (wt %) | 0.55 | 0.11 | 0.11 | 0.11 | 0.11 | 0.11 | 0.11 |
| $K_2O$ (wt %) | 0.17 | 0.17 | 0.83 | 0.17 | 0.17 | 0.16 | 0.17 |
| CaO (wt %) | 1.59 | 1.59 | 1.59 | 1.58 | 1.58 | 1.57 | 1.58 |
| $ZrO_2$ (wt %) | 8.75 | 8.75 | 8.73 | 9.79 | 10.82 | 11.84 | 10.88 |
| $P_2O_5$ (wt %) | 4.03 | 4.03 | 4.02 | 4.01 | 3.99 | 3.97 | 4.01 |
| $Al_2O_3$:$Li_2O$ | 0.13 | 0.13 | 0.13 | 0.13 | 0.13 | 0.13 | 0.12 |
| $Li_2O$:$ZrO_2$ | 1.61 | 1.61 | 1.61 | 1.43 | 1.29 | 1.17 | 1.33 |
| $Li_2O$:($Li_2O$ + $K_2O$ + $Na_2O$) | 0.95 | 0.98 | 0.93 | 0.98 | 0.98 | 0.98 | 0.98 |
| Liquidus Temp. (° C.) | 1050 | 1090 | 1085 | 1180 | 1185 | 1200 | 1180 |
| Liquidus phase | Zircon | Zircon | Sogdianite | Zircon | Zircon | Zircon | Zircon |
| Liquidus viscosity (poise) | 858 | 622 | 650 | 215 | 194 | 178 | 183 |
| ceramming cycle (nucleation (° C.-hr), (growth (° C.-hr)) | 570-4, 710-1 | 570-4, 710-1 | 570-4, 710-1 | 570-4, 710-1 | 570-4, 710-1 | 570-4, 710-1 | 570-4, 710-1 |
| Qualitative appearance | clear transparent | clear transparent | | clear transparent | clear transparent | clear transparent | clear transparent |
| Phase assemblage | Lithium disilicate; lithiophosphate | Lithium disilicate; lithiophosphate | Lithium disilicate; lithium metasilicate | Lithium disilicate; lithiophosphate | Lithium disilicate; lithium metasilicate | Lithium disilicate; lithium metasilicate | Lithium disilicate; lithium metasilicate |
| Rietveld parameter - Glass | 32 | 38 | 50 | 31 | 42 | 48 | 48 |
| Rietveld parameter - $Li_2Si_2O_5$ | 63 | 62 | 46 | 63 | 54 | 44 | 44 |
| Rietveld parameter - $Li_2SiO_3$ | 0 | 0 | 3.3 | 0 | 4.1 | 7.9 | 7.1 |
| Rietveld parameter - $Li_3PO_4$ | 4.7 | 0 | 0 | 6.4 | 0 | 0 | 0 |
| Haze at 0.6 mm | | | | | | | |
| $K_{1c}$ (MPa · $m^{1/2}$) | | | | 1.3 | 1.27 | 1.2 | 1.27 |
| Young's modulus (GPa) | | | | 107.8 | 105 | 101.7 | 107 |
| Poisson's ratio | | | | 0.21 | 0.21 | 0.21 | 0.22 |
| Shear modulus (GPa) | | | | 44.5 | 43.3 | 42.2 | 44 |
| SOC (nm/mm/MPa) | 2.499 | 2.486 | | | | | |

TABLE 1C

| Example | 15 | 16 | 17 | 18 | 19 | 20 | Comp. A |
|---|---|---|---|---|---|---|---|
| $SiO_2$ (wt %) | 67.72 | 68.11 | 68.51 | 67.79 | 69.56 | 69.40 | 73.91 |
| $Al_2O_3$ (wt %) | 0.90 | 0.45 | 0.00 | 1.82 | 1.99 | 1.81 | 7.55 |
| $Li_2O$ (wt %) | 14.56 | 14.59 | 14.62 | 14.27 | 14.01 | 13.99 | 11.17 |
| $Na_2O$ (wt %) | 0.11 | 0.11 | 0.11 | 1.10 | 0.11 | 0.44 | 1.64 |
| $K_2O$ (wt %) | 0.17 | 0.17 | 0.17 | 0.17 | 0.17 | 0.17 | 0 |
| CaO (wt %) | 1.59 | 1.59 | 1.60 | 2.60 | 1.59 | 1.60 | 0 |
| $ZrO_2$ (wt %) | 10.92 | 10.94 | 10.96 | 7.69 | 8.53 | 8.55 | 3.58 |
| $P_2O_5$ (wt %) | 4.03 | 4.03 | 4.04 | 4.55 | 4.03 | 4.04 | 2.16 |
| $Al_2O_3$:$Li_2O$ | 0.06 | 0.03 | 0 | 0.13 | 0.14 | 0.13 | 0.68 |
| $Li_2O$:$ZrO_2$ | 1.33 | 1.33 | 1.33 | 1.86 | 1.64 | 1.64 | 3.12 |
| $Li_2O$:($Li_2O$ + $K_2O$ + $Na_2O$) | 0.98 | 0.98 | 0.98 | 0.92 | 0.98 | 0.96 | 0.87 |
| Liquidus Temp. (° C.) | | | | | | | 1135 |
| Liquidus phase | | | | | | | Zircon |
| Liquidus viscosity (poise) | | | | | | | 1135 |
| ceramming cycle (nucleation (° C.-hr), (growth (° C.-hr)) | 570-4, 710-1 | 570-4, 710-1 | 570-4, 710-1 | 570-4, 700-1 | 570-4, 710-1 | 570-4, 710-1 | 590-4/ 720-1 |
| Qualitative appearance | Clear trspt | Clear trspt | Slight hazy, trspt | | | | Clear, Transparent |
| Phase assemblage | Lithium disilicate | Lithium disilicate | Lithium disilicate | | | | Lithium disilicate, petalite |
| Rietveld parameter - Glass | 49 | 50 | 52 | 35 | 28 | 32 | 22 |
| Rietveld parameter - $Li_2Si_2O_5$ | 51 | 50 | 48 | 55 | 70 | 66 | 34 |
| Rietveld parameter - $Li_2SiO_3$ | 0 | 0 | 0 | | | | 0 |
| Rietveld parameter - $Li_3PO_4$ | 0 | 0 | 0 | 6 | 2 | 2 | 0 |
| Haze at 0.6 mm | | | | 0.15* | 0.12* | 0.12* | 0.26 |
| $K_{1c}$ (MPa · $m^{1/2}$) | | | | 1.31 | 1.27 | 1.24 | 1.17 |
| Young's modulus (GPa) | | | | 110.1 | 108.7 | 109.6 | 105.2 |
| Poisson's ratio | | | | 0.22 | 0.22 | 0.21 | 0.201 |
| Shear modulus (GPa) | | | | 45.2 | 44.7 | 45.2 | 43.8 |
| Vickers hardness (kgf/$mm^2$) | | | | | 731 | | 746 |
| Density (g/$cm^3$) | | | | | 2.572 | | 2.55 |
| Refractive index at 589.3 nm | | | | 1.5652 | 1.5662 | 1.5658 | 1.5580 |

*Haze values reported at 0.5 mm thickness

TABLE 1D

| Example | 21 | 22 | 23 | 24 | 25 | 26 | 27 |
|---|---|---|---|---|---|---|---|
| $SiO_2$ (wt %) | 69.09 | 68.32 | 67.56 | 67.40 | 67.30 | 68.80 | 68.60 |
| $Al_2O_3$ (wt %) | 0.94 | 0.94 | 0.93 | 1.82 | 1.82 | 1.32 | 1.60 |
| $Li_2O$ (wt %) | 17.21 | 16.95 | 16.69 | 14.16 | 14.15 | 17.15 | 17.10 |
| $Na_2O$ (wt %) | 0.11 | 0.11 | 0.11 | 1.11 | 1.10 | 0.11 | 0.11 |
| $K_2O$ (wt %) | 0.17 | 0.17 | 0.17 | 0 | 0 | 0.17 | 0.17 |
| MgO(wt %) | 0 | 0 | 0 | 0 | 0 | 0 | 0 |
| CaO (wt %) | 1.77 | 1.75 | 1.74 | 3.61 | 3.61 | 1.76 | 1.80 |
| SrO (wt %) | 0 | 0 | 0 | 0 | 0 | 0 | 0 |
| ZnO (wt %) | 0 | 0 | 0 | 0 | 0 | 0 | 0 |
| $P_2O_5$ (wt %) | 4.99 | 4.96 | 4.92 | 4.19 | 4.31 | 4.99 | 4.99 |
| $ZrO_2$ (wt %) | 5.70 | 6.80 | 7.87 | 7.71 | 7.71 | 5.69 | 5.69 |
| $Al_2O_3$:$Li_2O$ | 0.05 | 0.06 | 0.06 | 0.13 | 0.13 | 0.08 | 0.09 |
| $Li_2O$:$ZrO_2$ | 3.02 | 2.49 | 2.12 | 1.84 | 1.84 | 3.01 | 3.01 |
| $Li_2O$:($Li_2O$ + $K_2O$ + $Na_2O$) | 0.98 | 0.98 | 0.98 | 0.93 | 0.93 | 0.98 | 0.98 |
| Liquidus Temp. (° C.) | 1025 | 1010 | 1020 | 1005 | 1010 | 1035 | 1040 |
| Liquidus phase | Lithium Phosphate | Lithium Phosphate | Lithium Phosphate | Zektzerite | Zektzerite | Lithium Phosphate | Lithium Phosphate |
| Liquidus viscosity (poise) | 473 | 595 | 549 | 1002 | 963 | 378 | 391 |
| ceramming cycle (nucleation (° C.-hr), (growth (° C.-hr)) | 530-4, 710-1 | 530-4, 710-1 | 530-4, 710-1 | 530-4, 710-1 | 530-4, 710-1 | 520-6, 710-1 | 520-6, 710-1 |
| Rietveld parameter - Glass | 14 | 16 | 18 | 23 | 21 | 16 | 15 |
| Rietveld parameter - $Li_2Si_2O_5$ | 85 | 81 | 78 | 73 | 75 | 83 | 84 |

TABLE 1D-continued

| Example | 21 | 22 | 23 | 24 | 25 | 26 | 27 |
|---|---|---|---|---|---|---|---|
| $Li_2Si_2O_5$ Crystallite Size (nm) | 38 | 23 | 22 | 29 | 24 | 24 | 23 |
| Rietveld parameter - $Li_2SiO_3$ | 0 | 0 | 0 | 0.8 | 0 | 0 | 0 |
| Rietveld parameter - $Li_3PO_4$ | 1.2 | 3.4 | 4.2 | 3.9 | 4.2 | 1.4 | 1.5 |
| Haze at 0.5 mm | 0.35 | 0.25 | 0.3 | 0.31 | 0.3 | 0.23 | 0.17 |
| $K_{1c}$ (MPa · $m^{1/2}$) | 1.39 | 1.3 | 1.27 | 1.33 | 1.34 | 1.40 | 1.40 |
| Young's modulus (GPa) | 115.8 | 115.2 | 114.7 | 112.4 | 112.0 | 115.6 | 115.1 |
| Poisson's ratio | 0.22 | 0.23 | 0.22 | 0.22 | 0.23 | 0.23 | 0.23 |
| Shear modulus (GPa) | 47.4 | 47.0 | 47.0 | 45.9 | 45.7 | 47.2 | 47.0 |

TABLE 1E

| Example | 28 | 29 | 30 | 31 | 32 | 33 | 34 | 35 |
|---|---|---|---|---|---|---|---|---|
| $SiO_2$ (wt %) | 68.38 | 67.71 | 67.05 | 67.17 | 65.63 | 66.16 | 67.58 | 69.57 |
| $Al_2O_3$ (wt %) | 1.88 | 2.81 | 3.72 | 1.89 | 1.84 | 1.86 | 1.87 | 1.76 |
| $Li_2O$ (wt %) | 17.05 | 16.85 | 16.66 | 16.72 | 16.33 | 16.47 | 16.89 | 14.17 |
| $Na_2O$ (wt %) | 0.11 | 0.11 | 0.11 | 0.11 | 0.11 | 0.11 | 0.11 | 0.13 |
| $K_2O$ (wt %) | 0.17 | 0.17 | 0.17 | 0.17 | 0.17 | 0.17 | 0.17 | 0.18 |
| MgO(wt %) | 0 | 0 | 0 | 1.49 | 0 | 0 | 0 | 0 |
| CaO (wt %) | 1.76 | 1.75 | 1.74 | 1.76 | 1.72 | 1.74 | 1.75 | 1.58 |
| SrO (wt %) | 0 | 0 | 0 | 0 | 3.75 | 0 | 0 | 0 |
| ZnO (wt %) | 0 | 0 | 0 | 0 | 0 | 2.97 | 0 | 0 |
| $P_2O_5$ (wt %) | 4.97 | 4.96 | 4.92 | 4.99 | 4.87 | 4.91 | 4.94 | 3.49 |
| $ZrO_2$ (wt %) | 5.68 | 5.65 | 5.62 | 5.70 | 5.57 | 5.61 | 6.77 | 9.03 |
| $Al_2O_3$:$Li_2O$ | 0.11 | 0.17 | 0.22 | 0.11 | 0.11 | 0.11 | 0.11 | 0.12 |
| $Li_2O$:$ZrO_2$ | 3.00 | 2.98 | 2.96 | 2.93 | 2.93 | 2.93 | 2.49 | 1.57 |
| $Li_2O$:($Li_2O$ + $K_2O$ + $Na_2O$) | 0.98 | 0.98 | 0.98 | 0.98 | 0.98 | 0.98 | 0.98 | 0.98 |
| Liquidus Temp. (° C.) | 1030 | | | | | | | |
| Liquidus phase | Lithium Phosphate | | | | | | | |
| Liquidus viscosity (poise) | 382 | | | | | | | |
| ceramming cycle (nucleation (° C.-hr), (growth (° C.-hr)) | 520-6, 710-1 | 520-6, 710-1 | 520-6, 710-1 | 520-6, 710-1 | 520-6, 710-1 | 520-6, 710-1 | 520-6, 710-1 | 520-6, 720-1 |
| Rietveld parameter - Glass | 14 | 11 | 11 | 16 | 10 | 16 | 18 | 30 |
| Rietveld parameter - $Li_2Si_2O_5$ | 84 | 87 | 84 | 82 | 89 | 81 | 80 | 67 |
| $Li_2Si_2O_5$ Crystallite Size (nm) | 21 | 18 | 16 | 33 | 43 | 23 | 21 | |
| Rietveld parameter - $Li_2SiO_3$ | 0 | 0 | 2 | 0 | 0 | 0 | 0 | 0 |
| Rietveld parameter - $Li_3PO_4$ | 1.6 | 2 | 2 | 2 | 1 | 3 | 2 | 3 |
| Haze (%) at 0.5 mm | 0.2 | | | | | | | 0.13 |
| $K_{1c}$ (MPa · $m^{1/2}$) | 1.36 | | | | | | | 1.31 |
| Young's modulus (GPa) | 115.3 | | | | | | | 110 |
| Poisson's ratio | 0.23 | | | | | | | 0.22 |
| Shear modulus (GPa) | 47 | | | | | | | |

TABLE 1F

| Example | 36 | 37 | 38 | 39 | 40 | 41 | 42 | 43 |
|---|---|---|---|---|---|---|---|---|
| $SiO_2$ (wt %) | 69.70 | 69.43 | 69.60 | 69.42 | 69.52 | 69.53 | 69.52 | 69.56 |
| $Al_2O_3$ (wt %) | 1.96 | 1.96 | 1.96 | 1.76 | 1.81 | 1.76 | 1.81 | 1.76 |
| $Li_2O$ (wt %) | 13.93 | 14.00 | 13.97 | 14.20 | 14.14 | 14.14 | 14.14 | 14.14 |
| $Na_2O$ (wt %) | 0.08 | 0.14 | 0.13 | 0.13 | 0.13 | 0.14 | 0.13 | 0.14 |
| $K_2O$ (wt %) | 0.13 | 0.13 | 0.13 | 0.18 | 0.18 | 0.18 | 0.18 | 0.18 |
| CaO (wt %) | 1.58 | 1.61 | 1.60 | 1.58 | 1.59 | 1.60 | 1.59 | 1.60 |
| $ZrO_2$ (wt %) | 8.49 | 8.54 | 8.54 | 9.05 | 9.07 | 9.06 | 9.07 | 9.06 |
| $P_2O_5$ (wt %) | 3.87 | 3.88 | 3.86 | 3.50 | 3.48 | 3.49 | 3.48 | 3.49 |
| $Fe_2O_3$ (wt %) | 0.06 | 0.06 | 0.06 | 0.06 | 0.06 | 0.06 | 0.06 | 0.06 |
| $HfO_2$ (wt %) | 0.14 | 0.16 | 0.16 | 0.17 | 0.17 | 0.17 | 0.17 | 0.17 |
| $SnO_2$ (wt %) | 0.06 | 0.03 | 0.04 | 0.04 | 0.03 | 0.03 | 0.03 | 0.03 |

TABLE 1F-continued

| Example | 36 | 37 | 38 | 39 | 40 | 41 | 42 | 43 |
|---|---|---|---|---|---|---|---|---|
| $Al_2O_3$:$Li_2O$ | 0.14 | 0.14 | 0.14 | 0.12 | 0.13 | 0.12 | 0.13 | 0.12 |
| $Li_2O$:$ZrO_2$ | 1.64 | 1.64 | 1.64 | 1.57 | 1.56 | 1.56 | 1.56 | 1.56 |
| $Li_2O$:($Li_2O$ + $K_2O$ + $Na_2O$) | 0.99 | 0.98 | 0.98 | 0.98 | 0.98 | 0.98 | 0.98 | 0.98 |
| Thickness (mm) | 4.3 | 3.0 | 3.9 | 4.3 | 0.8 | 3.0 | 0.8 | 3.0 |
| ceramming cycle (nucleation (° C.-hr), (growth (° C.-hr)) | 570-4, 710-1 | 560-4, 710-1 | 560-4, 710-1 | 600-4, 710-1 | 595-4, 720-1 | 595-4, 720-1 | 530-6, 720-1 | 530-6, 720-1 |
| Haze (%) | 0.10% at 0.5 mm | 0.09% at 0.6 mm | 0.10% at 0.6 mm | 0.17% at 0.5 mm | 0.23% at 0.6 mm | 0.22% at 0.6 mm | 0.13% at 0.6 mm | 0.13% at 0.6 mm |
| Phase assemblage | Lithium disilicate; lithio-phosphate | Lithium disilicate; lithio-phosphate | Lithium disilicate; lithio-phosphate | Lithium disilicate; lithio-phosphate | Lithium disilicate; lithio-phosphate | Lithium disilicate; lithio-phosphate | Lithium disilicate; lithio-phosphate | Lithium disilicate; lithio-phosphate |
| Rietveld parameter - Glass | 22.8 | 26.6 | 24.2 | 27.5 | 29.1 | 28.6 | 27.3 | 25.8 |
| Rietveld parameter - $Li_2Si_2O_5$ | 72.8 | 70.3 | 71 | 69.4 | 67.8 | 68.4 | 69.5 | 71.1 |
| Rietveld parameter - $Li_2SiO_3$ | 0 | 0 | 0 | 0 | 0 | 0 | 0 | 0 |
| Rietveld parameter - $Li_3PO_4$ | 4.4 | 3 | 4.6 | 3.1 | 3.1 | 3.1 | 3.2 | 3.1 |
| $Li_2Si_2O_5$ Crystallite size (nm) | 13 | 13 | 13 | 19 | 21 | 21 | 17 | 17 |
| $K_{1c}$ (MPa · $m^{1/2}$) | 1.24 | 1.22 | | 1.35 | 1.35 | | 1.30 | |
| Young's modulus (GPa) | 109.071 | 109.093 | | 110.019 | 110.149 | | 110.324 | |
| Poisson's ratio | 0.215 | 0.215 | | 0.212 | 0.216 | | 0.214 | |
| Shear modulus (GPa) | 44.885 | 44.891 | | 45.396 | 45.285 | | 45.437 | |

TABLE 1G

| Example | 44 | 45 | 46 | 47 | 48 | 49 | 50 |
|---|---|---|---|---|---|---|---|
| $SiO_2$ (wt %) | 69.67 | 69.83 | 69.06 | 68.70 | 68.23 | 68.54 | 69.39 |
| $Al_2O_3$ (wt %) | 1.95 | 1.98 | 1.94 | 1.91 | 1.99 | 2.79 | 1.87 |
| $Li_2O$ (wt %) | 14.50 | 14.50 | 14.30 | 14.20 | 14.30 | 14.30 | 14.30 |
| $Na_2O$ (wt %) | 0.10 | 0.10 | 0.10 | 0.10 | 0.12 | 0.10 | 0.10 |
| $K_2O$ (wt %) | 0.19 | 0.20 | 0.20 | 0.19 | 0.20 | 0.18 | 0.19 |
| MgO (wt %) | 0.58 | 1.13 | 0.02 | 0.01 | 0.02 | 0.05 | 0.05 |
| CaO (wt %) | 0.81 | 0.02 | 0.80 | 0.04 | 0.80 | 2.06 | 2.08 |
| SrO (wt %) | 0.01 | 0.01 | 1.44 | 2.82 | 0.04 | 0.01 | 0.00 |
| BaO (wt %) | 0.00 | 0.00 | 0.02 | 0.04 | 2.09 | 0.00 | 0.00 |
| $ZrO_2$ (wt %) | 8.71 | 8.73 | 8.52 | 8.33 | 8.41 | 8.35 | 8.66 |
| $P_2O_5$ (wt %) | 3.56 | 3.67 | 3.57 | 3.54 | 3.76 | 3.60 | 3.42 |
| $Al_2O_3$:$Li_2O$ | 0.13 | 0.14 | 0.14 | 0.13 | 0.14 | 0.20 | 0.13 |
| $Li_2O$:$ZrO_2$ | 1.66 | 1.66 | 1.68 | 1.71 | 1.70 | 1.71 | 1.65 |
| $Li_2O$:($Li_2O$ + $K_2O$ + $Na_2O$) | 0.98 | 0.98 | 0.98 | 0.98 | 0.98 | 0.98 | 0.98 |
| ceramming cycle (nucleation (° C.-hr), (growth (° C.-hr)) | 560-6, 720-1 | 560-6, 720-1 | 560-6, 720-1 | 560-6, 720-1 | 560-6, 720-1 | 560-6, 720-1 | 560-4, 720-1 |
| Haze (6 mm) | 0.19% | 0.23% | 0.18% | 0.22% | | 0.17% | 0.28% |
| Phase assemblage | | | | | | | |
| Rietveld parameter - Glass | 30.3 | 34.3 | 26.5 | 27.1 | 40.7 | 8.6 | 29.5 |
| Rietveld parameter - $Li_2Si_2O_5$ | 67.4 | 63.2 | 70.4 | 71.1 | 56 | 77.9 | 68.2 |
| Rietveld parameter - $Li_2SiO_3$ | 0 | 0 | 0 | 0 | 0 | 0 | 0 |
| Rietveld parameter - $Li_3PO_4$ | 2.4 | 2.6 | 3.1 | 2.4 | 2.1 | 3.5 | 2.3 |
| $Li_2Si_2O_5$ Crystallite size (nm) | 19 | 20 | 16 | 19 | 29 | 18 | 27 |
| $K_{1c}$ (MPa · $m^{1/2}$) | 1.26 | 1.36 | 1.31 | 1.24 | | 1.17 | 1.39 |
| Young's modulus (GPa) | 110 | 109 | 110 | 110 | | 111 | 110 |

TABLE 1H

| Example | 51 | 52 | 53 | 54 | 55 | 56 |
|---|---|---|---|---|---|---|
| $SiO_2$ (wt %) | 70.64 | 71.49 | 72.44 | 70.13 | 70.55 | 69.61 |
| $Al_2O_3$ (wt %) | 1.91 | 1.92 | 1.93 | 1.91 | 1.92 | 1.91 |
| $Li_2O$ (wt %) | 14.01 | 14.08 | 14.16 | 14.02 | 14.10 | 14.02 |
| $Na_2O$ (wt %) | 0.14 | 0.14 | 0.14 | 0.14 | 0.14 | 0.14 |
| $K_2O$ (wt %) | 0.15 | 0.15 | 0.15 | 0.15 | 0.15 | 0.15 |
| MgO(wt %) | — | — | — | — | — | — |
| CaO (wt %) | 1.60 | 1.61 | 1.62 | 2.10 | 2.62 | 2.60 |
| SrO (wt %) | — | — | — | — | — | — |
| ZnO (wt %) | — | — | — | — | — | — |
| $P_2O_5$ (wt %) | 3.90 | 3.92 | 3.94 | 3.90 | 3.93 | 3.90 |
| $ZrO_2$ (wt %) | 7.57 | 6.63 | 5.55 | 7.57 | 6.51 | 7.57 |
| $Al_2O_3$:$Li_2O$ | 0.14 | 0.14 | 0.14 | 0.14 | 0.14 | 0.14 |
| $Li_2O$:$ZrO_2$ | 1.85 | 2.12 | 2.55 | 1.85 | 2.17 | 1.85 |
| $Li_2O$:($Li_2O$ + $K_2O$ + $Na_2O$) | 0.98 | 0.98 | 0.98 | 0.98 | 0.98 | 0.98 |
| Liquidus Temp. (° C.) | — | — | — | — | — | — |
| Liquidus phase | — | — | — | — | — | — |
| Liquidus viscosity (poise) | — | — | — | — | — | — |
| ceramming cycle (nucleation (° C.-hr), (growth (° C.-hr)) | 560-6, 740-1 | 560-6, 740-1 | 560-6, 740-1 | 560-6, 740-1 | 560-6, 740-1 | 560-6, 740-1 |
| Rietveld parameter - Glass | 20 | 18 | 19 | 19 | 16 | 16 |
| Rietveld parameter - $Li_2Si_2O_5$ | 76 | 78 | 78 | 77 | 80 | 80 |
| $Li_2Si_2O_5$ Crystallite Size (nm) | 16 | 18 | 22 | 19 | 24 | 20 |
| Rietveld parameter - $Li_2SiO_3$ | — | — | — | — | — | — |
| Rietveld parameter - $Li_3PO_4$ | 4 | 4 | 3 | 4 | 4 | 4 |
| Haze at 0.6 mm | 0.25 | 0.32 | 0.3 | 0.46 | 0.3 | 0.27 |
| $K_{1c}$ (MPa · $m^{1/2}$) | 1.28 | 1.32 | 1.34 | 1.31 | 1.33 | 1.37 |
| Young's modulus (GPa) | 110 | 111 | 111 | 111 | 112 | 112 |
| Poisson's ratio | 0.213 | 0.212 | 0.213 | 0.213 | 0.216 | 0.217 |
| Shear modulus (GPa) | 45.5 | 45.6 | 45.6 | 45.7 | 45.9 | 45.8 |

TABLE 1I

| Example | 57 | 58 | 59 | 60 | 61 | 62 |
|---|---|---|---|---|---|---|
| $SiO_2$ (wt %) | 70.97 | 71.40 | 70.14 | 69.95 | 68.38 | 67.72 |
| $Al_2O_3$ (wt %) | 1.93 | 1.95 | 1.92 | 1.92 | 2.79 | 3.24 |
| $Li_2O$ (wt %) | 14.19 | 14.27 | 14.02 | 13.99 | 13.88 | 13.86 |
| $Na_2O$ (wt %) | 0.15 | 0.15 | 0.70 | 0.96 | 0.69 | 0.96 |
| $K_2O$ (wt %) | 0.15 | 0.15 | 0.15 | 0.15 | 0.15 | 0.15 |
| MgO(wt %) | — | — | — | — | — | — |
| CaO (wt %) | 3.14 | 3.67 | 2.61 | 2.60 | 1.59 | 1.58 |
| SrO (wt %) | — | — | — | — | — | — |
| ZnO (wt %) | — | — | — | — | — | — |
| $P_2O_5$ (wt %) | 3.95 | 3.97 | 3.90 | 3.90 | 3.86 | 3.86 |
| $ZrO_2$ (wt %) | 5.43 | 4.35 | 6.48 | 6.46 | 8.58 | 8.57 |
| $Al_2O_3$:$Li_2O$ | 0.13635 | 0.13635 | 0.13703 | 0.13734 | 0.20128 | 0.23375 |
| $Li_2O$:$ZrO_2$ | 2.61 | 3.28 | 2.16 | 2.17 | 1.62 | 1.62 |
| $Li_2O$:($Li_2O$ + $K_2O$ + $Na_2O$) | 0.98 | 0.98 | 0.94 | 0.93 | 0.94 | 0.93 |
| Liquidus Temp. (° C.) | — | — | — | — | — | — |
| Liquidus phase | — | — | — | — | — | — |
| Liquidus viscosity (poise) | — | — | — | — | — | — |
| ceramming cycle (nucleation (° C.-hr), (growth (° C.-hr)) | 520-6, 720-1 | 520-6, 720-1 | 520-6, 720-1 | 520-6, 720-1 | 520-6, 720-1 | 520-6, 720-1 |
| Rietveld parameter - Glass | — | — | 19.4 | 23.2 | 27.7 | 21.4 |
| Rietveld parameter - $Li_2Si_2O_5$ | — | — | 77.3 | 73.8 | 68.2 | 74.4 |
| $Li_2Si_2O_5$ Crystallite Size (nm) | — | — | 22 | 24 | 16 | 16 |
| Rietveld parameter - $Li_2SiO_3$ | — | — | — | — | — | — |
| Rietveld parameter - $Li_3PO_4$ | — | — | 3.3 | 3 | 4.1 | 4.1 |
| Haze at 0.6 mm | 0.46 | — | 0.47 | 0.43 | — | — |
| $K_{1c}$ (MPa · $m^{1/2}$) | 1.37 | — | 1.3 | 1.31 | — | — |

TABLE 1I-continued

| Example | 57 | 58 | 59 | 60 | 61 | 62 |
|---|---|---|---|---|---|---|
| Young's modulus (GPa) | 112 | — | 111 | 112 | — | — |
| Poisson's ratio | 0.218 | — | 0.215 | 0.218 | — | — |
| Shear modulus (GPa) | 46.1 | — | 45.7 | 45.5 | — | — |

TABLE 1J

| Example | 63 | 64 | 65 | 66 | 67 | 68 |
|---|---|---|---|---|---|---|
| $SiO_2$ (wt %) | 70.97 | 71.40 | 70.14 | 69.95 | 68.38 | 67.72 |
| $Al_2O_3$ (wt %) | 1.93 | 1.95 | 1.92 | 1.92 | 2.79 | 3.24 |
| $Li_2O$ (wt %) | 14.19 | 14.27 | 14.02 | 13.99 | 13.88 | 13.86 |
| $Na_2O$ (wt %) | 0.15 | 0.15 | 0.70 | 0.96 | 0.69 | 0.96 |
| $K_2O$ (wt %) | 0.15 | 0.15 | 0.15 | 0.15 | 0.15 | 0.15 |
| MgO(wt %) | — | — | — | — | — | — |
| CaO (wt %) | 3.14 | 3.67 | 2.61 | 2.60 | 1.59 | 1.58 |
| SrO (wt %) | — | — | — | — | — | — |
| ZnO (wt %) | — | — | — | — | — | — |
| $P_2O_5$ (wt %) | 3.95 | 3.97 | 3.90 | 3.90 | 3.86 | 3.86 |
| $ZrO_2$ (wt %) | 5.43 | 4.35 | 6.48 | 6.46 | 8.58 | 8.57 |
| $Al_2O_3$:$Li_2O$ | 0.13635 | 0.13635 | 0.13703 | 0.13734 | 0.20128 | 0.23375 |
| $Li_2O$:$ZrO_2$ | 2.61 | 3.28 | 2.16 | 2.17 | 1.62 | 1.62 |
| $Li_2O$:($Li_2O$ + $K_2O$ + $Na_2O$) | 0.98 | 0.98 | 0.94 | 0.93 | 0.94 | 0.93 |
| Liquidus Temp. (° C.) | — | — | — | — | — | — |
| Liquidus phase | — | — | — | — | — | — |
| Liquidus viscosity (poise) | — | — | — | — | — | — |
| ceramming cycle (nucleation (° C.-hr), (growth (° C.-hr)) | 560-6, 740-1 | 560-6, 740-1 | 560-6, 740-1 | 560-6, 740-1 | 560-6, 740-1 | 560-6, 740-1 |
| Rietveld parameter - Glass | 13 | — | 23 | 20 | 24 | 19 |
| Rietveld parameter - $Li_2Si_2O_5$ | 85 | — | 73 | 75 | 71 | 76 |
| $Li_2Si_2O_5$ Crystallite Size (nm) | 26 | — | 25 | 27 | 18 | 21 |
| Rietveld parameter - $Li_2SiO_3$ | — | — | — | — | — | — |
| Rietveld parameter - $Li_3PO_4$ | — | — | 4 | 5 | 5 | 4 |
| Haze at 0.6 mm | — | — | — | — | 0.37 | 0.22 |
| $K_{1c}$ (MPa · $m^{1/2}$) | — | — | — | — | 1.27 | 1.23 |
| Young's modulus (GPa) | — | — | — | — | 110 | 110 |
| Poisson's ratio | — | — | — | — | 0.213 | 0.216 |
| Shear modulus (GPa) | — | — | — | — | 45.4 | 45.4 |

Figure 4:
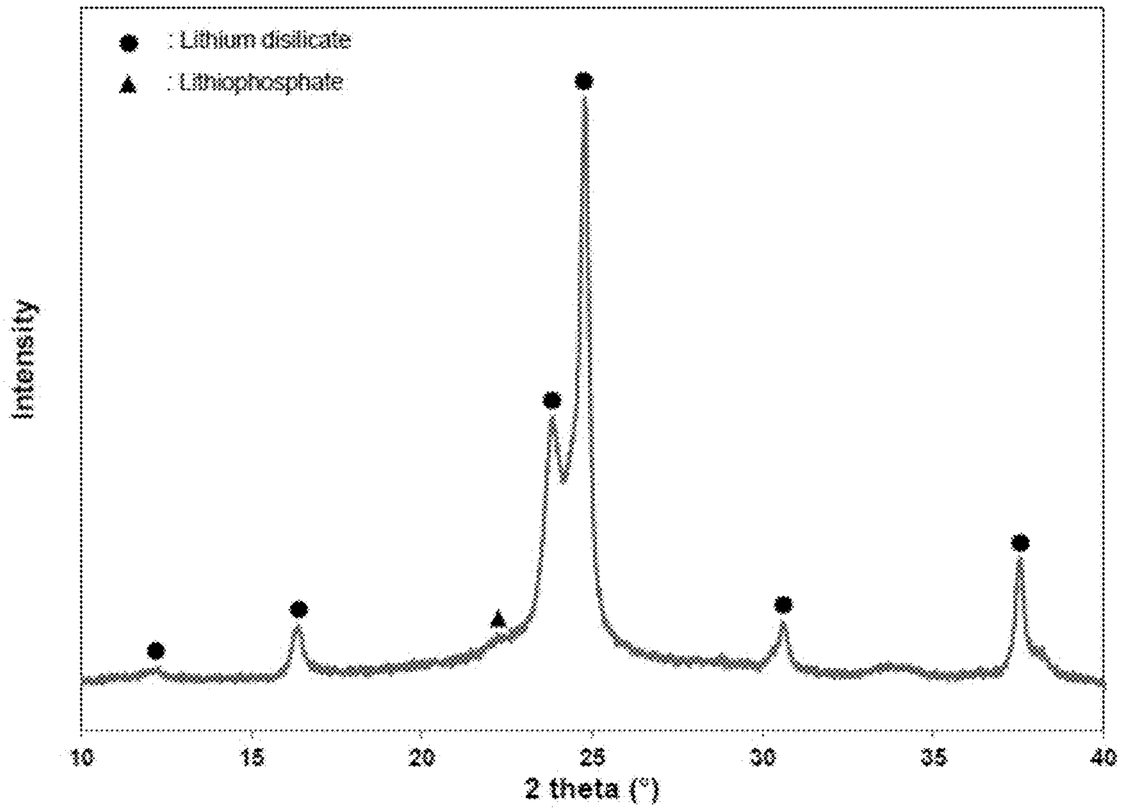
FIG. 4 is an x-ray diffraction spectrum of a glass-ceramic according to one or more embodiments described herein.

Following ceramming, the phase assemblage and Rietveld parameters of each of the glass-ceramic plates was determined by x-ray diffraction using the Rietveld method, as described herein. As an example, FIG. 4 graphically depicts the x-ray diffraction spectrum of Example 2 indicating that the glass-ceramic plates of Example 2 included two crystalline phase: lithium disilicate and lithiophosphate. FIG. 4 also demonstrates that the lithium disilicate crystalline phase was the primary crystalline phase present in the glass-ceramic plate. X-ray diffraction was also utilized to determine the Rietveld parameters of each crystalline phase present and the amount of the residual amorphous glass phase.

Figure 5:
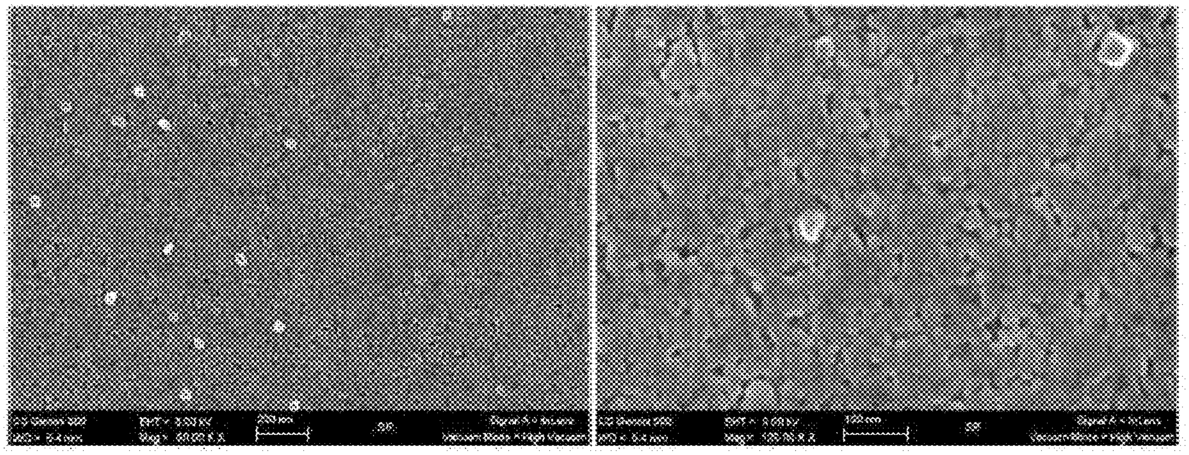
FIG. 5 is an SEM micrograph showing the microstructure and crystallites of a glass-ceramic according to one or more embodiments described herein.

Further, following ceramming, the microstructure of the glass-ceramic plates was assessed by scanning electron microscopy to determine the microstructure, crystallite size, and the like of the glass-ceramics. In particular, samples of the glass-ceramic plates were etched in a solution of 0.5 wt % HF and water for 10 seconds and then imaged with a scanning electron microscope to assess the crystallite size and microstructure of the samples. As an example, FIG. 5 is an SEM micrograph of a glass-ceramic plate of Example 2 showing the microstructure of the glass-ceramic plate at different magnifications.

Referring now to Table 2, glass plates having the composition of Example 19 and a thickness of 0.5 mm were heat treated at a nucleation temperature of 570° C. for a nucleation time of 4 hours and, thereafter, heat treated at growth temperatures from 690° C. to 740° C. for a growth time of 1 hour to determine the effect of growth temperature on haze, Young's modulus, and fracture toughness. The results are reported in Table 2 below.

TABLE 2

| Nucleation Temp. (° C.) | Nucleation Time (hr) | Growth Temp. (° C.) | Growth Time (hr) | Haze (%) | Young's modulus (GPa) | $K_{1c}$ (MPa · $m^{1/2}$) |
|---|---|---|---|---|---|---|
| 570 | 4 | 690 | 1 | 0.20 | 103.71 | — |
| 570 | 4 | 700 | 1 | 0.12 | 107.07 | 1.23 |
| 570 | 4 | 710 | 1 | 0.12 | 108.16 | 1.27 |
| 570 | 4 | 730 | 1 | 0.12 | 108.87 | 1.29 |
| 570 | 4 | 740 | 1 | 0.38 | 109.53 | — |

The data indicates that increasing the growth temperature to within the range of 700° C. to 730° C. can provide glass-ceramics with relatively high fracture toughnesses of greater than 1.20 MPa·m$^{1/2}$ and relatively high Young's moduli of greater than 105 GPa while also decreasing the haze of the resulting glass-ceramics, thereby providing glass-ceramics with both improved mechanical and improved optical properties. While not wishing to be bound by theory, it is believed that the improvement in fracture toughness and Young's modulus are due, in part, to a high degree of crystallinity in the resulting glass-ceramics and the presence of an interlocking microstructure.

Referring now to Table 3, glass-ceramic plates of Example 19 and Comparative Example A were strengthened by ion exchange in a molten salt bath comprising 20 wt % $KNO_3$, 80 wt % $NaNO_3$, and 0.14 wt % $LiNO_3$ at a temperature of 500° C. for times ranging from 4 hours to 14 hours to assess the amount of maximum central tension (mCT) and stored strain energy (SSE) that develop in the glass-ceramic plates as a result of ion exchange. The results are reported in Table 3. The maximum central tension (Y-axis) as a function of ion exchange time (X-axis) is plotted in FIG. 6.

TABLE 3

| Example | IOX Time (hr.) | CT (MPa) | SSE (J/m$^2$) | Thickness (mm) |
|---|---|---|---|---|
| Example 19 | 4 | 167.38 | 45.8 | 0.54 |
| Example 19 | 6 | 207.19 | 57.1 | 0.54 |
| Example 19 | 8 | 237.35 | 64.7 | 0.54 |
| Example 19 | 10 | 246.56 | 66.9 | 0.54 |
| Example 19 | 12 | 242.73 | 63.4 | 0.54 |
| Example 19 | 14 | 238.62 | 61.8 | 0.54 |
| Comp. A | 4 | 197.16 | 53.6 | 0.53 |
| Comp. A | 6 | 219.81 | 56.8 | 0.53 |
| Comp. A | 8 | 222.87 | 55.6 | 0.53 |
| Comp. A | 10 | 203.28 | 47.6 | 0.53 |
| Comp. A | 12 | 189.93 | 41.5 | 0.53 |
| Comp. A | 14 | 165.93 | 33.2 | 0.53 |

Figure 6:
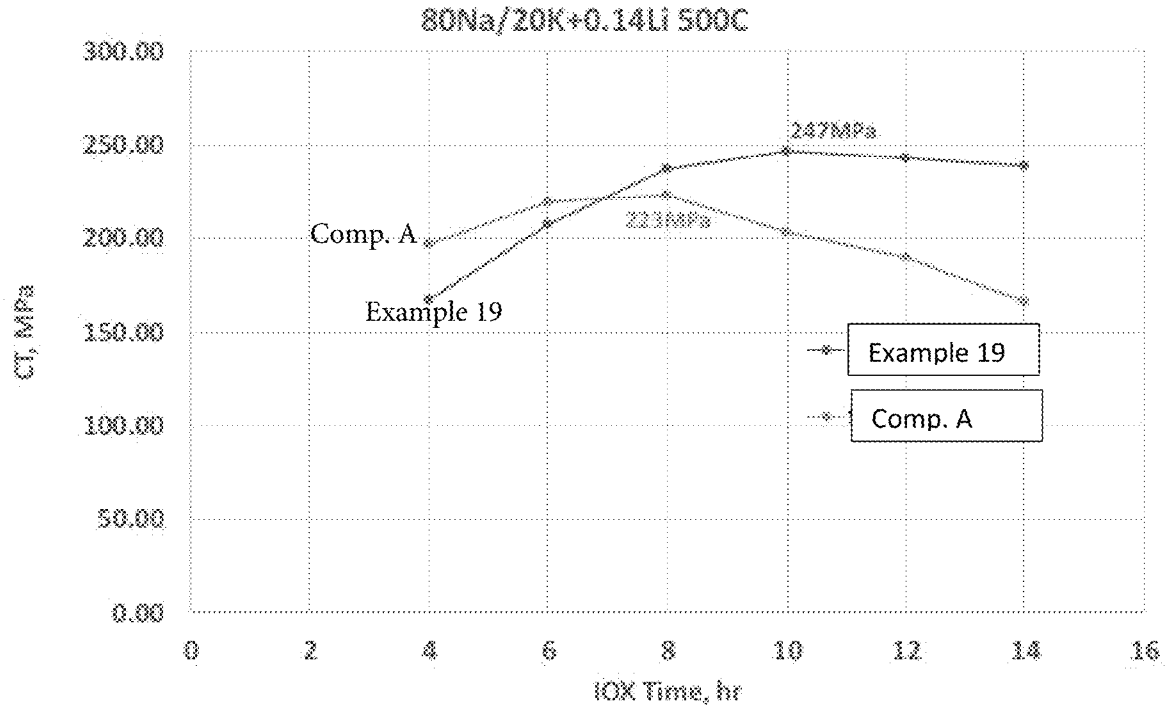
FIG. 6 graphically depicts the maximum central tension (Y-axis) as a function of ion exchange time (X-axis) for a lithium disilicate glass-ceramic plate according to one or more embodiments described herein and a petalite-lithium disilicate plate.

As indicated in Table 3 and FIG. 6, the glass-ceramic plates of Example 19 were able to achieve a higher maximum central tension (maximum mCT of 247 MPa) than the glass-ceramic plates of Comparative Example A (maximum mCT of 223 MPa) upon exposure to the same ion exchange conditions. Similarly, the glass-ceramic plates of Example 19 were able to achieve a higher stored strain energy (maximum SSE of 66.9 J/m$^2$) than the glass-ceramic plates of Comparative Example A (maximum SSE of 56.8 J/m$^2$) upon exposure to the same ion exchange conditions. Without wishing to be bound by theory, it is believed that the relative increase in the maximum central tension and the stored strain energy of the lithium disilicate glass-ceramic plates of Example 19 is due to the composition of the residual glass in the glass-ceramic and, in particular, the relatively high concentration of $Li_2O$ and $ZrO_2$, for example, in the residual glass.

Referring now to Table 4, the glass-ceramic plates of Examples 11-14 and Comparative Example A were strengthened by ion exchange in a molten salt bath comprising 20 wt % $KNO_3$, 80 wt % $NaNO_3$, and 0.14 wt % $LiNO_3$ at a temperature of 500° C. for times ranging from 2 hours to 15 hours to assess the amount of maximum central tension (mCT) and stored strain energy (SSE) that develop in the glass-ceramic plates as a result of ion exchange. The results are reported in Table 4. The maximum central tension (Y-axis) as a function of ion exchange time (X-axis) is plotted in FIG. 7.

TABLE 4

| Example | IOX Time (hr.) | CT (MPa) | SSE (J/m$^2$) | Thickness (mm) |
|---|---|---|---|---|
| Example 11 | 2 | 143.93 | 36.98 | 0.54 |
| Example 11 | 6 | 242.06 | 72.81 | 0.55 |
| Example 11 | 8 | 267.95 | 78.25 | 0.55 |
| Example 11 | 11 | 216.93 | 51.50 | 0.55 |
| Example 11 | 15 | 207.39 | 47.22 | 0.54 |
| Example 12 | 2 | 195.13 | 54.61 | 0.49 |
| Example 12 | 6 | 275.38 | 71.87 | 0.49 |
| Example 12 | 8 | 250.46 | 63.41 | 0.49 |
| Example 12 | 11 | 216.67 | 48.56 | 0.51 |
| Example 12 | 15 | 129.07 | 17.01 | 0.49 |
| Example 13 | 2 | 236.06 | 76.55 | 0.50 |
| Example 13 | 6 | 298.15 | 94.42 | 0.50 |
| Example 13 | 8 | 268.58 | 75.96 | 0.50 |
| Example 13 | 11 | 211.26 | 46.90 | 0.51 |
| Example 13 | 15 | 130.18 | 20.70 | 0.49 |
| Example 14 | 2 | 170.86 | 51.72 | 0.53 |
| Example 14 | 6 | 289.14 | 91.21 | 0.52 |
| Example 14 | 8 | 295.04 | 92.81 | 0.52 |
| Example 14 | 11 | 260.06 | 66.43 | 0.51 |
| Example 14 | 15 | 205.09 | 44.56 | 0.51 |
| Comp. A | 2 | 145.39 | 35.99 | 0.5 |
| Comp. A | 6 | 223.64 | 55.22 | 0.5 |
| Comp. A | 7 | 221.96 | 52.31 | 0.5 |
| Comp. A | 8 | 214.11 | 47.91 | 0.5 |
| Comp. A | 11 | 178.09 | 35.14 | 0.5 |
| Comp. A | 12 | 174.12 | 33.25 | 0.5 |
| Comp. A | 15 | 136.17 | 21.24 | 0.5 |

Figure 7:
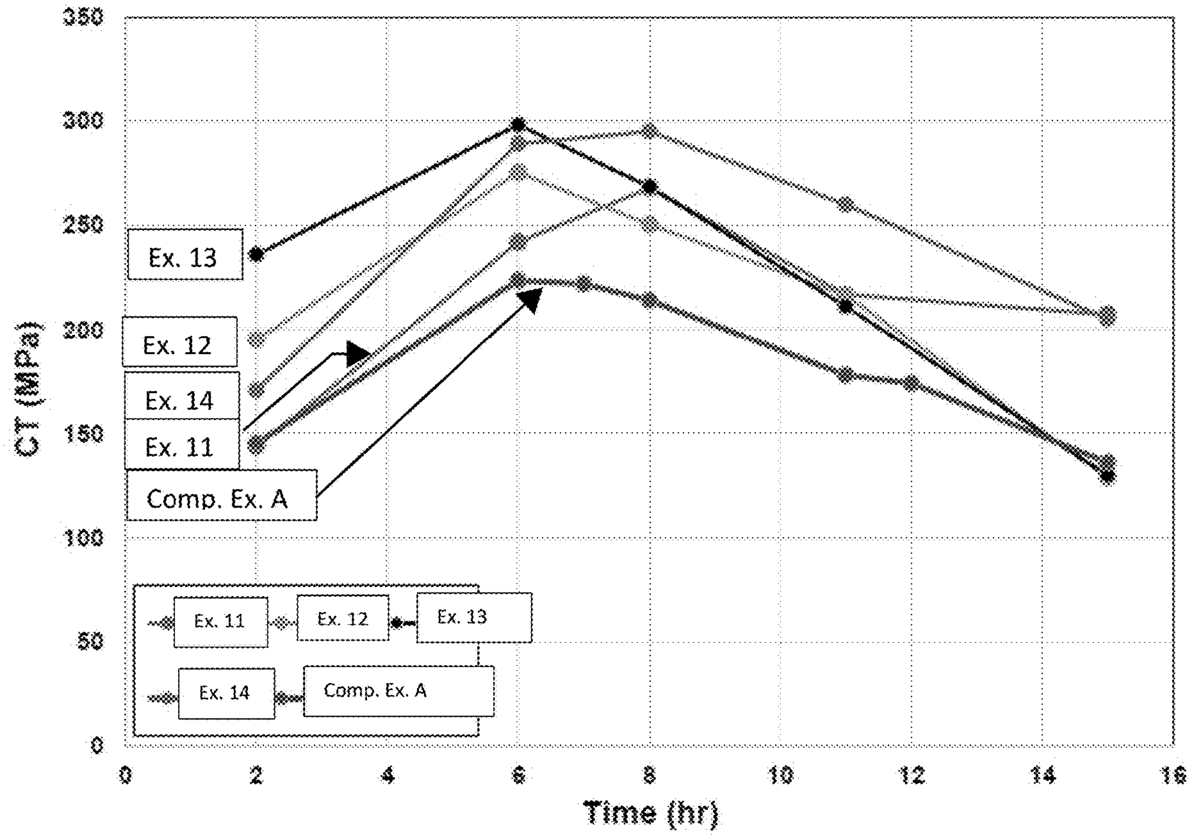
FIG. 7 graphically depicts the maximum central tension (Y-axis) as a function of ion exchange time (X-axis) for lithium disilicate glass-ceramic plates according to embodiments described herein and a petalite-lithium disilicate plate.

As indicated in Table 4 and FIG. 7, the lithium disilicate glass-ceramic plates of Examples 11-14 were able to achieve higher maximum central tensions than the petalite-lithium disilicate glass-ceramic plates of Comparative Example A upon exposure to the same ion exchange conditions. Similarly, the lithium disilicate glass-ceramic plates of Examples 11-14 were able to achieve a higher stored strain energy than the petalite-lithium disilicate glass-ceramic plates of Comparative Example A upon exposure to the same ion exchange conditions. Without wishing to be bound by theory, it is believed that the relative increase in the maximum central tension and the stored strain energy of the lithium disilicate glass-ceramic plates of Examples 11-14 is due to the composition of the residual glass in the glass-ceramic and, in particular, the relatively high concentration of $Li_2O$ and $ZrO_2$, for example, in the residual glass.

Figure 8:
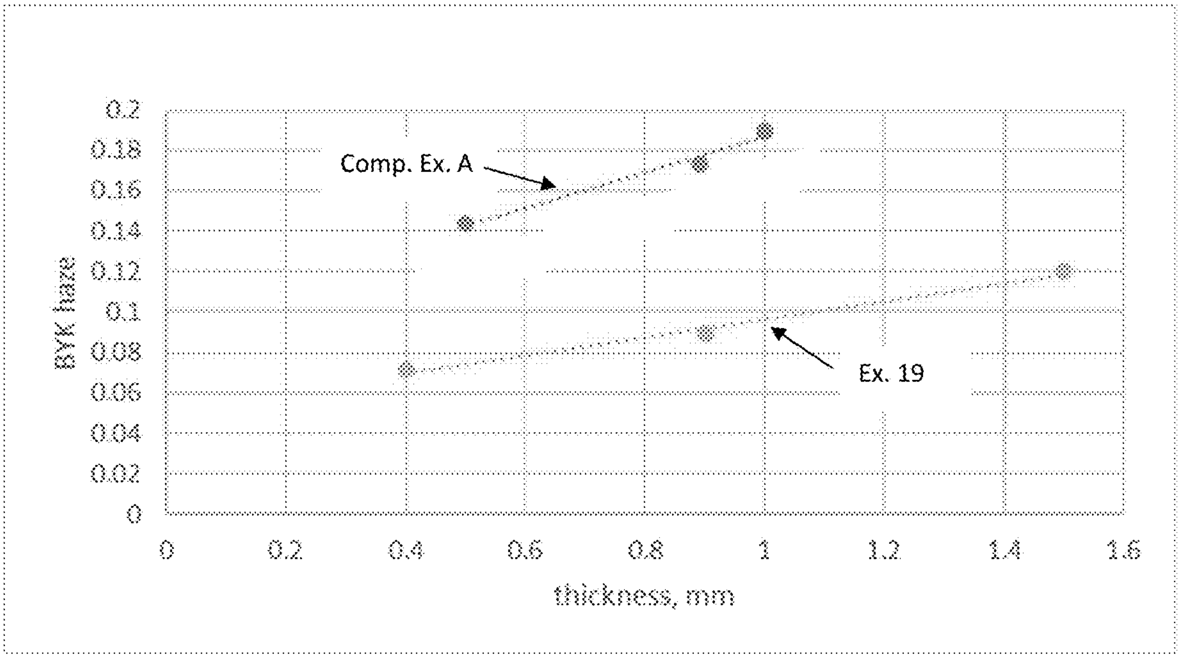
FIG. 8 graphically depicts the haze (Y-axis) as function of thickness (X-axis) for glass-ceramic plates according to embodiments described herein and glass-ceramic plates formed from a comparative glass-ceramic composition.

Glass-ceramic plates having thicknesses ranging from 0.4 mm to 1.5 mm were formed from the glass-ceramics of Example 19 and Comparative Ex. A (Comp. A of Table 1C). The haze of each glass-ceramic plate was then determined. FIG. 8 graphically depicts the haze (Y-axis) as a function of thickness (X-axis) for the glass-ceramic plates formed from the glass ceramic of Example 19 and the glass-ceramic plates formed from Comparative Ex. A.

As shown in FIG. 8, the glass-ceramic plates formed from the glass-ceramic of Example 19 had lower haze values for all thicknesses compared to the glass-ceramic plates formed from the glass-ceramic of Comparative Ex. A. In particular, the glass-ceramic plates formed from the glass-ceramic of Example 19 and having a thickness of 1.5 mm had lower haze values than the glass-ceramic plates formed from the glass-ceramic of Comparative Ex. A and having a thickness of 0.5 mm, demonstrating that the glass-ceramic of Example 19 has significantly improved optical properties relative the glass-ceramic of Comparative Ex. A. While not wishing to be bound by theory, it is believed that the improved optical properties of the glass-ceramic of Example 19 are due, at least in part, to the composition and phase assemblage of the glass-ceramic of Example 19. The data in FIG. 8 demonstrate that the glass-ceramic plates formed from the composition of Example 19 had a haze of less than 0.2%. In one or more embodiments, the glass-ceramic exhibits such haze at thicknesses of less than 1.6 mm. In one or more embodiments, the glass-ceramic exhibits a haze (%) per mm of thickness within the range of greater than or equal to 0.06/mm and less than or equal to 0.4/mm.

Figure 9:
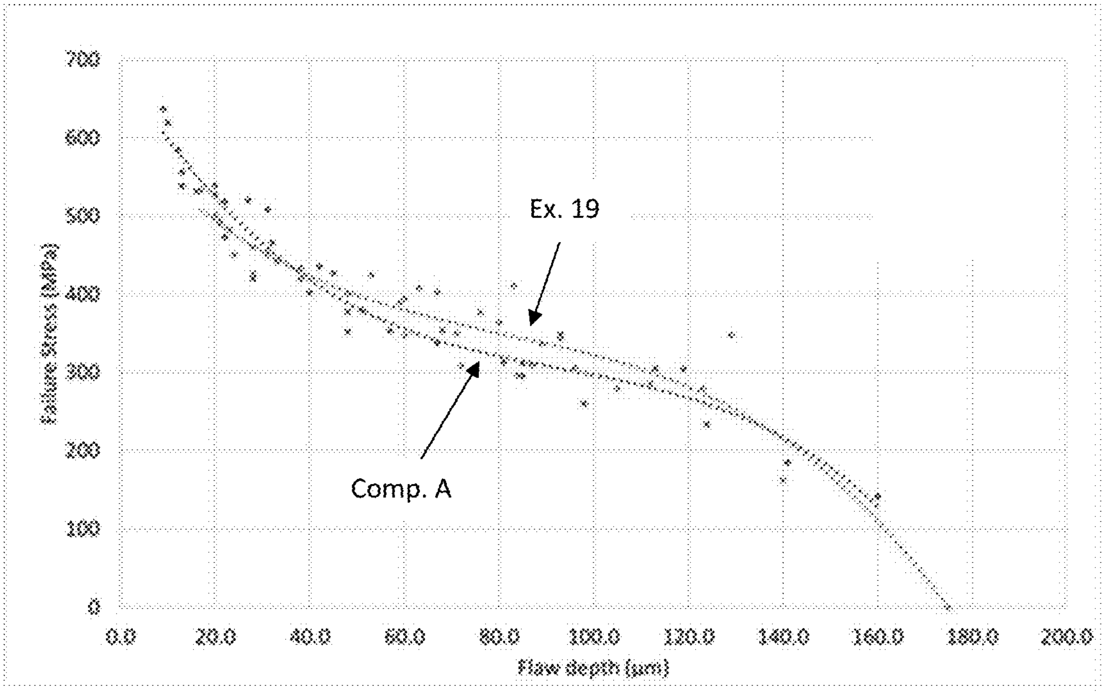
FIG. 9 graphically depicts the failure stress (Y-axis) as a function of flaw depth (X-axis) for glass-ceramic plates according to embodiments described herein and glass-ceramic plates formed from a comparative glass-ceramic composition.

Referring now to FIG. 9, glass-ceramic plates having thicknesses of approximately 0.5 mm were formed from the glass-ceramics of Example 19 and Comparative Ex. A (Comp. A of Table IC). The glass-ceramic plates were then strengthened by ion exchange in a salt bath comprising 60 wt % $KNO_3$/40 wt % $NaNO_3$/0.12 wt % $LiNO_3$ at a temperature of 530° C. for 6 hours. The $LiNO_3$ is added to the salt bath composition as a super addition. The retained strength was determined as a function of flaw depth in 4-point bending following damage introduction. In particular, flaws of different sizes were introduced in the glass-ceramic plates by the pressurized gas method as described herein. Thereafter, the glass-ceramic plates were tested in 4-point bending as described herein to determine the retained strength. The average depth of the flaws was also determined by optical inspection and image analysis of the tested parts following 4-point bending.

As graphically depicted in FIG. 9, the retained strength of the glass-ceramic plates formed from the composition of Example 19 and the glass-ceramic plates formed from the composition of Comparative Ex. A generally followed the same trend (i.e., the retained strength decreased with increasing flaw depth). The data in FIG. 9 demonstrate that the glass-ceramic plates formed from the composition of Example 19 had a retained strength of greater than 100 MPa for average flaw depths of less than or equal to 150 μm, a retained strength of greater than or equal to 200 MPa for average flaw depths less than or equal to 100 μm, a retained strength of greater than or equal to 350 MPa for average flaw depths less than or equal to 50 μm, a retained strength of greater than or equal to 450 MPa for average flaw depths less than or equal to 25 μm, and a retained strength of greater than or equal to 500 MPa for average flaw depths less than or equal to 10 μm.

Figure 10:
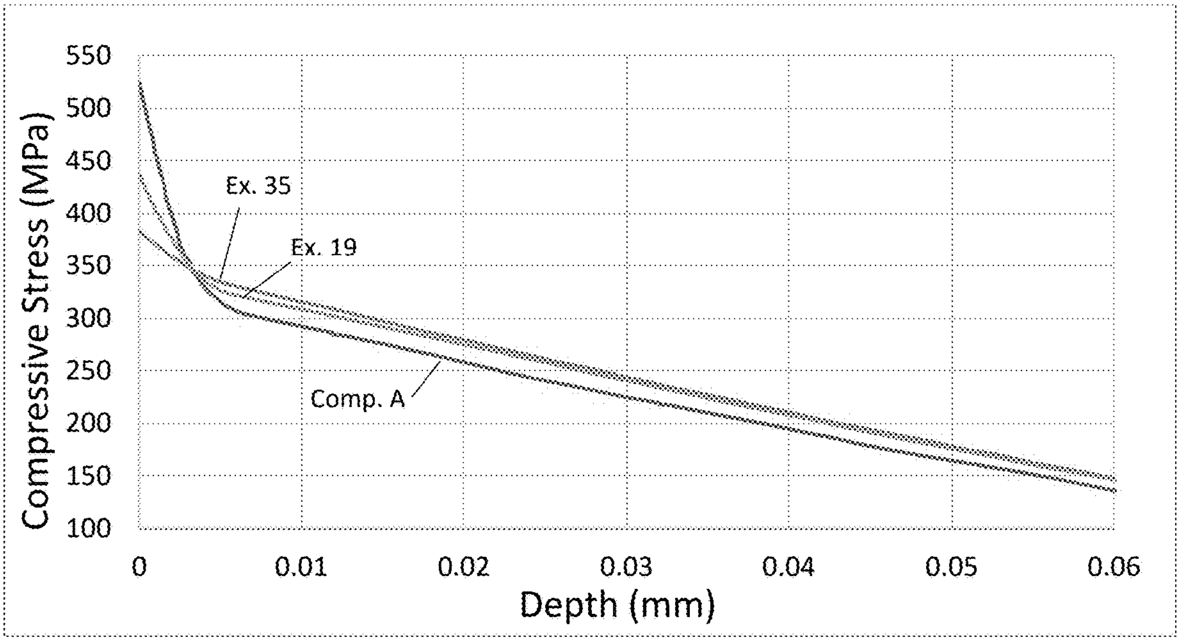
FIG. 10 graphically depicts the compressive stress (Y-axis) as a function of depth (X-axis) for lithium disilicate glass-ceramics according to embodiments described herein and a petalite-lithium disilicate glass-ceramic.

Referring now to FIG. 10, glass-ceramic plates formed from the glass-ceramics of Ex. 19, Ex. 35, and Comparative Example A were strengthened by ion exchange and, following ion exchange, the compressive stress of the glass-ceramic plates was determined as described herein. The glass-ceramic plates had a thickness t of 0.5 mm. The glass-ceramic plates of Ex. 19 were ion exchanged in a molten salt bath comprising 60 wt % $KNO_3$/40 wt % $NaNO_3$/0.12 wt % $LiNO_3$ at a temperature of 500° C. for 10 hours. The glass-ceramic plates of Ex. 35 were ion exchanged in a molten salt bath comprising 40 wt % $KNO_3$/60 wt % $NaNO_3$/0.16 wt % $LiNO_3$ at a temperature of 500° C. for 10 hours. The glass-ceramic plates of Comparative Example A were ion exchanged in a molten salt bath comprising 40 wt % $KNO_3$/60 wt % $NaNO_3$/0.12 wt % $LiNO_3$ at a temperature of 530° C. for 3 hours and 10 minutes. It is noted that the $LiNO_3$ is added to the salt bath compositions by super addition. As indicated in FIG. 10, the glass-ceramic plates formed from the glass-ceramic of Examples 19 and 35 achieved a greater compressive stress at depths of greater than or equal to 0.01t from the surface of the glass-ceramic plates than the glass-ceramic plates formed from the glass-ceramic of Comparative Example A. FIG. 10 also demonstrates that the glass-ceramic plates formed from the glass-ceramics of Examples 19 and 35 had compressive stresses $CS_D$ at a depth from 0.01t to 0.02t (where "t" is the thickness of the glass ceramic article) from the surface of the glass-ceramic plate of greater than or equal to 300 MPa throughout the range while the glass-ceramic plates formed from the glass-ceramic of Comparative Example A had a $CS_D$ of less that 300 MPa over at least a portion of this range.

Figure 11:
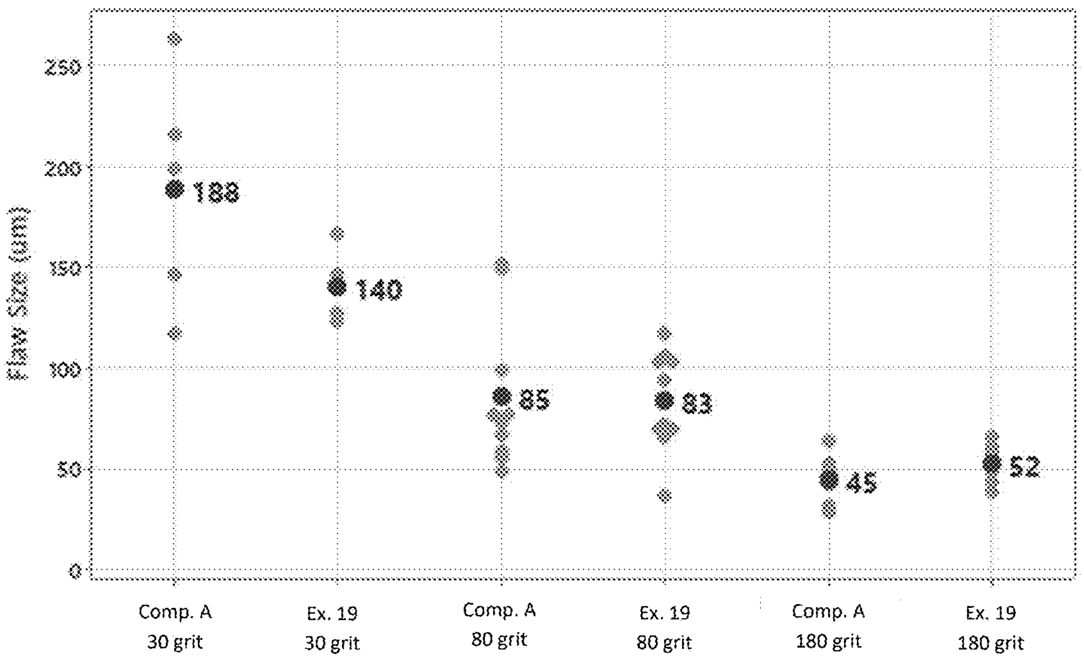
FIG. 11 graphically depicts the depth of flaws (Y-axis) introduced in non-ion exchanged lithium disilicate glass-ceramics according to embodiments described herein and non-ion exchanged petalite-lithium disilicate glass-ceramics for different sandpaper grits utilized in a pendulum impactor apparatus.
Figure 12:
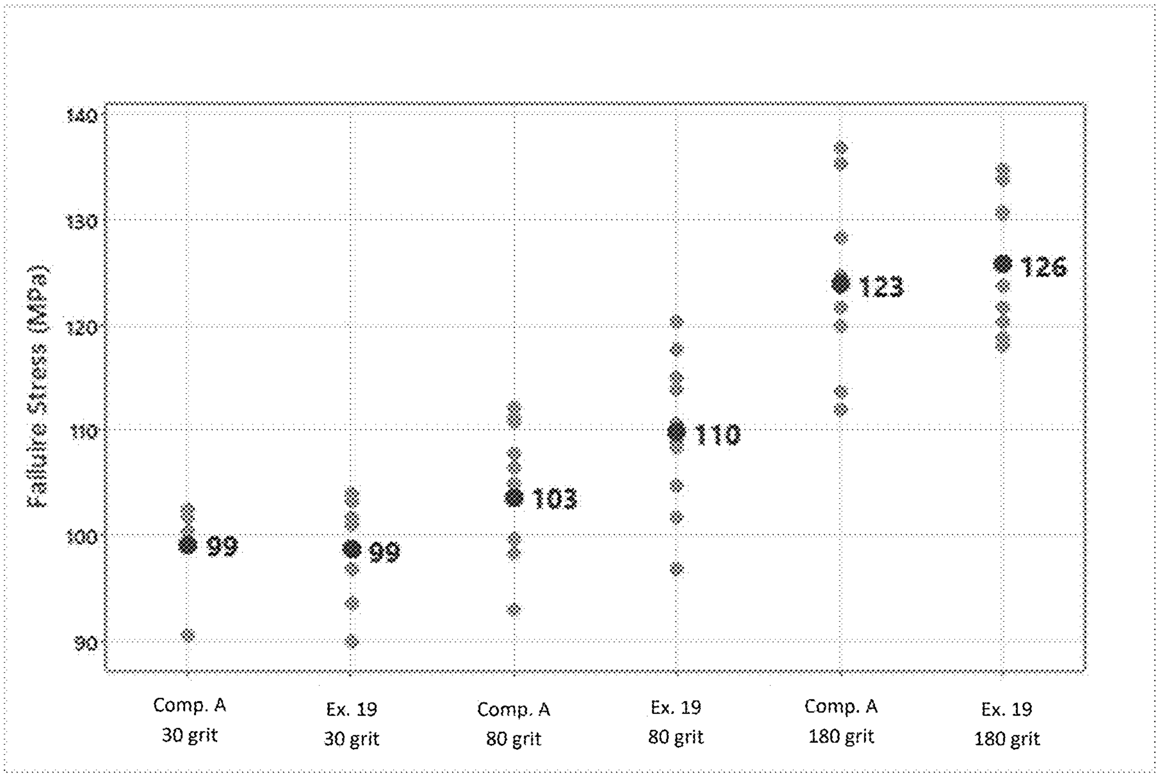
FIG. 12 graphically depicts the failure stress or retrained strength in 4-point bending (Y-axis) for non-ion exchanged lithium disilicate glass-ceramics according to embodiments described herein and non-ion exchanged petalite-lithium disilicate glass-ceramics for different sandpaper grits utilized in a pendulum impactor apparatus.

Referring now to FIGS. 11 and 12, non-ion exchanged glass-ceramic plates having a thickness t of 0.5 mm and formed from the glass-ceramics of Ex. 19 and Comparative Example A were subjected to damage introduction with a pendulum impactor apparatus and different sandpaper grits (30 grit, 80 grit, and 180 grit). Following damage introduction, the glass-ceramic plates were tested in 4-point bending, as described herein, and the applied load at failure was recorded. The applied load is converted to a stress (i.e., the failure stress) as described herein. Thereafter, the average depth of the flaws (i.e., the flaw size) introduced by the pendulum impactor apparatus was determined by optical inspection and image analysis. As shown in FIG. 11, the flaws induced in the glass-ceramic plates formed from the glass-ceramic of Ex. 19 with larger grit sandpaper (i.e., 30 grit) generally had an average flaw depth that was shallower than the glass-ceramic plates formed from the glass-ceramic of Comparative Example A. While not wishing to be bound by theory, it is believed the reduced average flaw depth is at least partially attributable to the increased Knoop hardness of the glass-ceramics described herein. As indicated in FIG. 12, the glass-ceramic plates formed from the glass-ceramic of Ex. 19 exhibited failure stresses greater than or equal to the failure stresses of the glass-ceramic plates formed from the glass-ceramic of Comparative Example A.

Figure 13:
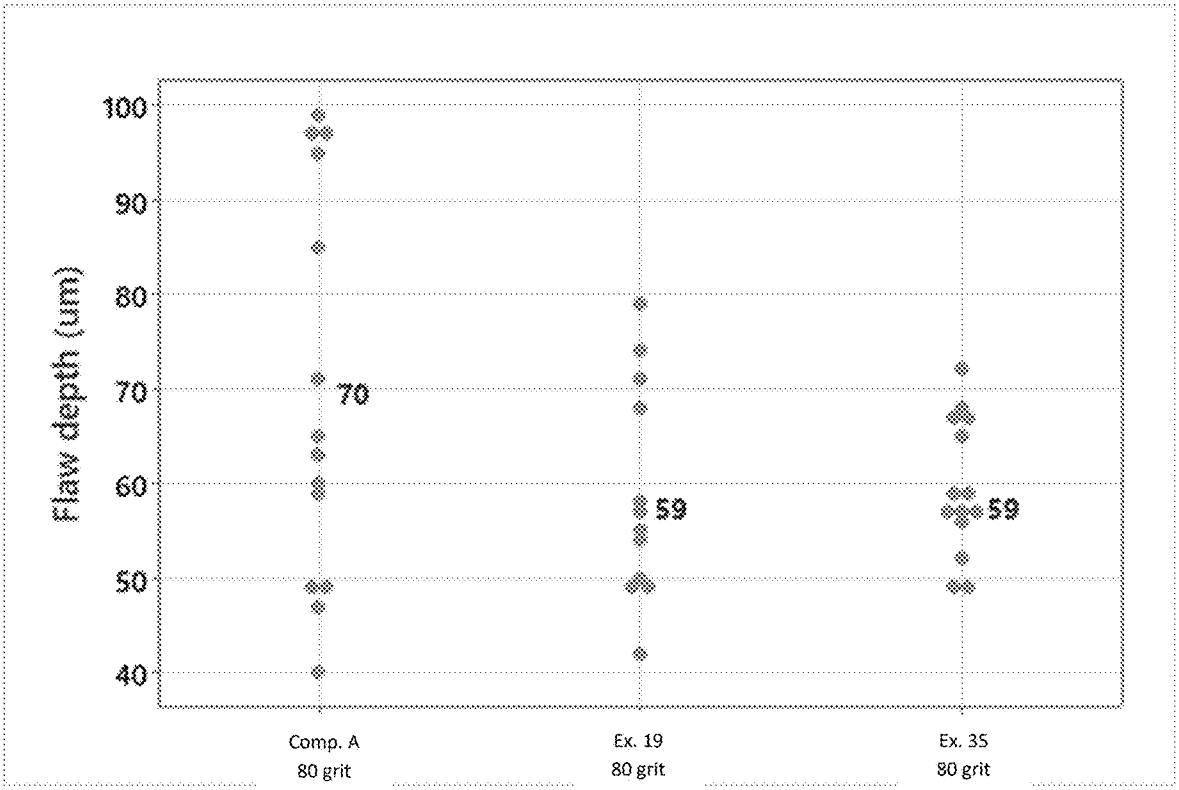
FIG. 13 graphically depicts the depth of flaws (Y-axis) introduced in ion exchanged lithium disilicate glass-ceramics according to embodiments described herein and ion exchanged petalite-lithium disilicate glass-ceramics for 80 grit sandpaper utilized in a pendulum impactor apparatus.
Figure 14:
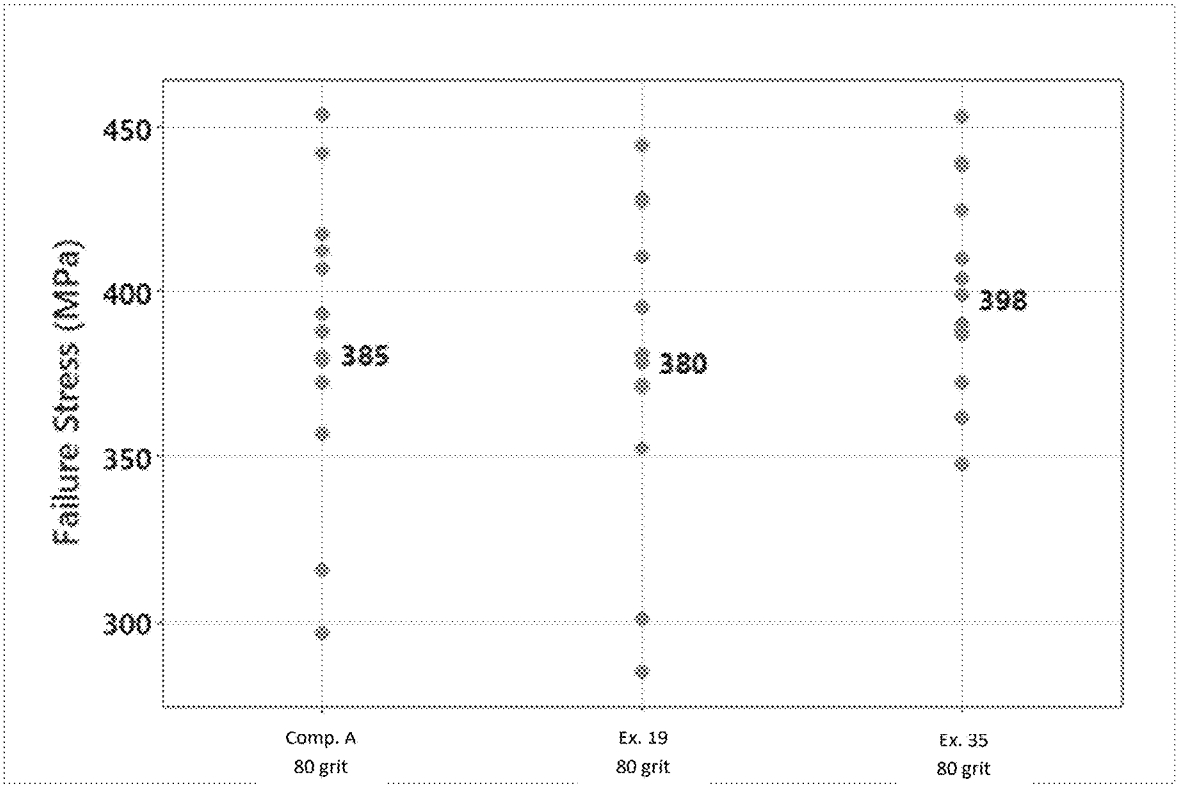
FIG. 14 graphically depicts the failure stress in 4-point bending (Y-axis) for ion exchanged lithium disilicate glass-ceramics according to embodiments described herein and ion exchanged petalite-lithium disilicate glass-ceramics for 80 grit sandpaper utilized in a pendulum impactor apparatus.

Referring now to FIGS. 13 and 14, ion exchanged glass-ceramic plates formed from the glass-ceramics of Ex. 19, Ex. 35, and Comparative Example A with a thickness t of 0.5 mm were subjected to damage introduction with a pendulum impactor apparatus using 80 grit sandpaper. The glass-ceramic plates were subjected to ion-exchange conditions as described herein with respect to FIG. 10. Following damage introduction, the glass-ceramic plates were tested in 4-point bending, as described herein, and the applied load at failure was recorded. The applied load at failure is then converted to a stress (i.e., the failure stress) as described herein. Thereafter, the average depth of the flaws (i.e., the flaw size) introduced by the pendulum impactor apparatus was determined by optical inspection and image analysis. As shown in FIG. 13, the flaws induced in the glass-ceramic plates formed from the glass-ceramics of Ex. 19 and Ex. 35 generally had an average flaw depth shallower than the glass-ceramic plates formed from the glass-ceramic of Comparative Example A. While not wishing to be bound by theory, it is believed that the reduced average flaw depth is at least partially attributable to the increased Knoop hardness of the glass-ceramics of Ex. 19 and Ex. 35 as well as the greater compressive stress at depths from the surface of the plate relative to the glass-ceramic plates formed from the glass-ceramic of Comparative Example A. As indicated in FIG. 14, the glass-ceramic plates formed from the glass-ceramics of Ex. 19 and Ex. 35 exhibited failure stresses in keeping with the failure stresses exhibited by the glass-ceramic plates formed from the glass-ceramic of Comparative Example A with the glass-ceramic plates formed from the glass-ceramic of Ex. 35 generally having failure stresses greater than the glass-ceramic plates formed from the glass-ceramic of Comparative Example A.

Figure 15:
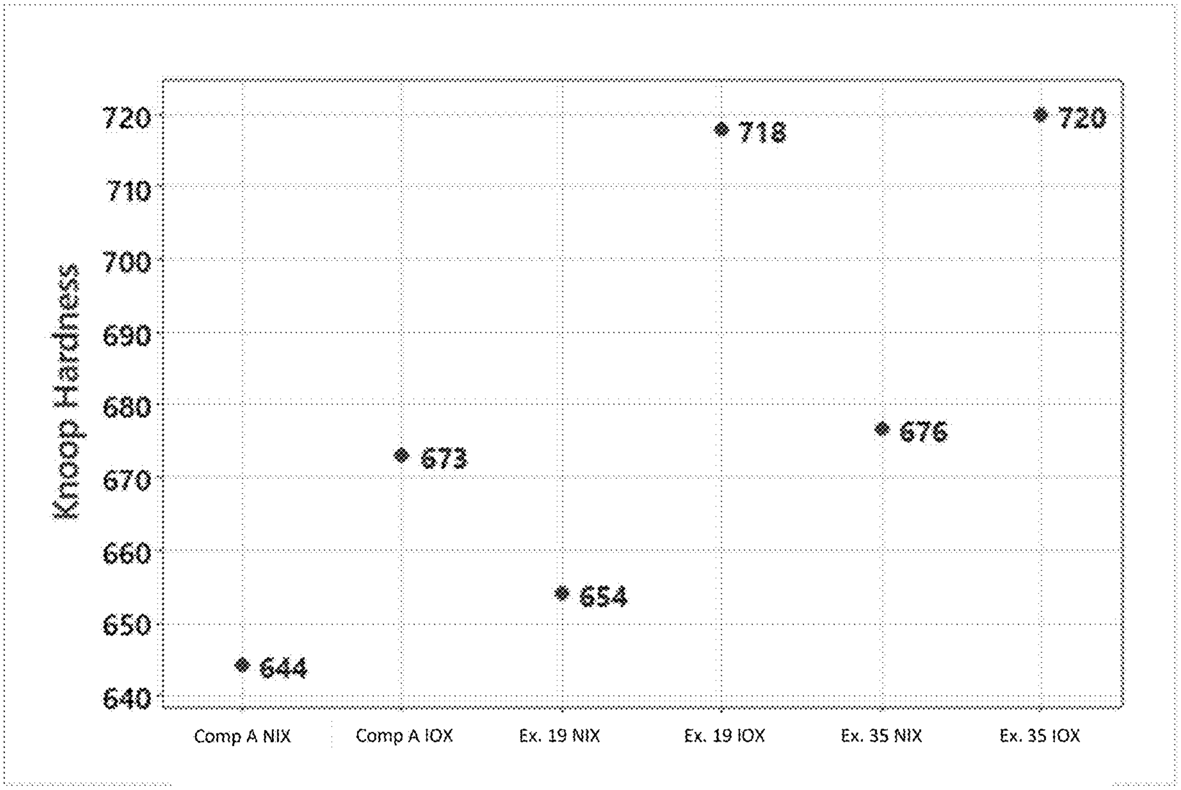
FIG. 15 graphically depicts the Knoop hardness values of ion exchanged (IOX) and non-ion exchanged (NIX) lithium disilicate glass-ceramics according to embodiments described herein and ion exchanged (IOX) and non-ion exchanged (NIX) petalite-lithium disilicate glass-ceramics.

Referring now to FIG. 15, the Knoop hardness of ion exchanged (IOX) and non-ion exchanged (NIX) glass-ceramic plates formed from the glass-ceramics of Ex. 19, Ex.

35, and Comparative Example A was determined. The glass-ceramic plates had a thickness of 0.5 mm. The ion exchanged glass-ceramic plates were subjected to ion-exchange conditions as described herein with respect to FIG. 10. As indicated in FIG. 15, the non-ion exchanged glass-ceramic plates formed from the glass-ceramic of Ex. 19 and Ex. 35 had Knoop hardnesses greater than the non-ion exchanged glass-ceramic plates formed from the glass-ceramic of Comparative Example A. Similarly, the ion-exchanged glass-ceramic plates formed from the glass-ceramics of Ex. 19 and Ex. 35 had Knoop hardnesses greater than the ion exchanged glass-ceramic plates formed from the glass-ceramic of Comparative Example A.

Figure 16:
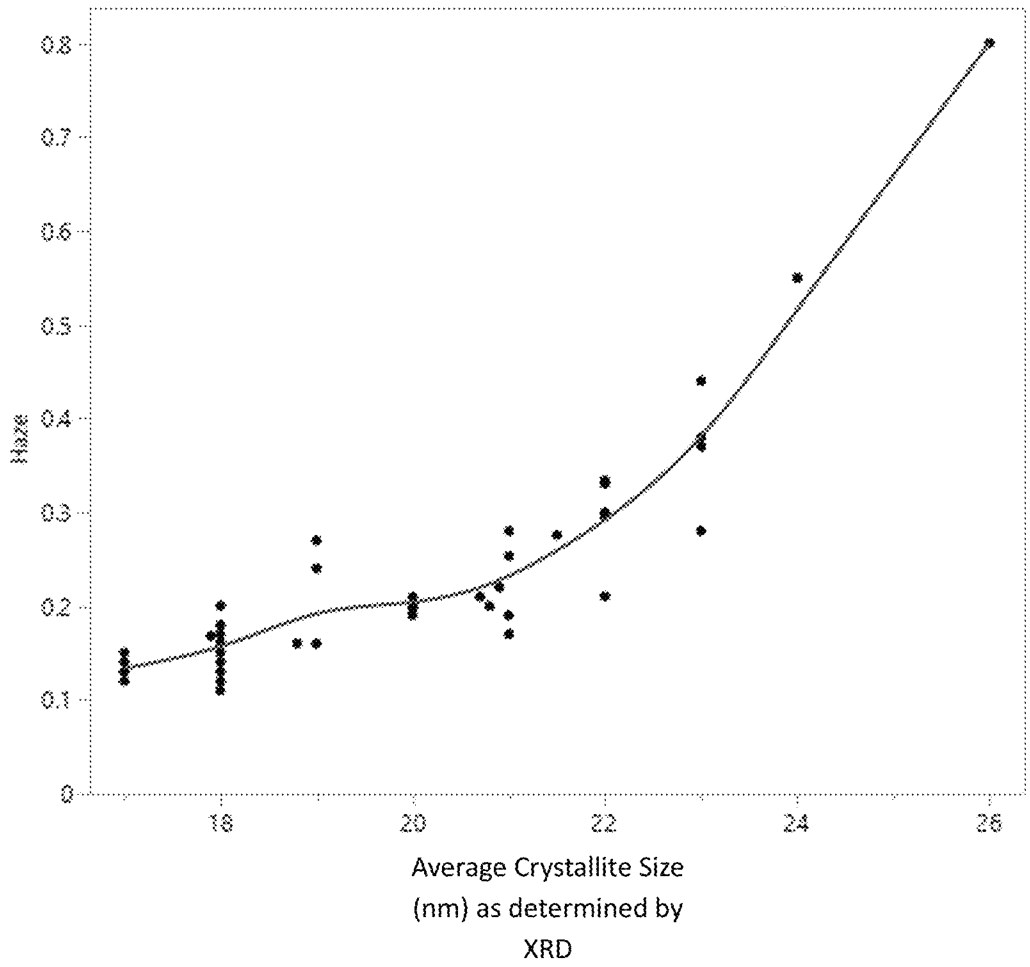
FIG. 16 graphically depicts the haze (Y-axis) as a function of the average crystallite size (X-axis) for lithium disilicate glass-ceramics according to embodiments described herein.

To investigate the relationship between the average crystallite size of glass-ceramics and the haze (%) of the glass-ceramics, glass-ceramic plates having the compositions of Examples 36-43 and thicknesses of 0.6 mm were produced using different ceramming cycles. In particular, nucleation temperatures of 510° C.-515° C., nucleation times of 180 minutes-360 minutes, growth temperatures of 700° C.-730° C. and growth times of 60 minutes-90 minutes were utilized to prepare the samples. Thereafter, the average crystallite size of the samples was determined using x-ray diffraction analysis as described herein. The haze (%) of the samples was also measured as described herein. The haze (%) of the samples (Y-axis) is plotted as a function of the average crystallite size (X-axis) in FIG. 16. As indicated in FIG. 16, the haze of the glass-ceramics generally increased with increasing average crystallite size, and rapidly increased with increasing average crystallite size once the average crystallite size exceeded 22 nm.

Figure 17:
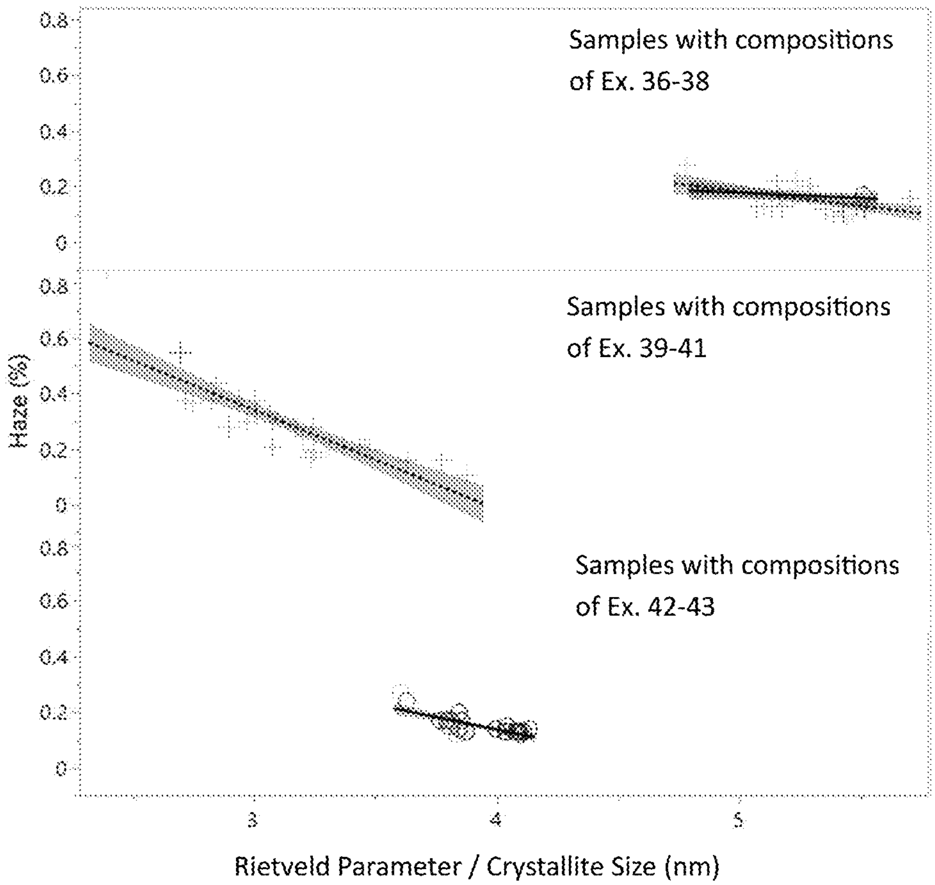
FIG. 17 graphically depicts the haze (Y-axis) as a function of the ratio of the Rietveld parameter of the lithium disilicate in the glass-ceramics to the average crystallite size (in nm) of the lithium disilicate in the glass-ceramics.

To investigate the relationship between the haze of glass-ceramics and the ratio of the Rietveld parameter of the lithium disilicate in the glass-ceramics to the crystallite size (in nm) of the lithium disilicate in the glass-ceramics, glass-ceramic plates having the composition of Examples 39-43 and thicknesses of 0.6 mm were produced using different ceramming cycles (i.e., nucleation times from 180 minutes to 360 minutes and nucleation temperatures from 515° C.-610° C.). Thereafter, the average crystallite size of the samples and the Rietveld parameter of the lithium disilicate in the samples were determined using x-ray diffraction analysis as described herein. The haze (%) of the samples was also measured as described herein. The haze (%) of the samples (Y-axis) is plotted as a function of the ratio (X-axis) of the Rietveld parameter of the lithium disilicate in the glass-ceramics to the crystallite size (in nm) of the lithium disilicate in the glass-ceramics in FIG. 17. As indicated in FIG. 17, when the ratio of the Rietveld parameter of the lithium disilicate in the glass-ceramics to the crystallite size of the lithium disilicate in the glass-ceramics is greater than about 2.75 wt %/nm, the haze (%) of the glass-ceramics is generally less than 0.4.

To investigate the relationship between the fracture toughness of glass-ceramics and the ratio of the Rietveld parameter of the lithium disilicate in the glass-ceramics to the crystallite size (in nm) of the lithium disilicate in the glass-ceramics, glass-ceramic plates having the compositions and thicknesses indicated in Table 5 were produced using the indicated ceramming cycles. Thereafter, the average crystallite size of the samples and the Rietveld parameter of the lithium disilicate in the samples were determined using x-ray diffraction analysis as described herein. The fracture toughness of each sample was then tested as described herein. The results are reported in Table 5.

TABLE 5

| Example | 44 | 45 | 46 | 47 | 48 | 49 | 50 | 51 | 52 | 53 |
|---|---|---|---|---|---|---|---|---|---|---|
| $SiO_2$ (wt %) | 69.3 | 69.3 | 69.3 | 69.3 | 69.3 | 69.5 | 69.5 | 69.356 | 69.3 | 69.5 |
| $Al_2O_3$ (wt %) | 1.81 | 1.81 | 1.81 | 1.81 | 1.81 | 1.96 | 1.96 | 1.82 | 1.82 | 1.96 |
| $Li_2O$ (wt %) | 14.1 | 14.1 | 14.1 | 14.1 | 14.1 | 13.99 | 13.99 | 14.1 | 14.1 | 14 |
| $Na_2O$ (wt %) | 0.14 | 0.14 | 0.14 | 0.14 | 0.15 | 0.14 | 0.14 | 0.14 | 0.14 | 0.13 |
| $K_2O$ (wt %) | 0.18 | 0.18 | 0.18 | 0.18 | 0.18 | 0.13 | 0.13 | 0.18 | 0.18 | 0.13 |
| CaO (wt %) | 1.59 | 1.59 | 1.59 | 1.59 | 1.60 | 1.61 | 1.61 | 1.59 | 1.59 | 1.60 |
| $ZrO_2$ (wt %) | 9.08 | 9.08 | 9.08 | 9.08 | 9.08 | 8.54 | 8.54 | 9.05 | 9.08 | 8.51 |
| $P_2O_5$ (wt %) | 3.49 | 3.49 | 3.49 | 3.49 | 3.49 | 3.88 | 3.88 | 3.49 | 3.48 | 3.89 |
| $Fe_2O_3$ (wt %) | 0.06 | 0.06 | 0.06 | 0.06 | 0.06 | 0.06 | 0.06 | 0.06 | 0.06 | 0.06 |
| $HfO_2$ (wt %) | 0.17 | 0.17 | 0.17 | 0.17 | 0.18 | 0.16 | 0.16 | 0.17 | 0.17 | 0.16 |
| $SnO_2$ (wt %) | 0.03 | 0.03 | 0.03 | 0.03 | 0.03 | 0.04 | 0.04 | 0.03 | 0.03 | 0.04 |
| $Al_2O_3$:$Li_2O$ | 0.13 | 0.13 | 0.13 | 0.13 | 0.13 | 0.14 | 0.14 | 0.13 | 0.13 | 0.14 |
| $Li_2O$:$ZrO_2$ | 1.55 | 1.55 | 1.55 | 1.55 | 1.55 | 1.64 | 1.64 | 1.56 | 1.55 | 1.64 |
| $Li_2O$:($Li_2O$ + $K_2O$ + $Na_2O$) | 0.98 | 0.98 | 0.98 | 0.98 | 0.98 | 0.98 | 0.98 | 0.98 | 0.98 | 0.98 |
| Thickness (mm) | 25 | 25 | 25 | 25 | 25 | 25 | 25 | 25 | 25 | 25 |
| ceramming cycle (nucleation (° C.-hr), (growth (° C.-hr) | 580-4, 720-1 | 520-3, 720-1 | 595-4, 720-1 | 595-4, 720-1 | 530-3, 720-1 | 570-4, 710-1 | 560-4, 720-60 | 595-4, 720-60 | 530-3, 720-1 | 560-4, 710-1 |
| Rietveld parameter - Glass | 27.8 | 27.2 | 31 | 30.1 | 28.2 | 25.5 | 24.7 | 30.7 | 28.2 | 25 |
| Rietveld parameter - $Li_2Si_2O_5$ | 69.3 | 69.2 | 66.5 | 67.3 | 68.6 | 70.2 | 71.3 | 66.7 | 68.5 | 70.7 |
| Rietveld parameter - $Li_3PO_4$ | 2.9 | 3.5 | 2.5 | 2.5 | 3.2 | 4.4 | 4.1 | 2.6 | 3.3 | 3.7 |
| $Li_2Si_2O_5$ Crystallite size (nm) | 20.6 | 18.6 | 23 | 22 | 18 | 14 | 13 | 23 | 18 | 13 |

TABLE 5-continued

| Example | 44 | 45 | 46 | 47 | 48 | 49 | 50 | 51 | 52 | 53 |
|---|---|---|---|---|---|---|---|---|---|---|
| Rietveld parameter of $Li_2Si_2O_5$:$Li_2Si_2O_5$ Crystallite size (nm) | 3.4 | 3.7 | 2.9 | 3.1 | 3.8 | 5 | 5.5 | 2.9 | 3.8 | 5.4 |
| $K_{1c}$ (MPa · $m^{1/2}$) | 1.34 | 1.28 | 1.34 | 1.35 | 1.3 | 1.23 | 1.22 | 1.34 | 1.31 | 1.21 |

As indicated in Table 5, when the ratio of the Rietveld parameter of the lithium disilicate in the glass-ceramics to the crystallite size of the lithium disilicate in the glass-ceramics is greater than about 2.75 wt %/nm, the fracture toughness of the glass-ceramics is greater than 1.2 MPa·$m^{1/2}$.

Glass-ceramic plates formed from the compositions of Example 40 and Example 42 in Table 1F and comparative Composition A in Table 1C were subjected to a drop test (as described herein) to determine the maximum drop height before failure (i.e., the drop height). The glass-ceramic plates had thicknesses of 0.5 mm, 0.55 mm, and/or 0.6 mm. The drop tests were performed on 80 grit SiC sandpaper, 60 grit $Al_2O_3$ sandpaper, and/or 36 grit $Al_2O_3$ sandpaper. The results are graphically depicted in FIG. 21 (80 grit SiC sandpaper), FIG. 22 (60 grit $Al_2O_3$ sandpaper), and FIG. 23 (36 grit $Al_2O_3$ sandpaper). The glass-ceramic plates were strengthened by ion exchange according to the conditions specified in Table 6.

TABLE 6

| Composition | Thickness (mm) | IOX Bath (wt %) | IOX Temp (° C.) | IOX Time (min.) |
|---|---|---|---|---|
| Ex. 40 | 0.5 | 20 $KNO_3$—80 $NaNO_3$—0.14 $LiNO_3$ | 515 | 380 |
| Ex. 40 | 0.55 | 20 $KNO_3$—80 $NaNO_3$—0.16 $LiNO_3$ | 515 | 390 |
| Ex. 40 | 0.6 | 20 $KNO_3$—80 $NaNO_3$—0.16 $LiNO_3$ | 515 | 510 |
| Ex. 42 | 0.55 | 42 $KNO_3$—58 $NaNO_3$—0.16 $LiNO_3$ | 515 | 420 |
| Ex. 42 | 0.6 | 47 $KNO_3$—53 $NaNO_3$—0.16 $LiNO_3$ | 515 | 510 |
| Comp. A | 0.55 | 60 $KNO_3$—40 $NaNO_3$—0.12 $LiNO_3$ | 530 | 205 |
| Comp. A | 0.6 | 60 $KNO_3$—40 $NaNO_3$—0.12 $LiNO_3$ | 530 | 220 |

Figure 21:
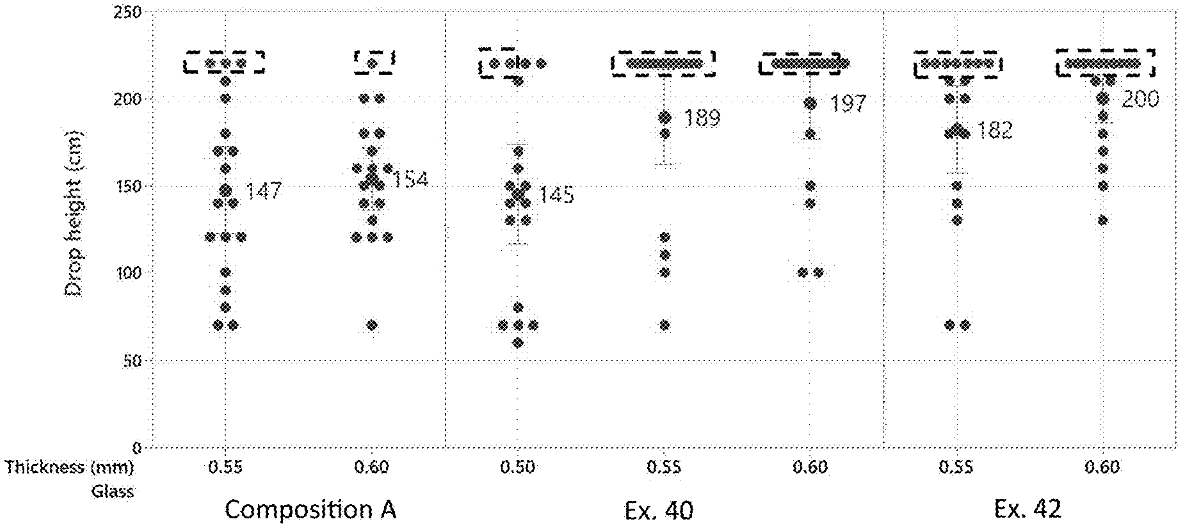
FIG. 21 graphically depicts the drop height at failure (Y-axis) as a function of glass thickness (X-axis) for glass-ceramic articles according to embodiments described herein and comparative glass-ceramic articles.

As shown in FIG. 21, glass-ceramic plates formed from the compositions of Examples 40 and 42 and strengthened as described herein generally exhibited a higher drop height than the glass-ceramic plates formed from comparative Composition A and strengthened as described herein for the same thickness when dropped on 80 grit SiC sandpaper. It is noted that the data points contained in the dashed boxes are glass-ceramic plates that survived the maximum drop height (i.e., 220 cm).

Figure 22:
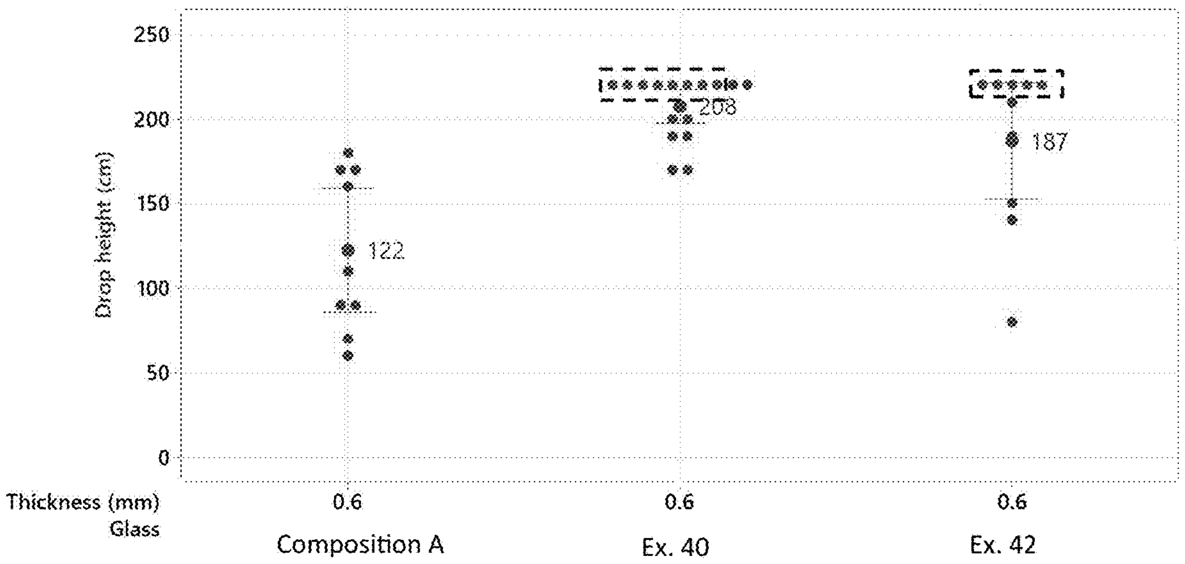
FIG. 22 graphically depicts the drop height at failure (Y-axis) as a function of glass thickness (X-axis) for glass-ceramic articles according to embodiments described herein and comparative glass-ceramic articles.

As shown in FIG. 22, glass-ceramic plates formed from the compositions of Examples 40 and 42 and strengthened as described herein generally exhibited a higher drop height than the glass-ceramic plates formed from comparative Composition A and strengthened as described herein for the same thickness when dropped on 60 grit $Al_2O_3$ sandpaper. It is noted that the data points contained in the dashed boxes are glass-ceramic plates that survived the maximum drop height (i.e., 220 cm).

Figure 23:
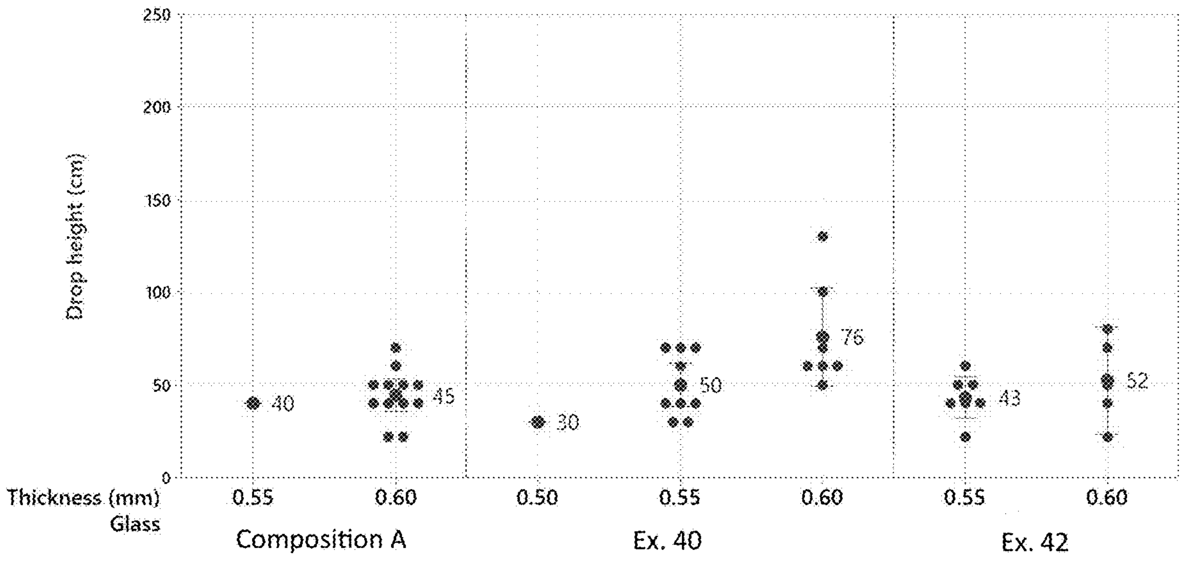
FIG. 23 graphically depicts the drop height at failure (Y-axis) as a function of glass thickness (X-axis) for glass-ceramic articles according to embodiments described herein and comparative glass-ceramic articles.

As shown in FIG. 23, glass-ceramic plates formed from the compositions of Examples 40 and 42 and strengthened as described herein generally exhibited a higher drop height than the glass-ceramic plates formed from comparative Composition A and strengthened as described herein for the same thickness when dropped on 36 grit $Al_2O_3$ sandpaper.

Glass plates formed from the compositions of Example 40 and having a thickness of 0.6 mm were cerammed according to different ceramming schedules to vary the crystallite size of the resulting glass-ceramic plates and, correspondingly, the haze of the glass-ceramic plates. Thereafter, the reflected color coordinates in the CIELAB color space, as measured at an article thickness of 0.6 mm under D65 illumination and a 10° standard observer angle (specular components excluded (SCE)), the transmitted color coordinates in the CIELAB color space, as measured at an article thickness of 0.6 mm under D65 illumination and a 10° standard observer angle, and the haze of each glass-ceramic plate was measured. The b* values (Y-axis) of light reflected from glass-ceramic substrates as a function of haze (X-axis) are plotted in FIG. 24 and the b* values (Y-axis) of light reflected from glass-ceramic substrates as a function of haze (X-axis) are plotted in FIG. 25.

Figure 24:
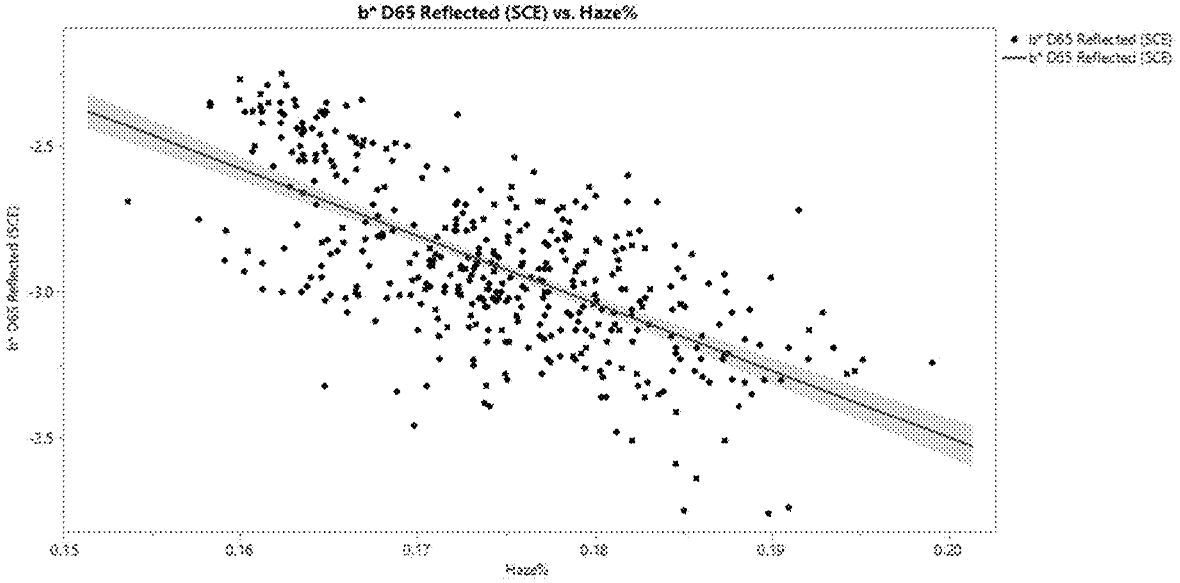
FIG. 24 graphically depicts the b* values (Y-axis) of light reflected from glass-ceramic substrates as a function of haze (X-axis)
Figure 25:
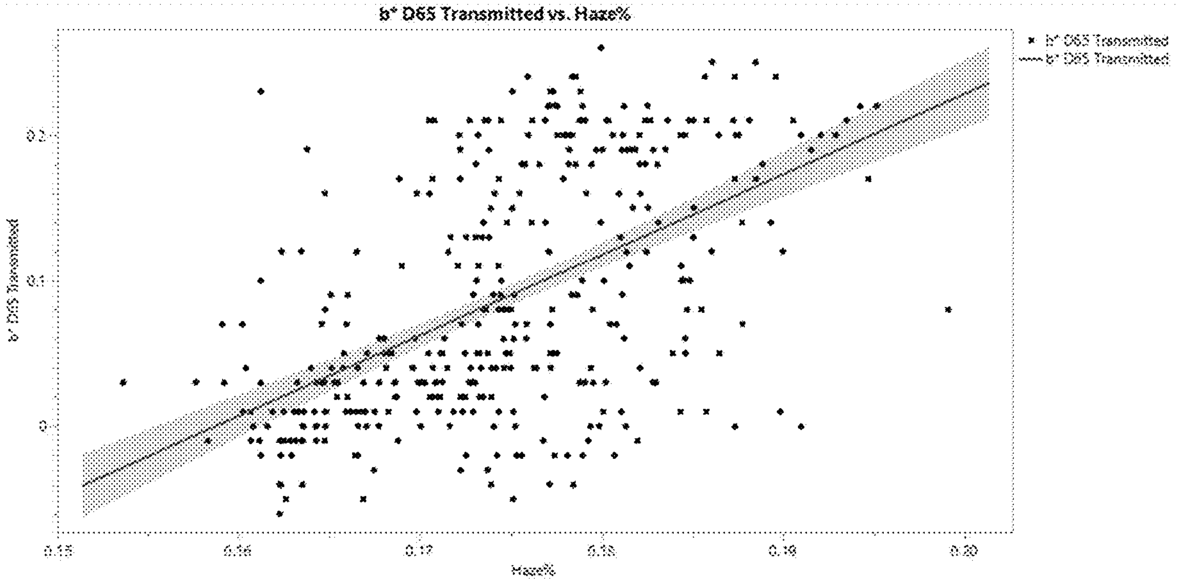
FIG. 25 graphically depicts the b* values (Y-axis) of light transmitted through glass-ceramic substrates as a function of haze (X-axis).

As depicted in FIG. 24, the b* values of the glass-ceramic plates generally decrease with increasing haze (and therefore increasing crystallite size) indicating a greater proportion of blue light in the reflected light with increasing haze (and increasing crystallite size). Conversely, FIG. 25 demonstrates that the b* values of the glass-ceramic plates generally increase with increasing haze (and therefore increasing crystallite size) indicating a greater proportion of yellow light in the transmitted light with increasing haze (and increasing crystallite size).

Procedure for Determining Rietveld Parameters for Glass-Ceramic Samples

The phase concentration using the Rietveld method is achieved through a least-squares modeling approach applied to X-ray diffraction (XRD) data to arrive at the Rietveld parameters. The Rietveld model assumes that all phases are crystalline and have known structures.

Glass-ceramics, being a mixture of crystalline phases and a residual amorphous glass phase, exhibit distinct XRD patterns. Structural information for the residual amorphous glass phase is unavailable. The residual amorphous glass phase is modeled as a material with similar absorption as the glass-ceramic under analysis and very small crystallite sizes, which, when refined, produce a spectrum that mimics the amorphous halo. The scale of this halo is then further refined alongside the crystalline phases, enabling an estimation of the relative concentrations of each phase (i.e., the Rietveld parameters, which are reported. Crystallite sizes are also calculated for the lithium disilicate crystalline phase using the Rietveld model. Both the Rietveld parameters and crystallite sizes resulting from the Rietveld model are highly repeatable.

The Rietveld parameters for crystalline phases and amorphous glass phases in glass-ceramics may be determined with the following procedure.

The procedure utilizes the following equipment and software:

X-ray diffractometer (Bruker-AXS D8 Endeavor equipped with a Cu radiation source and a Lynx Eye detector);

a Rocklabs Whisper Series Ring Mill, Backfill sample holders (Malvern Panalytical PW1770/10 Powder Sample Preparation Kit and PW18XX sample holder);

15.24 cm×15.24 cm weigh papers;

glass slides;

spatula; and data analysis software (MDI Jade (version 9.0 or higher), Bruker Topas (version 6.0 or higher), and Powder Diffraction File Database PDF-5 (2025 release or higher)).

Sample Preparation

Approximately 3 grams of a glass-ceramic sample is placed in the ring mill and ground for about 30 seconds to produce a fine powder. The glass-ceramic powder is placed in a PW18XX sample holder and the sample holder ring is clamped to a preparation table. The glass-ceramic powder is spread in the sample holder ring so that the powder is heaped in a conical shape inside the holder ring. The glass-ceramic power is pressed in the holder ring using a glass slide with excess glass-ceramic powder scraped back into the holder ring using the glass slide. Additional glass-ceramic powder may be added as necessary to fill the sample holder. This process is repeated until a densely packed glass-ceramic powder specimen is obtained. Excess glass-ceramic powder above the rim of the holder ring is removed using the edge of the glass slide. A bottom plate is placed onto the holder ring and clamped into position. The complete sample holder is removed from the preparation table and placed in the X-ray diffractometer.

X-Ray Diffraction

A job file for the glass-ceramic sample is created in XRD Commander of the Bruker software. The job file includes the position of the glass-ceramic sample in the X-ray diffractometer and identifying information for the glass-ceramic sample. After the job file is created the X-ray diffractometer scans the sample.

Data Analysis

After the sample is scanned by the X-ray diffractometer, the data obtained from the X-ray diffractometer is analyzed using the MDI Jade software. A file containing the data from the X-ray diffractometer is opened in MDI Jade. The "Phases" window of the software is used to identify indicator peaks in the data. Table 7 includes indicator peaks for at least some phases that may be present in the glass-ceramics described herein. The PDF number for each phase is typed into the PDF recall field of the software.

TABLE 7

| Peaks (Å) | Phase | PDF Card # |
|---|---|---|
| 5.42, 3.71, 3.59 | $Li_2Si_2O_5$ | 40-376 |
| 3.96, 2.63 | $Li_3PO_4$ | 15-760 |

If it is determined that there are additional phases present in the XRD scan, additional phase identifications are performed using the same technique and guided by the chemistry of the sample.

The data is then opened in the TOPAS Rietveld refinement software and analyzed using the following steps:

1. Load Data: Open the TOPAS Rietveld refinement software, click on File → Load Scan Data, and navigate to the location of the .raw file. Right-click the file name, select load inp.par, and locate the most recent instrument parameters file for the diffractometer. Change the file type drop-down menu to .par and load the file.
2. Set Parameters:
    - Refine instrument parameters using a traceable standard (e.g., NIST SRM 660).
    - Under the scan name, set the parameters as follows:
        - Emission profile: Not refining
        - Background model: Chebychev with 6 coefficients, refining
        - Linear PSD and Simple Axial model: Fixed
        - Sample displacement: Refining
        - LP factor: 1, Absorption: 20, Sample Thickness: 10 (all fixed)
    - Set the start X value to 11 and the finish X value to 74.
3. Load Structure Files: Download the following .str structure files from the PDF database:
    - Li5Si5O5: 00-040-0376
    - Cristobalite: 04-007-2134
    - Li3PO4: 15-760

Right-click the data file name, select load .str(s), and navigate to the saved .str files. Control-click to load the Cristobalite, Li2Si2O5, and Li3PO4 files.

4. Set Up the Amorphous Phase:
    - Rename the Cristobalite structure to "Amorphous."
    - In the structure tab, set lattice constants to a = 4.809 Å and c = 6.9383 Å (fixed). Allow the scale to refine.
    - In the microstructure tab, check Cry size L and set it to 1.4 (fixed).
    - Under the "Sites" tab, fix all atom positions and occupancies. Set the Beq values to $Si_1$ = 4.122 and $O_1$ = −2.226. Note: While a negative Beq value is typically unrealistic, this structure has been refined to fit the glassy phase of the glass-ceramics described herein and is an accepted exception.

-continued

| | | |
|---|---|---|
| Run the refinement and accept the parameters upon convergence. | | |
| 5. | Refine Li4Si4O5: | |
| | | Check the use box for this phase. Ensure lattice parameters and scale are on. |
| | | Run the refinement and accept the parameters upon convergence. |
| | | In the microstructure tab, check Cry size L, set the start value to 20, and allow it to refine. |
| | | In the preferred orientation menu, set PO Spherical Harmonics to use with a 4th-order fit. Run the refinement and accept the parameters upon convergence. |
| 6. | Refine Li3PO4: | |
| | | Check the use box for this phase. Do not refine lattice parameters, only scale. |
| | | In the microstructure tab, check Cry size L, set the value to 24.0, and fix it. |
| | | Run the refinement and accept the parameters upon convergence. |

Results and Checks

At this point, the Rietveld parameter for each phase (crystalline and amorphous) will be displayed in the upper-right corner of the main display window. The goodness of fit for the Rietveld model is determined by the software as an "Rwp" value and if the Rwp value is less than 8 and the difference plot is flat aside from minor discrepancies in the $Li_2Si_2O_5$ phase (due to its needle-like microstructure), there is high confidence in the relative Rietveld parameter results. If the Rwp value exceeds 10 and peaks appear in the difference plot, this indicates a missing phase in the model, and phase identification should be revisited.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass-ceramic article comprising:

a composition, in weight percent (wt %) on an oxide basis, comprising:

greater than or equal to 55 wt % and less than or equal to 80 wt % $SiO_2$;

greater than or equal to 0 wt % and less than or equal to 6 wt % $Al_2O_3$;

greater than or equal to 7 wt % and less than or equal to 20 wt % $Li_2O$;

greater than or equal to 1 wt % and less than or equal to 8 wt % $P_2O_5$;

greater than 0.5 wt % to less than or equal to 20 wt % $ZrO_2$;

greater than or equal to 0 wt % and less than or equal to 5.0 wt % $Na_2O$; and greater than or equal to 0 wt % and less than or equal to 5.0 wt % $K_2O$;

a phase assemblage comprising lithium disilicate ($Li_2Si_2O_5$) as a primary crystalline phase and a residual amorphous glass phase, the lithium disilicate ($Li_2Si_2O_5$) with a Rietveld parameter of greater than or equal to 20 and less than or equal to 90;

lithium phosphate ($Li_3PO_4$) with a Rietveld parameter of greater than or equal to 0 and less than or equal to 10;

lithium metasilicate ($Li_2SiO_3$) with a Rietveld parameter of greater than or equal to 0 and less than or equal to 10; and petalite ($LiAlSi_4O_{10}$) with a Rietveld parameter of greater than or equal to 0 and less than 5;

a transmittance of greater than 88% for wavelengths of light within a range from greater than or equal to 400 nm to less than or equal to 750 nm; and a haze of less than 1%; and a thickness of less than 1.6 mm.

2. The glass-ceramic article of claim 1, wherein the phase assemblage comprises the lithium disilicate ($Li_2Si_2O_5$) with a Rietveld parameter of greater than or equal to 55 to less than or equal to 65.

3. The glass-ceramic article of claim 1, wherein a ratio of $Li_2O$ (wt %) to $ZrO_2$ (wt %) in the glass-ceramic is greater than or equal to 1.10 and less than or equal to 5.0.

4. The glass-ceramic article according to claim 1 wherein the phase assemblage is substantially free of a petalite crystalline phase; and wherein the haze is less than 0.2.

5. The glass-ceramic article according to claim 1 wherein the $ZrO_2$ is greater than 4 wt % to less than or equal to 15 wt %;

wherein the $Na_2O$ is greater than or equal to 0.1 wt % and less than or equal to 5 wt %; and wherein the $K_2O$ is greater than or equal to 0 wt % and less than 1 wt %; and wherein the phase assemblage is substantially free of a petalite crystalline phase.

6. The glass-ceramic article of claim 5, further comprising:

a compressive stress layer extending from a surface of the glass-ceramic to a depth of compression; and a maximum central tension, wherein the maximum central tension is greater than 130 MPa.

7. The glass-ceramic article of claim 6, wherein the compressive stress layer comprises a surface compressive stress greater than or equal to 200 MPa and less than or equal to 650 MPa.

8. The glass-ceramic article of claim 4, comprising a retained strength following damage introduction by a pressurized gas method of:

greater than or equal to 100 MPa for average flaw depths less than or equal to 150 μm;

greater than or equal to 200 MPa for average flaw depths less than or equal to 100 μm;

greater than or equal to 350 MPa for average flaw depths less than or equal to 50 μm;

greater than or equal to 450 MPa for average flaw depth less than or equal to 25 μm; and greater than or equal to 500 MPa for average flaw depths less than or equal to 10 μm.

9. The glass-ceramic article of claim 4, comprising:

greater than or equal to 55 wt % and less than or equal to 80 wt % $SiO_2$;

greater than or equal to 7 wt % and less than or equal to 20 wt % $Li_2O$;

greater than 4 wt % to less than or equal to 15 wt % $ZrO_2$;

greater than or equal to 1 wt % and less than or equal to 8 wt % $P_2O_5$;

greater than or equal to 0.1 wt % and less than or equal to 5 wt % $Na_2O$; and less than 1 wt % $K_2O$.

10. The glass-ceramic article of claim 9, wherein:

the $Li_2O$ is greater than or equal to 12.0 wt %;

the $ZrO_2$ is greater than or equal to 8.0 wt %;

the $Na_2O$ is greater than or equal to 0.5 wt %; and the $P_2O_5$ is greater than or equal to 3.0 wt %.

11. The glass-ceramic article of claim 10, wherein the composition further comprises:

greater than 0 wt % and less than or equal to 3.0 wt % $HfO_2$; and greater than 0 wt % to less than or equal to 3 wt % $SnO_2$.

12. The glass-ceramic article of claim 11, wherein the phase assemblage comprises the lithium disilicate ($Li_2Si_2O_5$) with a Rietveld parameter of greater than or equal to 55 to less than or equal to 65.

13. The glass-ceramic article of claim 4, wherein a ratio of $Li_2O$ (wt %) to $ZrO_2$ (wt %) in the glass-ceramic is greater than or equal to 1.10 and less than or equal to 5.0.

14. The glass-ceramic article of claim 4, further comprising:

a compressive stress layer extending from a surface of the glass-ceramic to a depth of compression; and a maximum central tension, wherein the maximum central tension is greater than 130 MPa.

15. The glass-ceramic article of claim 14, wherein the compressive stress layer comprises a surface compressive stress greater than or equal to 200 MPa and less than or equal to 650 MPa.

16. The glass-ceramic article of claim 4, comprising:

a Young's modulus greater than or equal to 100 GPa and less than or equal to 130 GPa;

a fracture toughness greater than or equal to 1.10 $MPa \cdot m^{1/2}$ and less than or equal to 2.00 $MPa \cdot m^{1/2}$ prior to strengthening by ion exchange.

17. An electronic device comprising a cover substrate, the cover substrate comprising the glass-ceramic article of claim 4.

18. The glass-ceramic article of claim 4, wherein the composition further comprises greater than 0 wt % to less than 8 wt % CaO.

19. The glass-ceramic article of claim 4, wherein the composition is such that a ratio of $Al_2O_3$(wt %) to $Li_2O$ (wt %) is greater than or equal to 0 and less than 0.50.

* * * * *